（12）United States Patent
Yang

(10) Patent No.: US 7,173,344 B2
(45) Date of Patent: Feb. 6, 2007

(54) SERIES & PARALLEL COMBINED DUAL POWER DRIVE SYSTEM

(76) Inventor: Tai-Her Yang, No. 59, Chung Hsing 8 St., Si-Hu Town, Dzan Hwa (TW)

( * ) Notice: Subject to any disclaimer, the term of this patent is extended or adjusted under 35 U.S.C. 154(b) by 67 days.

(21) Appl. No.: 10/918,487

(22) Filed: Aug. 16, 2004

(65) Prior Publication Data

US 2005/0230976 A1    Oct. 20, 2005

Related U.S. Application Data

(63) Continuation-in-part of application No. 10/851,207, filed on May 24, 2004, now abandoned, which is a continuation-in-part of application No. 10/826,392, filed on Apr. 19, 2004, now abandoned.

(51) Int. Cl.
*F16H 3/72* (2006.01)
*F02N 15/00* (2006.01)

(52) U.S. Cl. .................. 290/4 R; 290/40 C; 475/5; 180/65.2

(58) Field of Classification Search ............... 290/1 R, 290/3, 4 R, 40 C; 475/5, 330, 311; 180/65.2
See application file for complete search history.

(56) References Cited

U.S. PATENT DOCUMENTS

| | | | | |
|---|---|---|---|---|
| 5,433,282 A * | 7/1995 | Moroto et al. | ............. | 180/65.2 |
| 5,966,000 A * | 10/1999 | Yang | ............. | 322/23 |
| 6,054,844 A * | 4/2000 | Frank | ............. | 322/16 |
| 6,297,575 B1 * | 10/2001 | Yang | ............. | 310/266 |
| 6,365,983 B1 * | 4/2002 | Masberg et al. | .......... | 290/40 C |
| 6,432,023 B1 * | 8/2002 | Ahner et al. | ............. | 477/5 |
| 6,575,866 B2 * | 6/2003 | Bowen | ............. | 475/5 |
| 6,702,709 B2 * | 3/2004 | Bowen | ............. | 475/277 |
| 6,716,126 B2 * | 4/2004 | Bowen | ............. | 475/5 |
| 6,832,148 B1 * | 12/2004 | Bennett et al. | ............. | 701/54 |
| 6,994,646 B2 * | 2/2006 | Ai | ............. | 475/5 |
| 7,028,795 B2 * | 4/2006 | Tabata | ............. | 180/65.2 |
| 7,042,108 B2 * | 5/2006 | Farkas | ............. | 290/3 |

\* cited by examiner

*Primary Examiner*—Nicholas Ponomarenko
(74) *Attorney, Agent, or Firm*—Rabin & Berdo, P.C.

(57) ABSTRACT

A series and parallel combined dual power system operates as a series combined power system, or as a parallel combined power system; the power from an engine directly drive the load; the system engages in the operation as the series combined power system incase of a light load; the load is driven by the engine in case of a normal load; an optional rechargeable device is adapted to the system; either or both of a primary and a secondary dynamo-electric units functions as a motor on the power from the rechargeable device to jointly drive the load with the power from the engine; and functions to provide power drive in case of a light load.

13 Claims, 73 Drawing Sheets

SERIES & PARALLEL COMBINED DUAL POWER DRIVE SYSTEM

CROSS-REFERENCE TO RELATED APPLICATION

This application is a Continuation-In-Part of U.S. patent application, Ser. No. 10/851,207, file May 24, 2004, now abandoned, which is a Continuation-In-Part of U.S. patent application, Ser. No. 10/826,392, filed Apr. 19, 2004, now abandoned.

BACKGROUND OF THE INVENTION (a) Field of the Invention

The present invention is related to a series and parallel combined dual power drive system for the engine functioning as the active rotation power source to directly drive a load, the system provides the following functions:

Operating as a series combined power system, wherein, the engine drives a primary dynamo-electric unit to function as a generator with the power generated to drive a secondary dynamo-electric unit to output mechanical rotation kinetics to drive the load and regulate the engine to operate at a constant speed yielding higher energy efficiency; the constant speed operation is defined as the range of operation speed wherein the engine is running at lower fuel consumption but paid the operation region with comparatively higher fuel saving of comparatively higher output power so to reach the brake specific fuel consumption; or when an optional rechargeable device is added to the system, the power generated by the primary dynamo-electric unit as driven by the engine charges the rechargeable device, or the power from the rechargeable device and that from the primary dynamo-electric unit jointly drive the secondary dynamo-electric unit to function as a motor to output to regulate the engine operating in a constant speed of comparatively higher energy efficiency; again, the constant speed operation is defined as the range of operation speed wherein the engine is running at lower fuel consumption but paid the operation region with comparatively higher fuel saving of comparatively higher output power so to reach the brake specific fuel consumption;

The load is driven by the rotation kinetics from the engine power;

When adapted with the optional rechargeable device, the system provides the operation of the parallel combined power system for the power from the rechargeable device to drive either or both of the primary and the secondary dynamo-electric units to function as a motor to jointly drive the load with the power from the engine, or in case of a light load, the kinetics form the engine is used to drive either or both of the primary and the secondary dynamo-electric units to function as a generator to charge the rechargeable device or supply power to another load;

The power from the rechargeable device drives either or both of the primary and the secondary dynamo-electric units to function as a motor for driving a load;

The power from the engine drives either or both of the primary and the secondary dynamo-electric units to function as a generator to charge the rechargeable device or to supply power to another load;

The load is used to inversely drive either or both of the primary and the secondary dynamo-electric units to function as a generator to charge the rechargeable device or supply power to another load;

Mechanical damper of the engine functions as the brake, or if the rechargeable device is adapted, either or both of the primary and the secondary dynamo-electric units operates at the same time as a generator to charge the rechargeable device or to supply power to another load for creating the braking function by regeneration;

The rechargeable device drives either or both of the primary and the secondary dynamo-electric units to function as a motor to start the engine; and The system provides all or any part of those functions described above.

The system by providing all or any part of those functions described above corrects the defectives of the lower efficiency and higher pollution found with the engine when operating at low power output and low speed.

(b) Description of the Prior Art

Conventional land, surface or air carriers are usually provided with a single power system. In recent years, as demanded by energy saving and pollution control appeals, major efforts have been put into the research and development of dual power drive system. Wherein, significant progress has been down in the combined dual power system containing rotation kinetics outputted form a combustion engine and that outputted from a power driven motor. Looking back those combined dual power systems already having been developed, they include:

1. Series combined power system: the engine is used to drive the motor, in turn, the power from the generator drives the motor to create rotation kinetics to drive the load; this system has its flaw in a wild difference in the efficiency of the system under various load rate; large dynamo-electric rated capacity, consuming too much space, heavier and higher cost since the motor and the generator bear all the powers;

2. Energy storage series drive system: with normal load, the engine is used to drive the generator, in turn, the power from the generator drives the motor to output rotation kinetics to drive the load; in case of a light load, the power from generator while driving the motor, is partially inputted into the rechargeable device for storing energy so that if the engine stops running, the power from the rechargeable device drives the motor to output rotation kinetics to drive the load for reducing pollution and upgrading energy efficiency; in case of a heavy load, the power from the generator as driven the engine and that from the rechargeable device are jointly outputted to the motor to output rotation kinetics for driving the load;

3. Parallel combined power system: with a normal load, the rotation kinetics outputted from the engine directly drive the load; in case of a light load, the motor drawn by the engine is switched to function as a generator to charge the rechargeable device or to supply power to another load; or if the engine stops running, the power from the rechargeable device drives the motor to output rotation kinetics for driving the load to upgrade energy efficiency and reduce pollution; and in case of a heavy load, the rotation kinetics outputted from the engine and that from the motor as driven by the rechargeable device jointly drive the load; the flaw of the system rests in that it requires the rechargeable device with sufficient capacity.

SUMMARY OF THE INVENTION

The primary purpose of the present invention is to provide a series and parallel combined dual power system. While providing the power form the engine to directly drive the load; the series combined power system operates and the engine drives in case of a normal load; when the optional rechargeable device is adapted to the system, either or both of the primary and the secondary dynamo-electric units operates as a motor on the power supplied from the rechargeable device so to jointly drive the load with the power from the engine; and in case of a light load, the system executes the power drive.

BRIEF DESCRIPTION OF THE DRAWINGS

FIG. 120 is a schematic view showing that the preferred embodiment of the system illustrated in FIG. 100 has the mechanical damper of the engine to exercise a brake on the load and to drive both of the primary and the secondary dynamo-electric units to regenerate for charging the rechargeable device or supplying power to another load.

FIG. 121 is a schematic view showing that the preferred embodiment of the system illustrated in FIG. 100 operates on the power from the rechargeable device to drive the primary dynamo-electric unit to start the engine.

FIG. 122 is a schematic view showing that the preferred embodiment of the system illustrated in FIG. 100 operates on the power from the rechargeable device to drive the secondary dynamo-electric unit to start the engine.

FIG. 123 is a schematic view showing that the preferred embodiment of the system illustrated in FIG. 100 operates on the power from the rechargeable device to drive both of the primary and the secondary dynamo-electric units to start the engine.

FIG. 124 is a block chart showing that the preferred embodiment of the system illustrated in FIG. 1 has different layouts of spatial configuration among the constituent units without changing the mechanism of the system.

FIG. 125 is a schematic view showing that the preferred embodiment of the system illustrated in FIG. 1 engages in the distribution of power by a variable transmission unit driven by the active power source to drive in sequent two or more than two primary dynamo-electric units, clutches, and the secondary dynamo-electric units for driving the load.

FIG. 126 is a schematic view showing that the preferred embodiment of the system illustrated in FIG. 1 engages in the distribution of power by the variable transmission unit driven by an output end from the primary dynamo-electric unit to drive in sequent two or more than two clutches, and the secondary dynamo-electric units for respectively driving the load.

FIG. 127 is a schematic view showing that the preferred embodiment of the system illustrated in FIG. 1 has the clutch driven by the primary dynamo-electric unit to drive the variable transmission unit for power distribution so to drive two or more than two secondary dynamo-electric units.

FIG. 128 is a schematic view showing that the preferred embodiment of the system illustrated in FIG. 1 has the variable unit at the output end of the system driven by the secondary dynamo-electric unit to engage in power distribution for driving two or more than two units of load.

FIG. 129 is a schematic view showing that the preferred embodiment of the system illustrated in FIG. 1 has the individual output end of the variable transmission unit further driven by the clutch driven by the primary dynamo-electric unit to be respectively coupled to the rotation part of the secondary dynamo-electric unit and to the load end.

FIG. 130 is a schematic view showing that the preferred embodiment of the system illustrated in FIG. 1 has the output from the active rotation power source to be respectively coupled to the primary dynamo-electric unit through the variable transmission unit driven by the active rotation power source, and coupled to the secondary dynamo-electric unit through the clutch.

Figure 1:
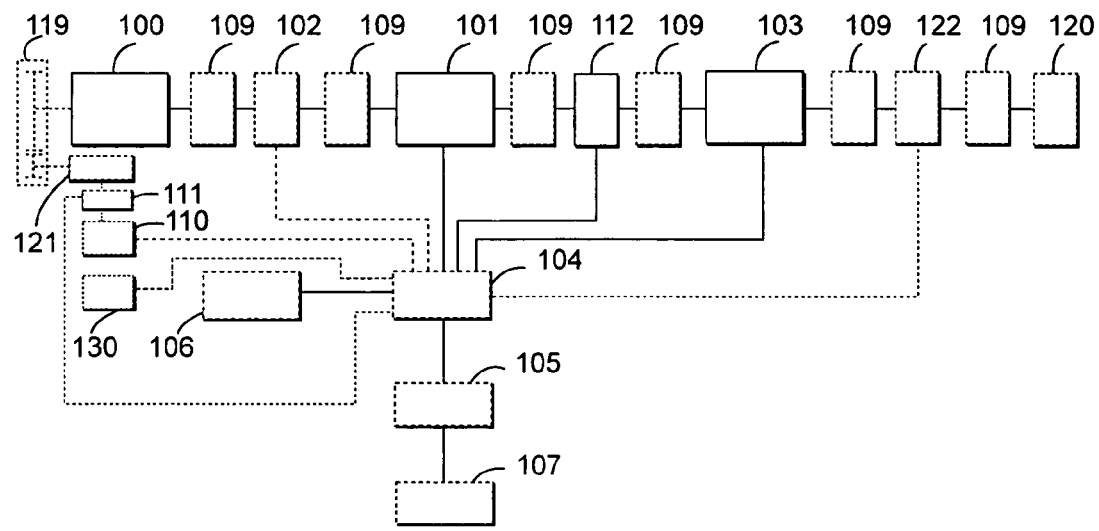
FIG. 1 is a system block chart of a preferred embodiment of the present invention.
Figure 131:
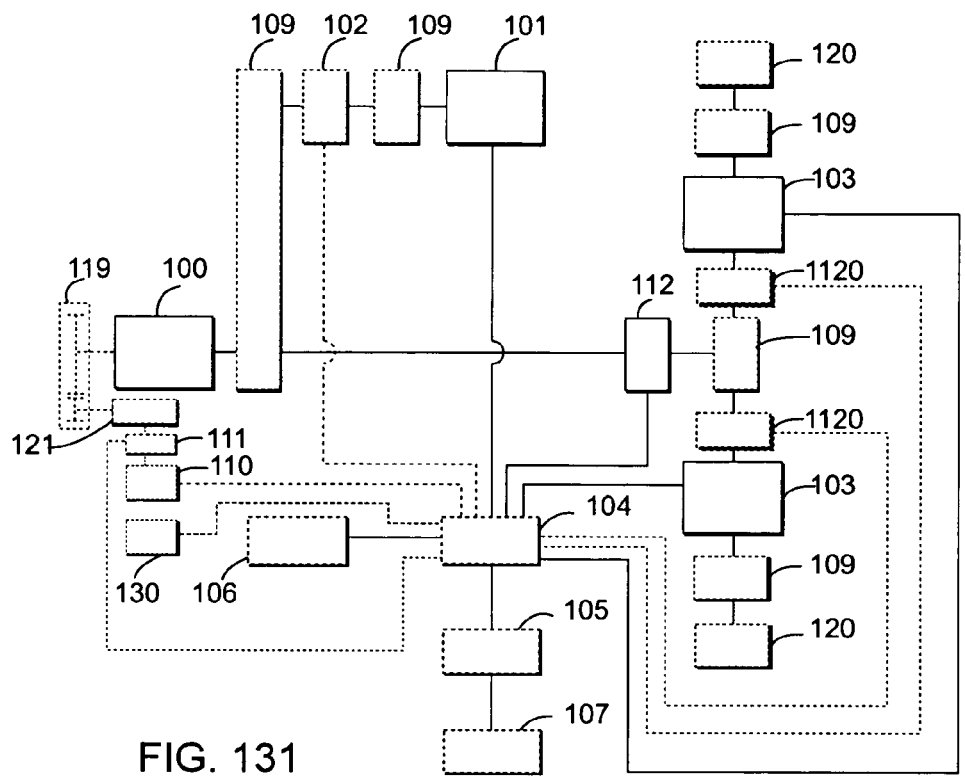

FIG. 131 is a schematic view showing that the preferred embodiment of the system illustrated in FIG. 1 has the output from the active rotation power source respectively coupled through the variable transmission unit driven by the active rotation power source to the primary dynamo-electric unit, and through the clutch to the individual output end of the variable transmission unit driven by the clutch for respectively driving two or more than two units of the secondary dynamo-electric units and loads.

Figure 132:
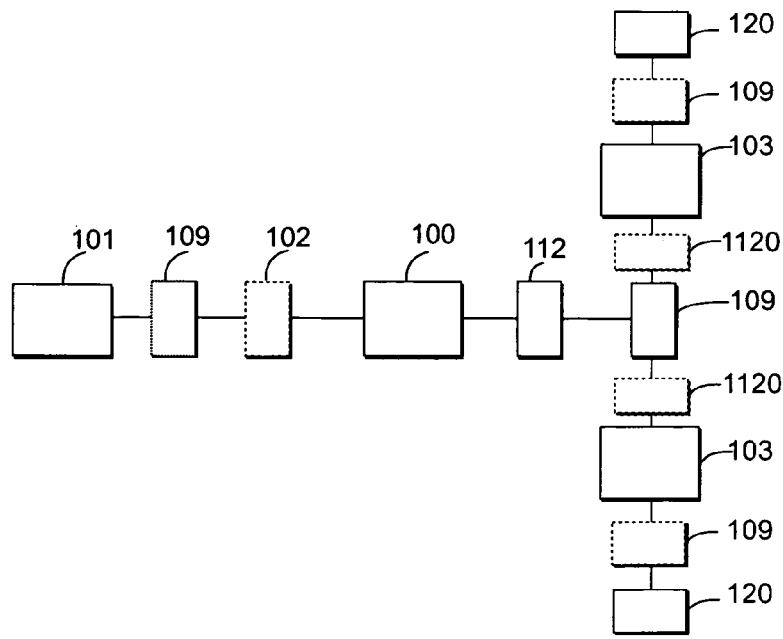

FIG. 132 is a schematic view showing that the preferred embodiment of the system illustrated in FIG. 1 has two output ends with one end coupled to the first primary dynamo-electric unit and the other end coupled to the variable transmission unit comprised of clutch and differential gear set to respectively drive the load through the clutch and the secondary dynamo-electric unit.

Figure 133:
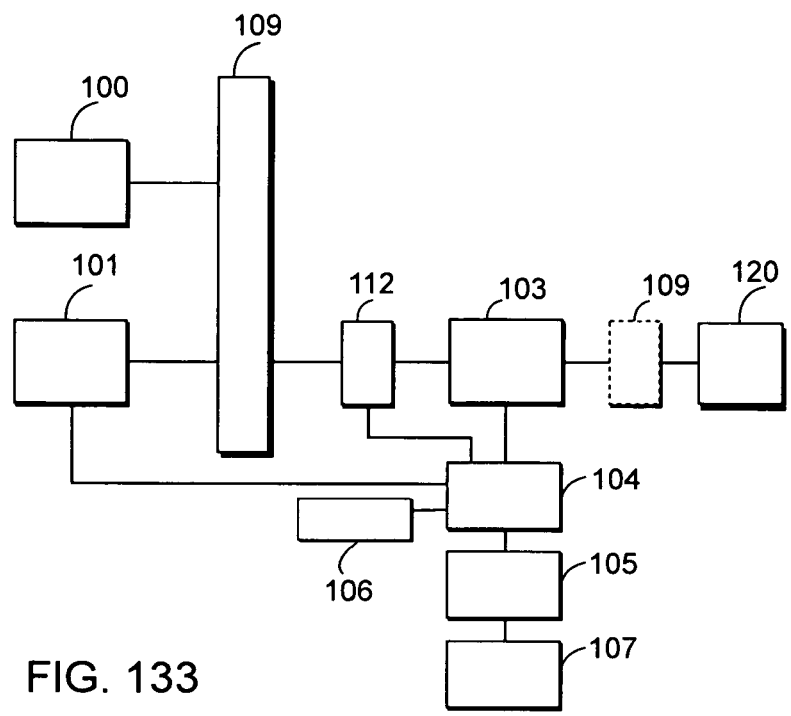

FIG. 133 is a schematic view showing that the preferred embodiment of the system illustrated in FIG. 1 has the rotary part of the primary dynamo-electric unit to be coupled to the secondary dynamo-electric unit, and that optionally the variable transmission unit is adapted to the secondary dynamo-electric unit to drive the load and another variable transmission unit is provided between the output of the active rotation power source and the rotary part of the primary dynamo-electric unit.

Figure 12:
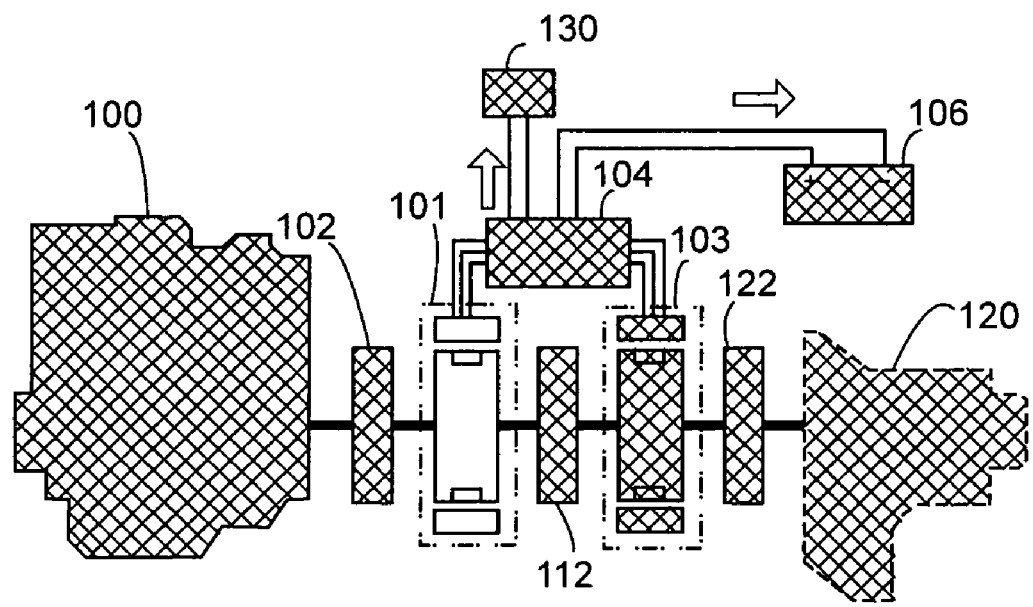
FIG. 12 is a schematic view showing that the preferred embodiment of the system illustrated in FIG. 2 operates to drive the load by the power of engine, and the secondary dynamo-electric unit is driven to function as a generator to charge the rechargeable device or to supply power to another load.
Figure 134:
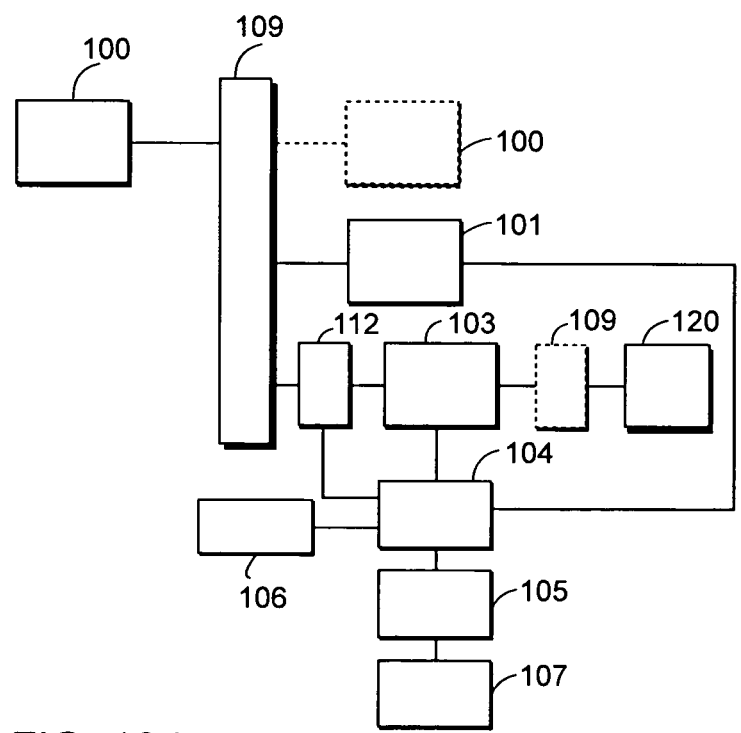

FIG. 134 is a schematic view showing that the preferred embodiment of the system illustrated in FIG. 12 has the rotary part of the active rotation power source and where between the rotary part and the clutch of the primary dynamo-electric unit coupled by means of the variable transmission unit, and that the output end of the clutch is provided for copulation to the rotary part of the secondary dynamo-electric unit while a variable transmission unit is optionally provided at where between the rotary part of the secondary dynamo-electric unit and the load.

Figure 135:
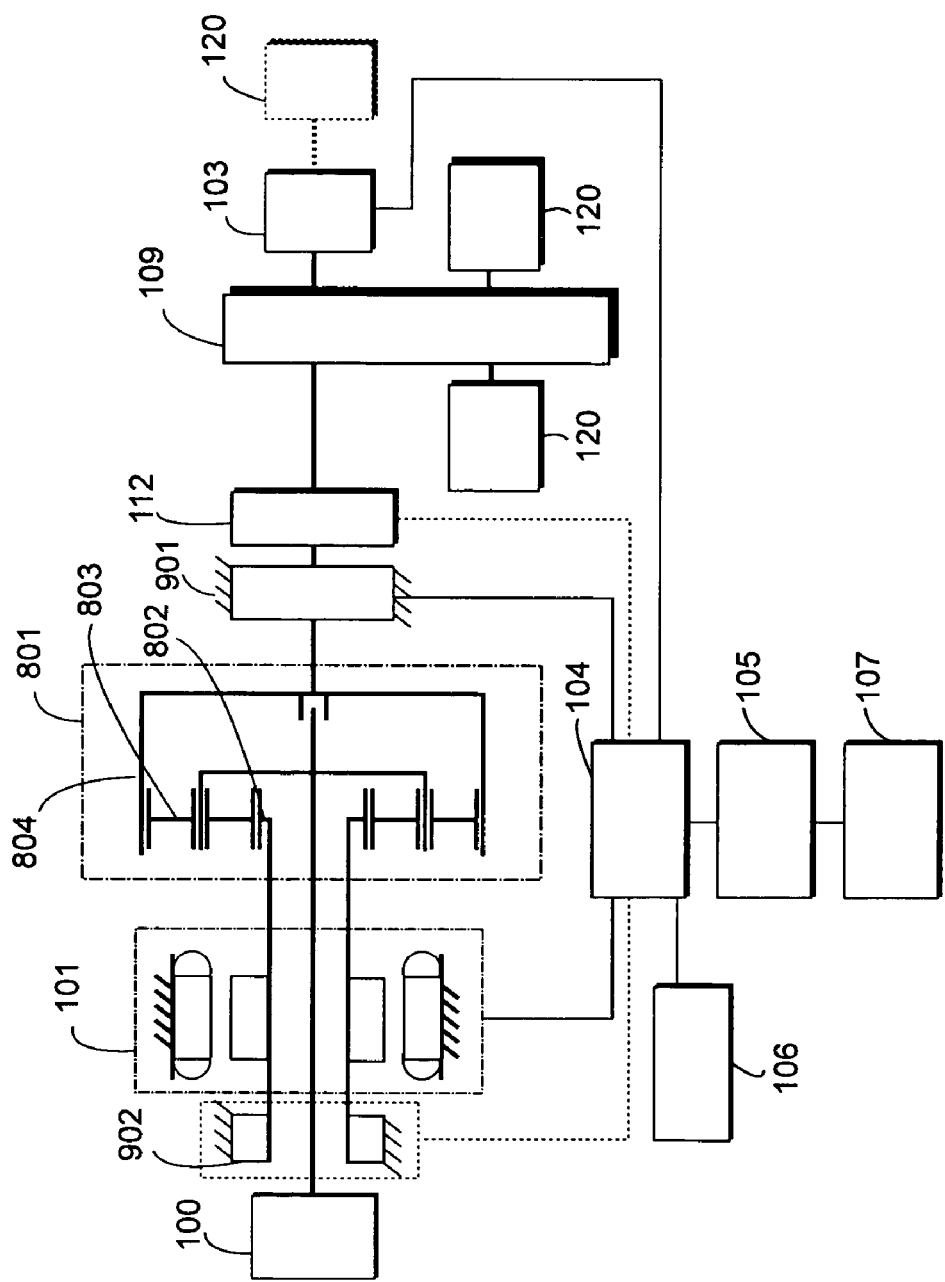

FIG. 135 is a schematic view showing that the preferred embodiment as illustrated in FIG. 1 that has the active rotation power source respectively coupled to the primary and secondary dynamo-electric units via epicyclical gear, clutch and brake; and the output from the variable transmission unit is used to drive the load.

Figure 136:
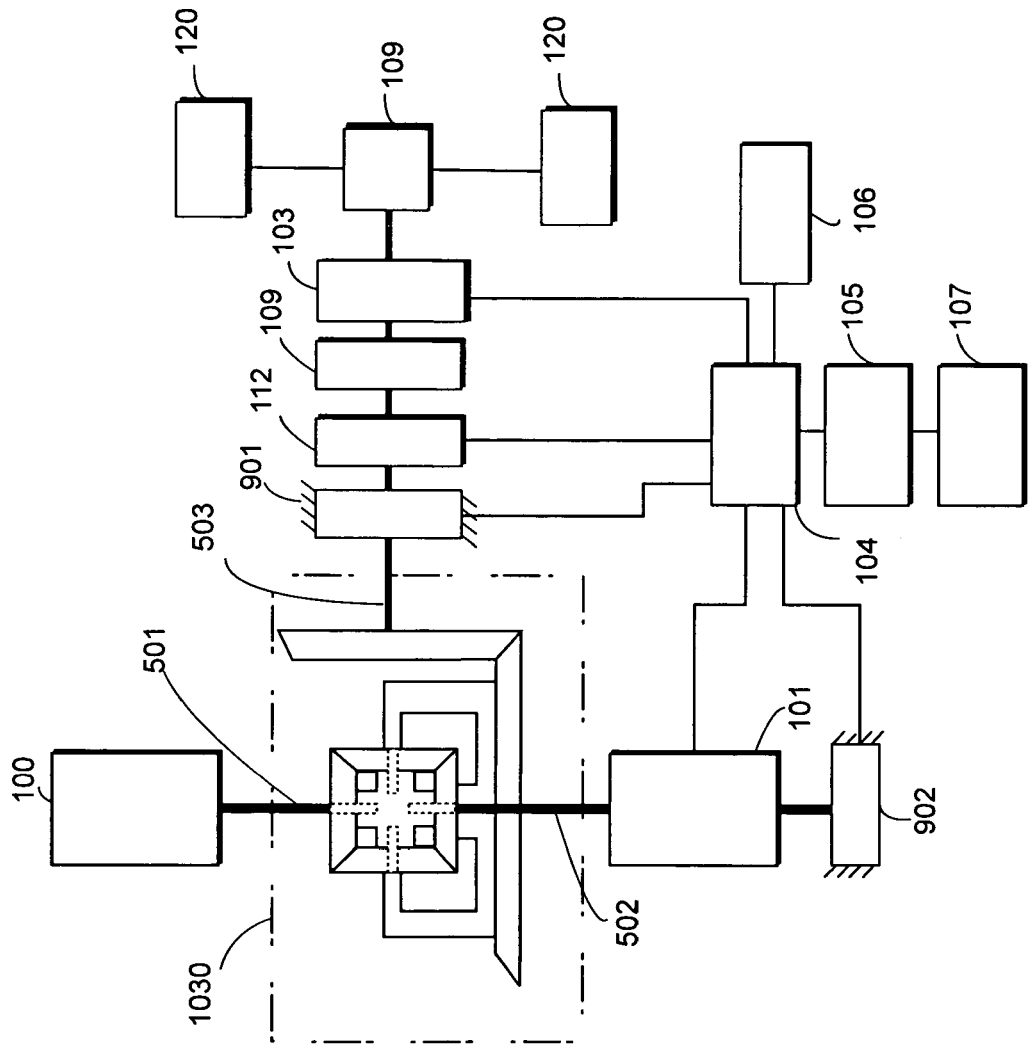

FIG. 136 is a schematic view showing that the preferred embodiment as illustrated in FIG. 1 has the active rotation power source respectively coupled to the primary dynamo-electric unit and to the secondary dynamo-electric unit through the epicyclical gear set and the brake; and the output from the variable transmission unit is used to drive the load.

Figure 137:
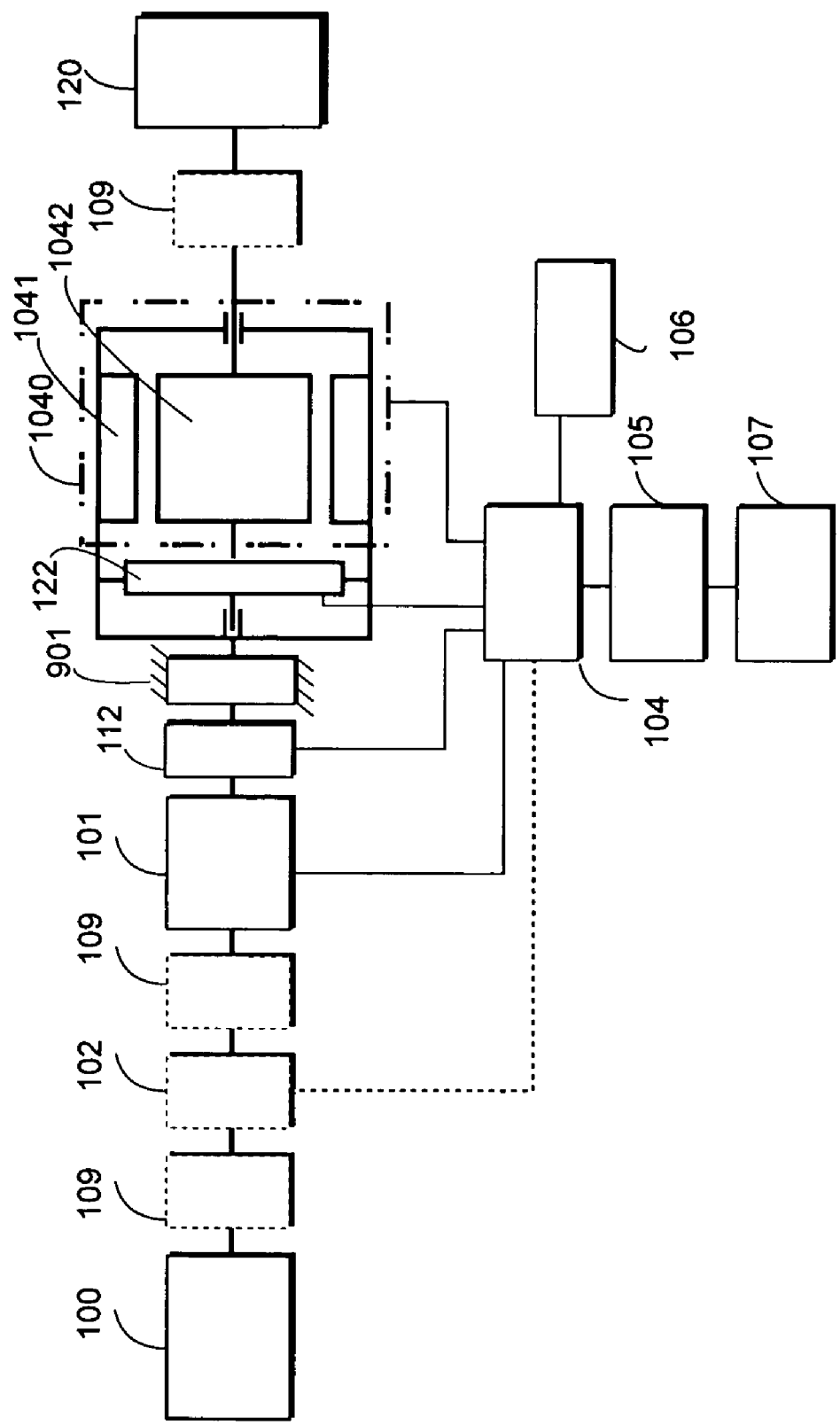

FIG. 137 is a schematic view showing that the preferred embodiment as illustrated in FIG. 1 has the active rotation power source is coupled to the primary dynamo-electric unit and the combined dual power dynamo-electric unit via the clutch and the output from the variable transmission unit is used to drive the load.

Figure 138:
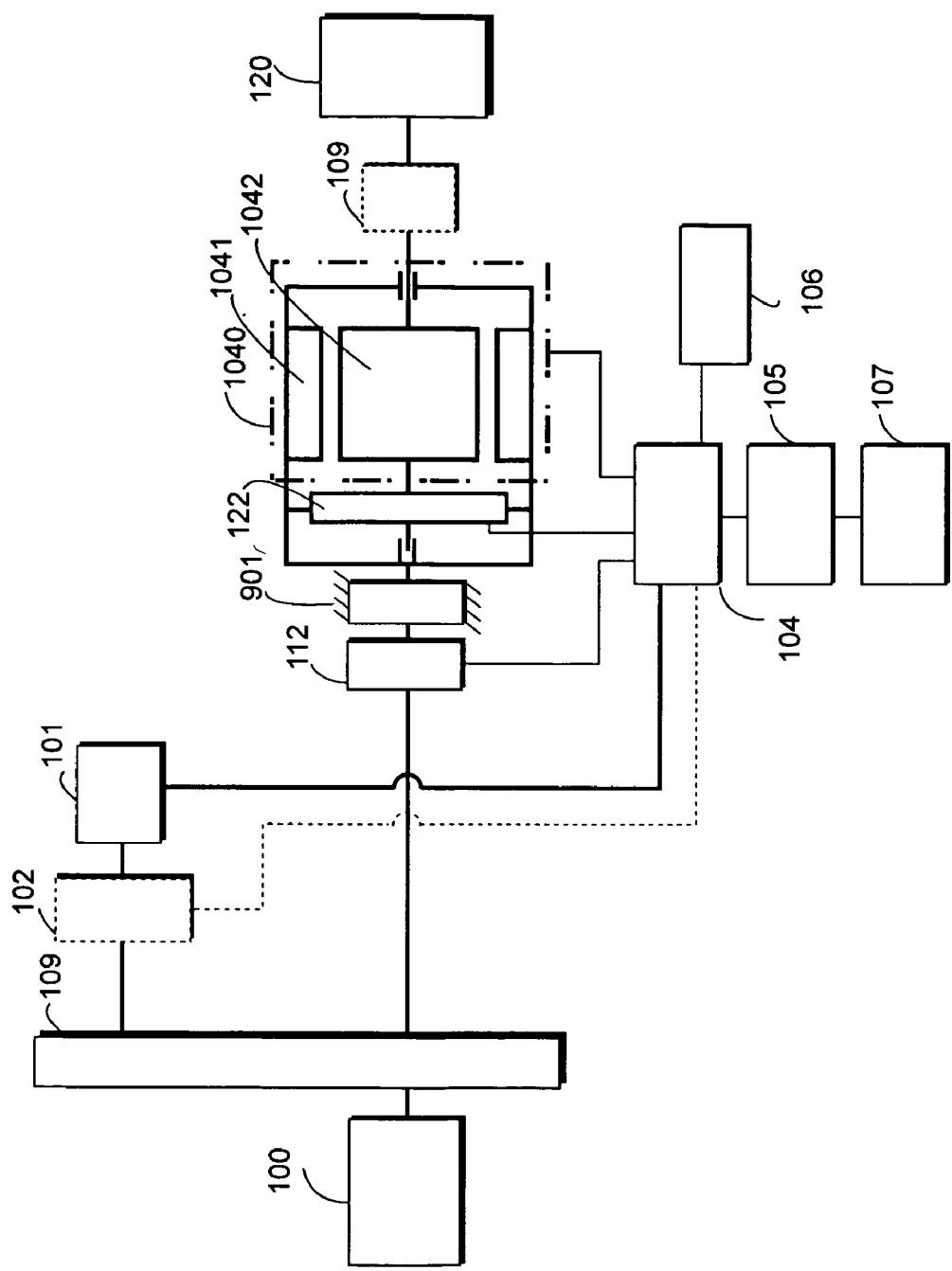

FIG. 138 is a schematic view showing that the preferred embodiment as illustrated in FIG. 1 has installation of various shafts by having the primary dynamo-electric unit and the active rotary power source coupled to a multi-shaft transmission variable unit; and the output end of the active rotation power source drives the load as driven by the dual power dynamo-electric unit through the clutch.

Figure 139:
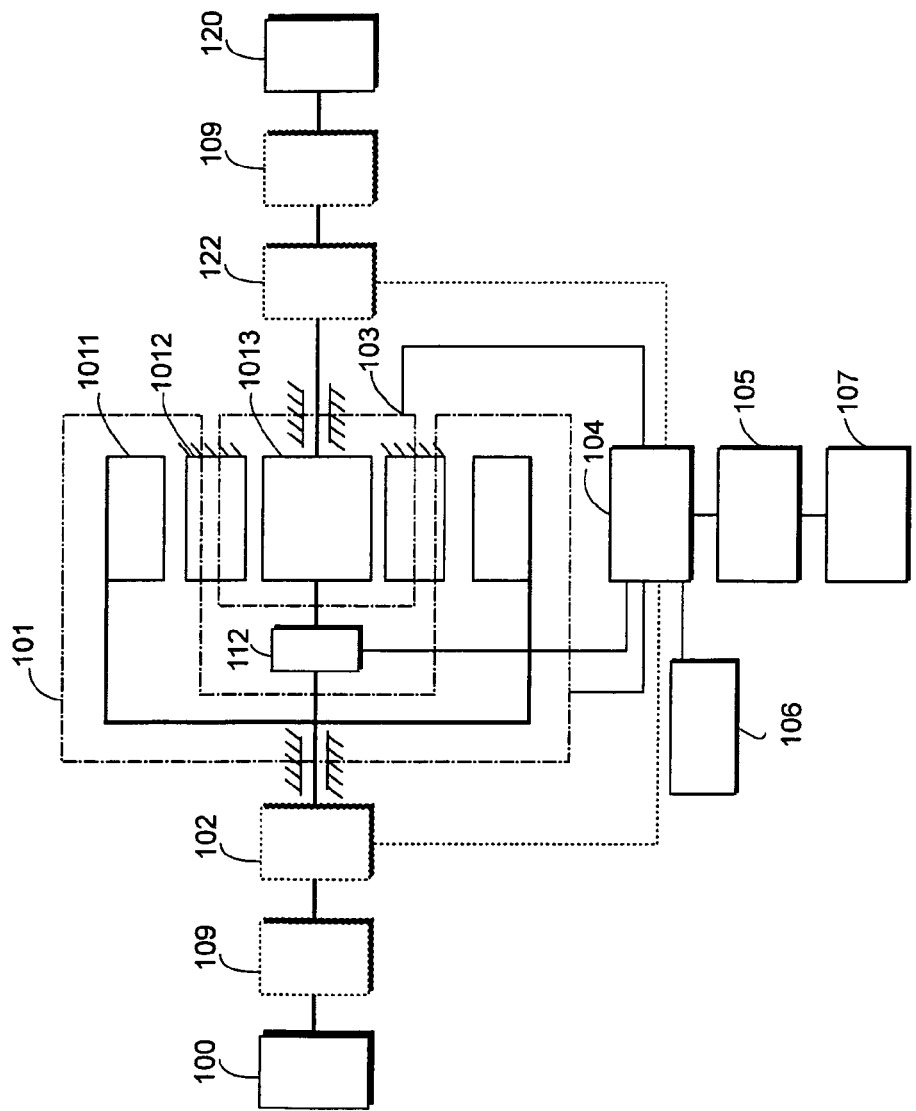

FIG. 139 is a schematic view showing that another preferred embodiment yet of the system of the present invention that both the primary and the secondary dynamo-electric units share the same structure.

Figure 140:
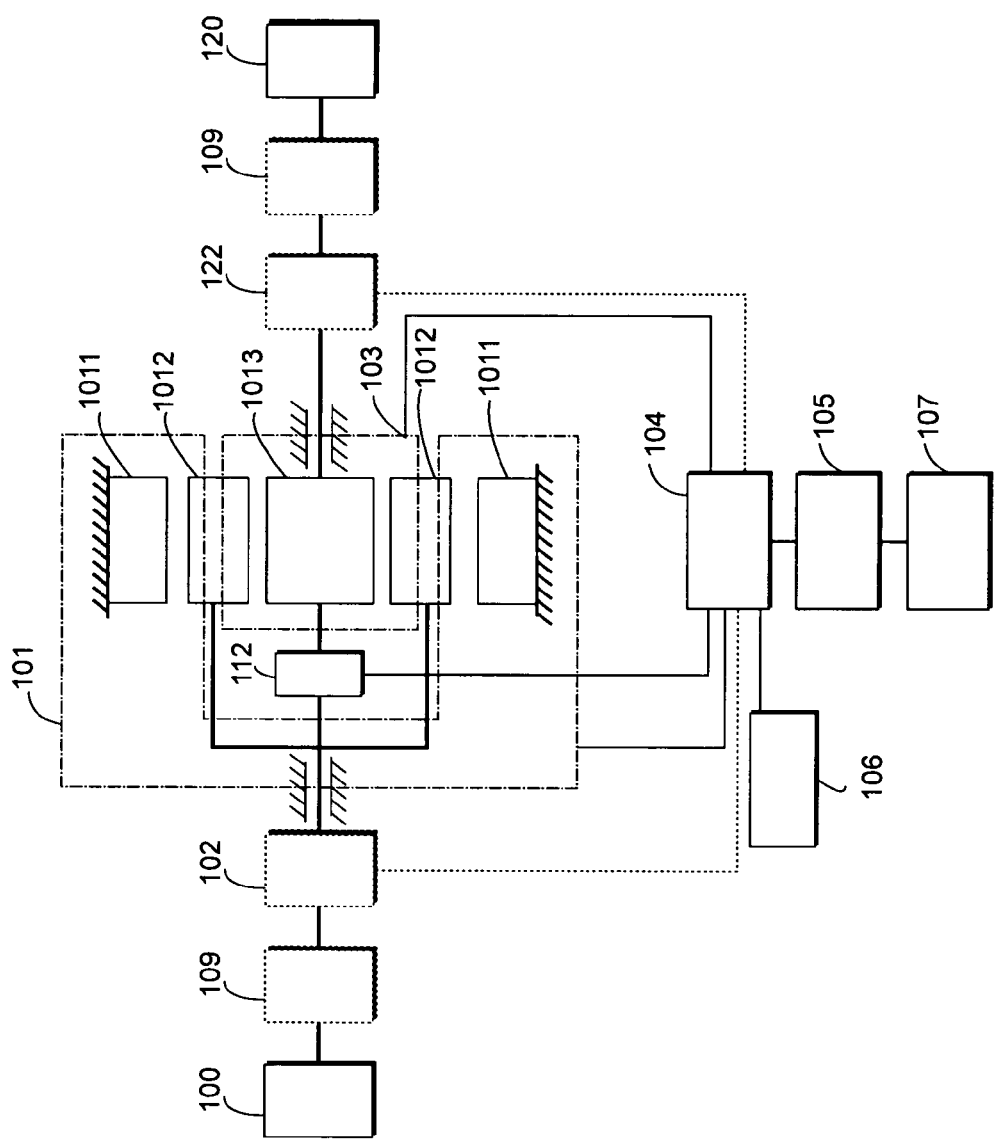
Figure 129:
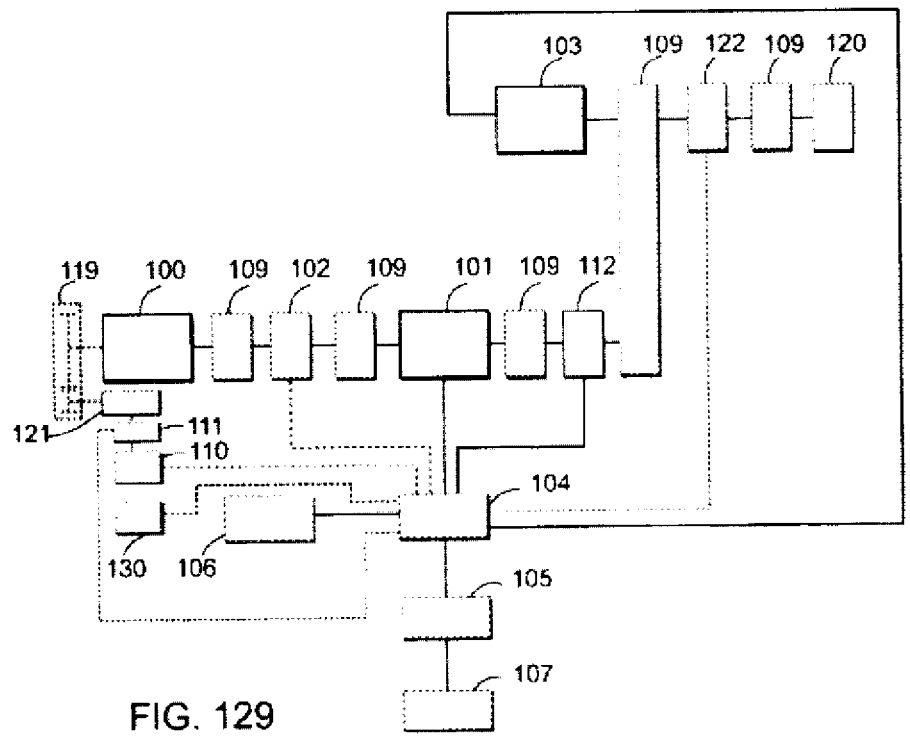
Figure 130:
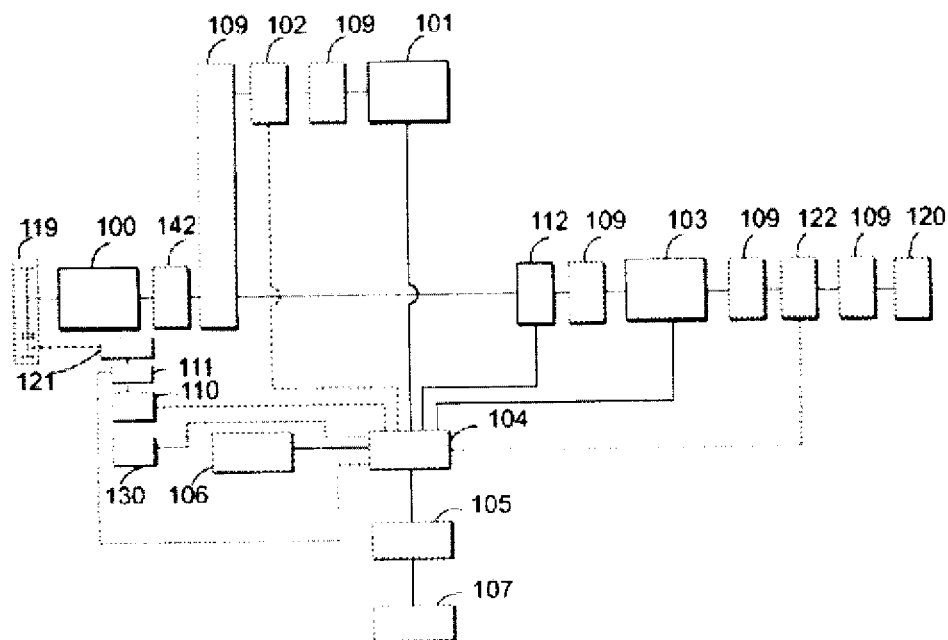

FIG. 140 is another schematic view showing that another preferred embodiment yet of the system of the present invention that both the primary and the secondary dynamo-electric units share the same structure.

DETAILED DESCRIPTION OF THE PREFERRED EMBODIMENTS

The present invention of a series and parallel combined dual power system operates as a series combined power system, or as a parallel combined power system. Wherein, when an internal combustion engine is used as an active rotation power source, the rotation kinetics outputted form the engine is used to directly drive a load in case of a normal load; the system is switched to operate as the series combined power system as required with the power from the engine to drive a primary dynamo-electric unit for functioning as a generator to drive a secondary dynamo-electric unit for functioning as a motor to output rotation kinetics to drive the load in case of a light load.

The series and parallel dual power system may be adapted with an operation rechargeable device. If the rechargeable device is adapted and in case of a heavy load, the power from the rechargeable device drives either or both of the primary and the secondary dynamo-electric units to function as a motor, and to jointly drive the load with the power from the engine for operating as a parallel combined power system. In case of a normal load, the rotation kinetics outputted from the engine directly drives the load. In case of a light load, while the rotation kinetics outputted form the engine directly drives the load, either or both of the primary and the secondary dynamo-electric units functions as a generator to charge the rechargeable device or to supply power to another load. If the system is converted to operate in the mode of the series combined power system, the power from the engine drives the primary dynamo-electric unit to function as a generator to further drive the secondary dynamo-electric unit for functioning as a motor, and may charge the rechargeable device or supply power to another load at random for regulating the engine to operate at a constant speed with higher energy efficiency, the constant speed operation is defined as the range of operation speed wherein the engine is running at lower fuel consumption but paid the operation region with comparatively higher fuel saving of comparatively higher output power so to reach the optimal brake specific fuel consumption. Furthermore, as required, the power from the rechargeable device is used to drive either or both of the primary and the secondary dynamo-electric units to function as a motor to further output rotation kinetics to drive the load in correcting the defectives of the lower efficiency and higher pollution found with the engine when operating at low power output and low speed.

The system by providing all or any part of those functions described above corrects the defectives of the lower efficiency and higher pollution found with the engine when operating at low power output and low speed.

FIG. 1 is a system block chart of a series and parallel combined dual power system of the present invention. Wherein, the active rotation power source and both of the primary and the secondary dynamo-electric units, an operation clutch and an optional variable transmission unit constituting a systematic incorporation is essentially comprised of:

An active rotation power source: comprised of one or multiple internal combustion engines, external combustion engine or other rotation kinetics power sources of the prior art, an rotary part of the active power source 100 is directly or through either or both of an optional clutch 102 and an optional variable transmission unit 109, coupled to a primary dynamo-electric unit 101;

The primary dynamo-electric unit 101: comprised of one or multiple AC, DC, brushless, brush, synchronous or asynchronous rotation dynamo-electric device providing functions as a generator, or switched functions between those of a generator and a motor; a rotary part of the primary dynamo-electric unit 101 is coupled to a secondary dynamo-electric unit 103 through a clutch 112, or as required through the clutch 112 and the variable transmission unit 109;

Clutches 102, 112, 122: related to a single way clutch or a clutch controlled by manual, mechanical force, eccentric force, air pressure, hydraulic flow, or electromagnetic force used to transmit or interrupt the transmission of the mechanical rotation kinetics; one or multiple clutches 112 is required while one or multiple clutches 102 and clutches 122 may be provided or not; or idling shaft function provided at random by a clutch disposed to the input end of the load or by a variable transmission device is used to replace that of the clutch 122;

The secondary dynamo-electric unit 103: comprised of one or multiple AC, DC, brushless, brush, synchronous or asynchronous rotation dynamo-electric device providing functions as a generator, or switched functions between those of a generator and a motor; a rotary part of the secondary dynamo-electric unit 103 is coupled to a secondary dynamo-electric unit 103 through a clutch 112, or as required through the clutch 112 and the variable transmission unit 109;

A drive control unit 104: an optional item, comprised of electro-mechanical or solid-status circuit to control the power generated by the primary dynamo-electric unit 101 functioning as a generator when the system operates as the series combined power system so to drive the secondary dynamo-electric unit 103 and charge a rechargeable device 106, or control either of the generation output functions, or control the power from the rechargeable device 106 to drive either or both of the primary and the secondary dynamo-electric units 101, 103 functioning as a motor, the drive control unit 104 controls voltage, amperage, polarity (in case of a DC), torque and phase (in case of an AC) to manipulate revolving direction, speed, torque and abnormality protection of the dynamo-electric unit; or when either or both of the primary and the secondary dynamo-electric units are inversely driven by the load to function as a generator, the driven control unit 104 controls the charging power transmitted to the rechargeable device 106 or to another load thus to manipulate the dynamo-electric unit to function as a brake by regeneration;

A central control unit: an optional item, comprised of a solid-status, or an electromechanical device, or chip and related working software, subject to the control by a control interface 107 to further control functions provided by the series and parallel dual power system, particularly in achieving the optimal fuel consumption and pollution control; controls the relative functions provided among the first dynamo-electric unit 101, the secondary dynamo-electric unit 103 and the rechargeable device 106 by manipulating the drive control unit 104; and controls the monitor and interaction of the feedback among all units in the system;

The rechargeable device 106: an optional item, related to a rechargeable battery, super capacitor, or any other rechargeable device;

The control interface 107: an optional item, related to a solid-state, or electromechanical device, or chip and related software, subject to the manual input or input of control signal to control the operation of the series and parallel combined dual power system;

The variable transmission unit 109: comprised of a variable transmission device of fixed speed ration, or automatic, semi-automatic, or manual variable transmission device, or a differential gear set, epicyclical gear set, or other variable transmission device; is provided at where between the active rotation power source 100 and the clutch 102, or between the clutch 102 and the rotary part of the primary dynamo-electric unit 101, or between the rotary part primary dynamo-electric unit 101 and that of the clutch 112, or between the rotary part of the clutch 112 and that of the secondary dynamo-electric unit 103, or between the rotary part of the secondary dynamo-electric unit 103 and that of the clutch 122, or between the rotary part of the clutch 122 and that of the load; and A redundant rechargeable device 110: comprised of a rechargeable battery, super capacitor, a flywheel for energy storage, or other rechargeable battery device with the power controlled by a start switch 111 to drive a start motor 121 of the engine set of the active rotation power source 100, thus to directly or through a transmission device start the engine set, or supply power to the peripheral equipment or another power driven load 130; all the redundant rechargeable device 110, the start switch 111 and the start motor 121 are optional items.

The rotation kinetics outputted from the system may be provided to drive a load of an air, land, or surface craft and other industrial equipment that is required to receive the input of the rotation mechanical kinetics.

With the engine as the active rotation power source, the series and parallel combined dual power system provides all or part of the following functions:

When the system operates as the series combined power system, the engine is controlled to run from low speed to high speed or run at a constant speed for driving the primary dynamo-electric unit to function as a generator; if the rechargeable device 106 is not adapted, the power generated drives the secondary dynamo-electric unit 103 to function as a motor to output rotation kinetics for driving the load 120; if the system is adapted with the rechargeable device 106 and in case of a light load, the power generated from the primary dynamo-electric unit drives the secondary dynamo-electric unit 103 while charging the rechargeable device 106; or in case of a heavy load, the power generated form the primary dynamo-electric unit 101 and that from the rechargeable device 106 jointly drive the secondary dynamo-electric unit 103 to output rotation kinetics for driving the load 120 and regulate the engine to operate at a constant speed yielding higher energy efficiency; the constant speed operation is defined as the range of operation speed wherein the engine is running at lower fuel consumption but paid the operation region with comparatively higher fuel saving of comparatively higher output power so to reach the optimal brake specific fuel consumption; or when an optional rechargeable device is added to the system, the power generated by the primary dynamo-electric unit as driven by the engine charges the rechargeable device, or the power from the rechargeable device and that from the primary dynamo-electric unit jointly drive the secondary dynamo-electric unit to function as a motor to output to regulate the engine operating in a constant speed of comparatively higher energy efficiency; again, the constant speed operation is defined as the range of operation speed wherein the engine is running at lower fuel consumption but paid the operation region with comparatively higher fuel saving of comparatively higher output power so to reach the brake specific fuel consumption;

The load 102 is driven by the rotation kinetics from the engine power;

When adapted with the optional rechargeable device 106, the system provides the operation of the parallel combined power system for the power from the rechargeable device 106 to drive either or both of the primary and the secondary dynamo-electric units 101, 103 to function as a motor to jointly drive the load 120 with the power from the engine, or in case of a light load, while driving the load 120, the power form the engine is used to drive either or both of the primary and the secondary dynamo-electric units 101, 103 to charge the rechargeable device 106 or supply power to another load 130; in case of a heavy load, the power from the rechargeable device 106 drives either or both of the primary and the secondary dynamo-electric units 101, 103 for jointly driving the load with the power from the engine;

The power from the rechargeable device 106 drives either or both of the primary and the secondary dynamo-electric units 101, 103 to function as a motor for driving the load 120;

The power from the engine drives either or both of the primary and the secondary dynamo-electric units 101, 103 to function as a generator to charge the rechargeable device 106 or to supply power to another load 130;

The load 102 is used to inversely drive either or both of the primary and the secondary dynamo-electric units 101, 103 to function as a generator to charge the rechargeable device 106 or supply power to another load 130;

Mechanical damper of the engine functions as the brake, or if the rechargeable device 106 is adapted, either or both of the primary and the secondary dynamo-electric units 101, 103 operates at the same time as a generator to charge the rechargeable device 106 or to supply power to another load 130 for creating the braking function by regeneration;

The rechargeable device 106 drives either or both of the primary and the secondary dynamo-electric units 101, 103 to function as a motor to start the engine; and The system provides all or any part of those functions described above.

For a summary description, the variable transmission unit 109, the redundant rechargeable device 110, the start switch 111, the start motor 121, the central control unit 105, and the control interface 107 are omitted from the system illustrated in FIG. 1 while the engine functions as the active rotation power source 100 and the primary dynamo-electric unit 101, the secondary dynamo-electric unit 103, the clutches 102, 112, 122, the drive control unit 104, and the optional rechargeable device 106 and the power driven load 130 are reserved to drive the load 120.

Figure 2:
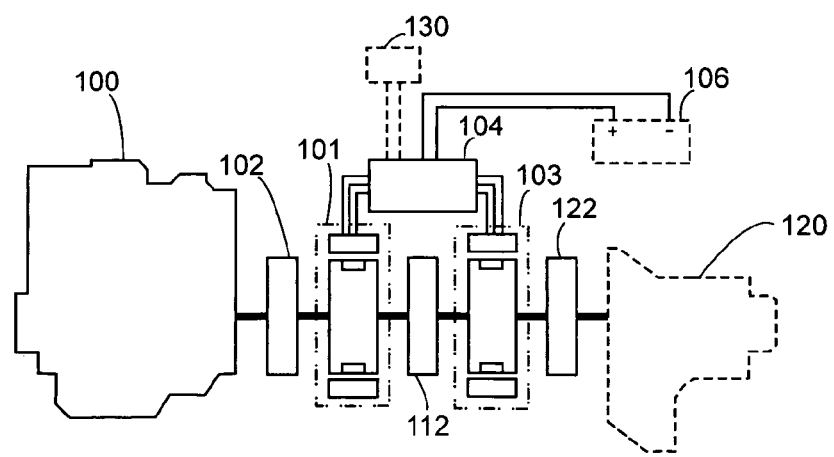
FIG. 2 is another system block chart comprised of the primary power unit taken from the preferred embodiment as illustrated in FIG. 1.

As illustrated in FIG. 2 for another system block chart comprised of the primary power unit taken from the preferred embodiment as illustrated in FIG. 1; wherein, the functions of the system provided by the interaction among all key power units include:

System functions 1, 2: related to that the rechargeable device 106 is adapted for the system to function as the series combined power system for driving the load;

System functions 3, 4: related to that the rechargeable device 106 is not adapted to the system, and the system functions as the series combined power system for driving the load;

System function 5: related to that the power from the engine as the active power source 100 drives the load 120;

System functions 6, 7, and 8: related to that the power from the engine as the active power source 100 and the power from the rechargeable device 106 jointly drive either or both of the primary and the secondary dynamo-electric units 101, 103 to function as a generator so to jointly drive the load 120;

System functions 9, 10, and 11: related to that the power from the engine as the active power source 100 drives the load 120 and drives at the same time either or both of the primary and secondary dynamo-electric units 101, 103 to function as a generator so to charge the rechargeable device 106 or supply power to another power driven load 130 (including any external load not specified);

System functions 12, 13, and 14: related to that the power from the rechargeable device 106 drives either or both of the primary and the secondary dynamo-electric units 101, 103 to function as a motor for driving the load 120;

System functions 15, 16, and 17: related to that the power from the engine as the active power source 100 drives either or both of the primary and the secondary dynamo-electric units 101, 103 to function as a generator so to charge the rechargeable device 106 or supply power to another power driven load 130 (including any external load not specified);

System functions 18, 19, and 20: related to that the load 120 inversely draws either or both of the primary and the secondary dynamo-electric units 101, 103 to function as a generator so to charge the rechargeable device 106 or supply power to another power driven load 130 (including any external load not specified) for achieving the purpose of regenerating by reclaiming the kinetics to exercise the brake;

System function 21: related to that the mechanical damper of the engine as the active power source 100 exercises the brake on the load 120;

System functions 22, 23, and 24: related to that the mechanical damper of the engine as the active power source 100 exercises the brake on the load 120, and either or both of the primary and the secondary dynamo-electric units 101,103 simultaneously functions as the regeneration to charge the rechargeable device 106 or another load 130 driven by power, and further to exercise the brake on the load 120;

System functions 25, 26, and 27: related to that the power from the rechargeable device 106 drives either or both of the primary and the secondary dynamo-electric units 101, 103 to function as a motor for starting the engine.

Figure 3:
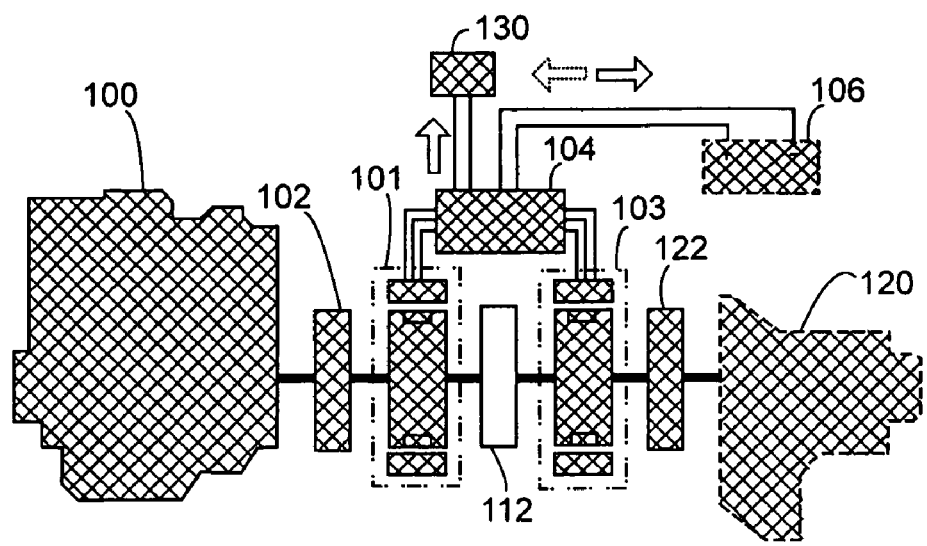
FIG. 3 is a schematic view showing that a rechargeable device is adapted to the system of the preferred embodiment to engage in the operation as the series combined power system with controllable engine speed.

FIG. 3 through FIG. 29 show those common functions of the system listed in Table A: Provided, however, that the functions of the system are not limited to those common functions. FIG. 3 through FIG. 29 are schematic views showing those system functions listed in Table A. Wherein, FIG. 3 shows that a rechargeable device is adapted to the system of the preferred embodiment illustrated in FIG. 2 to engage in the operation as the series combined power system with controllable engine speed. FIG. 3 shows the system function 1 of the preferred embodiment illustrated in FIG. 2, wherein, the system is adapted with the rechargeable device to provide the series combined power operation to drive the load.

Figure 4:
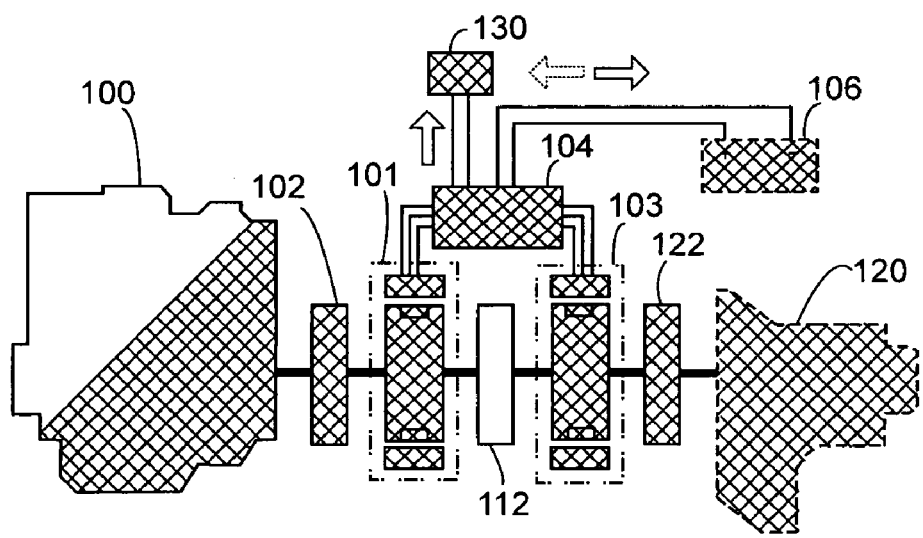
FIG. 4 is a schematic view showing that the preferred embodiment of the system illustrated in FIG. 2 adapted with the rechargeable device is operating as the series combined power system with the engine running at a constant speed.

FIG. 4 shows that the preferred embodiment of the system illustrated in FIG. 2 is adapted with the rechargeable device is operating as the series combined power system with the engine running at a constant speed. FIG. 4 shows system function 2 provided by the preferred embodiment illustrated in FIG. 2, wherein, the system is adapted with the rechargeable device while the engine is running at a constant speed to drive the system to provide series combined power operation for driving the load.

Figure 5:
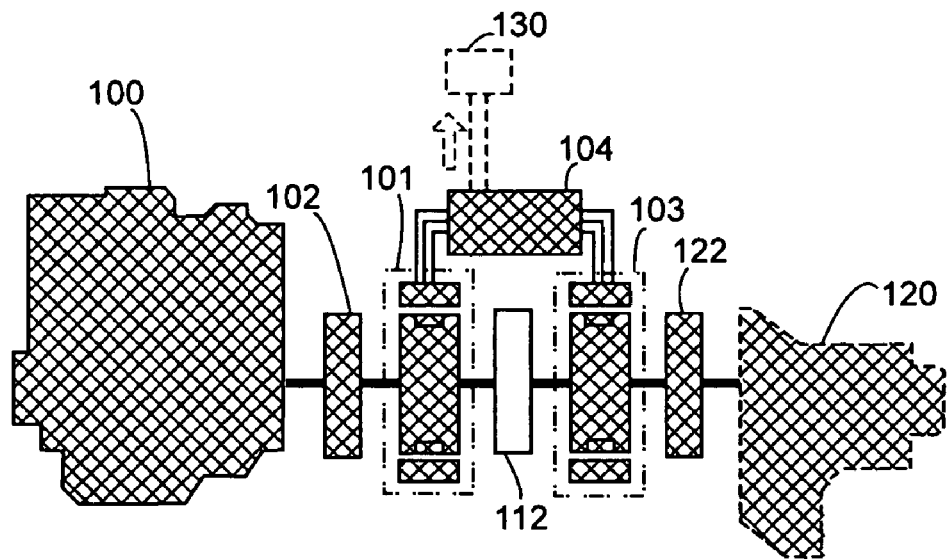
FIG. 5 is a schematic view showing that the preferred embodiment of the system illustrated in FIG. 2 not adapted with the rechargeable device is engaged in the operation as the series combined power system with controllable engine speed.

FIG. 5 is shows that the preferred embodiment of the system illustrated in FIG. 2 is not adapted with the rechargeable device and is providing the operation as the series combined power system with controllable engine speed. FIG. 5 shows system function 3 provided by the preferred embodiment illustrated in FIG. 2, wherein, the system without the adaptation of the rechargeable device provides the series combine power operation to drive the load.

Figure 6:
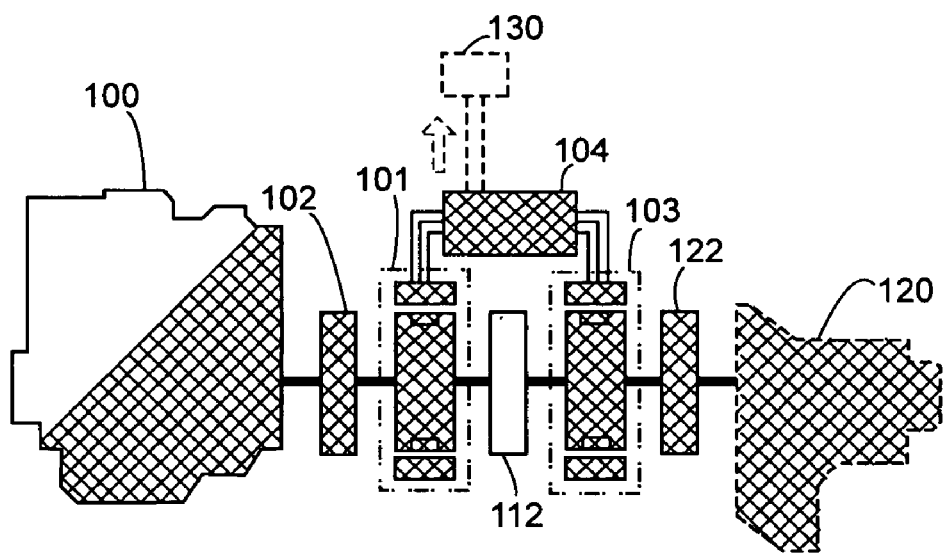
FIG. 6 is a schematic view showing that the preferred embodiment of the system illustrated in FIG. 2 not adapted with the rechargeable device is operating as the series combined power system with the engine running at a constant speed.

FIG. 6 shows that the preferred embodiment of the system illustrated in FIG. 2 is not adapted with the rechargeable device and is operating as the series combined power system with the engine running at a constant speed. FIG. 6 shows system function 4 of the preferred embodiment illustrated in FIG. 6, wherein, the system without the adaptation of the rechargeable device has the engine running at a constant speed to drive the system to provide the series combine power operation to drive the load.

Figure 7:
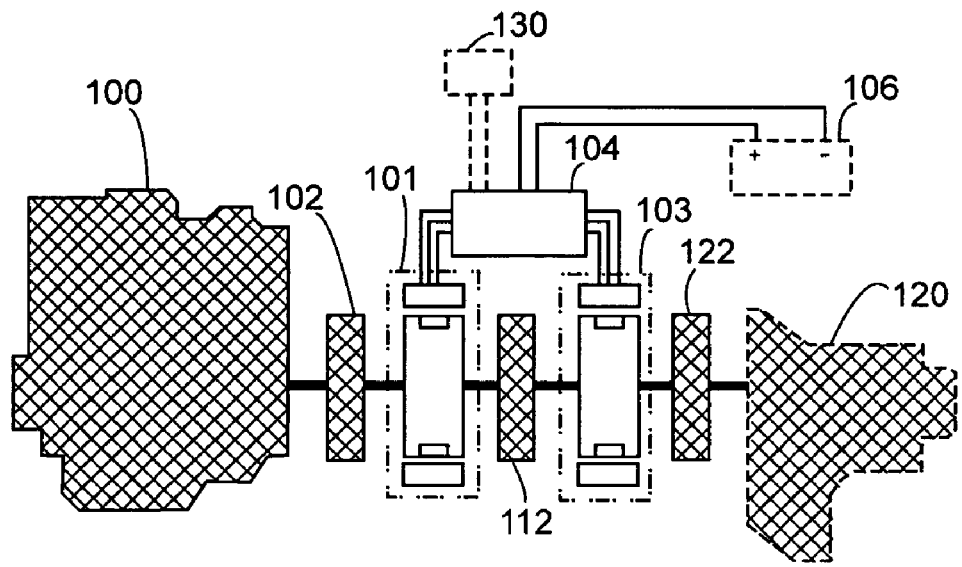
FIG. 7 is a schematic view showing that the preferred embodiment of the system illustrated in FIG. 2 operates to drive a load by the power from the engine.

FIG. 7 shows that the preferred embodiment of the system illustrated in FIG. 2 operates to drive a load by the power from the engine. FIG. 7 shows system function 5 provided by the preferred embodiment illustrated in FIG. 2, wherein, the system drives the load by the power from the engine.

Figure 8:
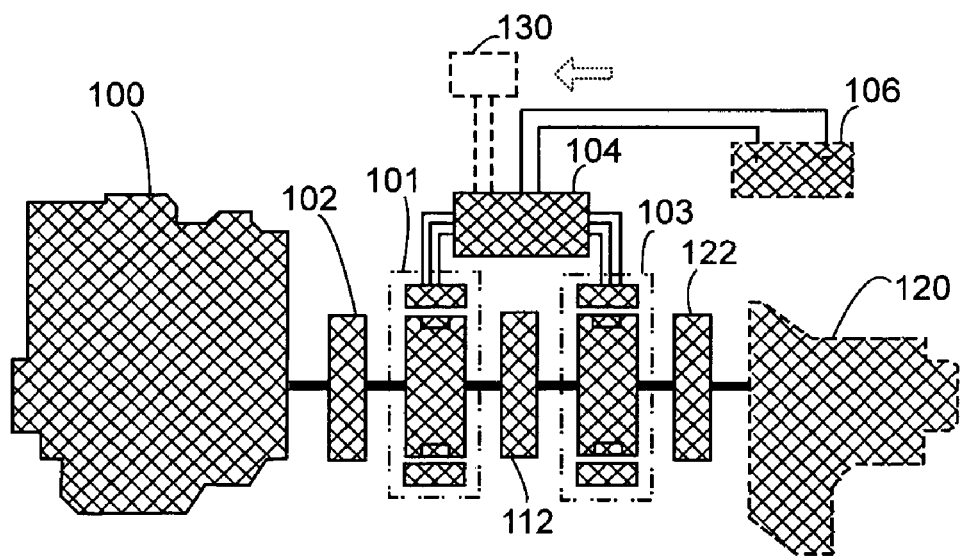
FIG. 8 is a schematic view showing that the preferred embodiment of the system illustrated in FIG. 2 jointly drive the load using the engine power and both of a primary and a secondary dynamo-electric units driven by the rechargeable device.

FIG. 8 shows that the preferred embodiment of the system illustrated in FIG. 2 jointly drives the load using the engine power and both of the primary and the secondary dynamo-electric units driven by the rechargeable device. FIG. 8 shows system function 6 provided by the preferred embodiment illustrated in FIG. 2, wherein, the system has the power from the engine and both of the primary and the secondary dynamo-electric units functioning as a motor in case of a heavy load to jointly drive the load.

Figure 9:
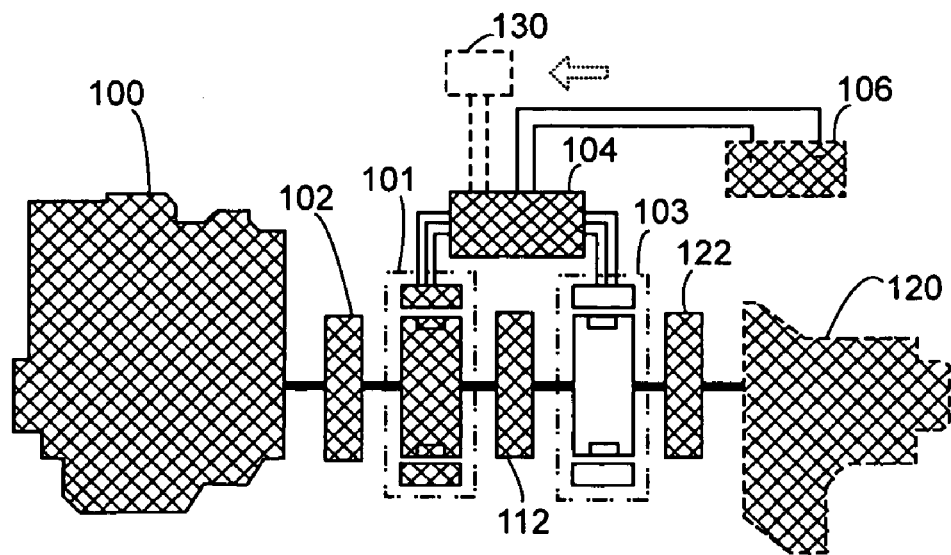
FIG. 9 is a schematic view showing that the preferred embodiment of the system illustrated in FIG. 2 jointly drive the load using the engine power and the primary dynamo-electric units driven by the rechargeable device.

FIG. 9 shows that the preferred embodiment of the system illustrated in FIG. 2 drives the load using the engine power and the primary dynamo-electric units driven by the rechargeable device. FIG. 9 shows system function 7 provided by the preferred embodiment illustrated in FIG. 2, wherein, the system has the power from the engine and the primary dynamo-electric unit functioning as a motor driven by the rechargeable device in case of a heavy load to jointly drive the load.

Figure 10:
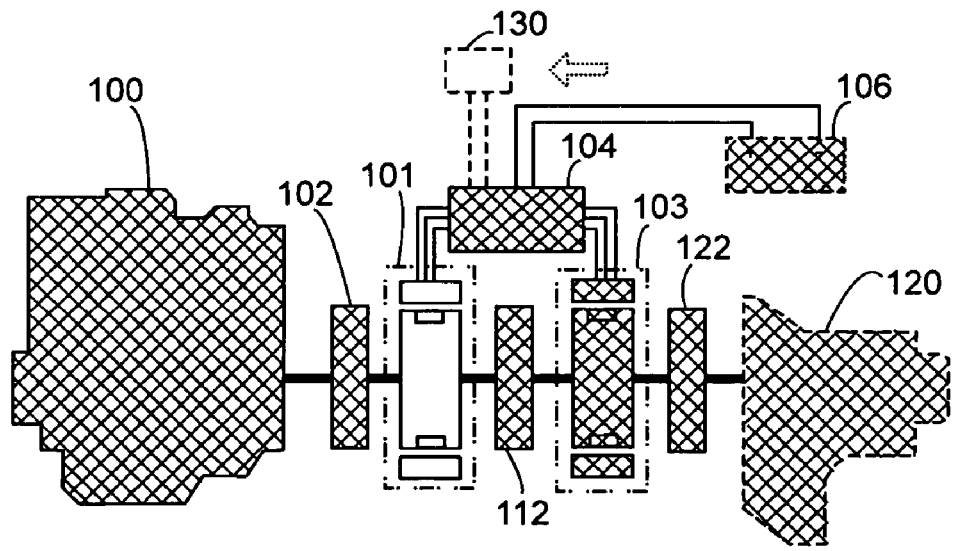
FIG. 10 is a schematic view showing that the preferred embodiment of the system illustrated in FIG. 2 jointly drive the load using the engine power and the secondary dynamo-electric units driven by the rechargeable device.

FIG. 10 is shows that the preferred embodiment of the system illustrated in FIG. 2 drives the load using the engine power and the secondary dynamo-electric units driven by the rechargeable device. FIG. 10 shows system function 8 provided by the preferred embodiment illustrated in FIG. 2, wherein, the system has the power from the engine and the secondary dynamo-electric unit functioning as a motor driven by the rechargeable device in case of a heavy load to jointly drive the load.

Figure 11:
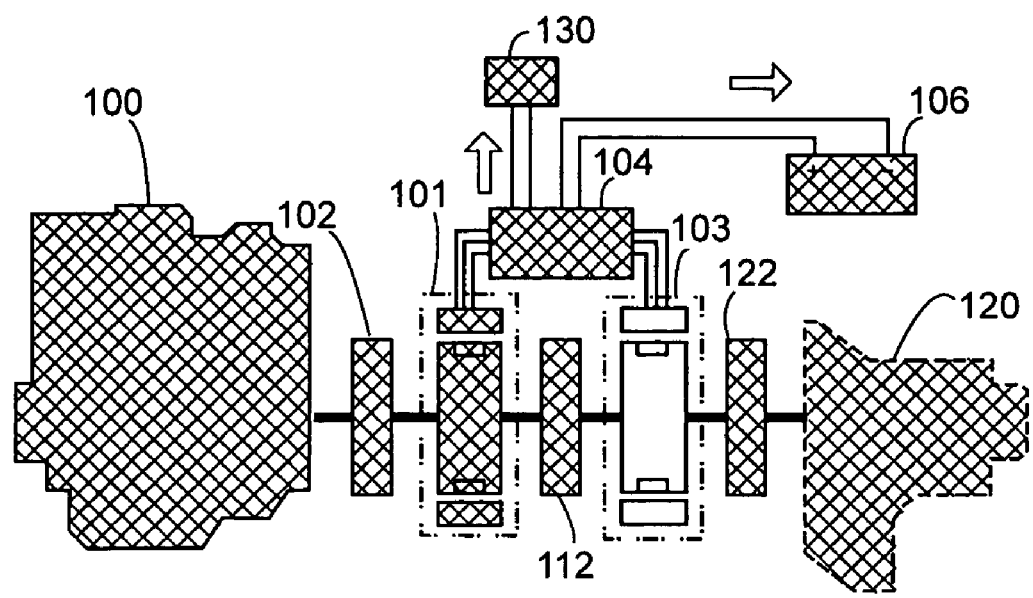
FIG. 11 is a schematic view showing that the preferred embodiment of the system illustrated in FIG. 2 operates to drive the load by the power of engine, and the primary dynamo-electric unit is driven to function as a generator to charge the rechargeable device or to supply power to another load.

FIG. 11 shows that the preferred embodiment of the system illustrated in FIG. 2 operates to drive the load by the power of engine, and the primary dynamo-electric unit is driven to function as a generator to charge the rechargeable device or to supply power to another load. FIG. 11 shows system function 9, wherein; the power from the engine drives the load, and the primary dynamo-electric unit to function as a generator for charging the rechargeable device or supplying power to another load.

FIG. 12 shows that the preferred embodiment of the system illustrated in FIG. 2 operates to drive the load by the power of engine, and the secondary dynamo-electric unit is driven to function as a generator to charge the rechargeable device or to supply power to another load. FIG. 12 shows system function 10 provided by the preferred embodiment illustrated in FIG. 2, wherein, the power from the engine drives the load, and the secondary dynamo-electric unit to function as a generator to charge the rechargeable device or to supply power to another load.

Figure 13:
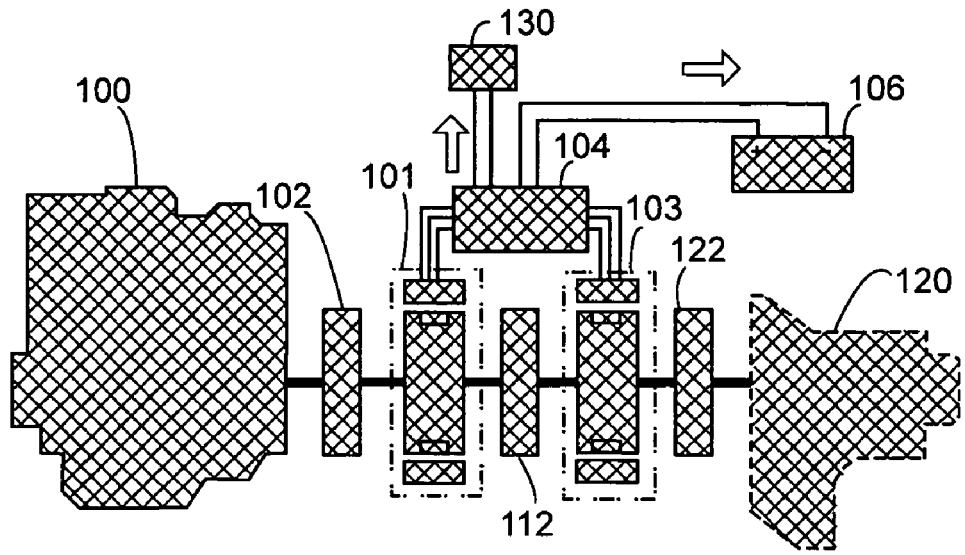
FIG. 13 is a schematic view showing that the preferred embodiment of the system illustrated in FIG. 2 operates to drive the load by the power of engine, and both of the primary and the secondary dynamo-electric units function as a generator to charge the rechargeable device or to supply power to another load.

FIG. 13 shows that the preferred embodiment of the system illustrated in FIG. 2 operates to drive the load by the power of engine, and both of the primary and the secondary dynamo-electric units function as a generator to charge the rechargeable device or to supply power to another load. FIG. 13 shows system function 11 provided by the preferred embodiment illustrated in FIG. 2, wherein, the power from the engine drives the load and both of the primary and the secondary dynamo-electric units to function as a generator for charging the rechargeable device or supplying power to another load.

Figure 14:
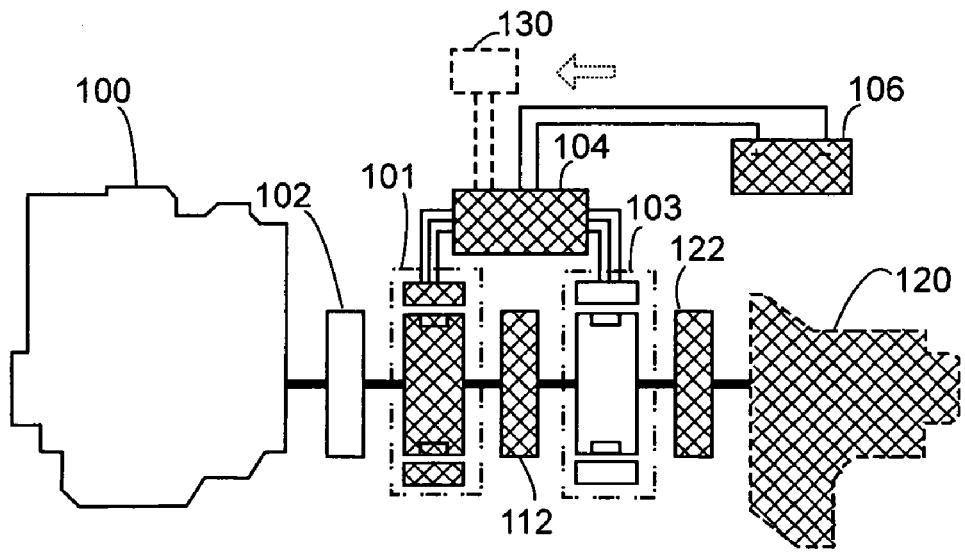
FIG. 14 is a schematic view showing that the preferred embodiment of the system illustrated in FIG. 2 operates to drive the primary dynamo-electric unit by the power from the rechargeable unit for driving the load.

FIG. 14 shows that the preferred embodiment of the system illustrated in FIG. 2 operates to drive the primary dynamo-electric unit by the power from the rechargeable unit for driving the load. FIG. 14 shows system function 12 provided by the preferred embodiment illustrated in FIG. 2, wherein, the power form the rechargeable device drives the primary dynamo-electric unit to function as a motor for driving the load.

Figure 15:
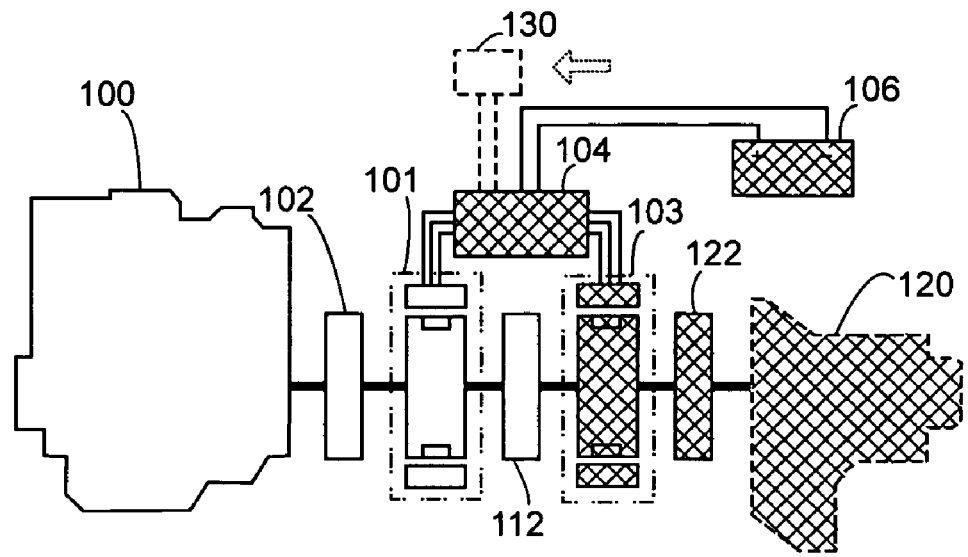
FIG. 15 is a schematic view showing that the preferred embodiment of the system illustrated in FIG. 2 operates to drive the secondary dynamo-electric unit by the power from the rechargeable unit for driving the load.

FIG. 15 shows that the preferred embodiment of the system illustrated in FIG. 2 operates to drive the secondary dynamo-electric unit by the power from the rechargeable unit for driving the load. FIG. 15 shows system function 13 provided by the preferred embodiment illustrated in FIG. 2, wherein, the power from the rechargeable device drives the secondary dynamo-electric unit to function as a motor for driving the load.

Figure 16:
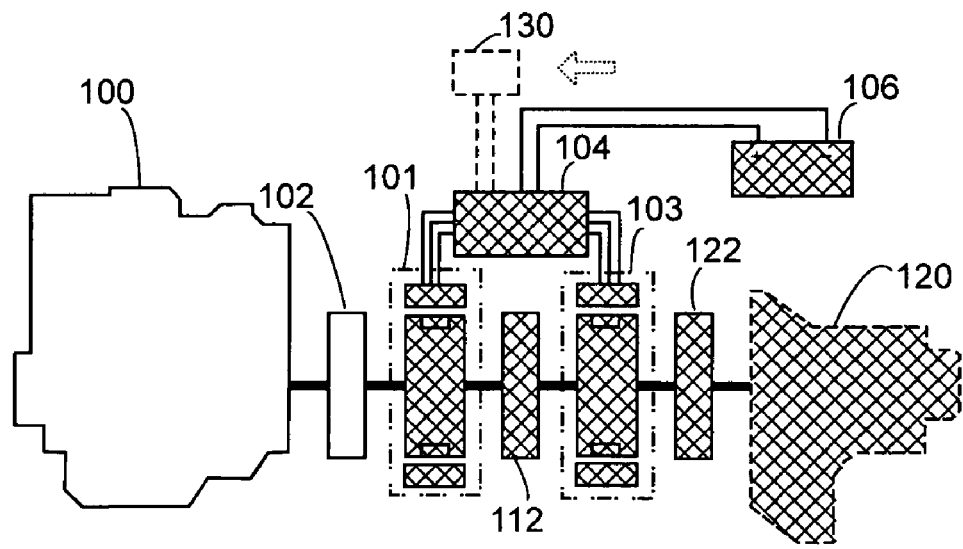
FIG. 16 is a schematic view showing that the preferred embodiment of the system illustrated in FIG. 2 operates to drive both of the primary and the secondary dynamo-electric units by the power from the rechargeable unit for driving the load.

FIG. 16 shows that the preferred embodiment of the system illustrated in FIG. 2 operates to drive both of the primary and the secondary dynamo-electric units by the power from the rechargeable unit for driving the load. FIG. 16 shows system function 14 provided by the preferred embodiment illustrated in FIG. 2, wherein, the power form the rechargeable device drives both of the primary and the secondary dynamo-electric units to function as a motor for driving the load.

Figure 17:
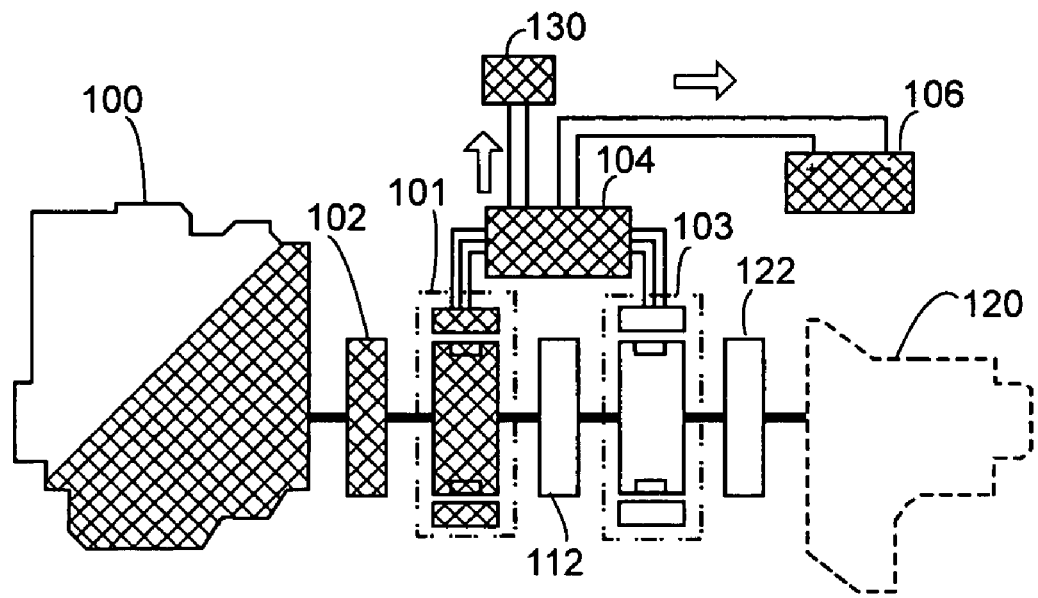
FIG. 17 is a schematic view showing that the preferred embodiment of the system illustrated in FIG. 2 operates on the power from the engine running at a constant speed to drive the primary dynamo-electric unit to function as a generator to charge the rechargeable device and to supply power to another load.

FIG. 17 shows that the preferred embodiment of the system illustrated in FIG. 2 operates on the power from the engine running at a constant speed to drive the primary dynamo-electric unit to function as a generator to charge the rechargeable device and to supply power to another load. FIG. 17 shows system function 15 provided by the preferred embodiment illustrated in FIG. 2, wherein, the engine runs at a constant speed to drive the primary dynamo-electric unit to function as a generator for charging the rechargeable device or supplying power to another load.

Figure 18:
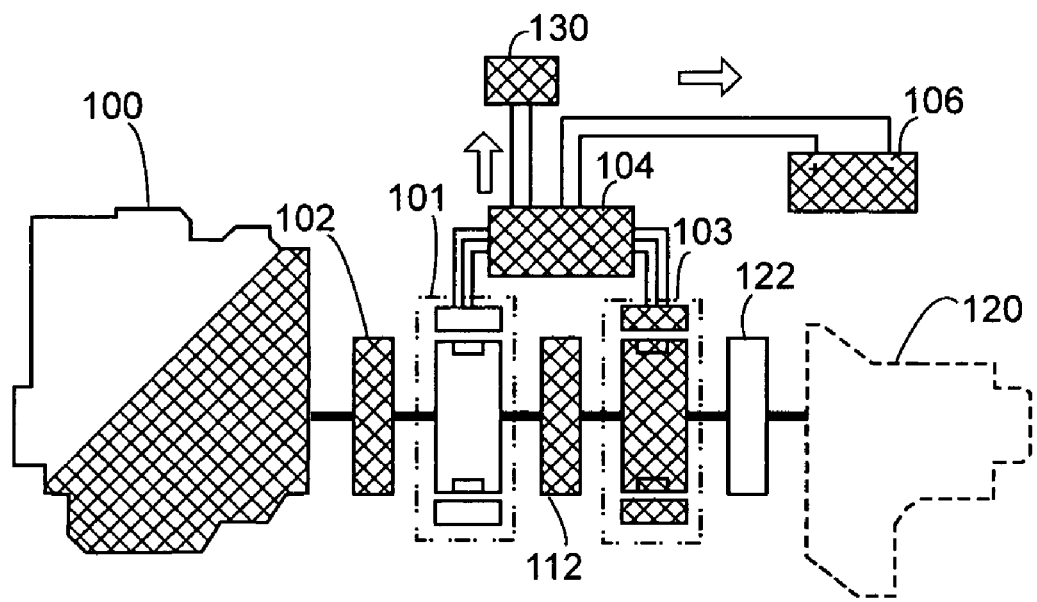
FIG. 18 is a schematic view showing that the preferred embodiment of the system illustrated in FIG. 2 operates on the power from the engine running at a constant speed to drive the secondary dynamo-electric unit to function as a generator to charge the rechargeable device and to supply power to another load.
Figure 19:
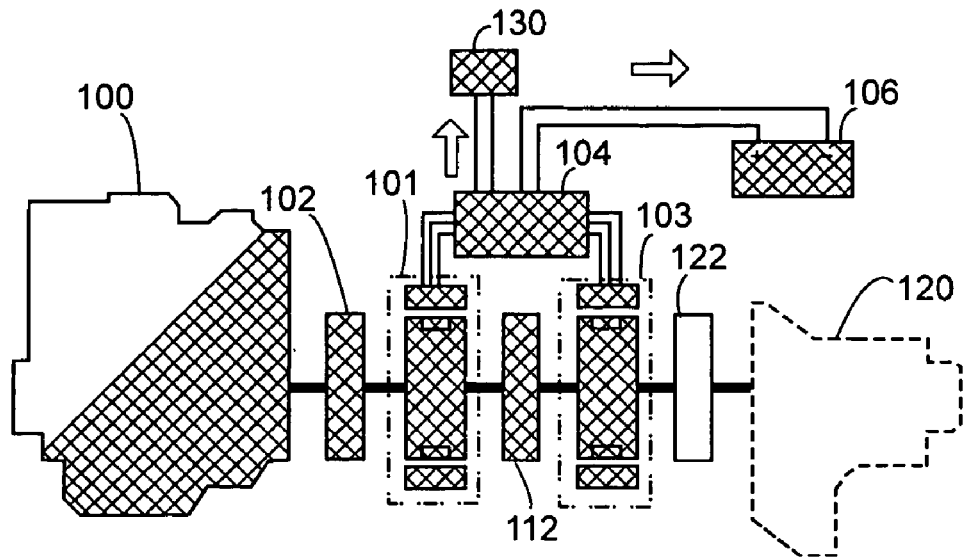
FIG. 19 is a schematic view showing that the preferred embodiment of the system illustrated in FIG. 2 operates on the power from the engine running at a constant speed to drive both of the primary and the secondary dynamo-electric units to function as a generator to charge the rechargeable device or to supply power to another load.
Figure 20:
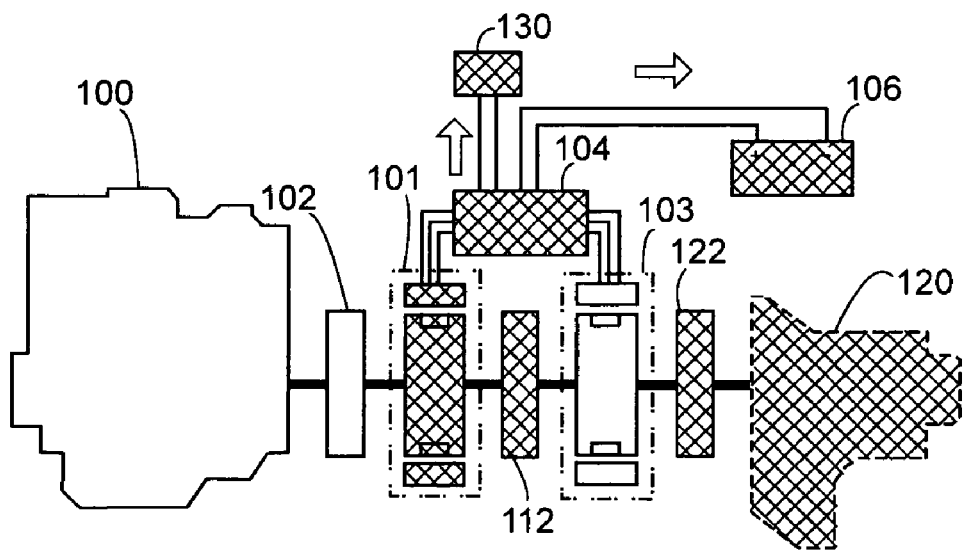
FIG. 20 is a schematic view showing that the preferred embodiment of the system illustrated in FIG. 2 has the load the draw the primary dynamo-electric unit to regenerate by reclaiming the kinetics so to charge the rechargeable device or to supply power to another load.

FIG. 18 shows that the preferred embodiment of the system illustrated in FIG. 2 operates on the power from the engine running at a constant speed to drive the secondary dynamo-electric unit to function as a generator to charge the rechargeable device and to supply power to another load. FIG. 18 shows system function 16 provided by the preferred embodiment illustrated in FIG. 2, wherein, the engine runs at a constant speed to drive the secondary dynamo-electric unit to function as a generator for charging the rechargeable device or supplying power to another load FIG. 19 shows that the preferred embodiment of the system illustrated in FIG. 2 operates on the power from the engine running at a constant speed to drive both of the primary and the secondary dynamo-electric units to function as a generator to charge the rechargeable device or to supply power to another load. FIG. 19 shows system function 17 provided by the preferred embodiment illustrated in FIG. 2, wherein, the engine runs at a constant speed to drive both of the primary and the secondary dynamo-electric units to function as a generator for charging the rechargeable device or supplying power to another load FIG. 20 shows that the preferred embodiment of the system illustrated in FIG. 2 has the load the draw the primary dynamo-electric unit to regenerate by reclaiming the kinetics so to charge the rechargeable device or to supply power to another load. FIG. 20 shows system function 18 provided by the preferred embodiment illustrated in FIG. 2, wherein, the system has the load to operate as the brake to draw the primary dynamo-electric unit for functioning as a generator to charge the rechargeable device or to supply power to another load.

Figure 21:
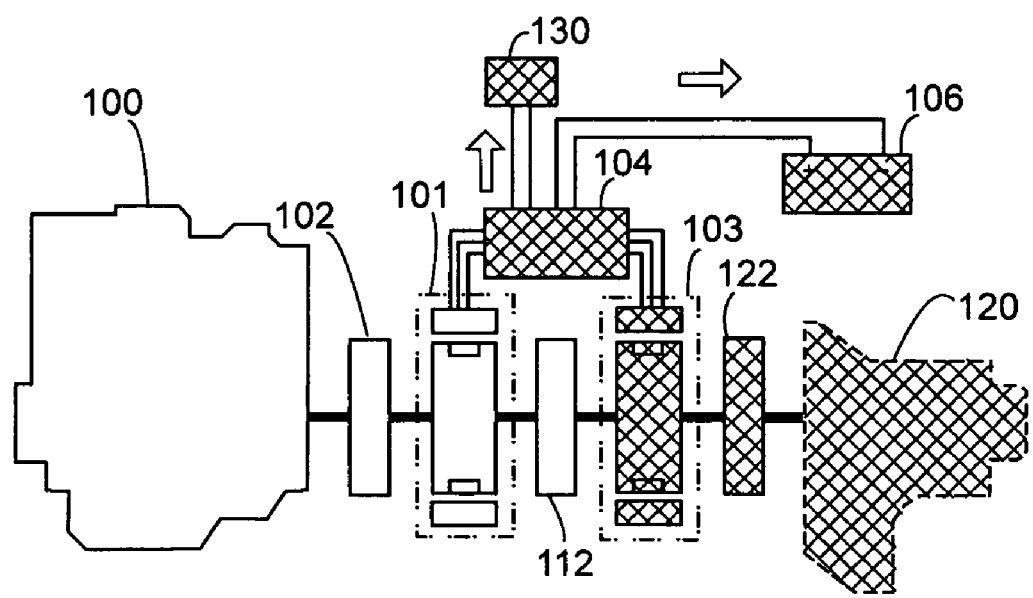
FIG. 21 is a schematic view showing that the preferred embodiment of the system illustrated in FIG. 2 has the load the draw the secondary dynamo-electric unit to regenerate by reclaiming the kinetics so to charge the rechargeable device or to supply power to another load.

FIG. 21 shows that the preferred embodiment of the system illustrated in FIG. 2 has the load the draw the secondary dynamo-electric unit to regenerate by reclaiming the kinetics so to charge the rechargeable device or to supply power to another load. FIG. 21 shows system function 19 provided by the preferred embodiment illustrated in FIG. 2, wherein, the system has the load to exercise the operation of a brake so to draw the secondary dynamo-electric unit to function as a generator for charging the rechargeable device or supplying power to another load.

Figure 22:
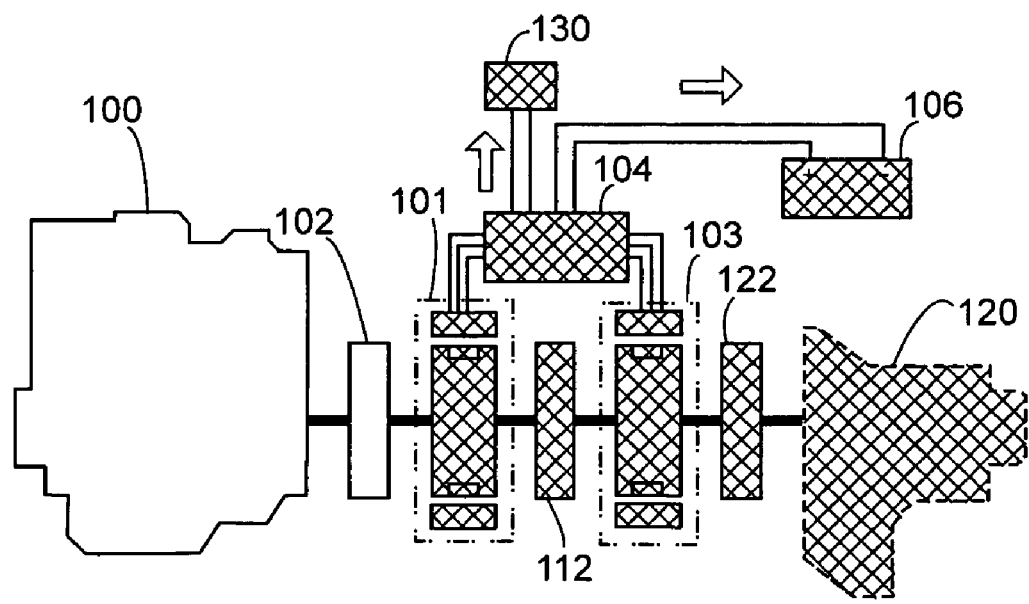
FIG. 22 is a schematic view showing that the preferred embodiment of the system illustrated in FIG. 2 has the load the draw both of the primary and the secondary dynamo-electric units to regenerate for reclaiming the kinetics so to charge the rechargeable device or to supply power to another load.

FIG. 22 shows that the preferred embodiment of the system illustrated in FIG. 2 has the load the draw both of the primary and the secondary dynamo-electric units to regenerate by reclaiming the kinetics so to charge the rechargeable device or to supply power to another load. FIG. 22 shows system function 20 provided by the preferred embodiment illustrated in FIG. 2, wherein, the system has the load to exercise the operation of a brake to draw both of the primary and the secondary dynamo-electric units to function as a generator for charging the rechargeable device or supplying power to another load.

Figure 23:
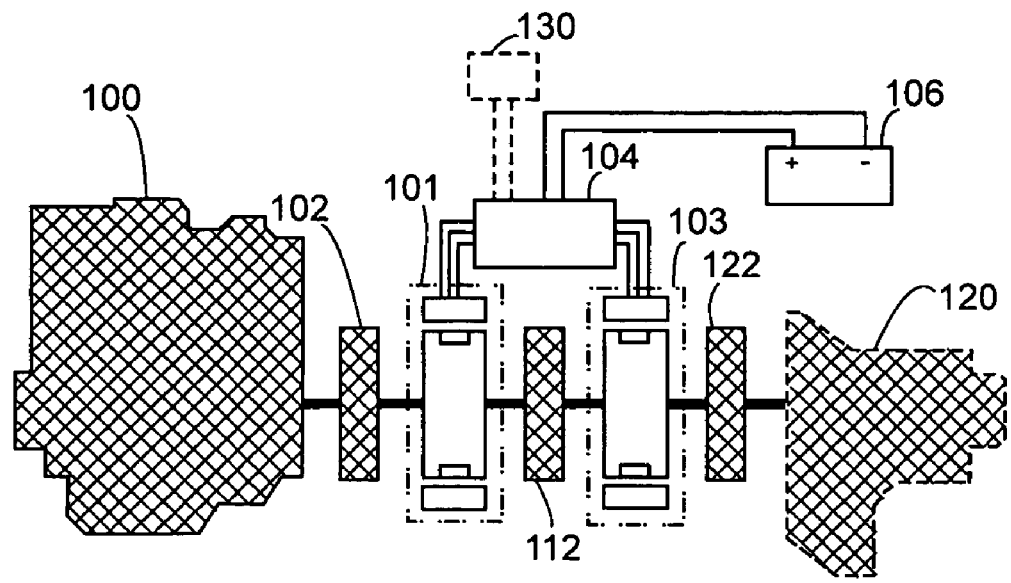
FIG. 23 is a schematic view showing that the preferred embodiment of the system illustrated in FIG. 2 exercises a braking on the load by means of a mechanical damper of the engine.

FIG. 23 shows that the preferred embodiment of the system illustrated in FIG. 2 exercises a braking on the load by means of a mechanical damper of the engine. FIG. 23 shows system function 21 provided by the preferred embodiment illustrated in FIG. 2, wherein, the engine has the damper to exercise the operation of brake on the load.

Figure 24:
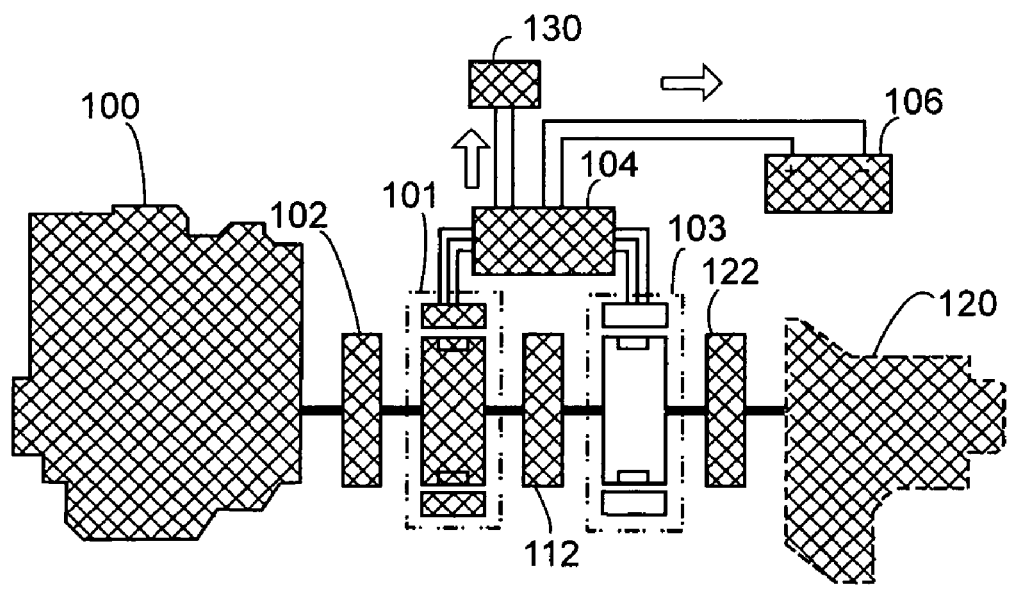
FIG. 24 is a schematic view showing that the preferred embodiment of the system illustrated in FIG. 2 exercises a braking on the load by means of the mechanical damper of the engine and drives the primary dynamo-electric unit to regenerate for charging the rechargeable device or supplying power to another load.

FIG. 24 shows that the preferred embodiment of the system illustrated in FIG. 2 exercises a braking on the load by means of the mechanical damper of the engine and drives the primary dynamo-electric unit to regenerate for charging the rechargeable device or supplying power to another load. FIG. 24 shows system function 22 provided by the preferred embodiment illustrated in FIG. 2, wherein, the engine is used as the damper to exercise brake on the load while the primary dynamo-electric functions as a generator to regenerate by reclaiming the kinetics for regenerating so to charge the rechargeable device or to supply power to another load.

Figure 25:
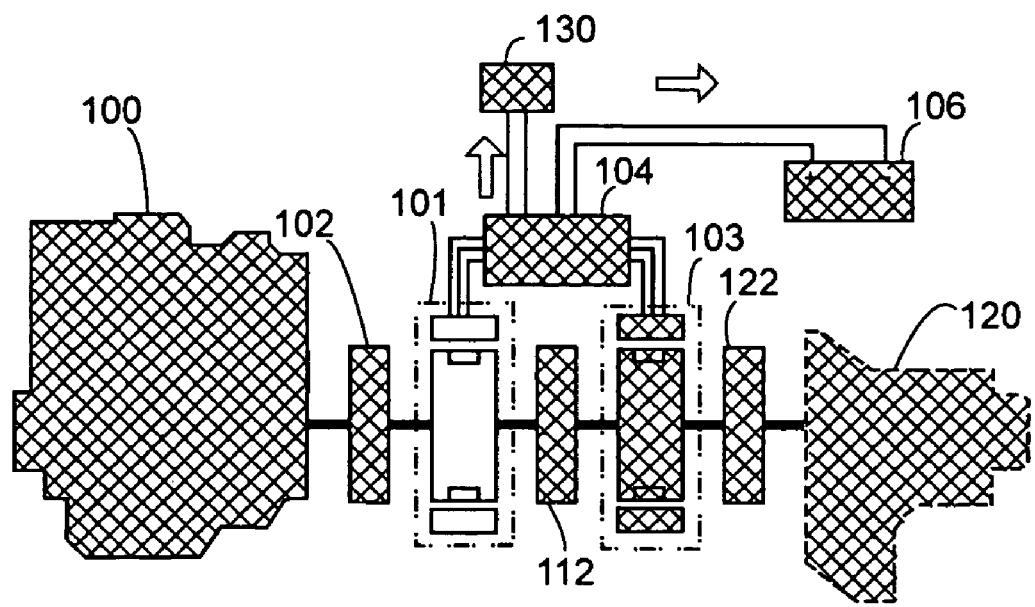
FIG. 25 is a schematic view showing that the preferred embodiment of the system illustrated in FIG. 2 exercises a braking on the load by means of the mechanical damper of the engine and drives the secondary dynamo-electric unit to regenerate for charging the rechargeable device or supplying power to another load.

FIG. 25 shows that the preferred embodiment of the system illustrated in FIG. 2 exercises a braking on the load by means of the mechanical damper of the engine and drives the secondary dynamo-electric unit to regenerate for charging the rechargeable device or supplying power to another load. FIG. 25 shows system function 23 provided by the preferred embodiment illustrated in FIG. 2, wherein, the secondary dynamo-electric unit functions as a generator to regenerate by reclaiming the kinetics for regenerating so to charge the rechargeable device or to supply power to another load.

Figure 26:
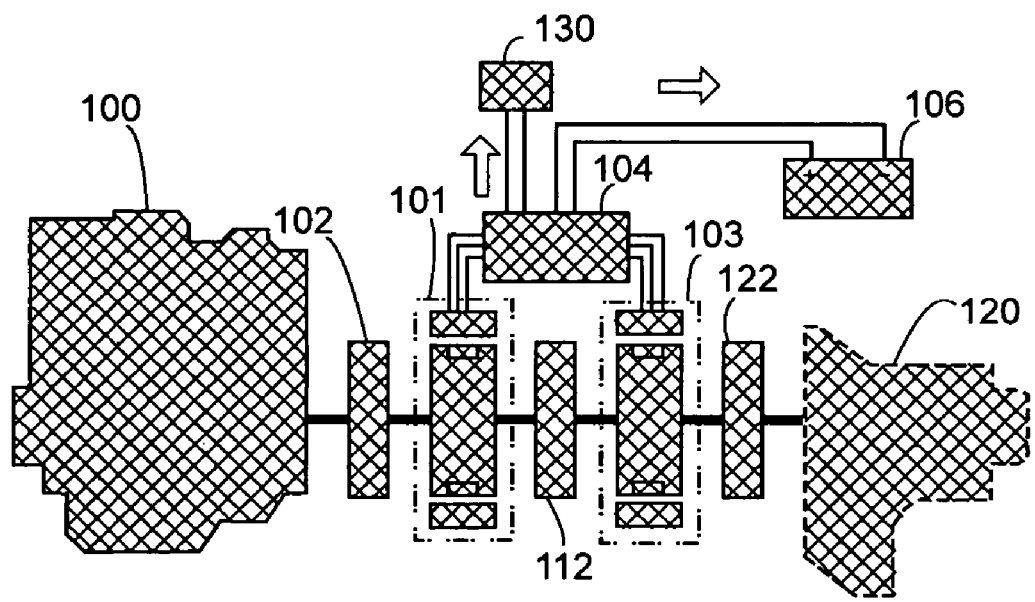
FIG. 26 is a schematic view showing that the preferred embodiment of the system illustrated in FIG. 2 exercises a braking on the load by means of the mechanical damper of the engine and drives both of the primary and the secondary dynamo-electric units to regenerate for charging the rechargeable device or supplying power to another load.

FIG. 26 shows that the preferred embodiment of the system illustrated in FIG. 2 exercises a braking on the load by means of the mechanical damper of the engine and drives both of the primary and the secondary dynamo-electric units to regenerate for charging the rechargeable device or supplying power to another load. FIG. 26 shows system function 24 provided by the preferred embodiment illustrated in FIG. 2, wherein, both of the primary and the secondary dynamo-electric units functioning as a generator to regenerate by reclaiming the kinetics so to charge the rechargeable device or to supply power to another load.

Figure 27:
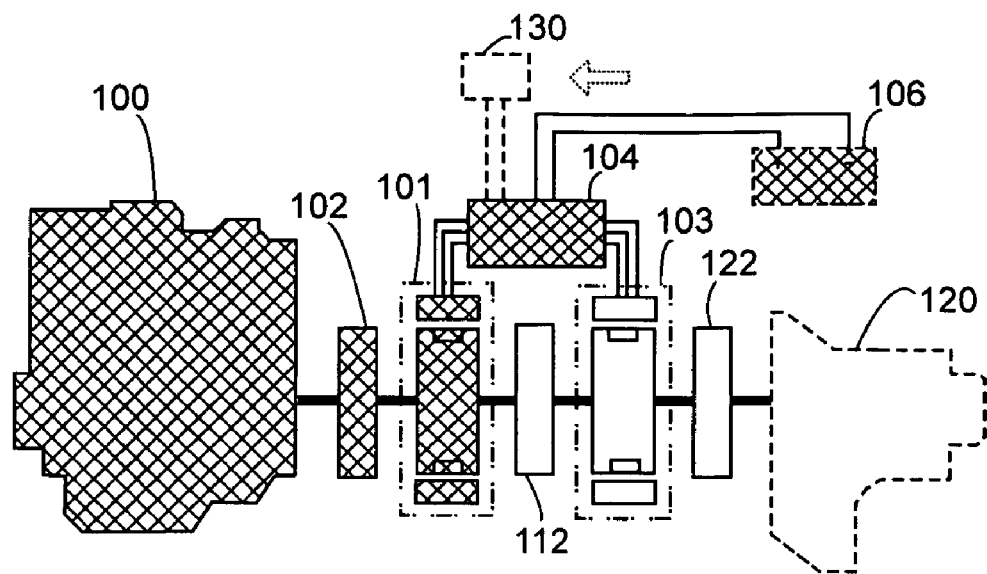
FIG. 27 is a schematic view showing that the preferred embodiment of the system illustrated in FIG. 2 uses the power from the rechargeable device to drive the primary dynamo-electric unit to start the engine.

FIG. 27 shows that the preferred embodiment of the system illustrated in FIG. 2 uses the power from the rechargeable device to drive the primary dynamo-electric unit to start the engine. FIG. 27 shows system function 25 provided by the preferred embodiment illustrated in FIG. 2, wherein, the power from the rechargeable device drives the primary dynamo-electric unit to function as a motor to start the engine.

Figure 28:
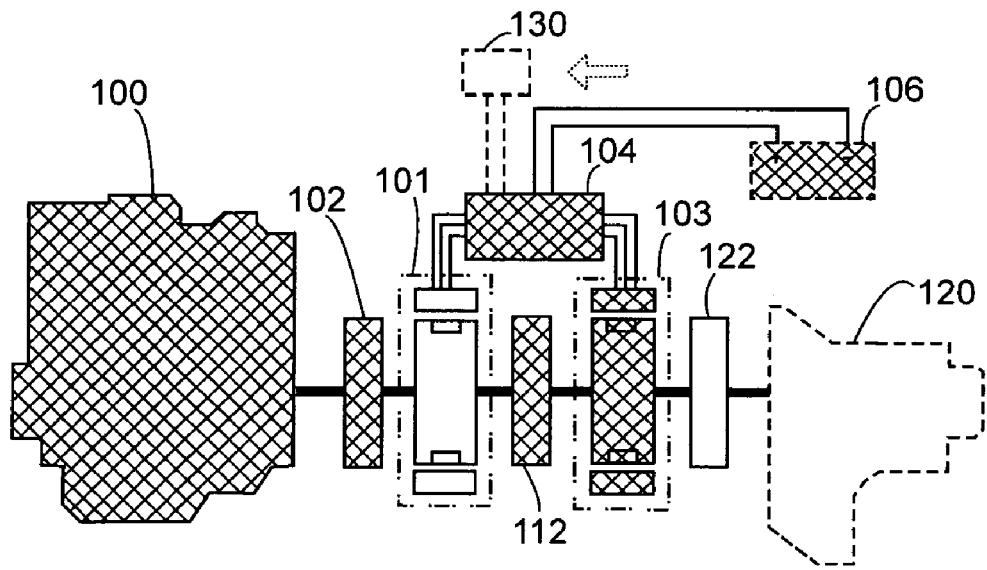
FIG. 28 is a schematic view showing that the preferred embodiment of the system illustrated in FIG. 2 uses the power from the rechargeable device to drive the secondary dynamo-electric unit to start the engine.

FIG. 28 shows that the preferred embodiment of the system illustrated in FIG. 2 uses the power from the rechargeable device to drive the secondary dynamo-electric unit to start the engine. FIG. 28 shows system function 26 provided by the preferred embodiment illustrated in FIG. 2, wherein, the power from the rechargeable device drives the secondary dynamo-electric unit to function as a motor to start the engine.

Figure 29:
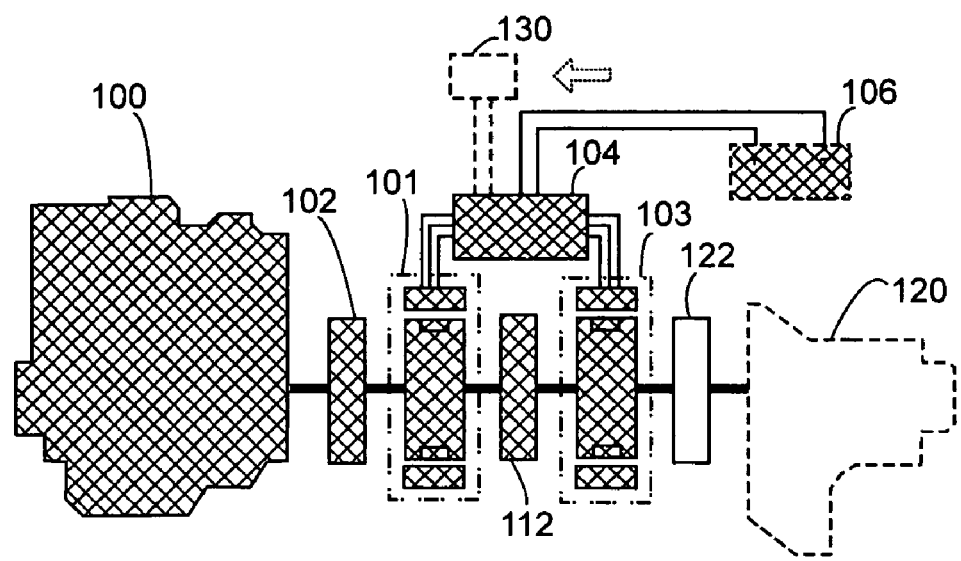
FIG. 29 is a schematic view showing that the preferred embodiment of the system illustrated in FIG. 2 uses the power from the rechargeable device to drive both of the primary and the secondary dynamo-electric units to start the engine.

FIG. 29 shows that the preferred embodiment of the system illustrated in FIG. 2 uses the power from the rechargeable device to drive both of the primary and the secondary dynamo-electric units to start the engine. FIG. 29 shows system function 27 provided by the preferred embodiment illustrated in FIG. 2, wherein, the power from the rechargeable device drives both of the primary and the secondary dynamo-electric units to function as a motor to start the engine.

The constant speed of the engine among those system functions described above is defined as the range of operation speed wherein the engine is running at lower fuel consumption but paid the operation region with comparatively higher fuel saving of comparatively higher output power so to reach the optimal brake specific fuel consumption.

In general, the series and parallel combined dual power system of the present invention has the engine as the active power with its essential structure and functions described as follows:

The rotary part of the engine serving as the active rotation power source 100 is directly couple to that of the primary dynamo-electric unit 101; or alternatively, an optional clutch 102 or a variable transmission unit 109 may or may not be provided between the active rotation power source 100 and the primary dynamo-electric unit 101;

The rotation kinetics outputted from the engine serving as the active rotation power source 100 drives the rotary part of the primary dynamo-electric unit 101 to function as a generator; the clutch 112 is provided between the rotary part of the primary dynamo-electric unit 101 and that of the secondary dynamo-electric unit 103; when the system is converted into the operation as the series combined power system, the clutch 112 is not coupled; instead, the engine serving as the active rotation power source 100 drives the primary dynamo-electric unit to function as a generator with the outputted power to further drive the secondary dynamo-electric unit to function as a motor for driving the load; if as required, the system is adapted with the rechargeable device 106 and other power driven load, the power generated by the primary dynamo-electric unit charges the rechargeable device 106 or supplies power to another load in case of a light load or no-load;

In the normal load, the clutch 112 located between both of the primary and the secondary dynamo-electric units is closed; the optional clutch 102 may or may not be provided between the rotary part of the engine serving as the active rotation power source 100 and that of the primary dynamo-electric unit 101; if the clutch 102 is provided, it is also closed; the optional clutch 122 may or may not be provided between the secondary dynamo-electric unit 103 and the load; and if the clutch 1122 is provided, it is also closed so that the rotation kinetics outputted form the engine serving as the active rotation power source 100 drives the load through the rotary part of the primary dynamo-electric unit 101 and that of the secondary dynamo-electric unit 103. If as required, the optional rechargeable device 106 is provided and in case of a heavy load, the clutch 112 is closed and the system indicates operation of the parallel combined power system. The optional clutches 102 and 122 may or may not be provided to the system. If the clutch 102 is provide, it is also closed; if the clutch 122 is provided, it is also closed; instead, the power from the rechargeable device 106 drives either or both of the primary and the secondary dynamo-electric units 101, 103 to function as a motor with the rotation kinetics outputted and that from the engine to jointly drive the load. In case of a light load, either or both of the primary and the secondary dynamo-electric units 101, 103 is converted to function as a generator for charging the rechargeable device 106 or supplying power to another load;

If the rechargeable device 106 and the clutch 102 are provided to the system, the clutch 102 is disengaged and the clutch 112 is closed, then the power from the rechargeable device drives either or both of the primary and the secondary dynamo-electric units 101, 103 to output rotation kinetics for driving the load; if the clutch 112 is disengaged, then the rechargeable device 106 drives the secondary unit 103 to output rotation kinetics for driving the load; and including but not limited to those secondary functions with or without the optional items as the case may be:

The clutch 112 is disengaged (if the optional clutch 102 is adapted, it is also closed), and the power from the rechargeable device 106 drives the primary dynamo-electric unit 101 to function as a motor for starting the engine serving as the active rotation power source 100;

The power from the rechargeable device 106, or that from the redundant rechargeable device 110 drives the optional start motor 124 through the optional start switch 111 to start the engine serving as the active rotation power source 100 through the variable transmission unit 109;

The clutch 112 is controlled to indicate disengaged status while the power from the rechargeable device 106 controls the speed, torque, and orientation of the secondary dynamo-electric unit 104 to function as a motor through the drive control unit 104 for outputting to drive the load; and The clutch 112 is controlled to indicate closed status for the engine serving as the active rotation power source 100 to revolve in positive or negative orientation through the optional variable transmission unit 109 to output kinetics to drive the load.

For environmental consideration, the demands of the driving power in case that the engine fails, and the energy storage demands when the regenerated power exercises a brake, the series and parallel combined dual power drive system of the present invention may be adapted with the optional rechargeable device 106, so to control the generation power when the rotation kinetics from the engine serving as the active rotation power source 100 drives the primary dynamo-electric unit 101 to serve as a generator, and further to charge the rechargeable device 106 in case of no-load, light load or at other proper time, or to supply power to another power driven load 130. Functions provided by the system include:

When the system operates as the series combined power system, it controls the clutch 112 to indicate disengaged status (as required, the clutch 102 and the clutch 122 may or may not be provided to the system; if the clutch 102 is provided, it is closed; if the clutch 122 is provided, it is also closed). As the system operates as the series combined power system, the rotation kinetics from the engine serving as the active rotation power source 100 drives the primary dynamo-electric unit 101 to function as a generator with the power generated while directly driving the secondary dynamo-electric unit to function as a motor for driving the load 120, further charges at random the rechargeable device 106 when adapted, or supplies power to another load 130 for the engine serving as the active rotation power source 100 to operate in a range featuring higher energy efficiency;

When the system operates as the parallel combined power system, the clutch 112 is closed (as required, the clutch 102 and the clutch 122 may or may not be provided to the system; if the clutch 102 is provided, it is closed; if the clutch 122 is provided, it is also closed), and the rotation kinetics fro the engine serving as the active rotation power source 100 directly drives the load 120; if the rechargeable device 106 is adapted and in case of a light load 120, the engine drives either or both of the primary and the secondary dynamo-electric units 101, 103 to function as a generator to charge the rechargeable device 106 or to supply power to another power driven load 130 for the active rotation power source 100 to operate in a range feature higher energy efficiency;

When the system operates as the parallel combined power system, the clutch 112 is controlled to indicate closed status (as required, the clutch 102 and the clutch 122 may or may not be provided to the system; if the clutch 102 is provided, it is closed; if the clutch 122 is provided, it is also closed), the power from the rechargeable device 106 drives either or both of the primary and the secondary dynamo-electric units 101, 103 to operate as a motor to output rotation kinetics together with that outputted from the engine serving as the active rotation power source to jointly drive the load;

When the system controls the clutch 112 to indicate disengaged status on the drive power outputted from the rechargeable device 106, the power from the rechargeable device 106 also drives the secondary dynamo-electric unit 103 to drive the load 120, or controls the clutch 112 to indicate closed status (if the optional clutch 102 is adapted, it is also controlled to indicate closed status), and the power from the rechargeable device 106 drives either or both of the primary and the secondary dynamo-electric units 101, 103 to function as a motor for driving the load 120; and if the clutch 122 is adapted to the system, the clutch 122 also indicates closed status;

If the system operates as a generator to control the clutch 112 to indicate disengaged status (if the optional clutch 102 is adapted, it indicates closed status), and the engine serving as the active rotation power source 100 drives the primary dynamo-electric unit 101 to function as a generator to output power, or when the optional clutch 122 is adapted to the system and the clutch 122 indicates disengaged status (if the optional clutch 102 is adapted, it is also controlled to indicate closed status), the engine serving as the active rotation power source 100 drives either or both of the primary and the secondary dynamo-electric units 101, 103 to function as a generator to output power to charge the rechargeable device 106 or to supply power to another power driven load 13o;

Both of the primary and the secondary dynamo-electric units to regenerate by reclaiming the kinetics for exercising the brake, the clutch 112 indicates disengaged status, and the secondary dynamo-electric unit 103 is converted to function as a generator to charge the rechargeable device 106 or to supply power to another power driven load 130; if the optimal clutch 122 is adapted to the system, both clutches 10, 112 indicate closed status; or when the optimal clutch 102 is adapted to the system with the clutch 102 indicating disengaged status and the clutch 112 indicating closed status, then either or both of the primary and the secondary dynamo-electric units 101, 103 is converted to function as a generator for charging the rechargeable device 106 or supplying power to another power driven load 130 to exercise the brake by the regenerated power, and if the optional clutch 122 is adapted to the system, the clutch 122 indicates closed status;

The mechanical damper of the engine is directly used to exercise the brake, or if the rechargeable device 106 is adapted, either or both of he primary and the secondary dynamo-electric units 101, 103 functions at the same time as a generator to charge the rechargeable device 106 or to supply power to another power driven load 130 for providing the brake by the regenerated power;

When the power from the rechargeable device 106 drives the dynamo-electric unit to start the engine, the clutch 112 is controlled to indicate disengaged status, the power from the rechargeable device 106 drives the primary dynamo-electric unit 101 to function as the start motor to start the engine serving as the active rotation power source 100; or when the optional clutch 122 is adapted to the system, the clutch indicates disengaged status and the clutch 112 indicates closed status, and the power from the rechargeable device 106 drives either or both of he primary and the secondary dynamo-electric units 101, 103 to function as a start motor to start the engine serving as the active rotation power source 100; and The system provides all or any of those functions described above.

Under the same operation mechanism of the system, the spatial location of each of all the units may be arranged as required. Each unit may be made into a standing alone unit as required before being coupled to another unit; or as required, two or more than two units of the system may be made by sharing the same structure in various arrangements depending on the spatial conditions and other factors including heat dissipation, noise, manageability, and service.

Figure 30:
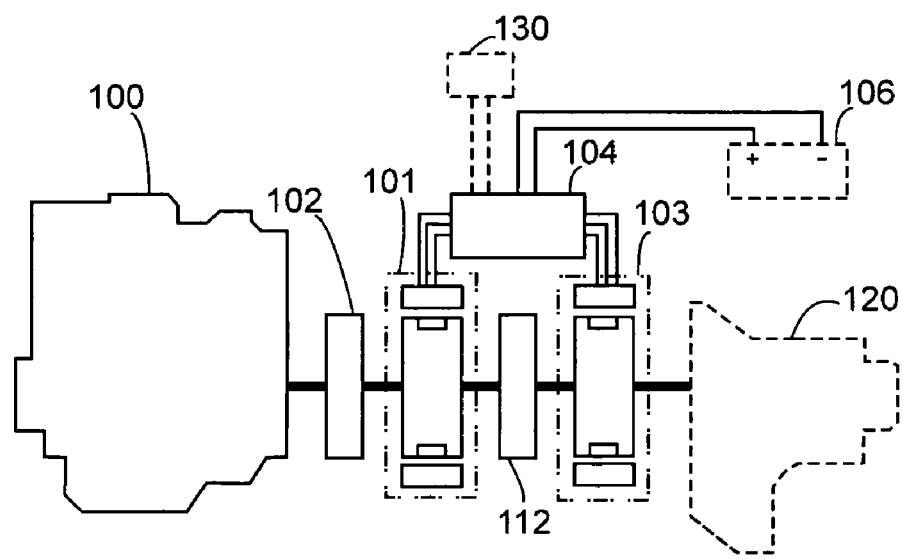
FIG. 30 is a schematic view showing that the preferred embodiment of the system illustrated in FIG. 2 is not adapted with a clutch between the output end and the load.

FIG. 30 shows that the preferred embodiment of the system illustrated in FIG. 2 is not adapted with a clutch between the output end and the load. As illustrated in FIG. 30, the clutch 112 is not adapted to where between the output end and the load side of the system. If the input end of the load is adapted with a clutch, the variable transmission dose not provide idling shift function, and the secondary dynamo-electric unit 103 fails to function as a generator driven by the engine serving as the active power source 100 of the system, nor as a motor to start the engine as illustrated in FIG. 2. The system may be selected to provide system functions 1~15, and all or any part of system functions 18~15 listed in Table B. Those system functions listed in Table B are illustrated in FIGS. 31~53.

Figure 31:
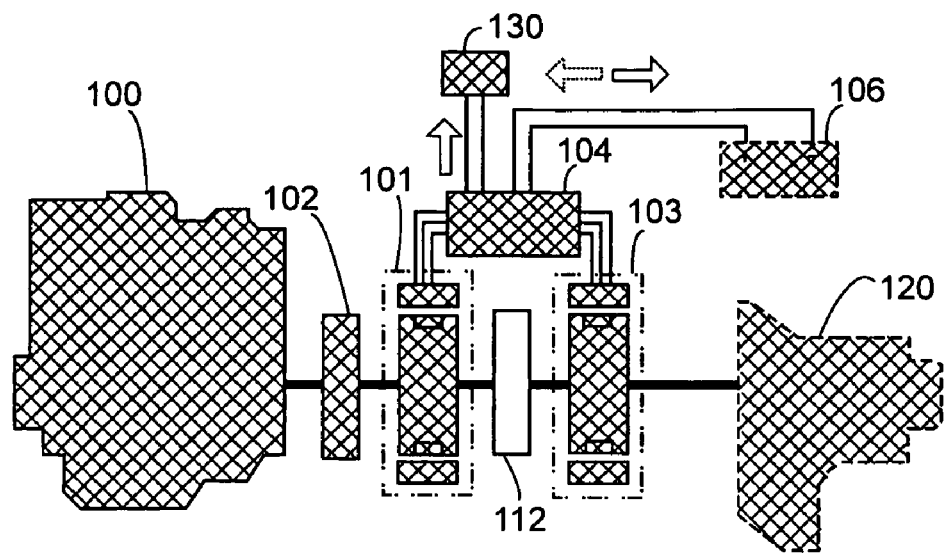
FIG. 31 is a schematic view showing that the preferred embodiment of the system illustrated in FIG. 30 is adapted with the rechargeable unit to operate as the series combined power system with controllable engine speed.

FIG. 31 shows that the preferred embodiment of the system illustrated in FIG. 30 is adapted with the rechargeable unit to operate as the series combined power system with controllable engine speed. FIG. 31 shows system function 1 provided by the preferred embodiment illustrated in FIG. 30, wherein, the rechargeable device is adapted to the system and the system engages in the series combined power operation to drive the load.

Figure 32:
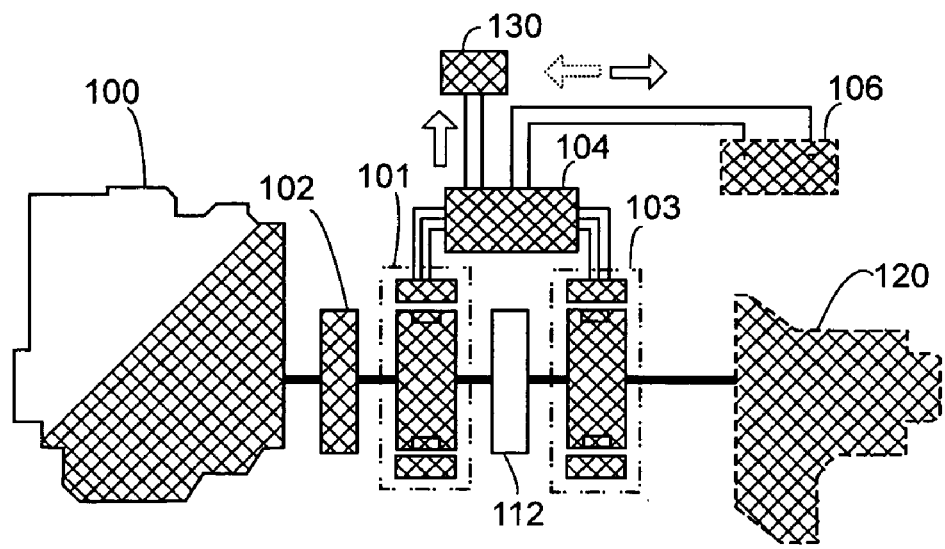
FIG. 32 is a schematic view showing that the preferred embodiment of the system illustrated in FIG. 30 adapted with the rechargeable device operates as the series combined power system with the engine running at a constant speed.

FIG. 32 shows that the preferred embodiment of the system illustrated in FIG. 30 adapted with the rechargeable device operates as the series combined power system with the engine running at a constant speed. FIG. 32 shows system function 2 provided by the preferred embodiment illustrated in FIG. 30, wherein, the rechargeable device is adapted for the engine to run at a constant speed for driving the system to engage in the series combined power operation to drive the load.

Figure 33:
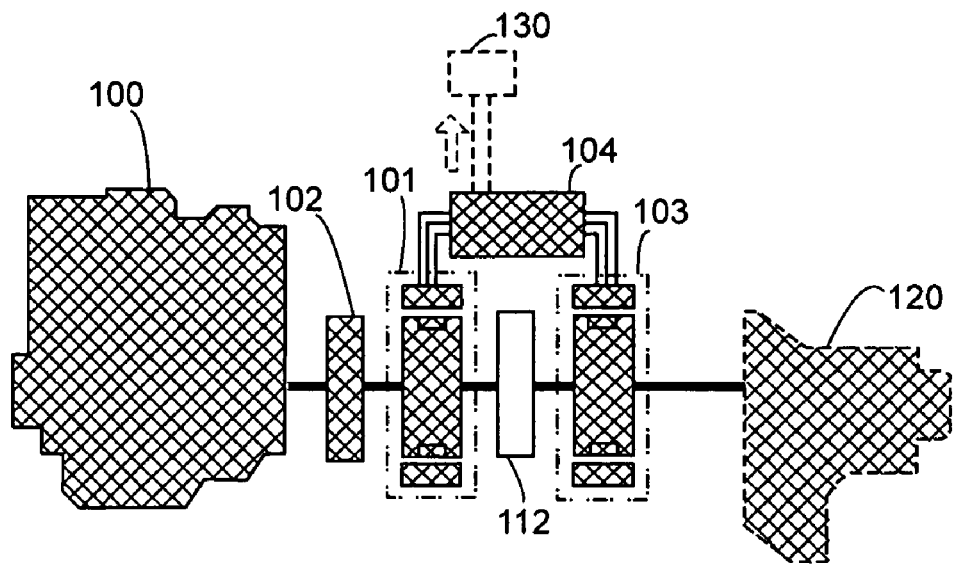
FIG. 33 is a schematic view showing that the preferred embodiment of the system illustrated in FIG. 30 operate as the series combined power system with controllable engine speed without the adaptation of a rechargeable unit.

FIG. 33 shows that the preferred embodiment of the system illustrated in FIG. 30 operate as the series combined power system with controllable engine speed without the adaptation of a rechargeable unit.

Figure 34:
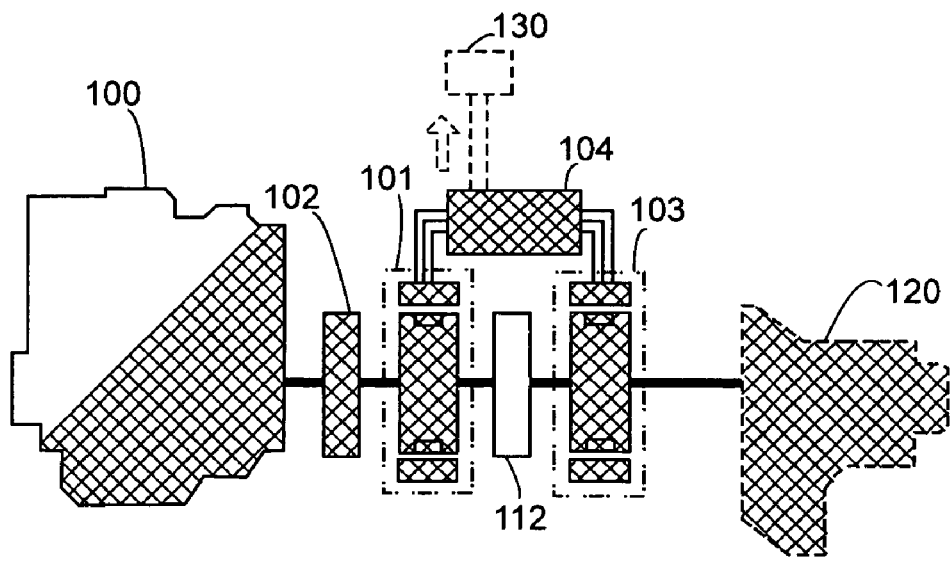
FIG. 34 is a schematic view showing that the preferred embodiment of the system illustrated in FIG. 30 operate as the series combined power system with the engine running at constant speed without the adaptation of a rechargeable unit.

FIG. 34 is a schematic view showing that the preferred embodiment of the system illustrated in FIG. 30 operate as the series combined power system with the engine running at constant speed without the adaptation of a rechargeable unit. FIG. 34 shows system function 4 provided by the preferred embodiment illustrated in FIG. 30, wherein, no rechargeable device is adapted to the system, and the engine runs at a constant speed to drive the system to engage in the series combined power operation for driving the load.

Figure 35:
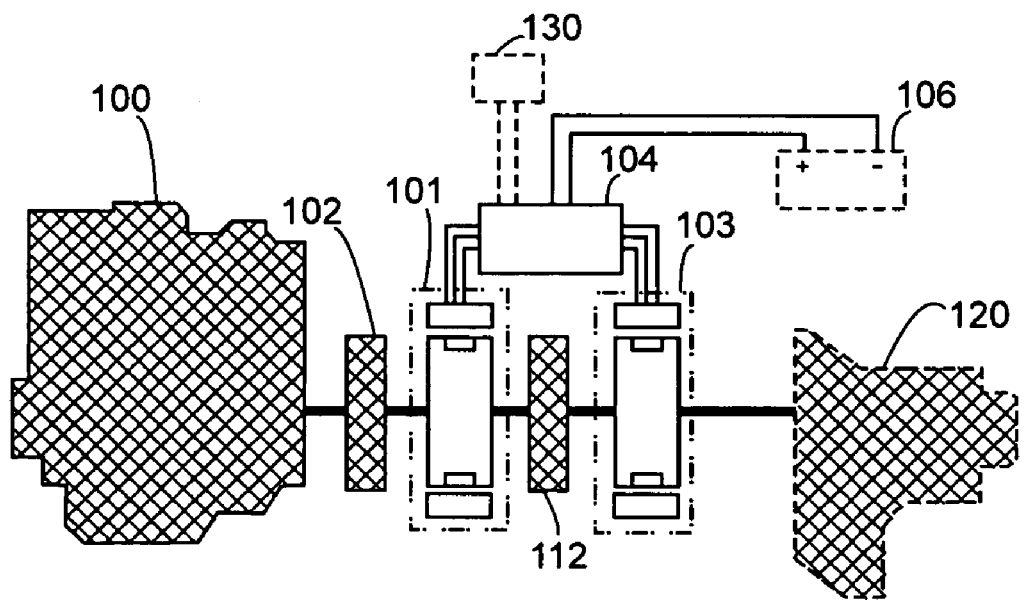
FIG. 35 is a schematic view showing that the preferred embodiment of the system illustrated in FIG. 30 operates on the power from the engine to drive the load.

FIG. 35 shows that the preferred embodiment of the system illustrated in FIG. 30 operates on the power from the engine to drive the load. FIG. 35 shows system function 5 provided by the preferred embodiment illustrated in FIG. 35, wherein, the system has the engine to drive the load.

Figure 36:
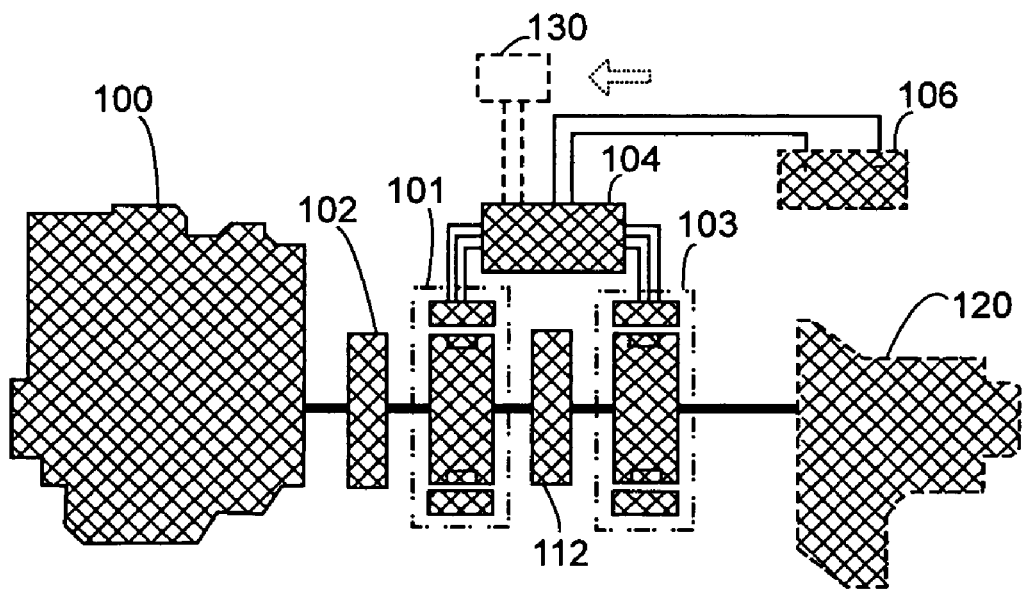
FIG. 36 is a schematic view showing that the preferred embodiment of the system illustrated in FIG. 30 operates on the power from the engine to jointly drive the load with both of the primary and the secondary dynamo-electric units driven by the rechargeable device.

FIG. 36 shows that the preferred embodiment of the system illustrated in FIG. 30 operates on the power from the engine to jointly drive the load with both of the primary and the secondary dynamo-electric units driven by the rechargeable device. FIG. 36 shows system function 6 by the preferred embodiment illustrated in FIG. 30, wherein, the power from the engine and both of the primary and the secondary dynamo-electric units driven by the rechargeable device function as a motor in case of a heavy load to jointly drive the load.

Figure 37:
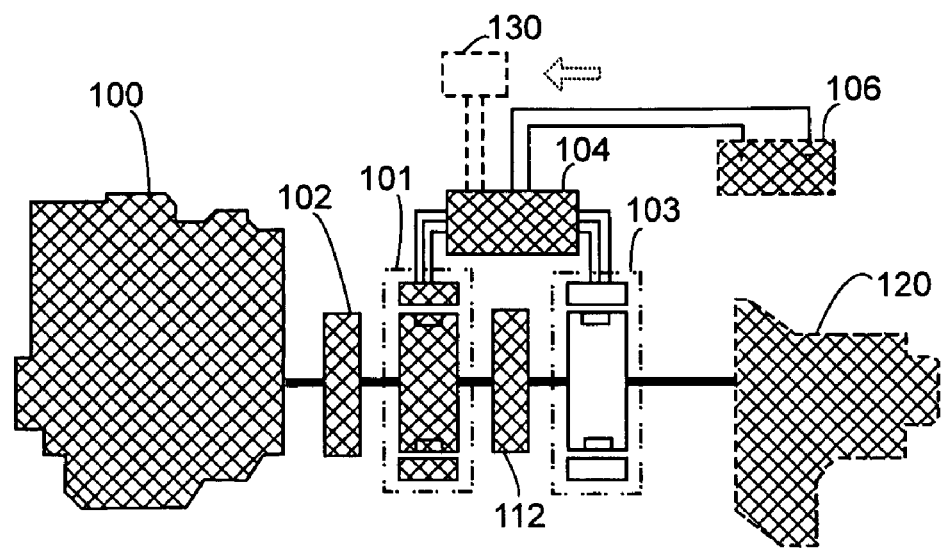
FIG. 37 is a schematic view showing that the preferred embodiment of the system illustrated in FIG. 30 operates on the power from the engine to jointly drive the load with the primary dynamo-electric unit driven by the rechargeable device.

FIG. 37 shows that the preferred embodiment of the system illustrated in FIG. 30 operates on the power from the engine to jointly drive the load with the primary dynamo-electric unit driven by the rechargeable device. FIG. 37 shows system function 7 provided by the preferred embodiment illustrated in FIG. 30, wherein, in case of a heavy load, it is jointly driven by the power from the engine and both of the primary and the secondary dynamo-electric units functioning as a motor.

Figure 38:
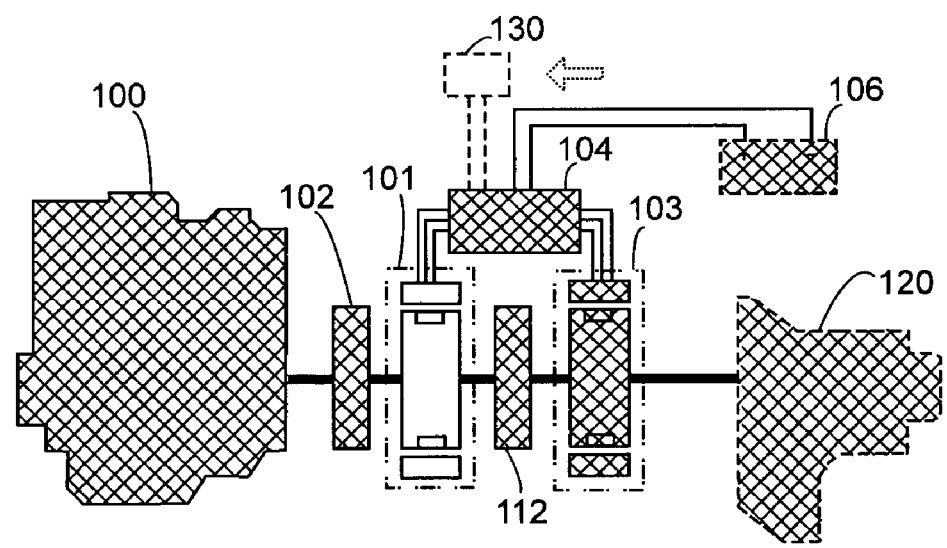
FIG. 38 is a schematic view showing that the preferred embodiment of the system illustrated in FIG. 30 operates on the power from the engine to jointly drive the load with the secondary dynamo-electric unit driven by the rechargeable device.

FIG. 38 shows that the preferred embodiment of the system illustrated in FIG. 30 operates on the power from the engine to jointly drive the load with the secondary dynamo-electric unit driven by the rechargeable device. FIG. 38 shows system function 8 provided by the preferred embodiment illustrated in FIG. 30, wherein, in case of a heavy load, the power from the engine and the secondary dynamo-electric unit driven by the rechargeable device functions a motor to jointly drive the load.

Figure 39:
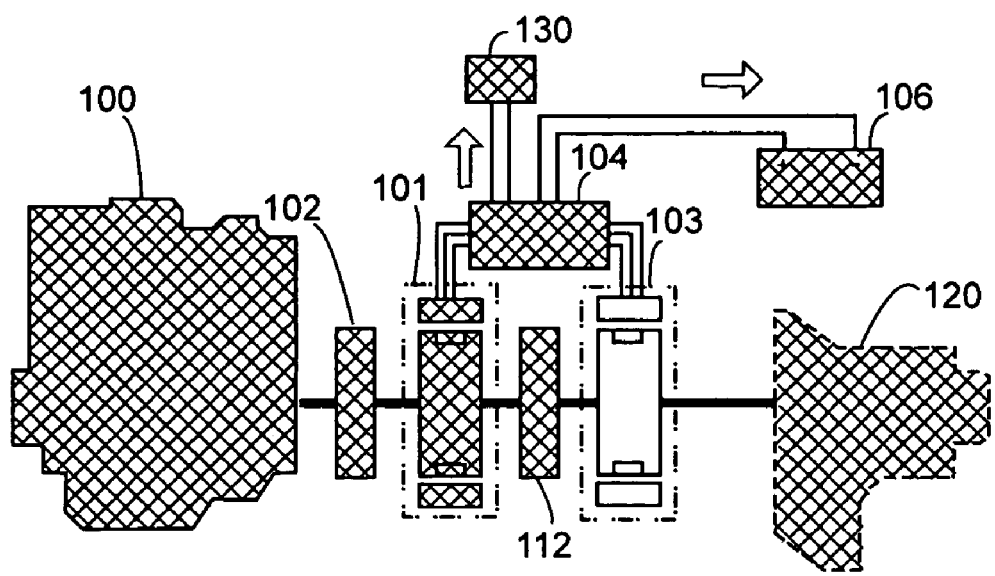
FIG. 39 is a schematic view showing that the preferred embodiment of the system illustrated in FIG. 30 operates on the power from the engine to drive the load, and drive the primary dynamo-electric unit to function as a generator to charge the rechargeable device or supply power to another load.

FIG. 39 shows that the preferred embodiment of the system illustrated in FIG. 30 operates on the power from the engine to drive the load, and drive the primary dynamo-electric unit to function as a generator to charge the rechargeable device or supply power to another load. FIG. 39 shows system function 9 provided by the preferred embodiment illustrated in FIG. 30, wherein, the power from the engine drives the load and the primary dynamo-electric unit to function as a generator for charging the rechargeable device or supplying power to another load.

Figure 40:
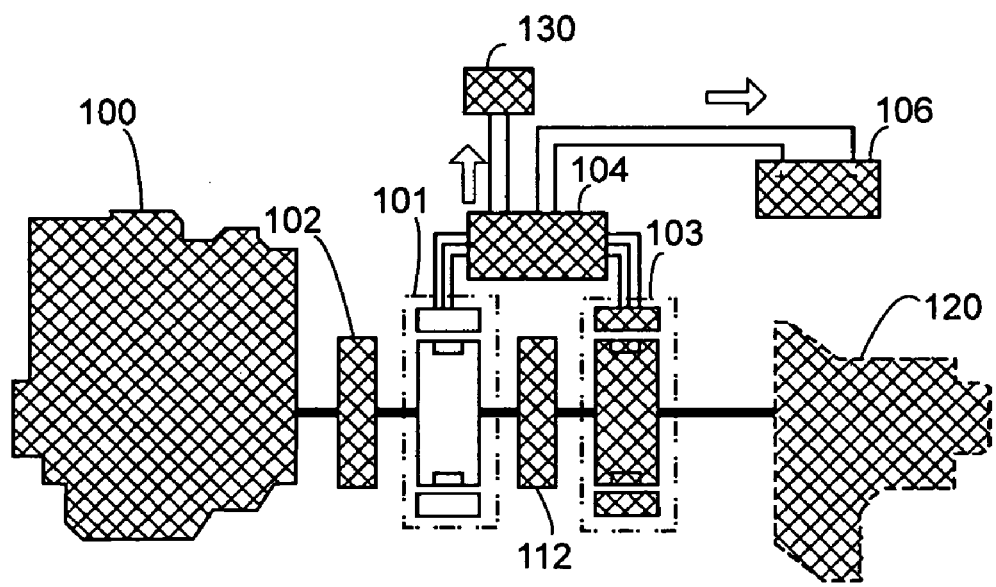
FIG. 40 is a schematic view showing that the preferred embodiment of the system illustrated in FIG. 30 operates on the power from the engine to drive the load, and drive the secondary dynamo-electric unit to function as a generator to charge the rechargeable device or supply power to another load.

FIG. 40 shows that the preferred embodiment of the system illustrated in FIG. 30 operates on the power from the engine to drive the load, and drive the secondary dynamo-electric unit to function as a generator to charge the rechargeable device or supply power to another load. FIG. 40 shows system function 10 provided by the preferred embodiment illustrated in FIG. 30, wherein, the power from the engine drives the load and the secondary dynamo-electric unit to function as a generator for charging the rechargeable device or supplying power to another load.

Figure 41:
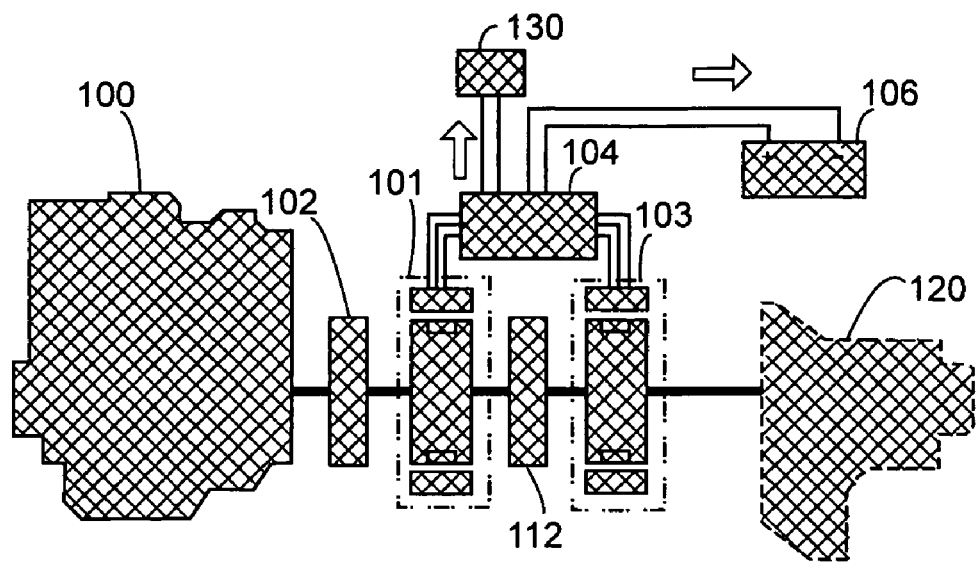
FIG. 41 is a schematic view showing that the preferred embodiment of the system illustrated in FIG. 30 operates on the power from the engine to drive the load, and drive both of the primary and the secondary dynamo-electric units to function as a generator to charge the rechargeable device or supply power to another load.

FIG. 41 shows that the preferred embodiment of the system illustrated in FIG. 30 operates on the power from the engine to drive the load, and drive both of the primary and the secondary dynamo-electric units to function as a generator to charge the rechargeable device or supply power to another load. FIG. 41 shows system function 11 provided by the preferred embodiment illustrated in FIG. 30, wherein, the power from the engine drives the load and both of the primary and the secondary dynamo-electric units to function as a generator for charging the rechargeable device or supplying power to another load.

Figure 42:
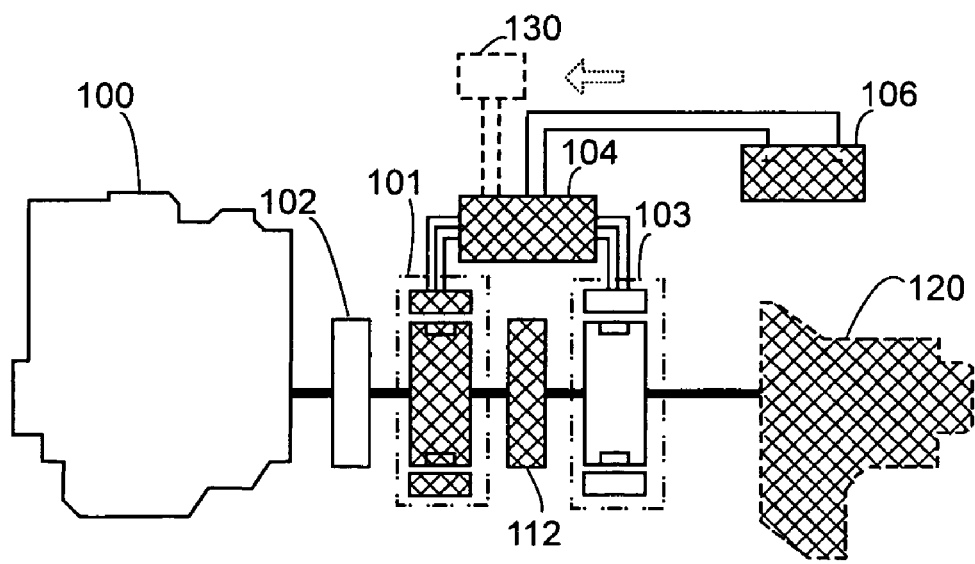
FIG. 42 is a schematic view showing that the preferred embodiment of the system illustrated in FIG. 30 operates on the power from the rechargeable device to drive the primary dynamo-electric unit to further drive the load.

FIG. 42 shows that the preferred embodiment of the system illustrated in FIG. 30 operates on the power from the rechargeable device to drive the primary dynamo-electric unit to further drive the load. FIG. 42 shows system function 12 provided by the preferred embodiment illustrated in FIG. 30, wherein, the power form the rechargeable device drives the primary dynamo-electric unit to function as a motor for driving the load.

Figure 43:
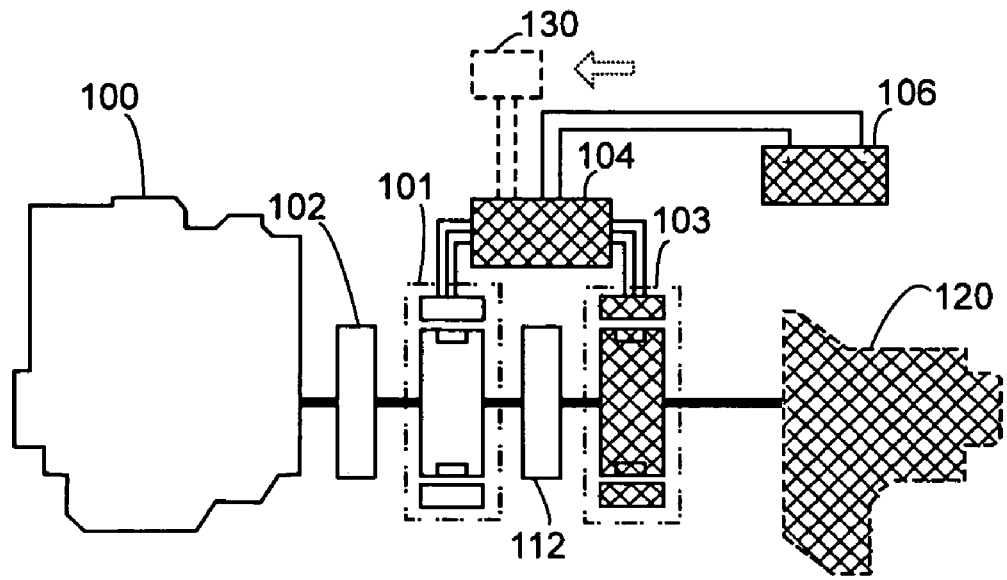
FIG. 43 is a schematic view showing that the preferred embodiment of the system illustrated in FIG. 30 operates on the power from the rechargeable device to drive the secondary dynamo-electric unit to further drive the load.

FIG. 43 shows that the preferred embodiment of the system illustrated in FIG. 30 operates on the power from the rechargeable device to drive the secondary dynamo-electric unit to further drive the load. FIG. 43 shows system function 13 provided by the preferred embodiment illustrated in FIG. 30, wherein, the power form the rechargeable device drives the secondary dynamo-electric unit to function as a motor for driving the load.

Figure 44:
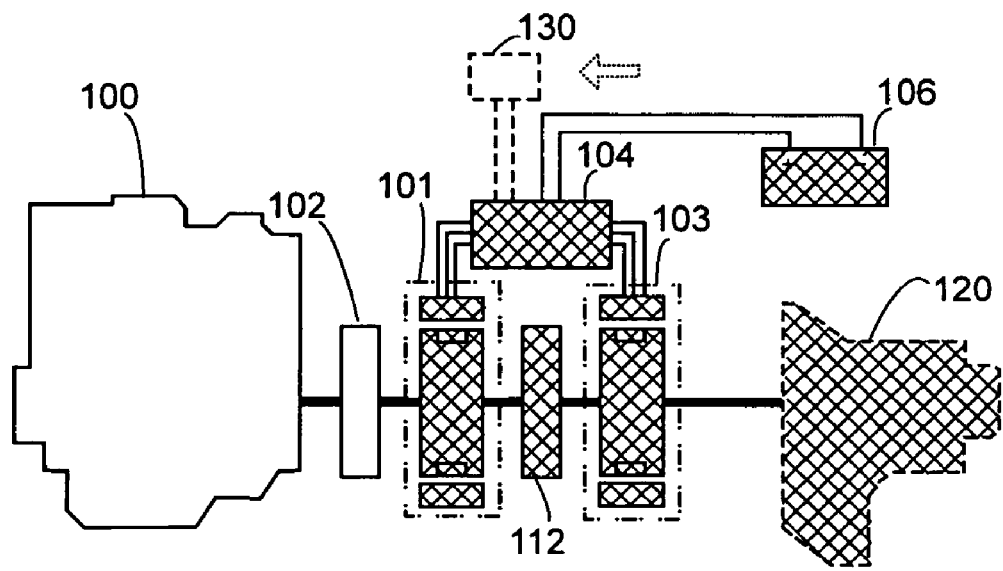
FIG. 44 is a schematic view showing that the preferred embodiment of the system illustrated in FIG. 30 operates on the power from the rechargeable device to drive both of the primary and the secondary dynamo-electric units to further drive the load.

FIG. 44 shows that the preferred embodiment of the system illustrated in FIG. 30 operates on the power from the rechargeable device to drive both of the primary and the secondary dynamo-electric units to further drive the load. FIG. 44 shows system function 14 provided by the preferred embodiment illustrated in FIG. 30, wherein, the power form the rechargeable device drives both of the primary and the secondary dynamo-electric units to function as a motor for driving the load.

Figure 45:
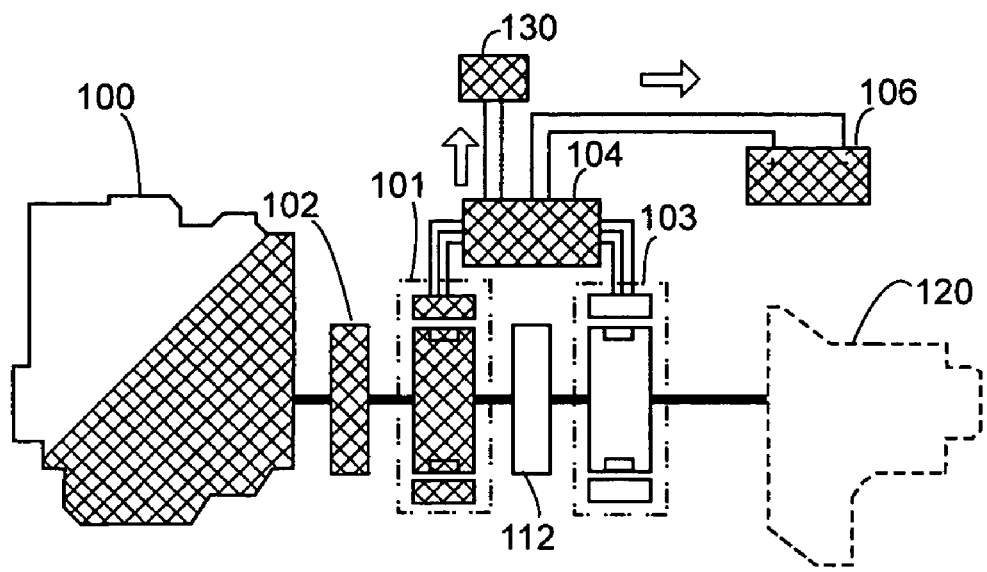
FIG. 45 is a schematic view showing that the preferred embodiment of the system illustrated in FIG. 30 has the engine to run at constant speed for driving the primary dynamo-electric unit to function as a generator to charge the rechargeable device or to supply power to another load.

FIG. 45 shows that the preferred embodiment of the system illustrated in FIG. 30 has the engine to run at constant speed for driving the primary dynamo-electric unit to function as a generator to charge the rechargeable device or to supply power to another load. FIG. 45 shows system function 15 provided by the preferred embodiment illustrated in FIG. 30, wherein, the engine runs at a constant speed to drive the primary dynamo-electric unit to function as a generator to charge the rechargeable device or to supply power to another load.

Figure 46:
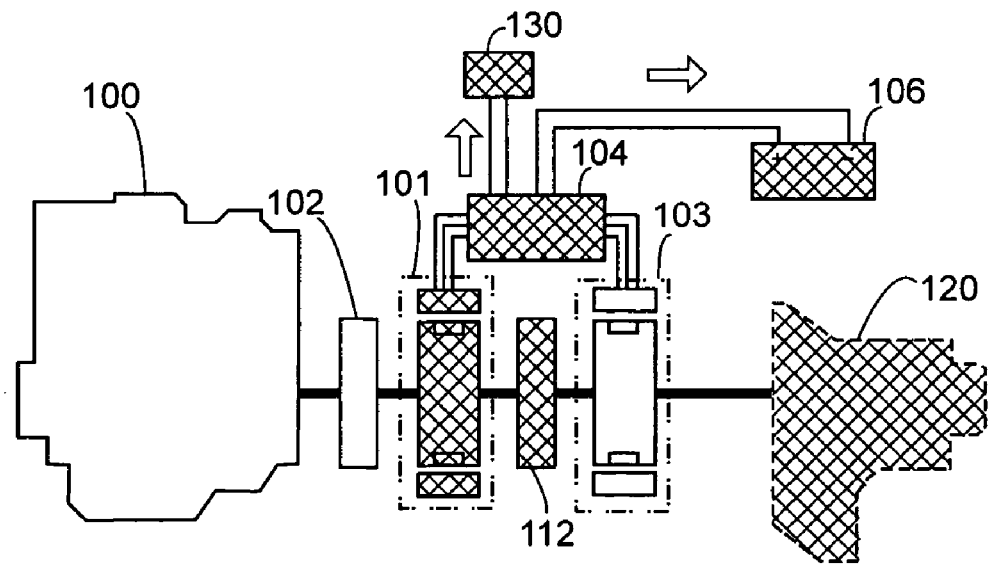
FIG. 46 is a schematic view showing that the preferred embodiment of the system illustrated in FIG. 30 has the load to drive the primary dynamo-electric unit to regenerate by reclaiming the kinetics so to charge the rechargeable device or to supply power to another load.

FIG. 46 shows that the preferred embodiment of the system illustrated in FIG. 30 has the load to drive the primary dynamo-electric unit to regenerate by reclaiming the kinetics r so to charge the rechargeable device or to supply power to another load. FIG. 46 shows system function 18 provided by the preferred embodiment illustrated in FIG. 30, wherein, the system has the load to exercise the operation of a brake thus to draw the primary dynamo-electric unit to function as a generator for charging the rechargeable device or supplying power to another load.

Figure 47:
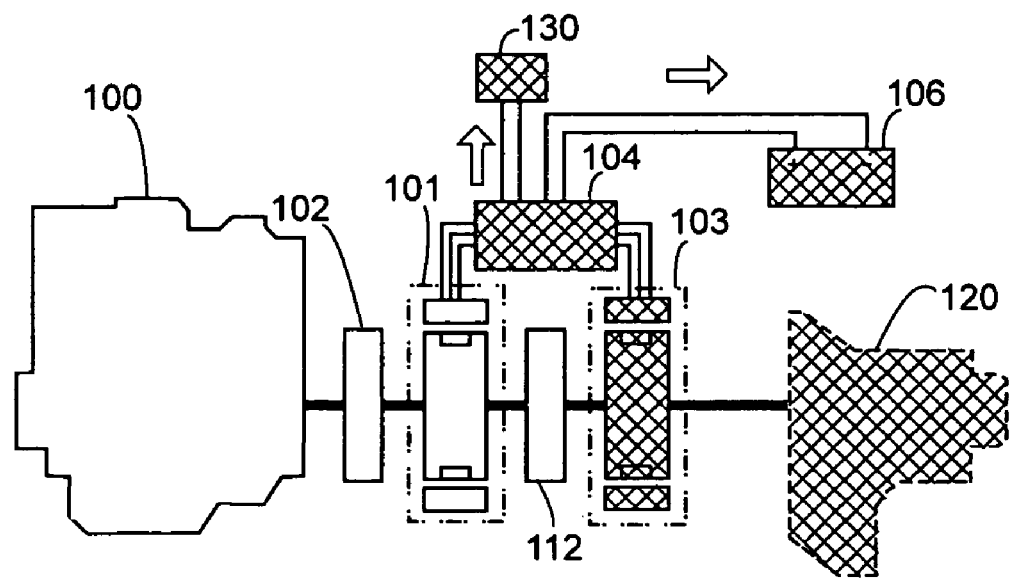
FIG. 47 is a schematic view showing that the preferred embodiment of the system illustrated in FIG. 30 has the load to drive the secondary dynamo-electric unit to regenerate by reclaiming the kinetics so to charge the rechargeable device or to supply power to another load.

FIG. 47 shows that the preferred embodiment of the system illustrated in FIG. 30 has the load to drive the secondary dynamo-electric unit to regenerate by reclaiming the kinetics so to charge the rechargeable device or to supply power to another load. FIG. 47 shows system function 19 provided by the preferred embodiment illustrated in FIG. 30, wherein, the system has the load to exercise the operation of a brake thus to draw the secondary dynamo-electric unit to function as a generator for charging the rechargeable device or supplying power to another load.

Figure 48:
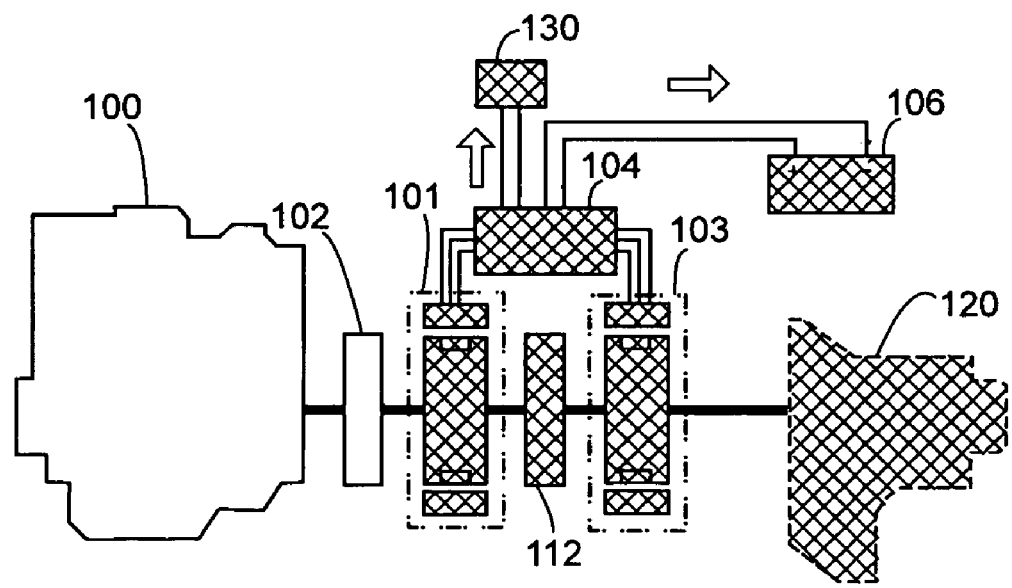
FIG. 48 is a schematic view showing that the preferred embodiment of the system illustrated in FIG. 30 has the load to drive both of the primary and the secondary dynamo-electric units to regenerate by reclaiming the kinetics so to charge the rechargeable device or to supply power to another load.

FIG. 48 shows that the preferred embodiment of the system illustrated in FIG. 30 has the load to drive both of the primary and the secondary dynamo-electric units to regenerate by reclaiming the kinetics so to charge the rechargeable device or to supply power to another load. FIG. 48 shows system function 20 provided by the preferred embodiment illustrated in FIG. 30, wherein, the system has the load to exercise the operation of a brake thus to draw both of the primary and the secondary dynamo-electric units to function as a generator for charging the rechargeable device or supplying power to another load.

Figure 49:
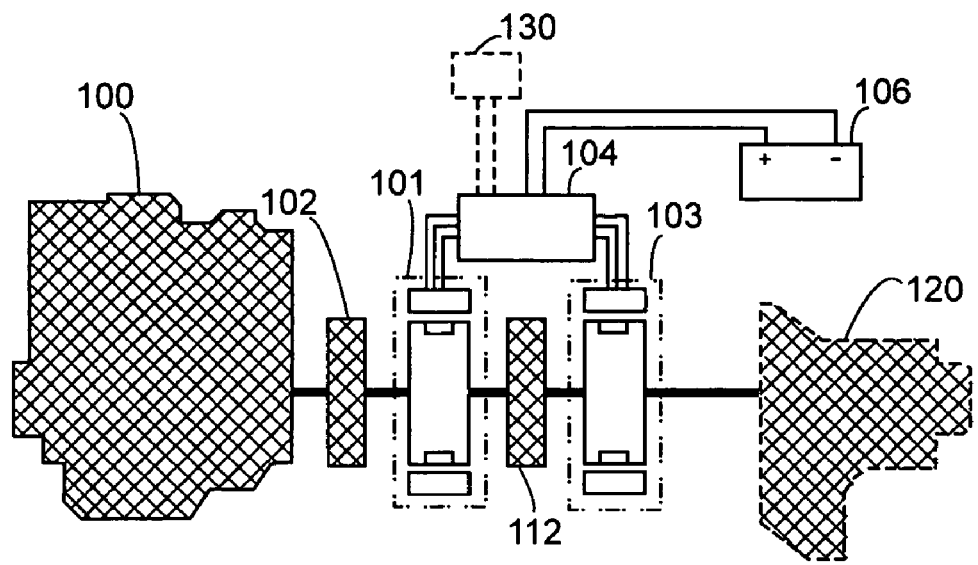
FIG. 49 is a schematic view showing that the preferred embodiment of the system illustrated in FIG. 30 has the mechanical damper from the engine to exercise a brake to the load.

FIG. 49 shows that the preferred embodiment of the system illustrated in FIG. 30 has the mechanical damper from the engine to exercise a brake to the load. FIG. 49 shows system function 21 provided by the preferred embodiment illustrated in FIG. 30, wherein, the mechanical damper from the engine exercises the braking operation on the load.

Figure 50:
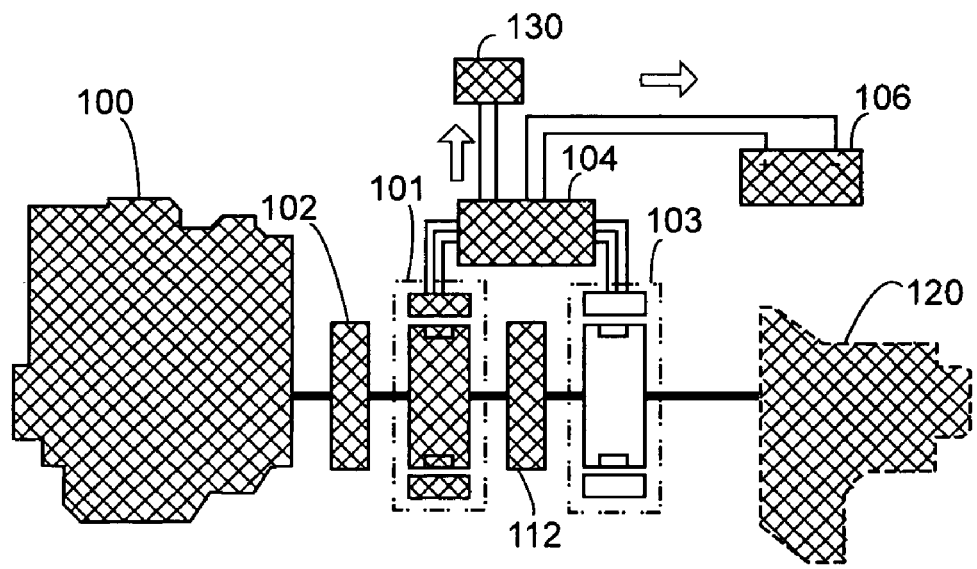
FIG. 50 is a schematic view showing that the preferred embodiment of the system illustrated in FIG. 30 has the mechanical damper from the engine to exercise a brake on the load and to drive the primary dynamo-electric unit to regenerate for charging the rechargeable device or supplying power to another load.

FIG. 50 shows that the preferred embodiment of the system illustrated in FIG. 30 has the mechanical damper from the engine to exercise a brake on the load and to drive the primary dynamo-electric unit to regenerate for charging the rechargeable device or supplying power to another load. FIG. 50 shows system function 22 provided by the preferred embodiment illustrated in FIG. 30, wherein, the mechanical damper from the engine exercises the braking operation on the load while the primary dynamo-electric unit operates as a motor to regenerate by reclaiming the kinetics to charge the rechargeable device or to supply power to another load.

Figure 51:
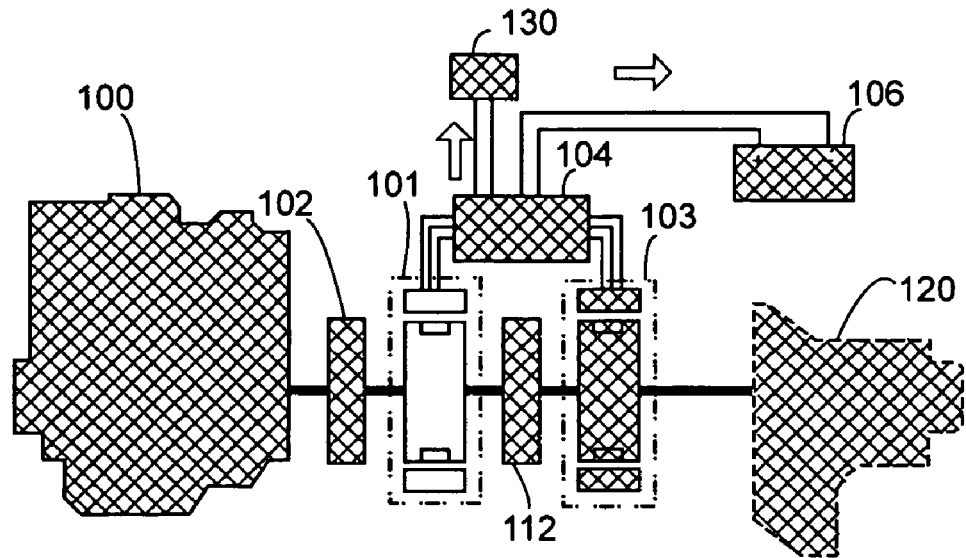
FIG. 51 is a schematic view showing that the preferred embodiment of the system illustrated in FIG. 30 has the mechanical damper from the engine to exercise a brake on the load and to drive the secondary dynamo-electric unit to regenerate for charging the rechargeable device or supplying power to another load.

FIG. 51 shows that the preferred embodiment of the system illustrated in FIG. 30 has the mechanical damper from the engine to exercise a brake on the load and to drive the secondary dynamo-electric unit to regenerate for charging the rechargeable device or supplying power to another load. FIG. 51 shows system function 23 provided by the preferred embodiment illustrated in FIG. 30, wherein, the mechanical damper from the engine exercises the braking operation on the load while the secondary dynamo-electric unit operates as a motor to regenerate by reclaiming the kinetics to charge the rechargeable device or to supply power to another load.

Figure 52:
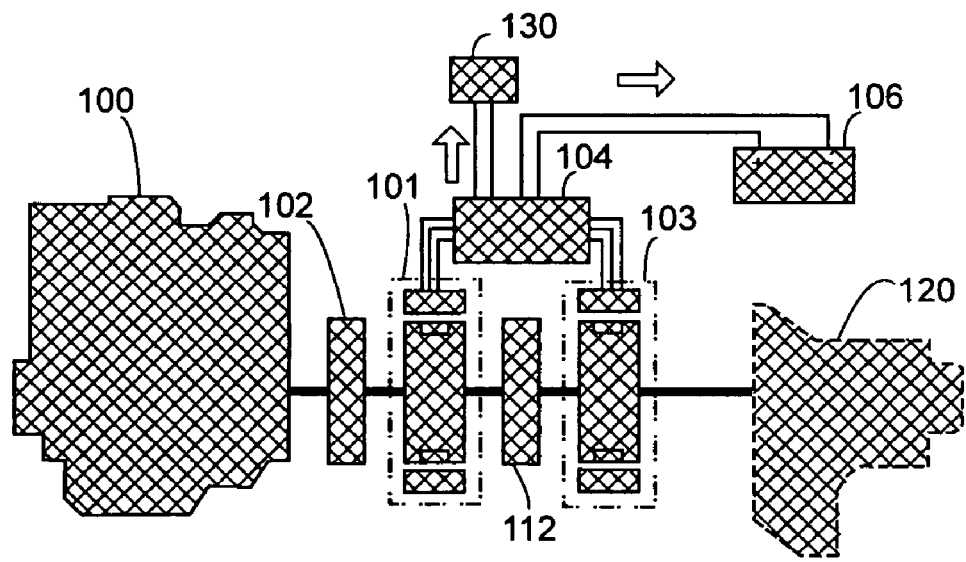
FIG. 52 is a schematic view showing that the preferred embodiment of the system illustrated in FIG. 30 has the mechanical damper from the engine to exercise a brake on the load and to drive both of the primary and the secondary dynamo-electric units to regenerate for charging the rechargeable device or supplying power to another load.

FIG. 52 shows that the preferred embodiment of the system illustrated in FIG. 30 has the mechanical damper from the engine to exercise a brake on the load and to drive both of the primary and the secondary dynamo-electric units to regenerate for charging the rechargeable device or supplying power to another load. FIG. 52 shows system function 24 provided by the preferred embodiment illustrated in FIG. 30, wherein, the mechanical damper from the engine exercises the braking operation on the load while both of the primary and the secondary dynamo-electric units function as a motor to regenerate by reclaiming the kinetics to charge the rechargeable device or to supply power to another load.

Figure 53:
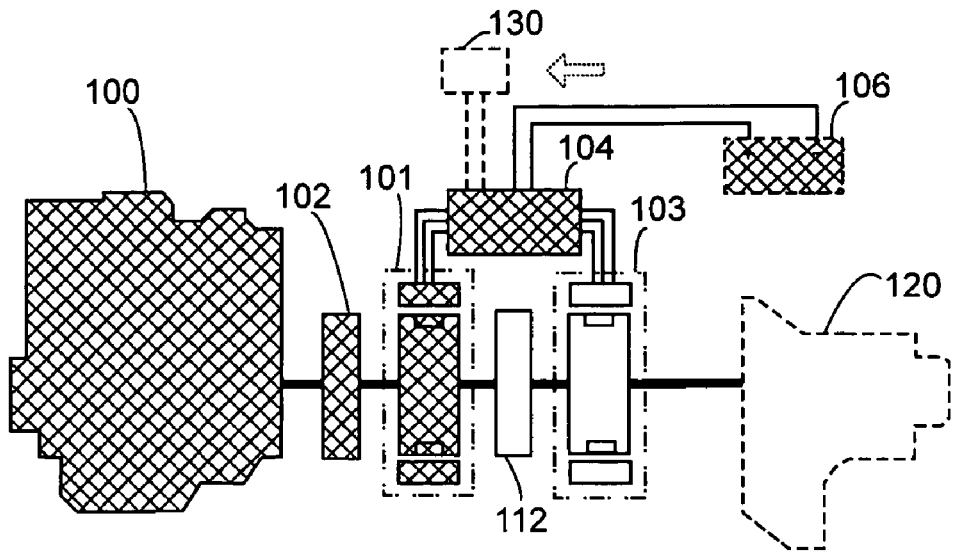
FIG. 53 is a schematic view showing that the preferred embodiment of the system illustrated in FIG. 30 operates on the power from the rechargeable device to drive the primary dynamo-electric unit to start the engine.

FIG. 53 shows that the preferred embodiment of the system illustrated in FIG. 30 operates on the power from the rechargeable device to drive the primary dynamo-electric unit to start the engine. FIG. 53 shows system function 25 provided by the preferred embodiment illustrated in FIG. 30, wherein, the power from the rechargeable device drives the primary dynamo-electric unit to function as a motor to start the engine.

Figure 54:
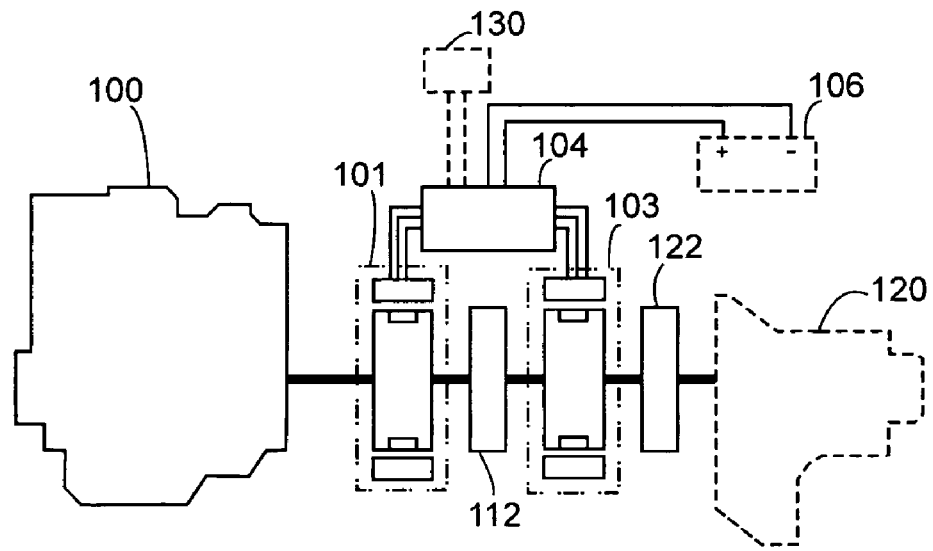
FIG. 54 is a schematic view showing that no clutch is provided between an active rotation power source and the primary dynamo-electric unit of the preferred embodiment of the system illustrated in FIG. 2

FIG. 54 shows that no clutch is provided between an active rotation power source and the primary dynamo-electric unit of the preferred embodiment of the system illustrated in FIG. 2. Wherein, no optional clutch 102 is provided at where between the engine serving as the active rotation power source 100 and the primary dynamo-electric unit 101; therefore, the primary dynamo-electric unit 101 does not function as a motor to drive the load as illustrated in FIG. 2, nor regenerates by reclaiming the kinetics to exercise the brake; instead, the system as selected provides all or any part of those system functions 1~11, 13, 15~17, 19, 21~27 as listed in Table C as illustrated in FIGS. 55~77.

Figure 55:
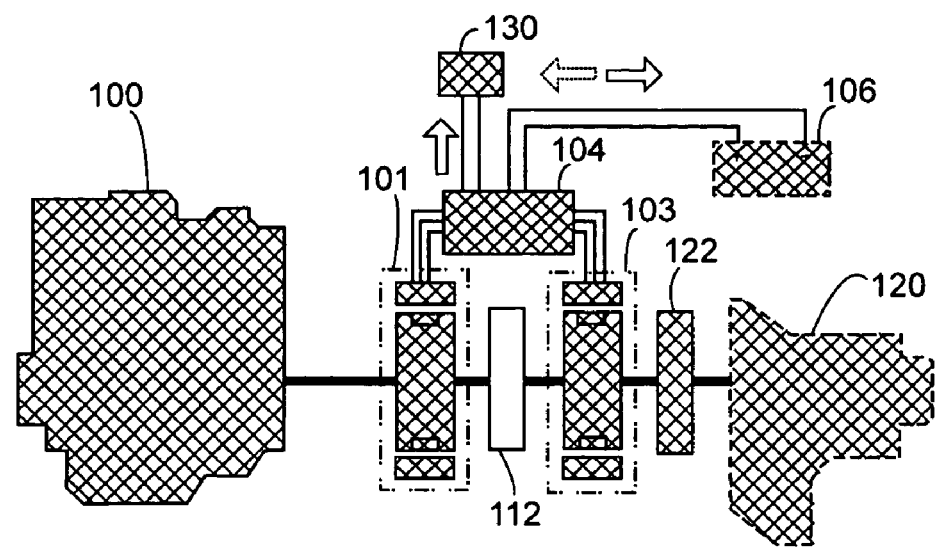
FIG. 55 is a schematic view showing that the preferred embodiment of the system illustrated in FIG. 54 is adapted with the rechargeable unit to operate as the series combined power system with controllable engine running speed.

FIG. 55 shows that the preferred embodiment of the system illustrated in FIG. 54 is adapted with the rechargeable unit to operate as the series combined power system with controllable engine running speed. FIG. 55 shows system function 1 provided by the preferred embodiment illustrated in FIG. 54, wherein, the rechargeable device is adapted to the system to engage in the series combined power operation to drive the load.

Figure 56:
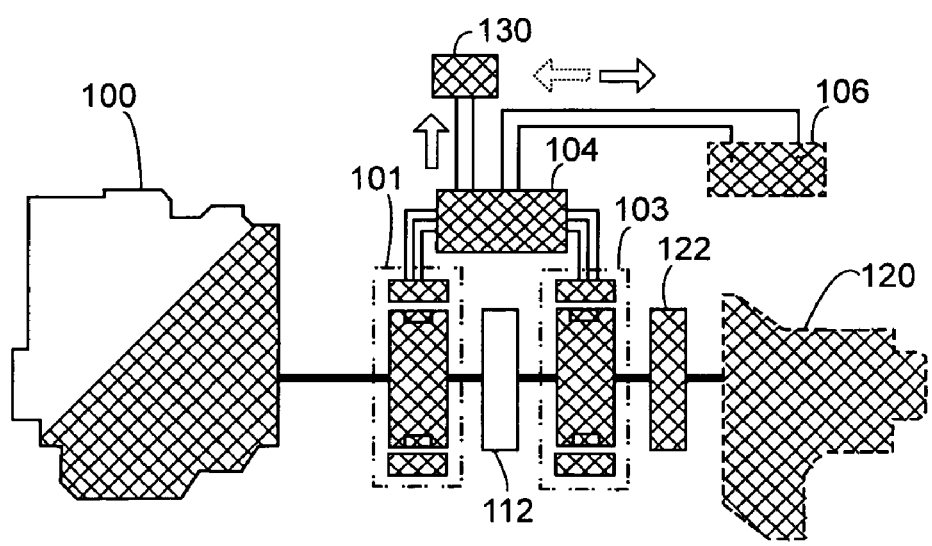
FIG. 56 is a schematic view showing that the preferred embodiment of the system illustrated in FIG. 54 is adapted with the rechargeable unit to operate as the series combined power system with the engine running at constant speed.

FIG. 56 shows that the preferred embodiment of the system illustrated in FIG. 54 is adapted with the rechargeable unit to operate as the series combined power system with the engine running at constant speed. FIG. 56 shows system function 2 provided by the preferred embodiment illustrated in FIG. 54, wherein, the rechargeable device is adapted to the system and the engine runs at a constant speed to drive the system to engage in the series combined power operation for driving the load.

Figure 57:
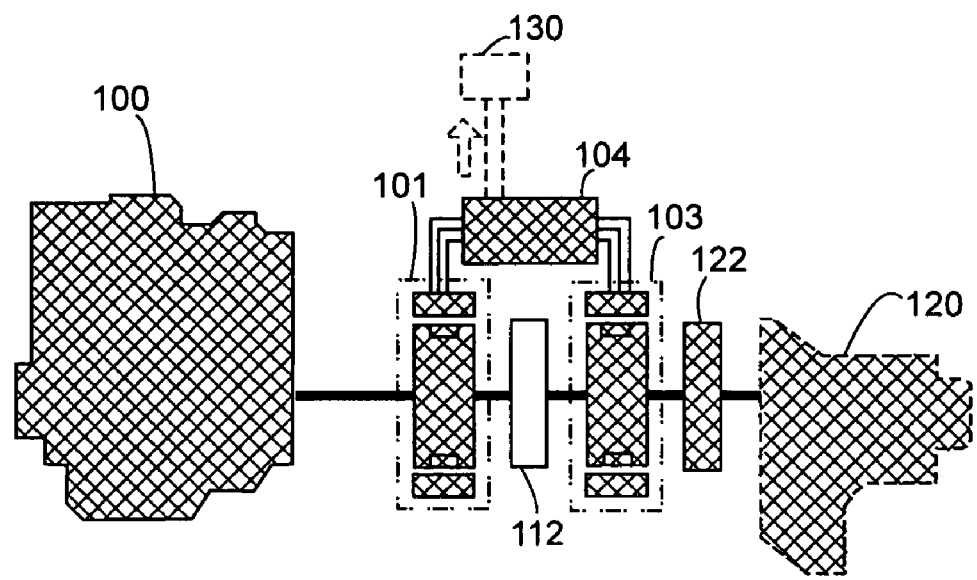
FIG. 57 is a schematic view showing that the preferred embodiment of the system illustrated in FIG. 54 operates as the series combined power system with controllable engine running speed without the adaptation of the rechargeable device.

FIG. 57 shows that the preferred embodiment of the system illustrated in FIG. 54 operates as the series combined power system with controllable engine running speed without the adaptation of the rechargeable device. FIG. 57 shows system function 3 provided by the preferred embodiment illustrated in FIG. 54, wherein, the system is not adapted with the rechargeable device and is engaging in the series combined power operation to drive the load.

Figure 58:
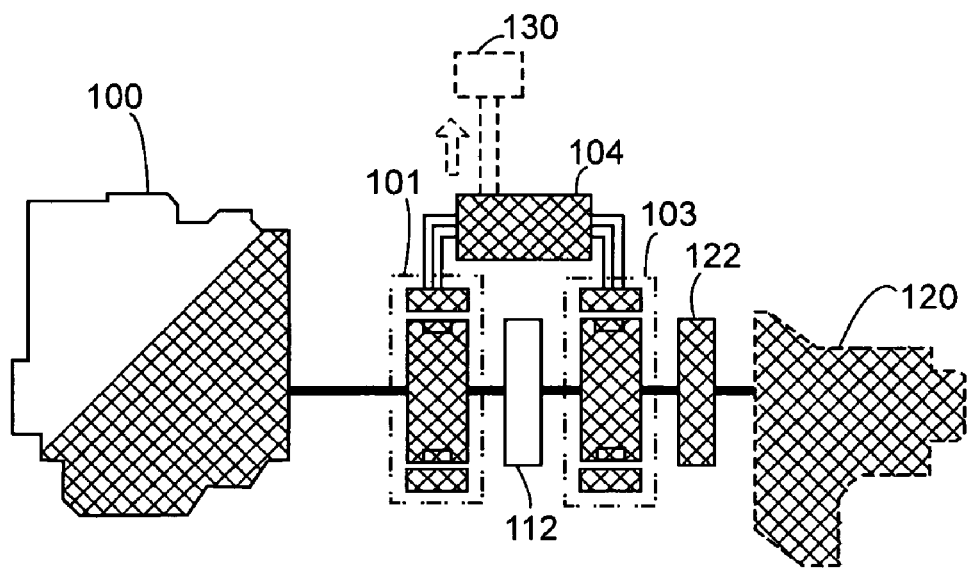
FIG. 58 is a schematic view showing that the preferred embodiment of the system illustrated in FIG. 54 operates as the series combined power system with the engine running at constant speed.

FIG. 58 shows that the preferred embodiment of the system illustrated in FIG. 54 operates as the series combined power system with the engine running at constant speed. FIG. 58 shows system function 4 provided by the preferred embodiment illustrated in FIG. 54, wherein, the system is not adapted with the rechargeable device and the engine runs at a constant speed to drive the system to engage in the series combined power operation for driving the load.

Figure 59:
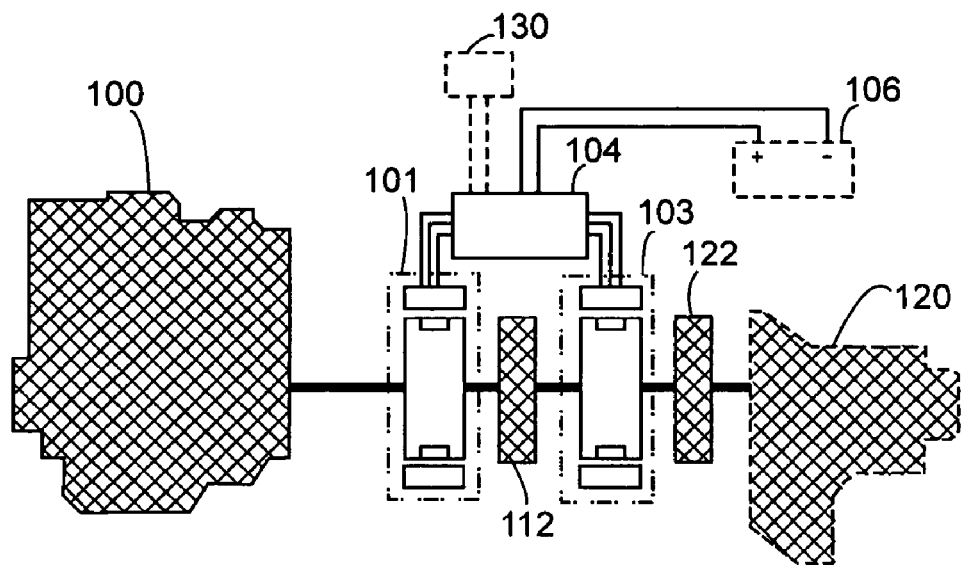
FIG. 59 is a schematic view showing that the preferred embodiment of the system illustrated in FIG. 54 operated on the power form the engine to drive the load.

FIG. 59 shows that the preferred embodiment of the system illustrated in FIG. 54 operated on the power form the engine to drive the load. FIG. 59 shows system function 5 provided by the preferred embodiment illustrated in FIG. 54, wherein, the system has the power from the engine to drive the load.

Figure 60:
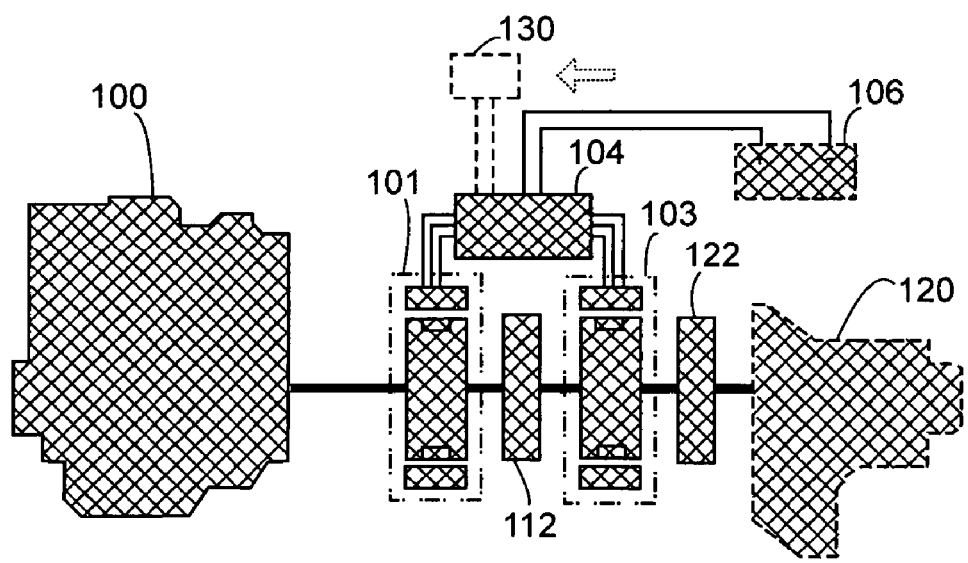
FIG. 60 is a schematic view showing that the preferred embodiment of the system illustrated in FIG. 54 operates on the power from the engine to jointly drive the load with both of the primary and the secondary dynamo-electric units driven by the rechargeable device.
Figure 61:
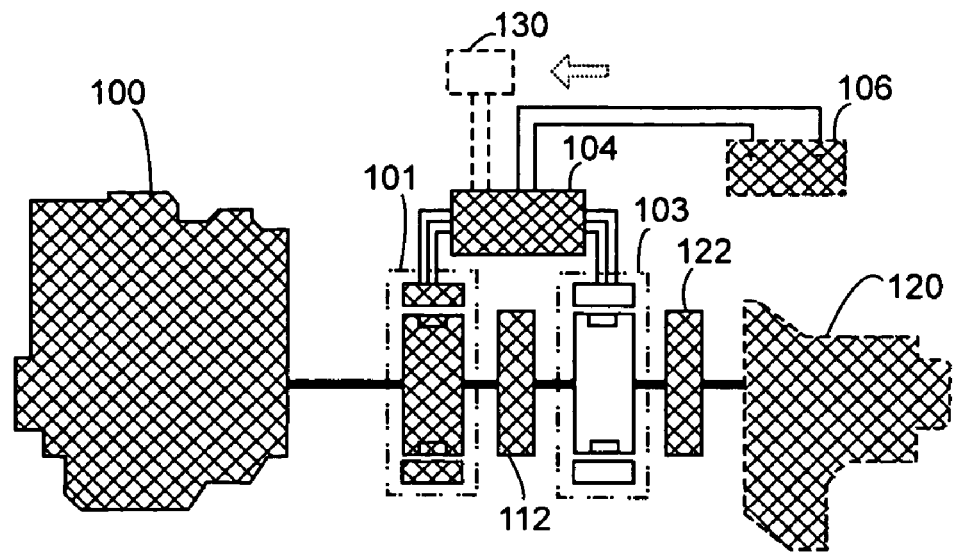
FIG. 61 is a schematic view showing that the preferred embodiment of the system illustrated in FIG. 54 operates on the power from the engine to jointly drive the load with both of the primary dynamo-electric unit driven by the rechargeable device.

FIG. 60 shows that the preferred embodiment of the system illustrated in FIG. 54 operates on the power from the engine to jointly drive the load with both of the primary and the secondary dynamo-electric units driven by the rechargeable device. FIG. 60 shows system function 6 provided by the preferred embodiment illustrated in FIG. 54, wherein, the power from the engine, and in case of a heavy load, both of the primary and the secondary dynamo-electric units driven by the rechargeable device functioning as a motor jointly drive the load FIG. 61 shows that the preferred embodiment of the system illustrated in FIG. 54 operates on the power from the engine to jointly drive the load with both of the primary dynamo-electric unit driven by the rechargeable device. FIG. 61 shows system function 7 provided by the preferred embodiment illustrated in FIG. 54, wherein, the system in case of a heavy load has the power from the engine and the primary dynamo-electric unit driven by the rechargeable device to function as a motor jointly drive the load.

Figure 62:
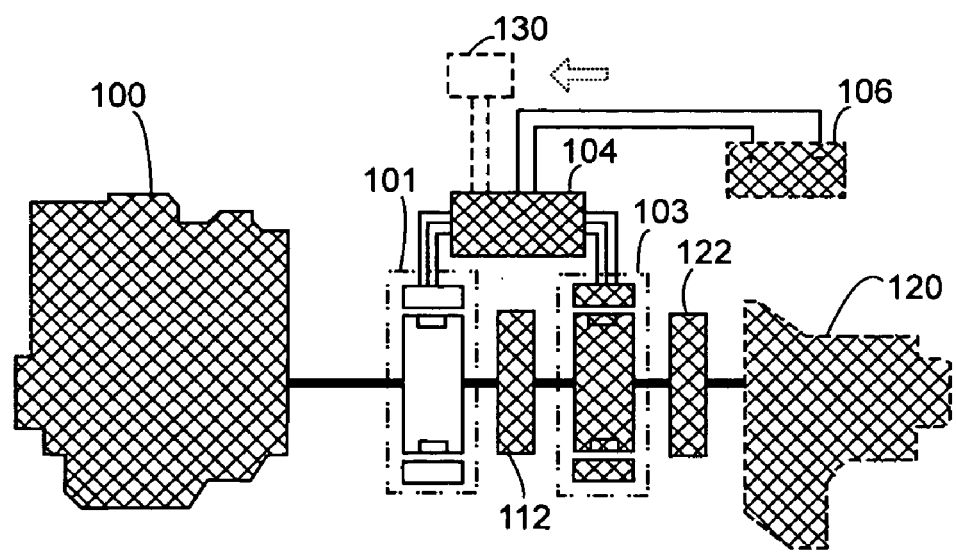
FIG. 62 is a schematic view showing that the preferred embodiment of the system illustrated in FIG. 54 operates on the power from the engine to jointly drive the load with both of the secondary dynamo-electric unit driven by the rechargeable device.

FIG. 62 shows that the preferred embodiment of the system illustrated in FIG. 54 operates on the power from the engine to jointly drive the load with both of the secondary dynamo-electric unit driven by the rechargeable device. FIG. 62 shows system function 8 provided by the preferred embodiment illustrated in FIG. 54, wherein, the system in case of a heavy load has the power from the engine and the secondary dynamo-electric unit driven by the rechargeable device to function as a motor jointly drive the load.

Figure 63:
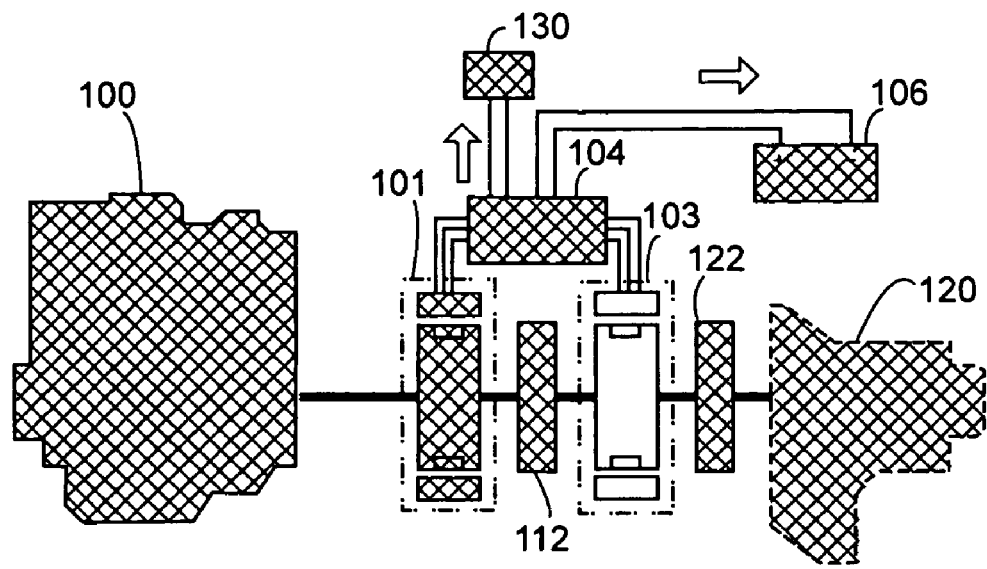
FIG. 63 is a schematic view showing that the preferred embodiment of the system illustrated in FIG. 54 operates on the power from the engine to drive the load and to drive the primary dynamo-electric unit to function as a generator for charging the rechargeable device or supplying power to another load.

FIG. 63 shows that the preferred embodiment of the system illustrated in FIG. 54 operates on the power from the engine to drive the load and to drive the primary dynamo-electric unit to function as a generator for charging the rechargeable device or supplying power to another load. FIG. 63 shows system function 9 provided by the preferred embodiment illustrated in FIG. 54, wherein, the power from the engine drives the load and the primary dynamo-electric unit to function as a generator for charging the rechargeable device or supplying power to another load.

Figure 64:
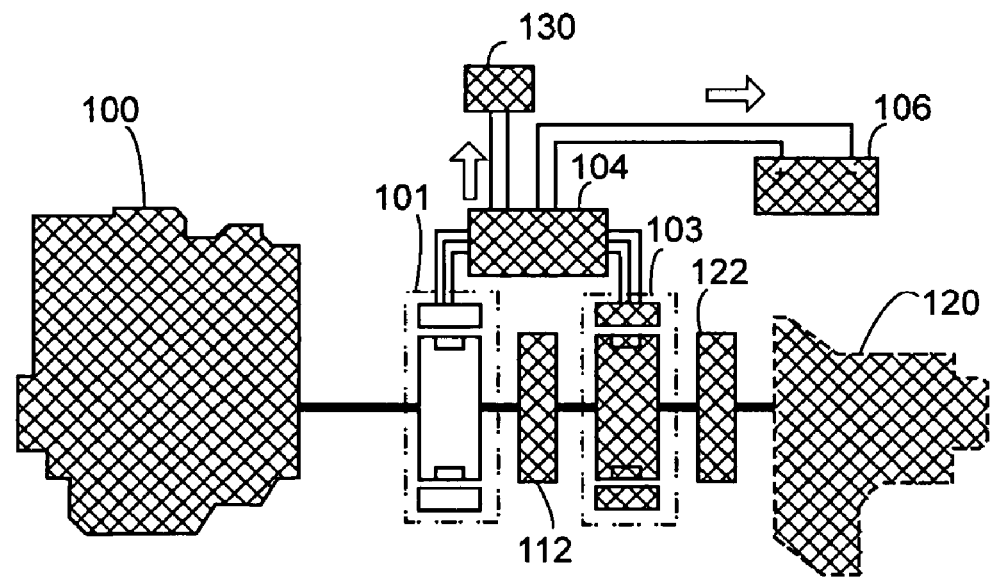
FIG. 64 is a schematic view showing that the preferred embodiment of the system illustrated in FIG. 54 operates on the power from the engine to drive the load and to drive the secondary dynamo-electric unit to function as a generator for charging the rechargeable device or supplying power to another load.

FIG. 64 shows that the preferred embodiment of the system illustrated in FIG. 54 operates on the power from the engine to drive the load and to drive the secondary dynamo-electric unit to function as a generator for charging the rechargeable device or supplying power to another load. FIG. 64 shows system function 10 provided by the preferred embodiment illustrated in FIG. 54, wherein, the power from the engine drives the load and the secondary dynamo-electric unit to function as a generator for charging the rechargeable device or supplying power to another load.

Figure 65:
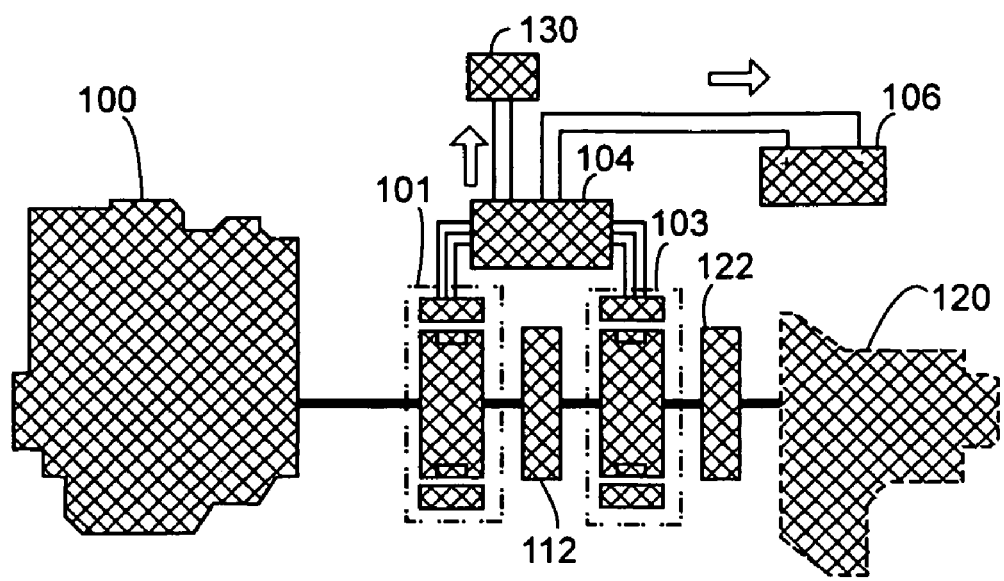
FIG. 65 is a schematic view showing that the preferred embodiment of the system illustrated in FIG. 54 operates on the power from the engine to drive the load and to drive both of the primary and the secondary dynamo-electric units to function as a generator for charging the rechargeable device or supplying power to another load.

FIG. 65 shows that the preferred embodiment of the system illustrated in FIG. 54 operates on the power from the engine to drive the load and to drive both of the primary and the secondary dynamo-electric units to function as a generator for charging the rechargeable device or supplying power to another load. FIG. 65 shows system function 11 provided by the preferred embodiment illustrated in FIG. 54, wherein, the power from the engine drives the load and both of the primary and the secondary dynamo-electric units to function as a generator for charging the rechargeable device or supplying power to another load.

Figure 66:
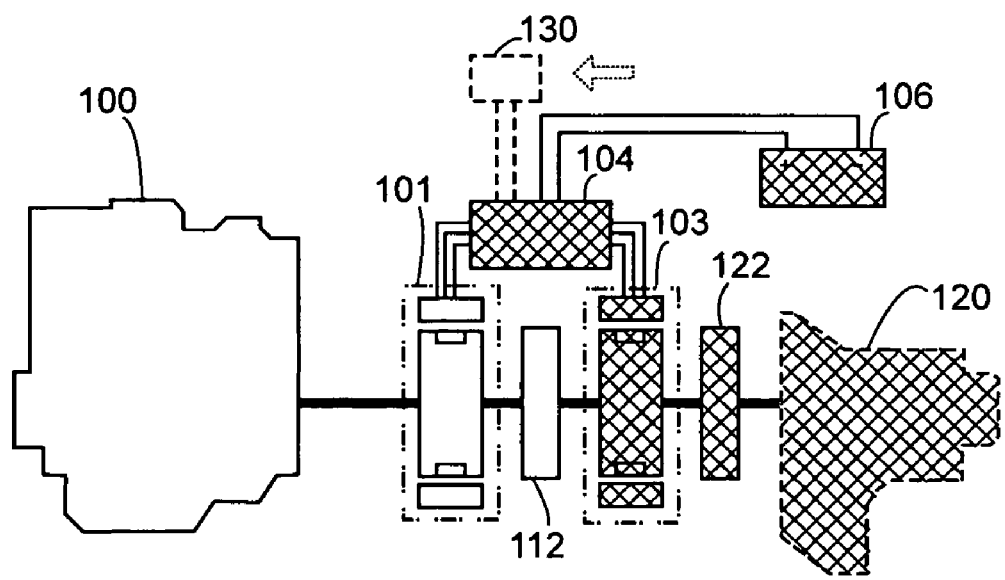
FIG. 66 is a schematic view showing that the preferred embodiment of the system illustrated in FIG. 54 has the power from the rechargeable device to drive the secondary dynamo-electric unit to further drive the load.

FIG. 66 shows that the preferred embodiment of the system illustrated in FIG. 54 has the power from the rechargeable device to drive the secondary dynamo-electric unit to further drive the load. FIG. 66 shows system function 13 provided by the preferred embodiment illustrated in FIG. 54, wherein, the power from the rechargeable device drives the secondary dynamo-electric unit to function as a motor to drive the load.

Figure 67:
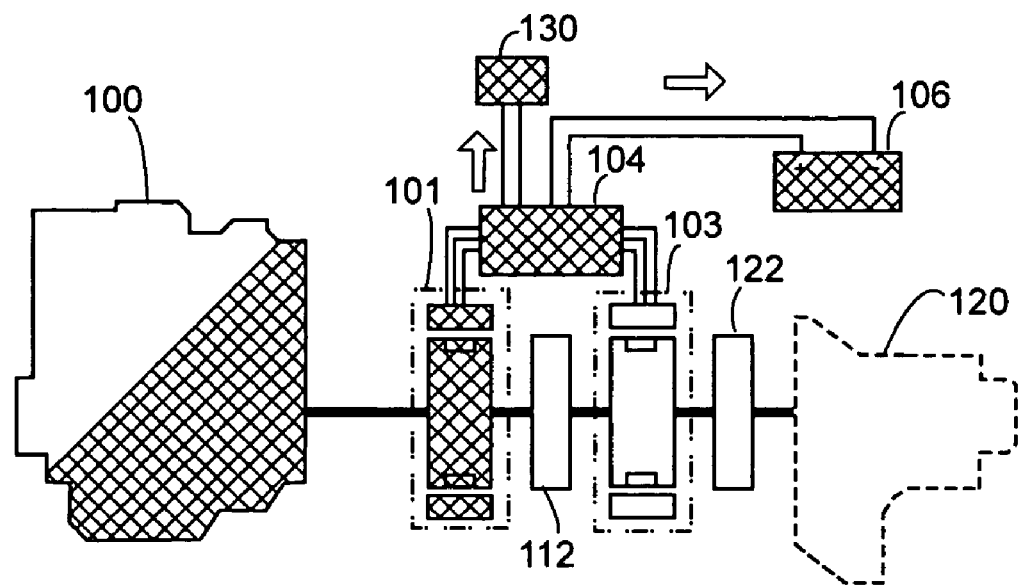
FIG. 67 is a schematic view showing that the preferred embodiment of the system illustrated in FIG. 54 has the engine running at constant speed to drive the primary dynamo-electric unit to function as a generator for charging the rechargeable device or supplying power to another load.

FIG. 67 shows that the preferred embodiment of the system illustrated in FIG. 54 has the engine running at constant speed to drive the primary dynamo-electric unit to function as a generator for charging the rechargeable device or supplying power to another load. FIG. 66 shows system function 15 provided by the preferred embodiment illustrated in FIG. 54, wherein, the power from the rechargeable device drives the primary dynamo-electric unit to function as a motor to drive the load.

Figure 68:
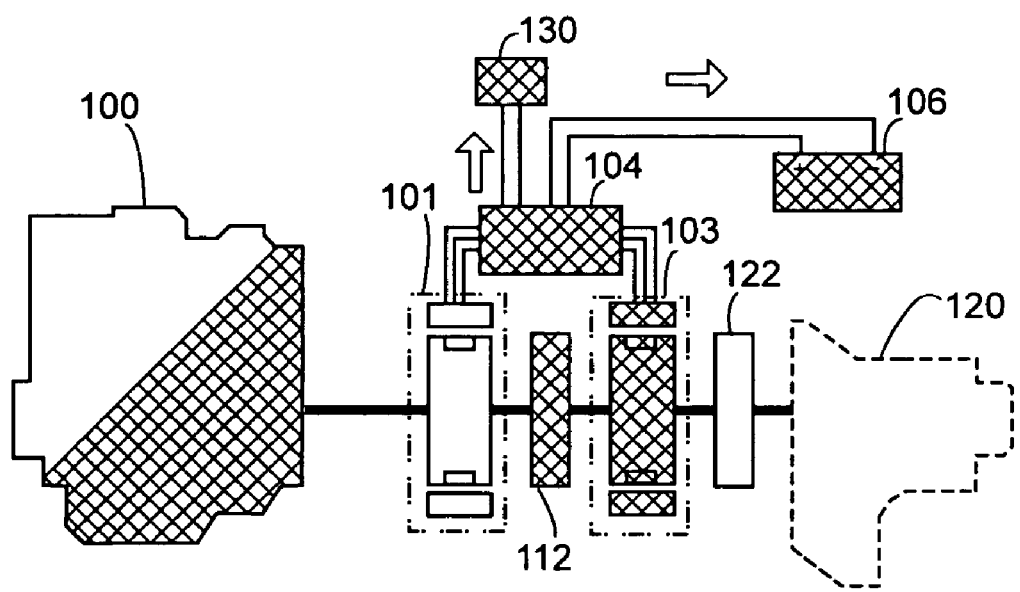
FIG. 68 is a schematic view showing that the preferred embodiment of the system illustrated in FIG. 54 has the engine running at constant speed to drive the secondary dynamo-electric unit to function as a generator for charging the rechargeable device or supplying power to another load.

FIG. 68 shows that the preferred embodiment of the system illustrated in FIG. 54 has the engine running at constant speed to drive the secondary dynamo-electric unit to function as a generator for charging the rechargeable device or supplying power to another load. FIG. 68 shows system function 16 provided by the preferred embodiment illustrated in FIG. 54, wherein, the engine runs at a constant speed to drive the secondary dynamo-electric unit to function as a generator for charging the rechargeable device or supplying power to another load.

Figure 69:
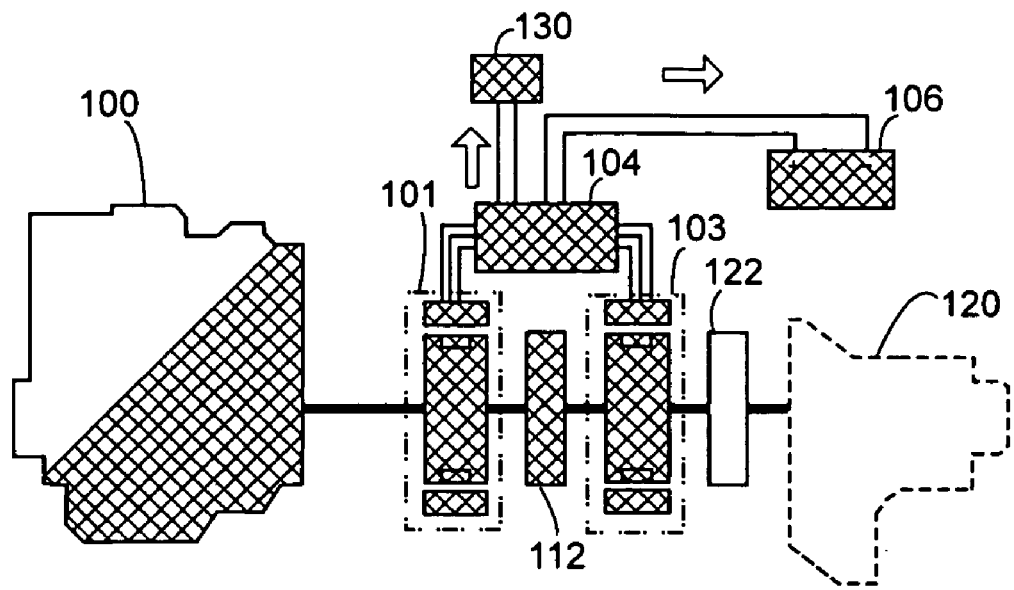
FIG. 69 is a schematic view showing that the preferred embodiment of the system illustrated in FIG. 54 has the engine running at constant speed to drive both of the primary and the secondary dynamo-electric units to function as a generator for charging the rechargeable device or supplying power to another load.

FIG. 69 shows that the preferred embodiment of the system illustrated in FIG. 54 has the engine running at constant speed to drive both of the primary and the secondary dynamo-electric units to function as a generator for charging the rechargeable device or supplying power to another load. FIG. 69 shows system function 17 provided by the preferred embodiment illustrated in FIG. 54, wherein, the engine runs at a constant speed to drive both of the primary and the secondary dynamo-electric units to function as a generator for charging the rechargeable device or supplying power to another load.

Figure 70:
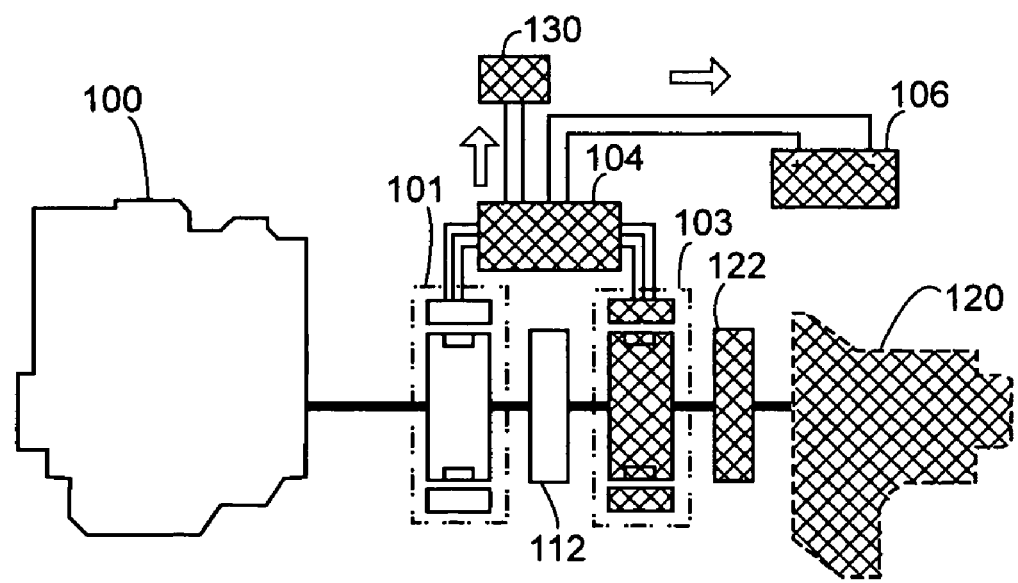
FIG. 70 is a schematic view showing that the preferred embodiment of the system illustrated in FIG. 54 has the load to draw the secondary dynamo-electric unit to regenerate by reclaiming the kinetics so to chare the rechargeable device or to supply power to another load.

FIG. 70 shows that the preferred embodiment of the system illustrated in FIG. 54 has the load to draw the secondary dynamo-electric unit to regenerate by reclaiming the kinetics so to chare the rechargeable device or to supply power to another load. FIG. 70 shows system function 19 provided by the preferred embodiment illustrated in FIG. 54, wherein, the system has the load to exercise the braking operation to draw the secondary dynamo-electric unit to function as a generator for charging the rechargeable device or supplying power to another load.

Figure 71:
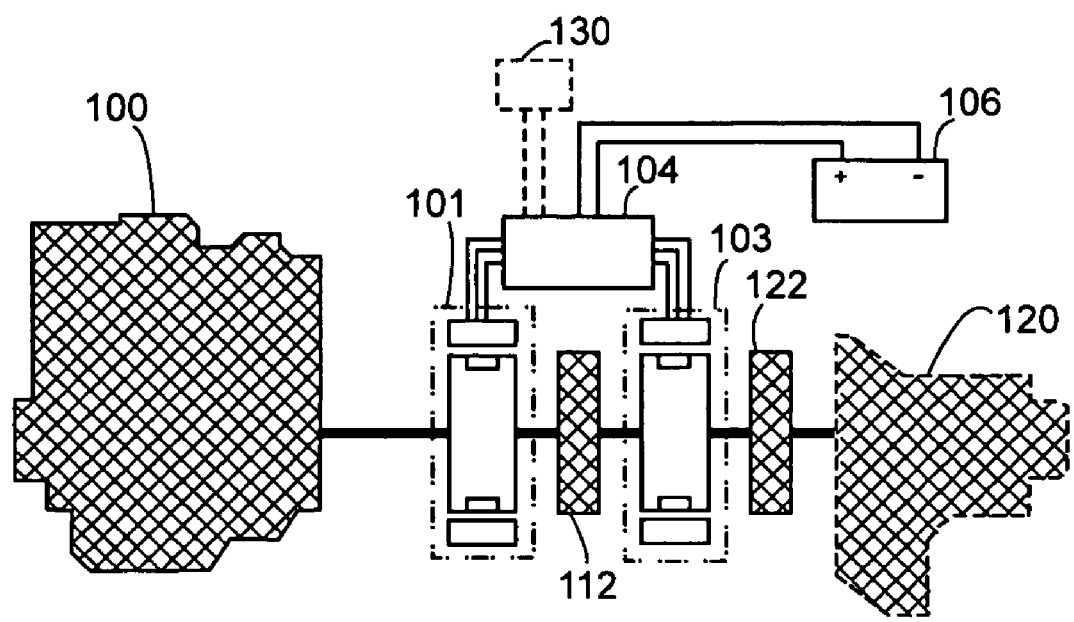
FIG. 71 is a schematic view showing that the preferred embodiment of the system illustrated in FIG. 54 has the mechanical damper of the engine to exercise a brake on the load.

FIG. 71 shows that the preferred embodiment of the system illustrated in FIG. 54 has the mechanical damper of the engine to exercise a brake on the load. FIG. 71 show system function 21 provided by the preferred embodiment illustrated in FIG. 54, wherein, the mechanical damper from the engine exercises the braking operation on the load.

Figure 72:
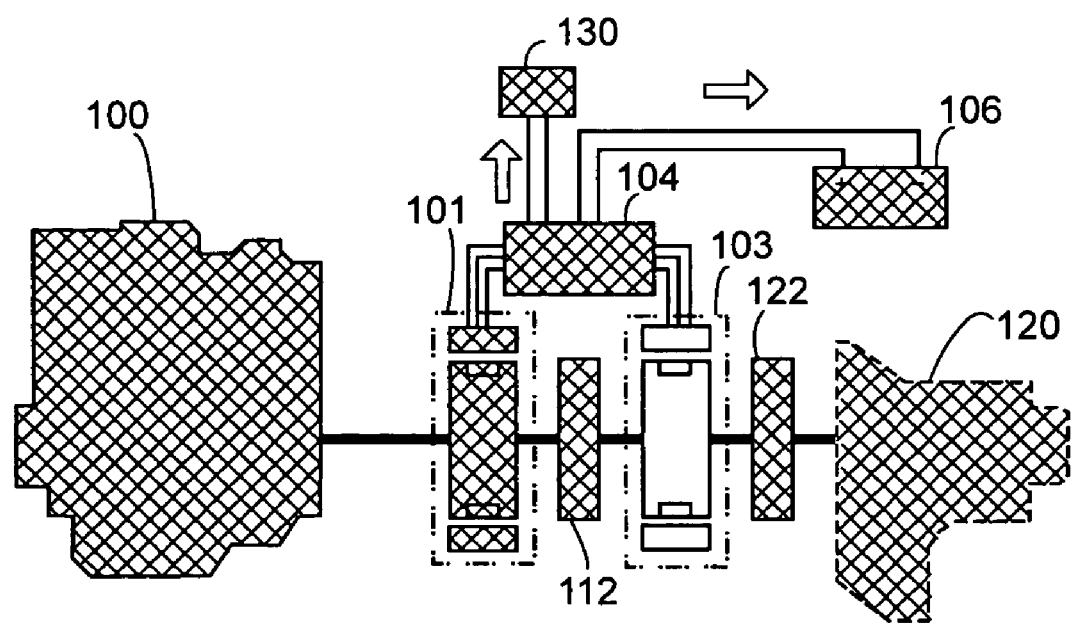
FIG. 72 is a schematic view showing that the preferred embodiment of the system illustrated in FIG. 54 has the mechanical damper of the engine to exercise a brake on the load and to drive the primary dynamo-electric unit to regenerate for charging the rechargeable device or supplying power to another load.

FIG. 72 shows that the preferred embodiment of the system illustrated in FIG. 54 has the mechanical damper of the engine to exercise a brake on the load and to drive the primary dynamo-electric unit to regenerate for charging the rechargeable device or supplying power to another load. FIG. 72 shows system function 22 provided by the preferred embodiment illustrated in FIG. 54, wherein, mechanical damper of the engine exercises the braking operation on the load while the primary dynamo-electric unit functions as a generator to regenerate by reclaiming the kinetics so to charge the rechargeable device or to supply power to another load.

Figure 73:
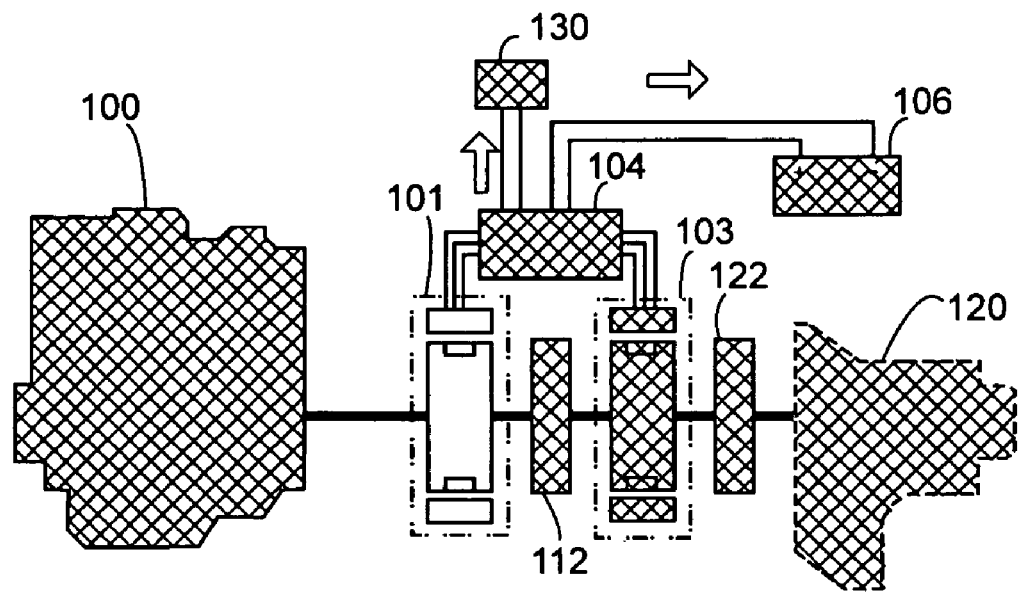
FIG. 73 is a schematic view showing that the preferred embodiment of the system illustrated in FIG. 54 has the mechanical damper of the engine to exercise a brake on the load and to drive the secondary dynamo-electric unit to regenerate for charging the rechargeable device or supplying power to another load.

FIG. 73 shows that the preferred embodiment of the system illustrated in FIG. 54 has the mechanical damper of the engine to exercise a brake on the load and to drive the secondary dynamo-electric unit to regenerate for charging the rechargeable device or supplying power to another load. FIG. 73 shows system function 23 provided by the preferred embodiment illustrated in FIG. 54, wherein, mechanical damper of the engine exercises the braking operation on the load while the secondary dynamo-electric unit functions as a generator to regenerate by reclaiming the kinetics so to charge the rechargeable device or to supply power to another load.

Figure 74:
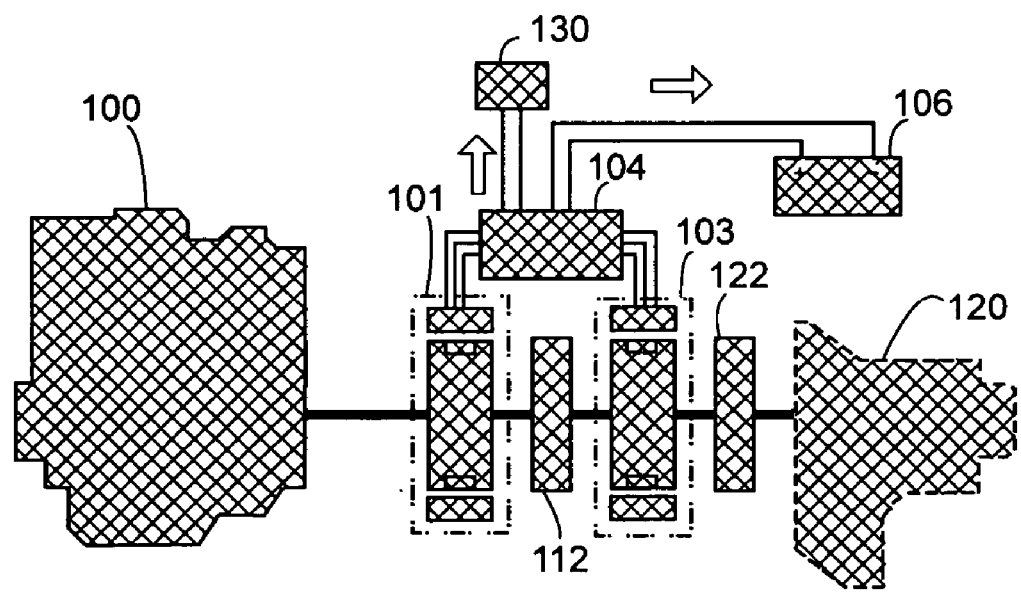
FIG. 74 is a schematic view showing that the preferred embodiment of the system illustrated in FIG. 54 has the mechanical damper of the engine to exercise a brake on the load and to drive both of the primary and the secondary dynamo-electric units to regenerate for charging the rechargeable device or supplying power to another load.

FIG. 74 shows that the preferred embodiment of the system illustrated in FIG. 54 has the mechanical damper of the engine to exercise a brake on the load and to drive both of the primary and the secondary dynamo-electric units to regenerate for charging the rechargeable device or supplying power to another load. FIG. 74 shows system function 24 provided by the preferred embodiment illustrated in FIG. 54, wherein, mechanical damper of the engine exercises the braking operation on the load while both of the primary and the secondary dynamo-electric units functions as a generator to regenerate by reclaiming the kinetics so to charge the rechargeable device or to supply power to another load.

Figure 75:
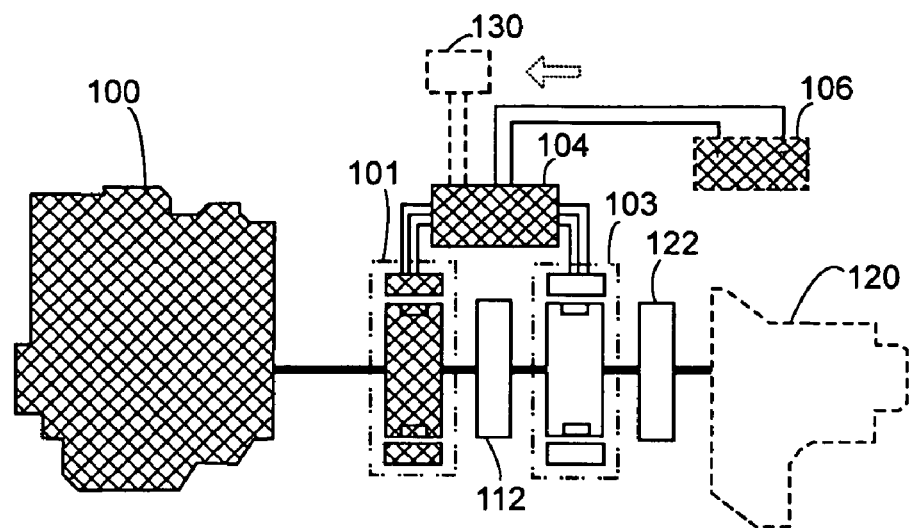
FIG. 75 is a schematic view showing that the preferred embodiment of the system illustrated in FIG. 54 operates on the power from the rechargeable device to drive the primary dynamo-electric unit to start the engine.

FIG. 75 shows that the preferred embodiment of the system illustrated in FIG. 54 operates on the power from the rechargeable device to drive the primary dynamo-electric unit to start the engine. FIG. 75 shows system function 25 provided by the preferred embodiment illustrated in FIG. 54, wherein, the power from the rechargeable device drives the primary dynamo-electric unit to function as a motor for starting the engine.

Figure 76:
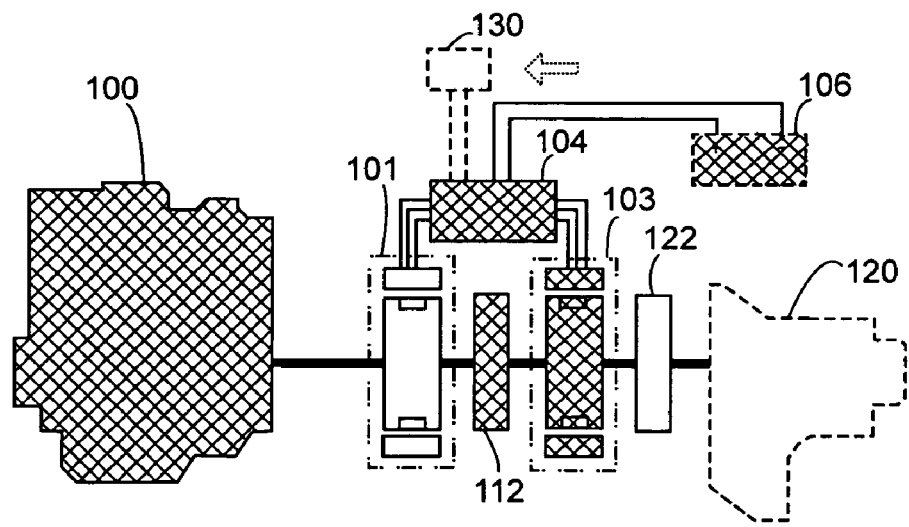
FIG. 76 is a schematic view showing that the preferred embodiment of the system illustrated in FIG. 54 operates on the power from the rechargeable device to drive the secondary dynamo-electric unit to start the engine.

FIG. 76 shows that the preferred embodiment of the system illustrated in FIG. 54 operates on the power from the rechargeable device to drive the secondary dynamo-electric unit to start the engine. FIG. 76 shows system function 26 provided by the preferred embodiment illustrated in FIG. 54, wherein, the power from the rechargeable device drives the secondary dynamo-electric unit to function as a motor for starting the engine.

Figure 77:
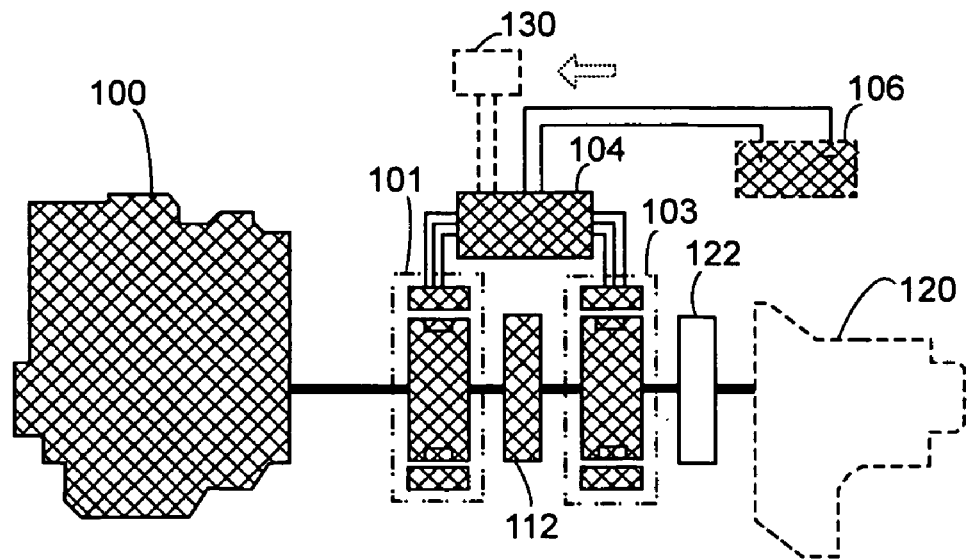
FIG. 77 is a schematic view showing that the preferred embodiment of the system illustrated in FIG. 54 operates on the power from the rechargeable device to drive both of the primary and the secondary dynamo-electric units to start the engine.

FIG. 77 shows that the preferred embodiment of the system illustrated in FIG. 54 operates on the power from the rechargeable device to drive both of the primary and the secondary dynamo-electric units to start the engine. FIG. 77 shows system function 27 provided by the preferred embodiment illustrated in FIG. 54, wherein the power from the rechargeable device drives both of the primary and the secondary dynamo-electric units to function as a motor for starting the engine.

Figure 78:
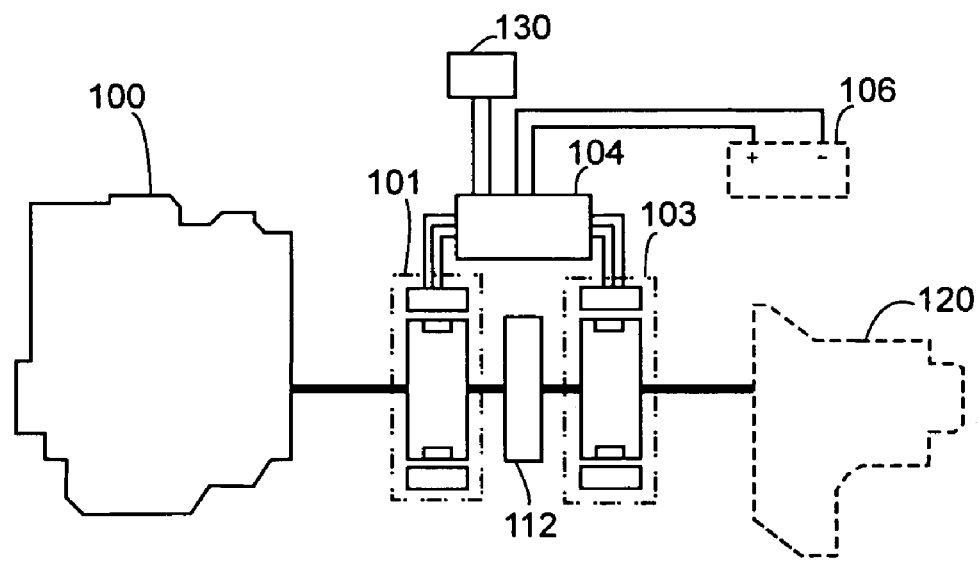
FIG. 78 is a schematic view showing that the preferred embodiment of the system illustrated in FIG. 2 is not adapted with a clutch either between the output end and the load side, or between the active rotation power source and the primary dynamo-electric unit.

FIG. 78 is a schematic view showing that the preferred embodiment of the system illustrated in FIG. 2 is not adapted with a clutch either between the output end and the load side, or between the active rotation power source and the primary dynamo-electric unit. Wherein, there is no clutch 102 provided between the engine serving as the active rotation power source 100 and the primary dynamo-electric unit 101; nor the clutch 122 provided between the output end and the load side of the system; if the input end of the load is not adapted with a clutch, the variable transmission device does not provide idling function, then the secondary dynamo-electric unit 103 fails to provide the function as a generator for the engine driven by the active power source 100 or as a start motor to start the engine among the system functions as illustrated in FIG. 2; nor the primary dynamo-electric unit 101 to function as a motor to drive the load or regenerate by reclaiming the kinetics for exercising the brake among those functions as illustrated in FIG. 2. The system may provide all or any part of system functions 1~11, 13, 15, 19, and 21~25 of those functions listed in Table D. FIGS. 79~99 show those system functions listed in Table D.

Figure 79:
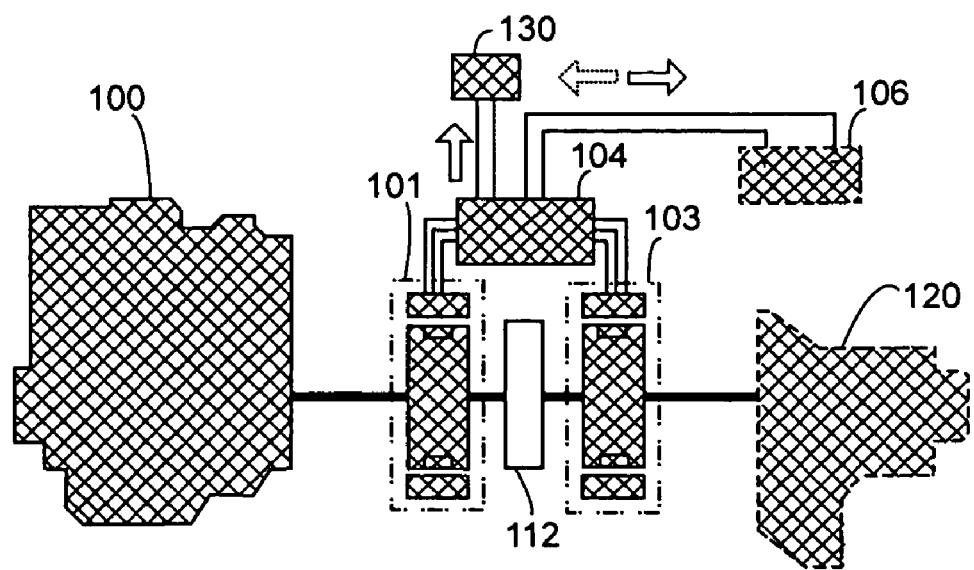
FIG. 79 is a schematic view showing that the preferred embodiment of the system illustrated in FIG. 78 adapted with the rechargeable device operates as the series combine power system with controllable engine speed.

FIG. 79 shows that the preferred embodiment of the system illustrated in FIG. 78 adapted with the rechargeable device operates as the series combine power system with controllable engine speed. FIG. 79 shows system function 1 provided by the preferred embodiment illustrated in FIG. 78, wherein, the rechargeable device is adapted to the system for the system to engage in the series combined power operation for driving the load.

Figure 80:
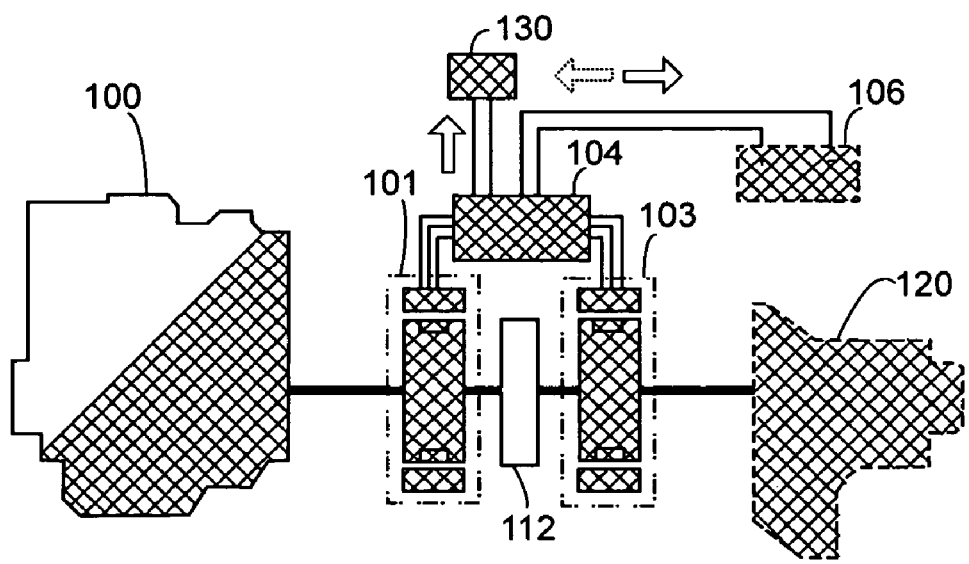
FIG. 80 is a schematic view showing that the preferred embodiment of the system illustrated in FIG. 78 adapted with the adaptation of the rechargeable device operates as the series combined power system at a constant engine speed.

FIG. 80 shows that the preferred embodiment of the system illustrated in FIG. 78 adapted with the adaptation of the rechargeable device operates as the series combined power system at a constant engine speed. FIG. 80 shows system function 2 provided by the preferred embodiment illustrated in FIG. 78, wherein, the rechargeable device is adapted to the system, and the engine runs at a constant speed to drive the system to engage in the series combined power operation for driving the load.

Figure 81:
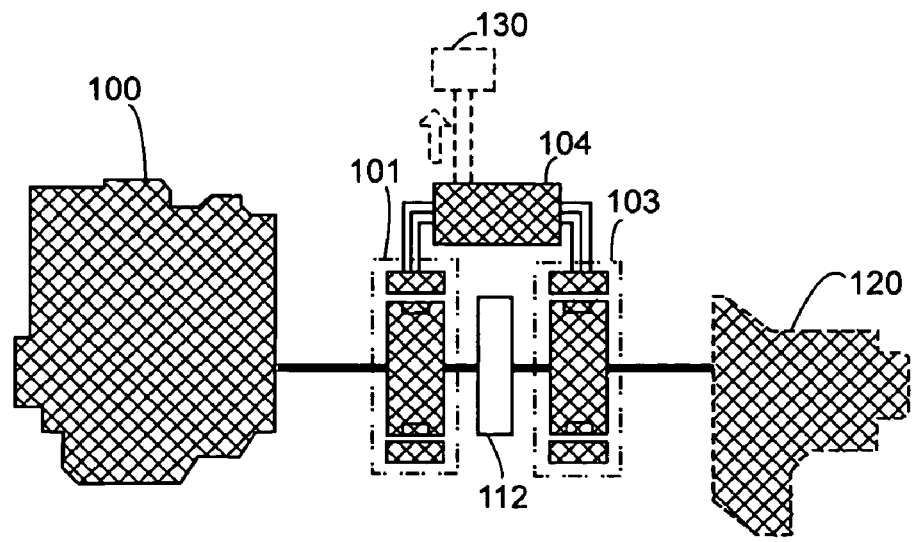
FIG. 81 is a schematic view showing that the preferred embodiment of the system illustrated in FIG. 78 not adapted with the adaptation of the rechargeable device operates as the series combined power system with controllable engine speed.

FIG. 81 shows that the preferred embodiment of the system illustrated in FIG. 78 not adapted with the adaptation of the rechargeable device operates as the series combined power system with controllable engine speed. FIG. 81 shows system function 3 provided by the preferred embodiment illustrated in FIG. 78, wherein, the system is not adapted with the rechargeable device and is engaging in the series combined power operation to drive the load.

Figure 82:
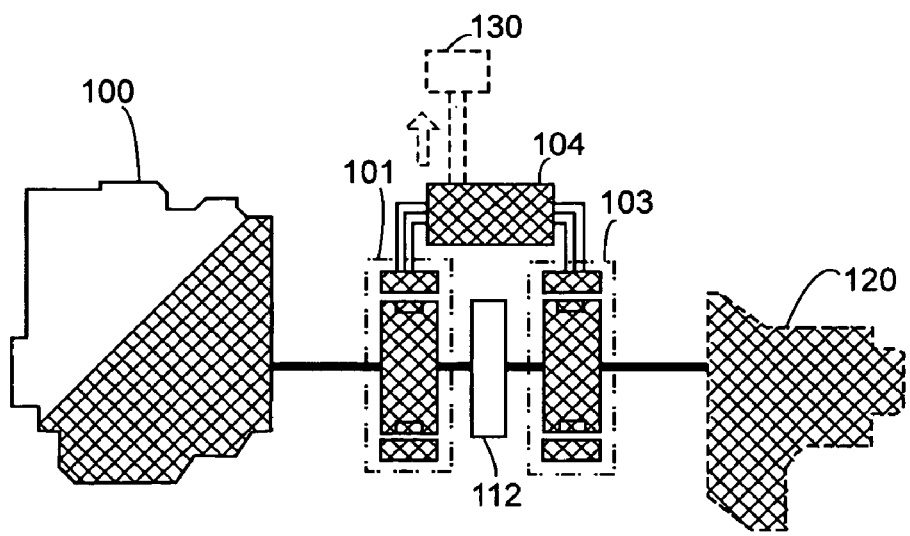
FIG. 82 is a schematic view showing that the preferred embodiment of the system illustrated in FIG. 78 not adapted with the adaptation of the rechargeable device operates as the series combined power system at a constant engine speed.

FIG. 82 shows that the preferred embodiment of the system illustrated in FIG. 78 not adapted with the adaptation of the rechargeable device operates as the series combined power system at a constant engine speed. FIG. 82 shows system function 4 provided by the preferred embodiment illustrated in FIG. 78, wherein, the system is not adapted with the rechargeable device, and the engine runs at a constant speed to drive the system to engage in the series combined power operation for driving the load.

Figure 83:
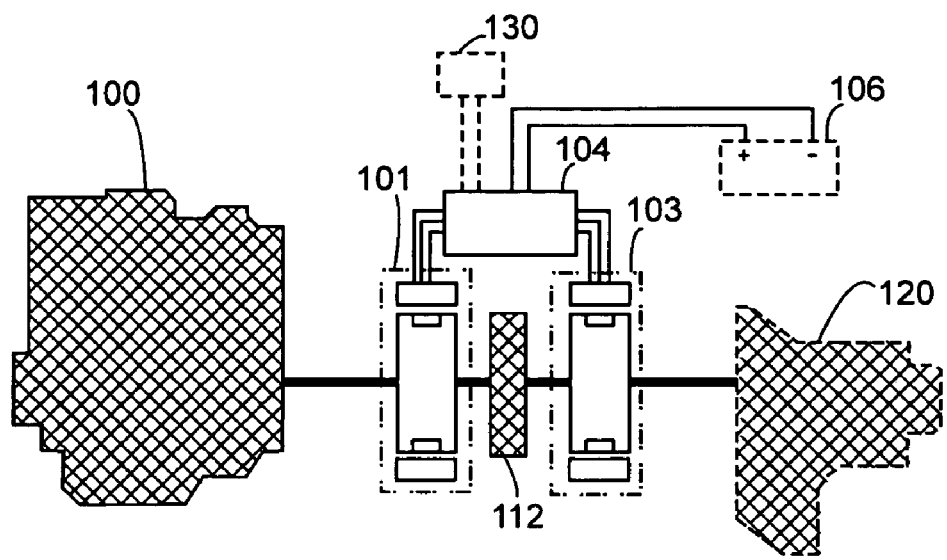
FIG. 83 is a schematic view showing that the preferred embodiment of the system illustrated in FIG. 78 operates on the engine power to drive the load.

FIG. 83 shows that the preferred embodiment of the system illustrated in FIG. 78 operates on the engine power to drive the load. FIG. 83 shows system function 5 provided by the preferred embodiment illustrated in FIG. 78, wherein, the system has the power from the engine to drive the load.

Figure 84:
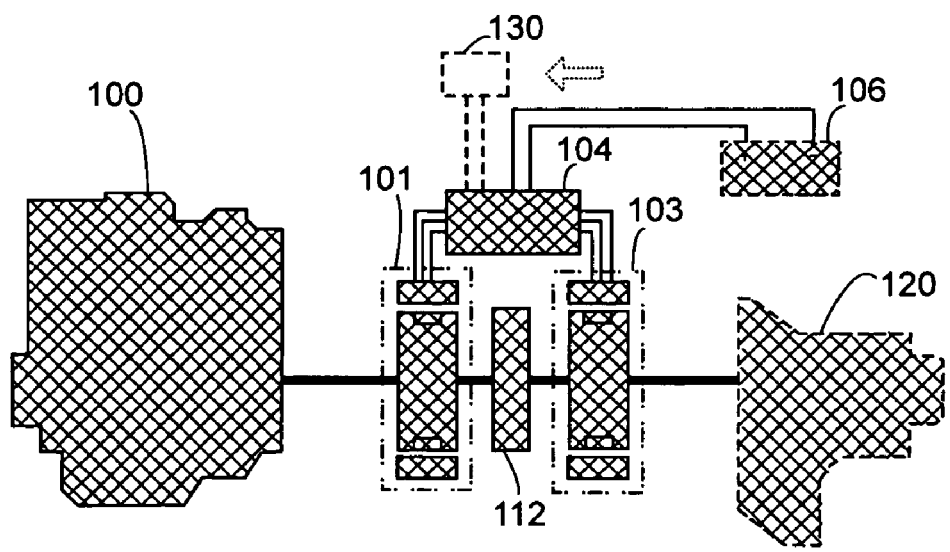
FIG. 84 is a schematic view showing that the preferred embodiment of the system illustrated in FIG. 78 operates on the power form the engine to jointly drive the load with both of the primary and the secondary dynamo-electric units driven by the rechargeable device.

FIG. 84 shows that the preferred embodiment of the system illustrated in FIG. 78 operates on the power form the engine to jointly drive the load with both of the primary and the secondary dynamo-electric units driven by the rechargeable device. FIG. 84 shows system function 6 provided by the preferred embodiment illustrated in FIG. 78, wherein, the system in case of a heavy load has the power form the engine and both of the primary and the secondary dynamo-electric units driven by the rechargeable device to function as a motor for jointly driving the load.

Figure 85:
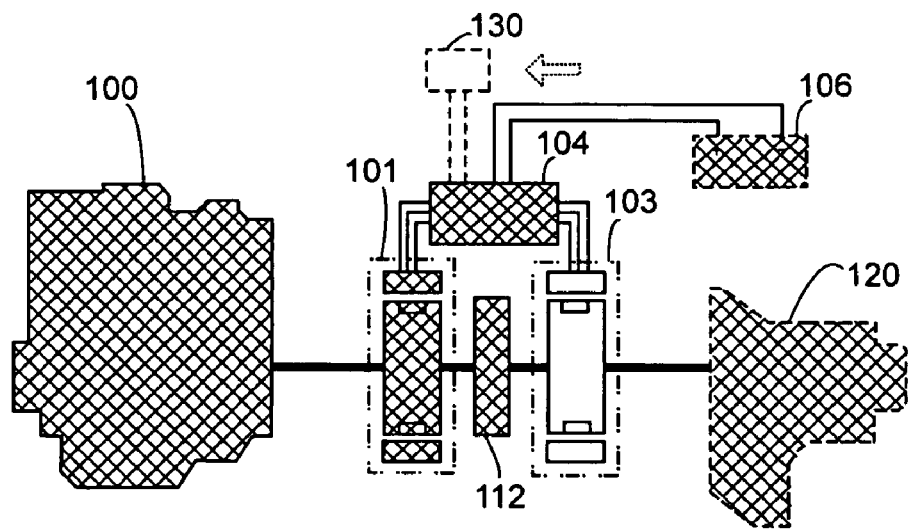
FIG. 85 is a schematic view showing that the preferred embodiment of the system illustrated in FIG. 78 operates on the power form the engine to jointly drive the load with the primary dynamo-electric unit driven by the rechargeable device.

FIG. 85 shows that the preferred embodiment of the system illustrated in FIG. 78 operates on the power form the engine to jointly drive the load with the primary dynamo-electric unit driven by the rechargeable device. FIG. 85 shows system function 7 provided by the preferred embodiment illustrated in FIG. 78, wherein, the system in case of a heavy load has the power form the engine and the primary dynamo-electric unit driven by the rechargeable device to function as a motor for jointly driving the load.

Figure 86:
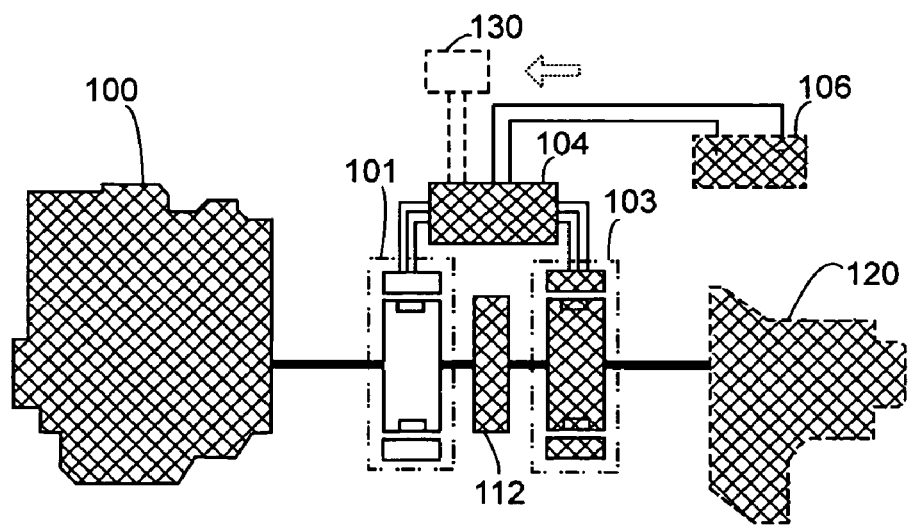
FIG. 86 is a schematic view showing that the preferred embodiment of the system illustrated in FIG. 78 operates on the power form the engine to jointly drive the load with the secondary dynamo-electric unit driven by the rechargeable device.

FIG. 86 shows that the preferred embodiment of the system illustrated in FIG. 78 operates on the power form the engine to jointly drive the load with the secondary dynamo-electric unit driven by the rechargeable device. FIG. 86 shows system function 8 provided by the preferred embodiment illustrated in FIG. 78, wherein, the system in case of a heavy load has the power form the engine and the secondary dynamo-electric units driven by the rechargeable device to function as a motor for jointly driving the load.

Figure 87:
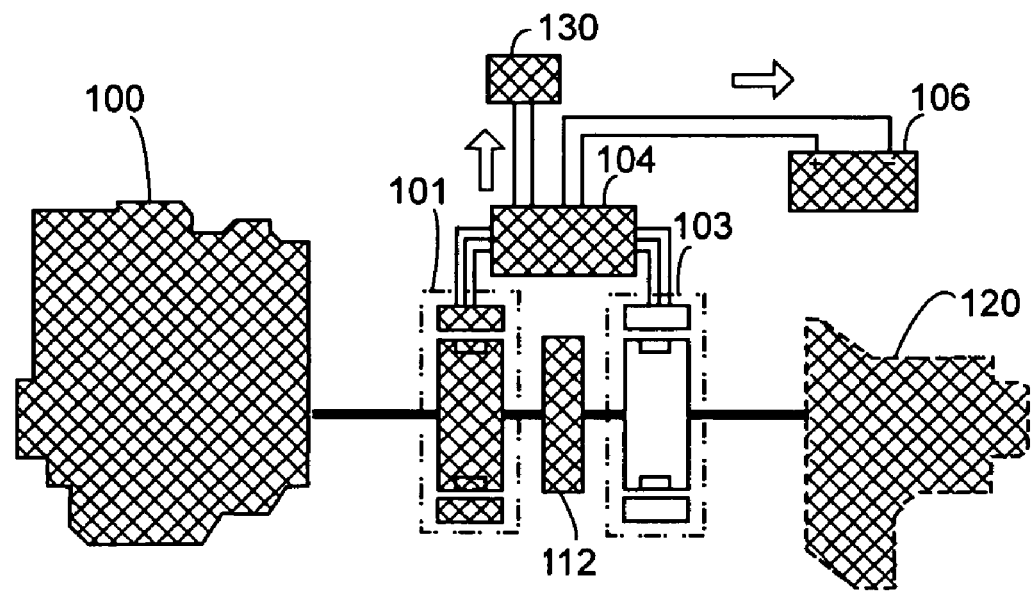
FIG. 87 is a schematic view showing that the preferred embodiment of the system illustrated in FIG. 78 operates on the power from the engine to drive the load, and to drive the primary dynamo-electric unit to function as a generator to charge the rechargeable device or to supply power to another load.

FIG. 87 shows that the preferred embodiment of the system illustrated in FIG. 78 operates on the power from the engine to drive the load, and to drive the primary dynamo-electric unit to function as a generator to charge the rechargeable device or to supply power to another load. FIG. 87 shows system function 9 provided by the preferred embodiment illustrated in FIG. 78, wherein, the power from the engine drives the load and the primary dynamo-electric unit to function as a generator for charging the rechargeable device or supplying power to another load.

Figure 88:
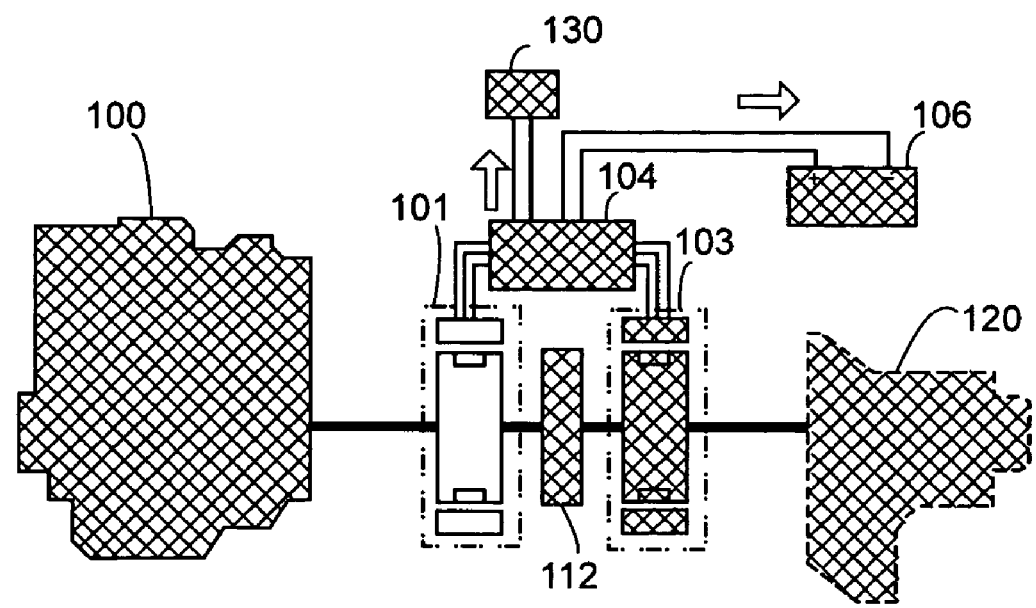
FIG. 88 is a schematic view showing that the preferred embodiment of the system illustrated in FIG. 78 operates on the power from the engine to drive the load, and to drive the secondary dynamo-electric unit to function as a generator to charge the rechargeable device or to supply power to another load.

FIG. 88 shows that the preferred embodiment of the system illustrated in FIG. 78 operates on the power from the engine to drive the load, and to drive the secondary dynamo-electric unit to function as a generator to charge the rechargeable device or to supply power to another load. FIG. 88 shows system function 10 provided by the preferred embodiment illustrated in FIG. 78, wherein, the power from the engine drives the load and the secondary dynamo-electric unit to function as a generator for charging the rechargeable device or supplying power to another load.

Figure 89:
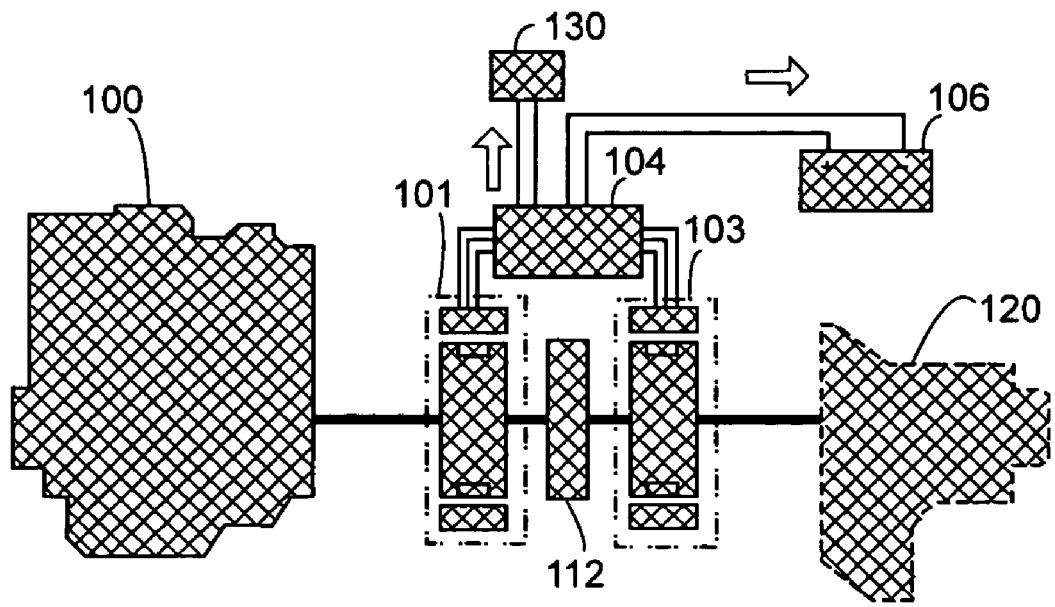
FIG. 89 is a schematic view showing that the preferred embodiment of the system illustrated in FIG. 78 operates on the power from the engine to drive the load, and to drive both of the primary and the secondary dynamo-electric units to function as a generator to charge the rechargeable device or to supply power to another load.

FIG. 89 shows that the preferred embodiment of the system illustrated in FIG. 78 operates on the power from the engine to drive the load, and to drive both of the primary and the secondary dynamo-electric units to function as a generator to charge the rechargeable device or to supply power to another load. FIG. 89 shows system function 11 provided by the preferred embodiment illustrated in FIG. 78, wherein, the power from the engine drives the load and both of the primary and the secondary dynamo-electric units to function as a generator for charging the rechargeable device or supplying power to another load.

Figure 90:
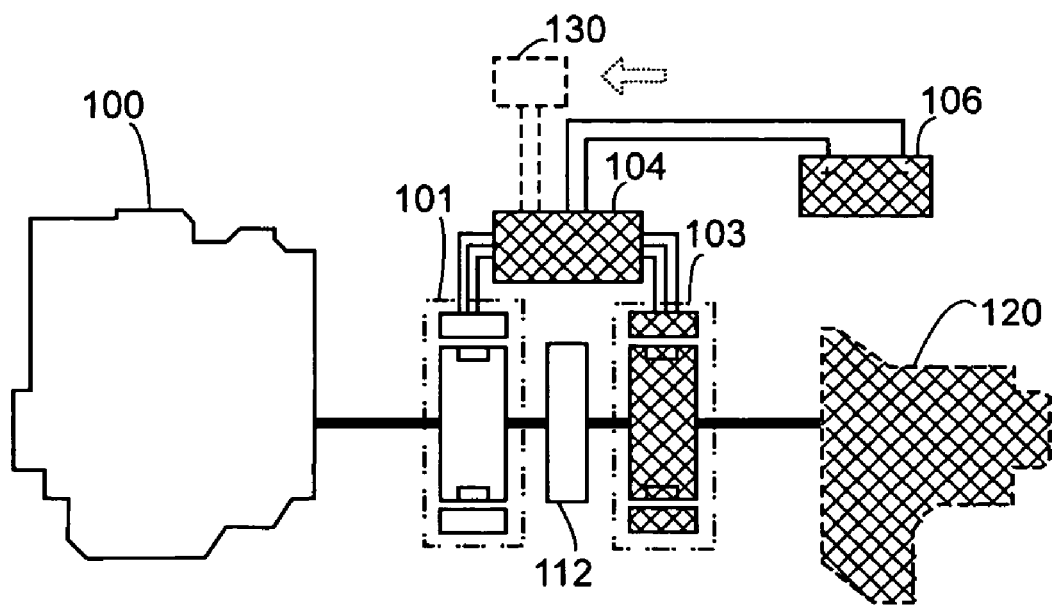
FIG. 90 is a schematic view showing that the preferred embodiment of the system illustrated in FIG. 78 operates on the power from the rechargeable device to drive the secondary dynamo-electric unit for driving the load.

FIG. 90 shows that the preferred embodiment of the system illustrated in FIG. 78 operates on the power from the rechargeable device to drive the secondary dynamo-electric unit for driving the load. FIG. 90 shows system function 13 provided by the preferred embodiment illustrated in FIG. 78, wherein, the power from the rechargeable device drives the secondary dynamo-electric unit to function as a motor for driving the load.

Figure 91:
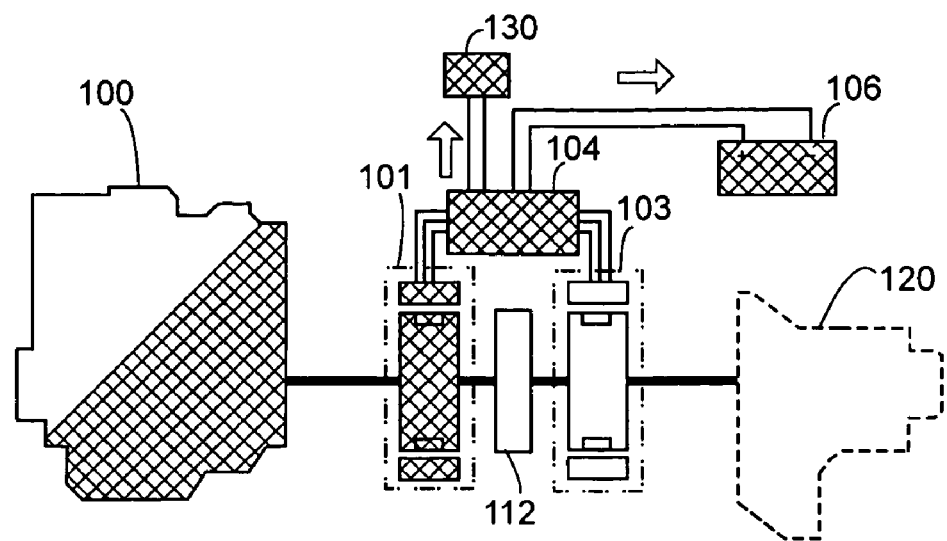
FIG. 91 is a schematic view showing that the preferred embodiment of the system illustrated in FIG. 78 operates on the power from the rechargeable device to drive the primary dynamo-electric unit for driving the load.

FIG. 91 shows that the preferred embodiment of the system illustrated in FIG. 78 operates on the power from the rechargeable device to drive the primary dynamo-electric unit for driving the load. FIG. 91 shows system function 15 provided by the preferred embodiment illustrated in FIG. 78, wherein, the engine runs at a constant speed to drive the primary dynamo-electric unit to function as a generator for charging the rechargeable device or supplying power to another load.

Figure 92:
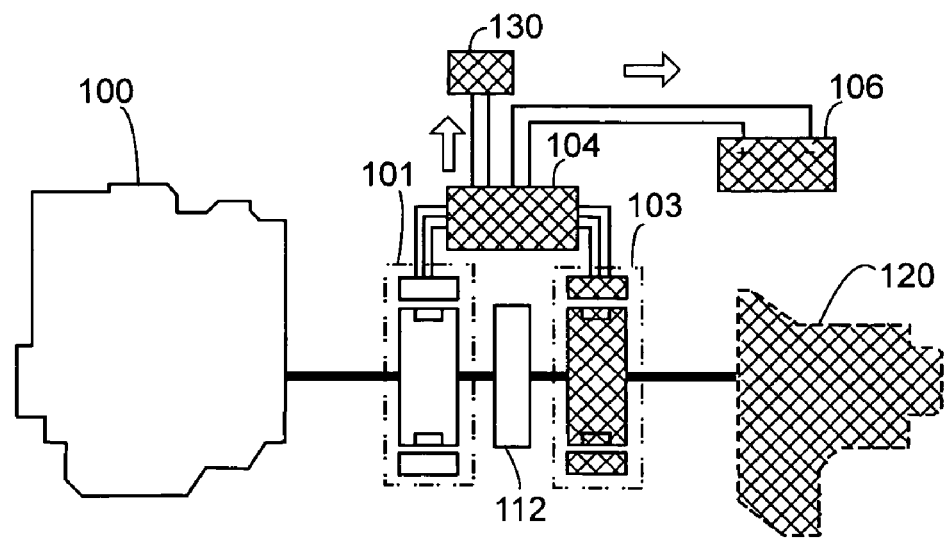
FIG. 92 is a schematic view showing that the preferred embodiment of the system illustrated in FIG. 78 has the load to draw the secondary dynamo-electric unit to regenerate by reclaiming the kinetics for charging the rechargeable device or supplying power to another load.

FIG. 92 shows that the preferred embodiment of the system illustrated in FIG. 78 has the load to draw the secondary dynamo-electric unit to regenerate by reclaiming the kinetics for charging the rechargeable device or supplying power to another load. FIG. 92 shows system function 19 provided by the preferred embodiment illustrated in FIG. 78, wherein, the system has the load to exercise the braking operation to draw the secondary dynamo-electric unit to function as a generator for charging the rechargeable device and supplying power to another load.

Figure 93:
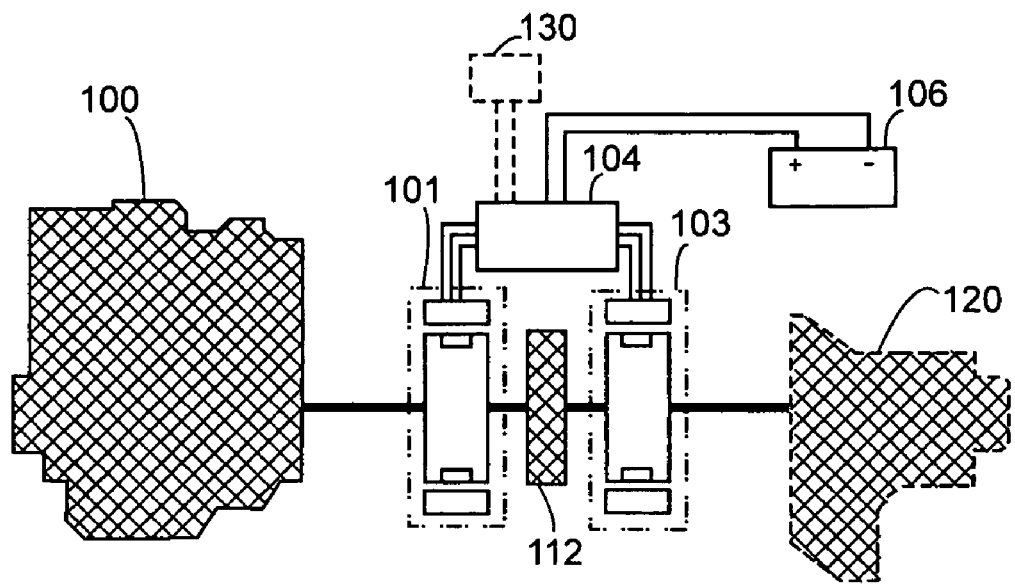
FIG. 93 is a schematic view showing that the preferred embodiment of the system illustrated in FIG. 78 operates on the mechanical damper of the engine to exercise a brake on the load.

FIG. 93 shows that the preferred embodiment of the system illustrated in FIG. 78 operates on the mechanical damper of the engine to exercise a brake on the load. FIG. 93 shows system function 21 provided by the preferred embodiment illustrated in FIG. 78, wherein, the mechanical damper from the engine exercise the braking operation on the load.

Figure 94:
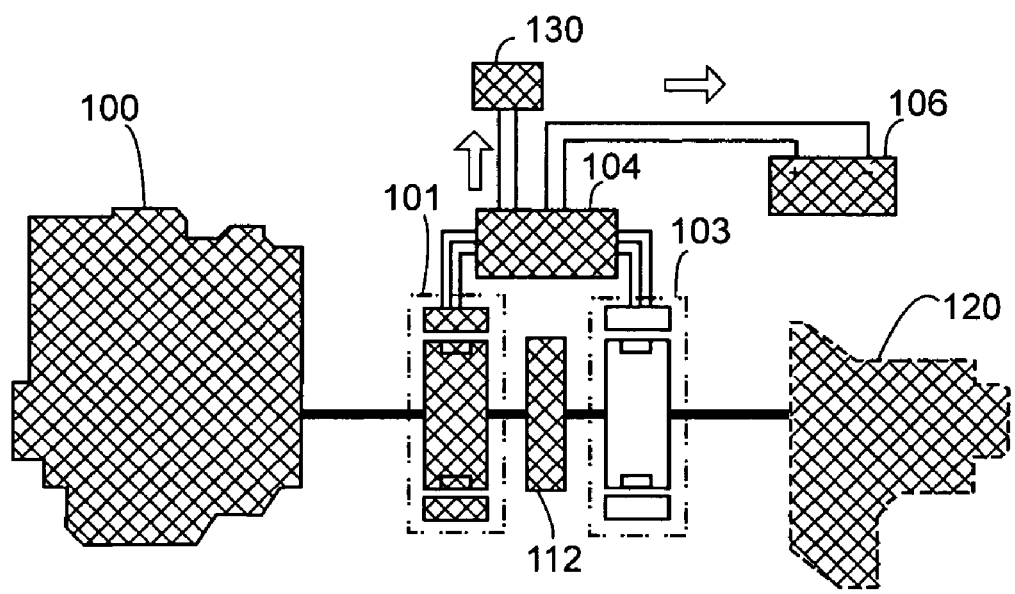
FIG. 94 is a schematic view showing that the preferred embodiment of the system operates on the mechanical damper of the engine to exercise a brake on the load and to drive the primary dynamo-electric unit to regenerate for charging the rechargeable device or supplying power to another load.

FIG. 94 shows that the preferred embodiment of the system operates on the mechanical damper of the engine to exercise a brake on the load and to drive the primary dynamo-electric unit to regenerate for charging the rechargeable device or supplying power to another load. FIG. 94 shows system function 22 provided by the preferred embodiment illustrated in FIG. 78, wherein, the mechanical damper of the engine exercises the braking operation on the load, meanwhile the primary dynamo-electric unit functions as a generator to regenerate by reclaiming the kinetics so to charge the rechargeable device or to supply power to another load.

Figure 95:
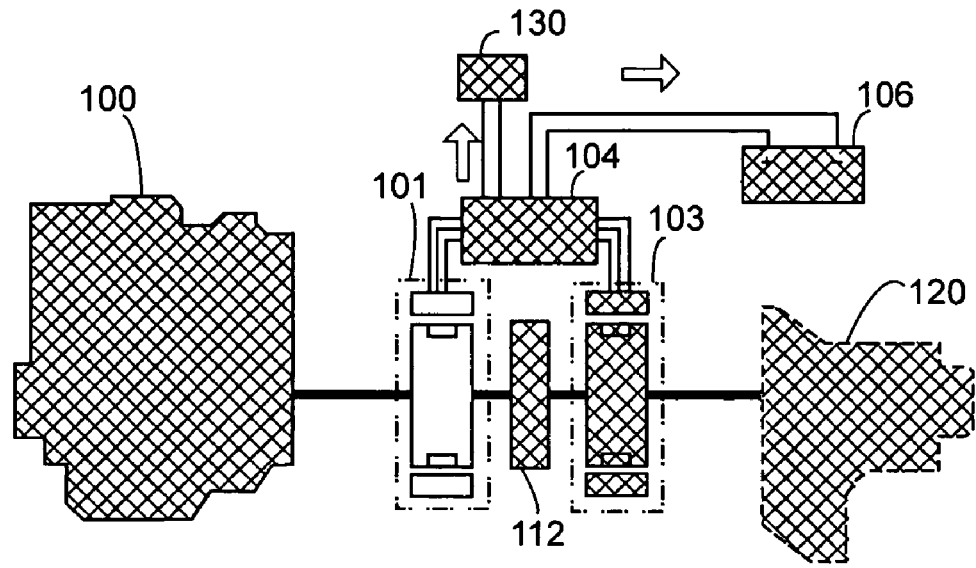
FIG. 95 is a schematic view showing that the preferred embodiment of the system operates on the mechanical damper of the engine to exercise a brake on the load and to drive the secondary dynamo-electric unit to regenerate for charging the rechargeable device or supplying power to another load.

FIG. 95 shows that the preferred embodiment of the system operates on the mechanical damper of the engine to exercise a brake on the load and to drive the secondary dynamo-electric unit to regenerate for charging the rechargeable device or supplying power to another load. FIG. 95 shows system function 23 provided by the preferred embodiment illustrated in FIG. 78, wherein, the mechanical damper of the engine exercises the braking operation on the load, meanwhile the secondary dynamo-electric unit functions as a generator to regenerate by reclaiming the kinetics so to charge the rechargeable device or to supply power to another load.

Figure 96:
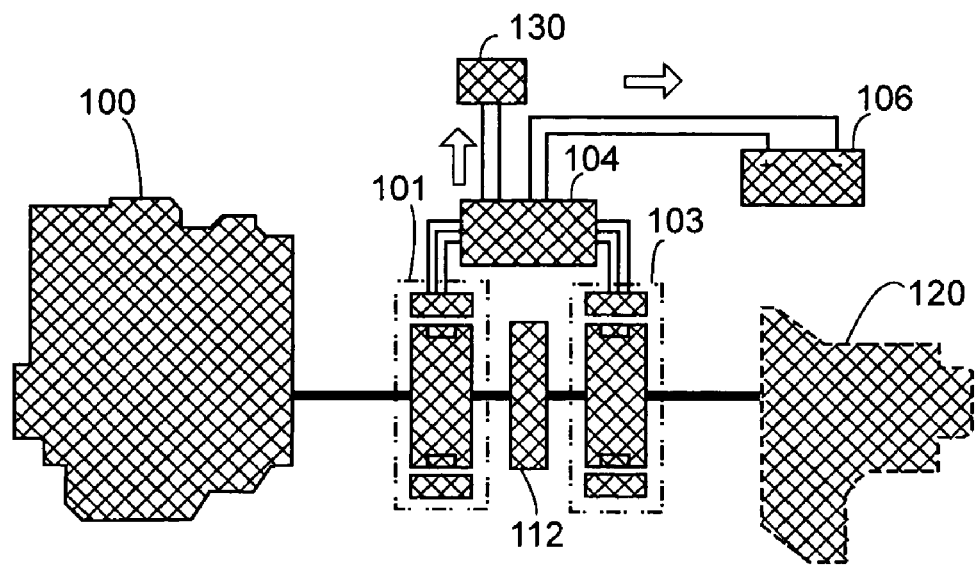
FIG. 96 is a schematic view showing that the preferred embodiment of the system operates on the mechanical damper of the engine to exercise a brake on the load and to drive both of the primary and the secondary dynamo-electric units to regenerate for charging the rechargeable device or supplying power to another load.

FIG. 96 shows that the preferred embodiment of the system operates on the mechanical damper of the engine to exercise a brake on the load and to drive both of the primary and the secondary dynamo-electric units to regenerate for charging the rechargeable device or supplying power to another load. FIG. 96 shows system function 24 provided by the preferred embodiment illustrated in FIG. 78, wherein, the mechanical damper of the engine exercises the braking operation on the load, meanwhile both of the primary and the secondary dynamo-electric units function as a generator to regenerate by reclaiming the kinetics so to charge the rechargeable device or to supply power to another load.

Figure 97:
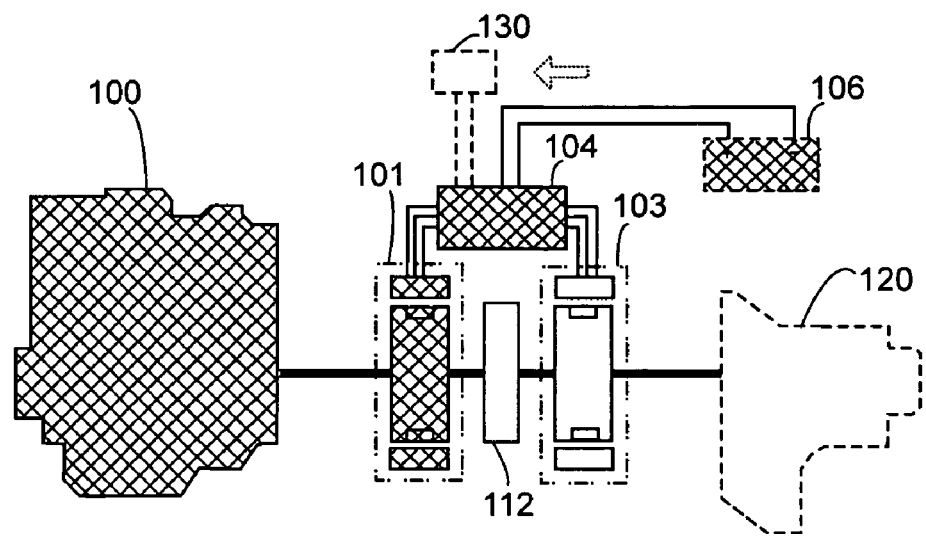
FIG. 97 is a schematic view showing that the preferred embodiment of the system illustrated in FIG. 78 operates on the power form the rechargeable device to drive the primary dynamo-electric unit to start the engine.

FIG. 97 shows that the preferred embodiment of the system illustrated in FIG. 78 operates on the power form the rechargeable device to drive the primary dynamo-electric unit to start the engine. FIG. 97 shows system function 25 provided by the preferred embodiment illustrated in FIG. 78, wherein, the power from the rechargeable device drives the primary dynamo-electric unit to function as a motor to start the engine.

Figure 98:
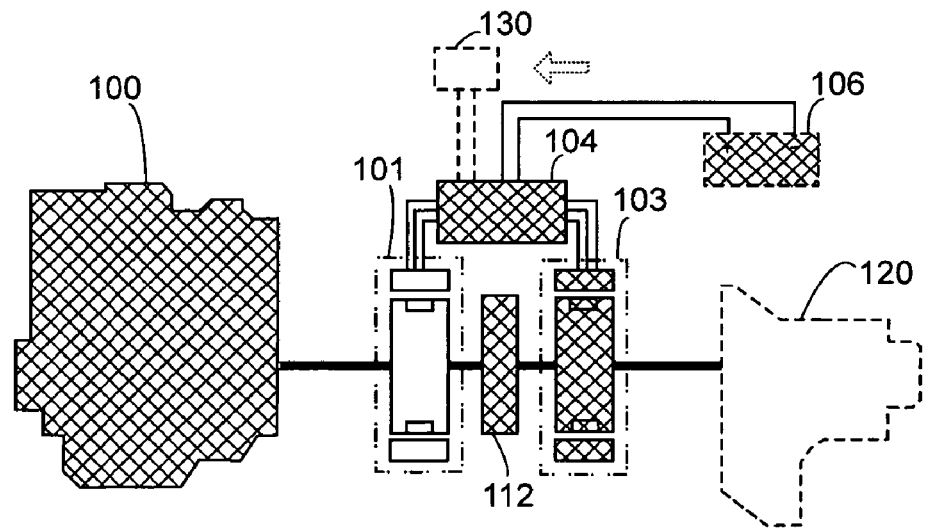
FIG. 98 is a schematic view showing that the preferred embodiment of the system illustrated in FIG. 78 operates on the power form the rechargeable device to drive the secondary dynamo-electric unit to start the engine.

FIG. 98 shows that the preferred embodiment of the system illustrated in FIG. 78 operates on the power form the rechargeable device to drive the secondary dynamo-electric unit to start the engine. FIG. 98 shows system function 26 provided by the preferred embodiment illustrated in FIG. 78, wherein, the power from the rechargeable device drives the secondary dynamo-electric unit to function as a motor to start the engine.

Figure 99:
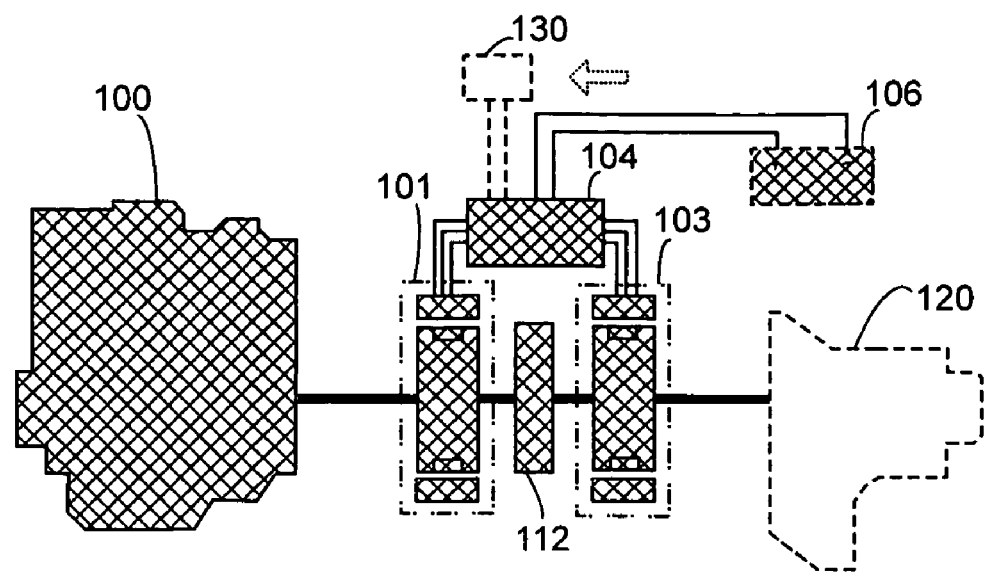
FIG. 99 is a schematic view showing that the preferred embodiment of the system illustrated in FIG. 78 operates on the power form the rechargeable device to drive both of the primary and the secondary dynamo-electric units to start the engine.

FIG. 99 shows that the preferred embodiment of the system illustrated in FIG. 78 operates on the power form the rechargeable device to drive both of the primary and the secondary dynamo-electric units to start the engine. FIG. 97 shows system function 27 provided by the preferred embodiment illustrated in FIG. 78, wherein, the power from the rechargeable device drives both of the primary and secondary dynamo-electric units to function as a motor to start the engine.

Figure 100:
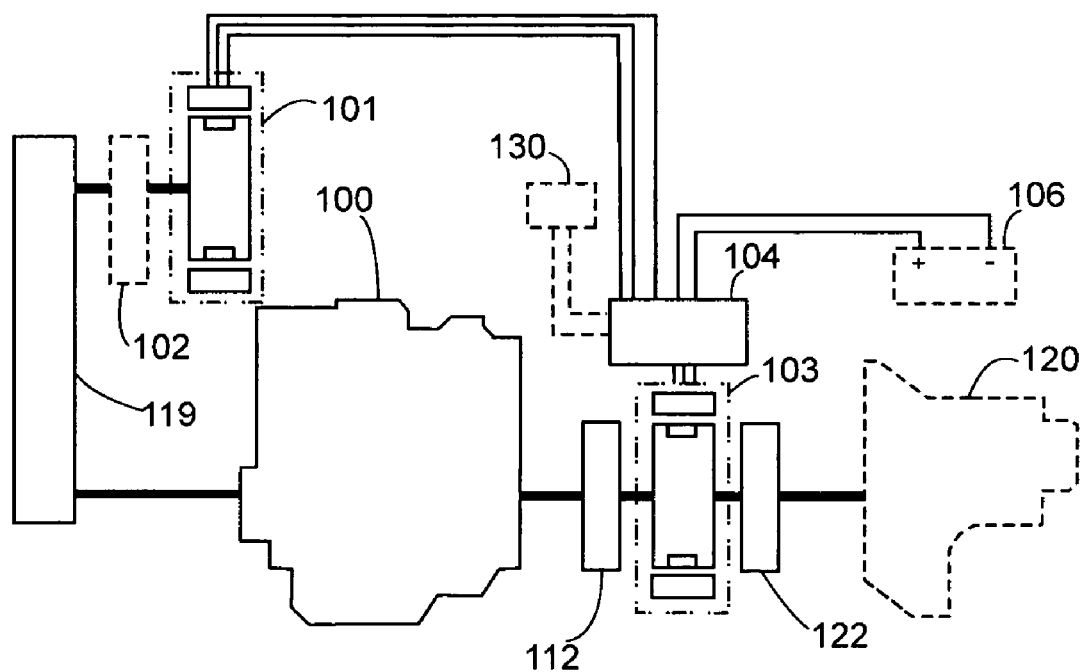
FIG. 100 is a schematic view showing that the preferred embodiment of the system illustrated in FIG. 2 has the primary dynamo-electric unit to be independently and directly driven by the active rotation power source or through a transmission device.

FIG. 100 is a schematic view showing that the preferred embodiment of the system illustrated in FIG. 2 has the primary dynamo-electric unit to be independently and directly driven by the active rotation power source or through a transmission device. Wherein, the system has the engine serving as the active rotation power source 100 directly driven by the primary dynamo-electric unit 101 alone or through the transmission 119 or the clutch 102; the output end of the active rotation power source 100 is directly or through a transmission unit 109 and the clutch 112 coupled to the secondary dynamo-electric unit 103; thereby, the output end of the secondary dynamo-electric unit 103 is coupled to the load 120 through the clutch 122. The primary dynamo-electric unit 101 may function as a generator and a motor as required, or only as a generator. Accordingly, the primary dynamo-electric fails to function as the motor to drive the load 120 or to function alone to regenerate by reclaiming kinetics to exercise brake on the load 120 within the configuration as illustrated in FIG. 2. Alternatively, the system may provide all or any part of those system functions 1~11, 13, 15~17, 19 and 21~27 as listed in Table E. FIGS. 101~123 show those functions listed in Table E.

Figure 101:
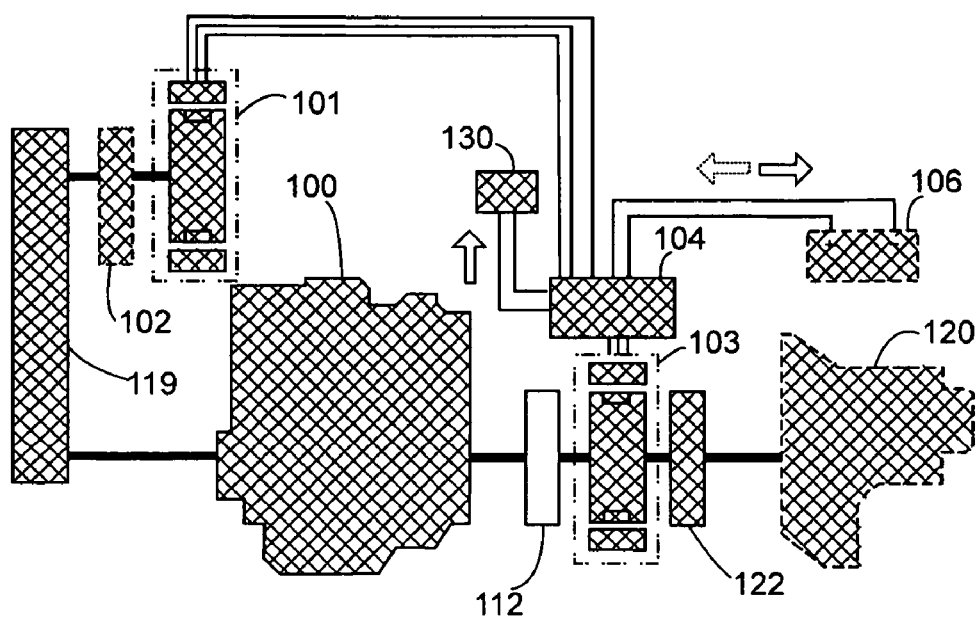
FIG. 101 is a schematic view showing that the preferred embodiment of the system illustrated in FIG. 100 adapted with the rechargeable device functions as the series combined power system with controllable engine speed.

FIG. 101 shows that the preferred embodiment of the system illustrated in FIG. 100 adapted with the rechargeable device functions as the series combined power system with controllable engine speed. FIG. 101 shows system function 1 provided by the preferred embodiment illustrated in FIG. 100, wherein, the system is adapted with the rechargeable device to engage in the series combined power operation to drive the load.

Figure 102:
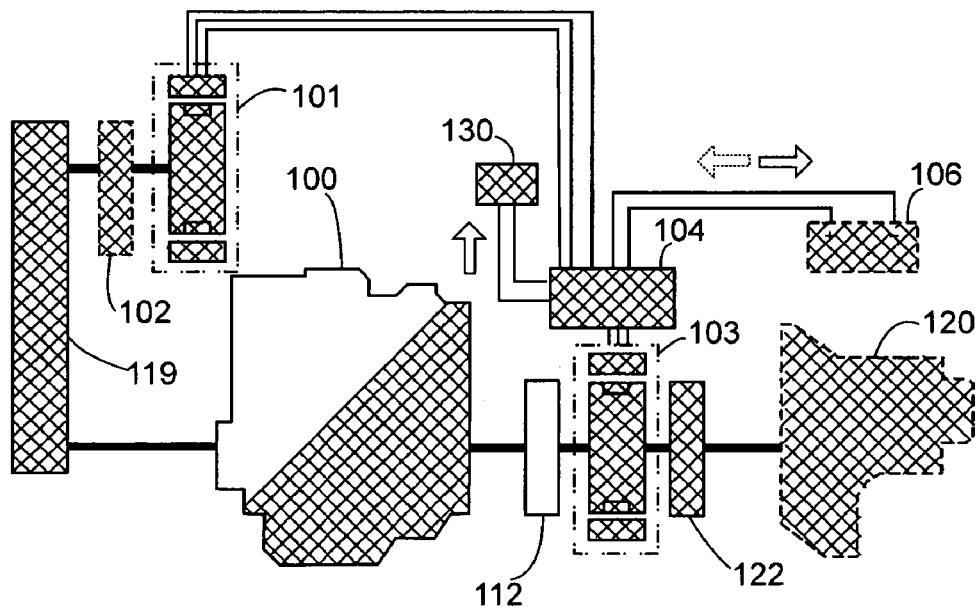
FIG. 102 is a schematic view showing that the preferred embodiment of the system illustrated in FIG. 100 adapted with the rechargeable device functions as the series combined power system at a constant engine speed.

FIG. 102 shows that the preferred embodiment of the system illustrated in FIG. 100 adapted with the rechargeable device functions as the series combined power system at a constant engine speed. FIG. 102 shows system function 2 provided by the preferred embodiment illustrated in FIG. 100, wherein, the rechargeable device is adapted to the system and the engine runs at a constant speed to drive the system to engage in the operation of series combined power for driving the load.

Figure 103:
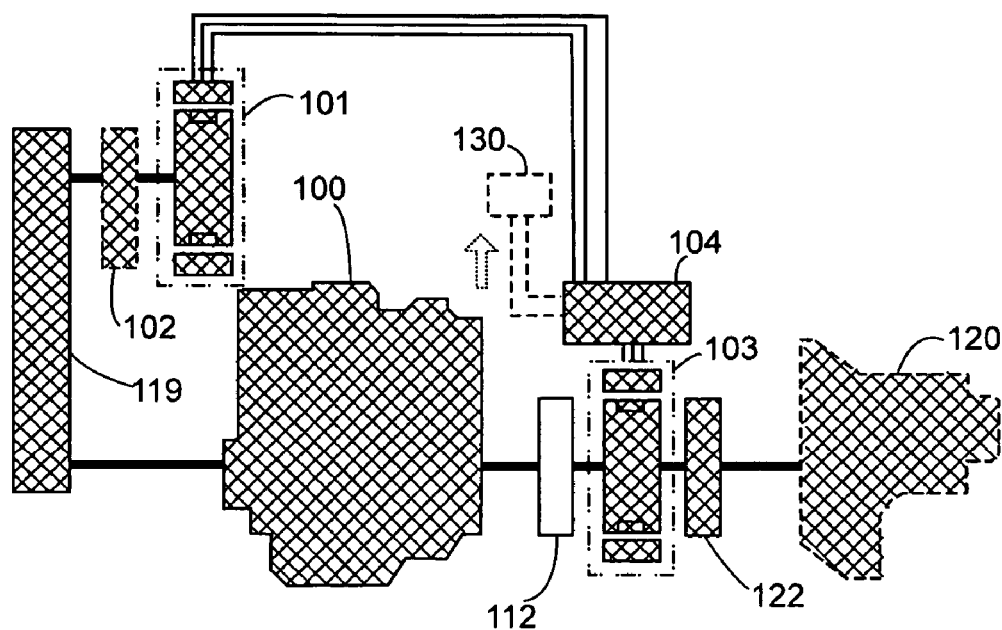
FIG. 103 is a schematic view showing that the preferred embodiment of the system illustrated in FIG. 100 not adapted with the rechargeable device functions as the series combined power system with controllable engine speed.

FIG. 103 shows that the preferred embodiment of the system illustrated in FIG. 100 not adapted with the rechargeable device functions as the series combined power system with controllable engine speed. FIG. 103 shows system function 3 provided by the preferred embodiment illustrated in FIG. 100, wherein, the system is not adapted with the rechargeable device and is engaged in the operation of the series combined power for driving the load.

Figure 104:
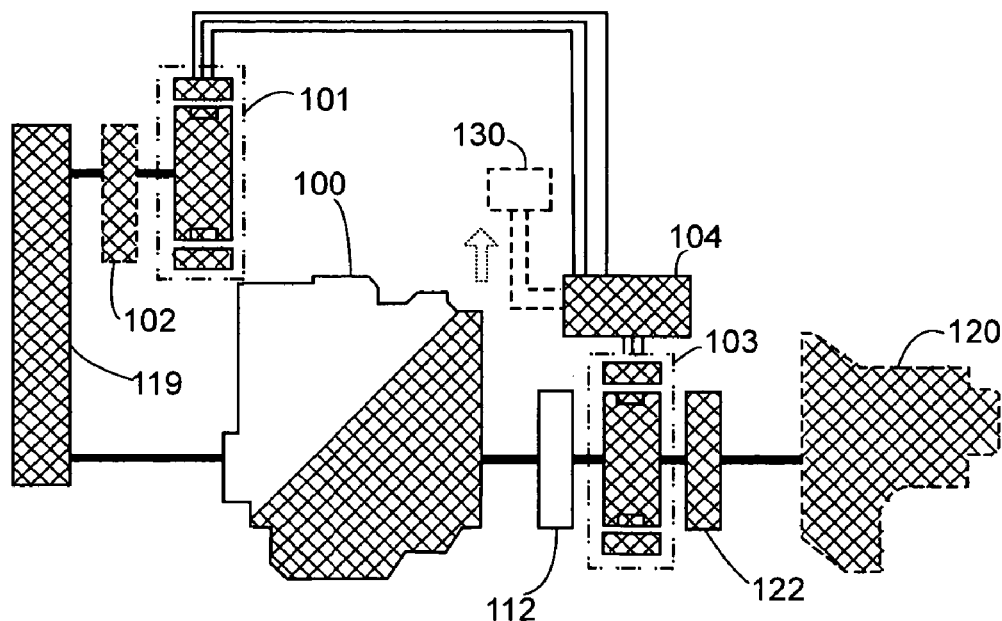
FIG. 104 is a schematic view showing that the preferred embodiment of the system illustrated in FIG. 100 not adapted with the rechargeable device functions as the series combined power system at a constant engine speed.

FIG. 104 shows that the preferred embodiment of the system illustrated in FIG. 100 not adapted with the rechargeable device functions as the series combined power system at a constant engine speed. FIG. 104 shows system function 4 provided by the preferred embodiment illustrated in FIG. 100, wherein, the system is not adapted with the rechargeable device, and the engine runs at a constant speed to drive the system to engage in the operation of the series combined power for driving the load.

Figure 105:
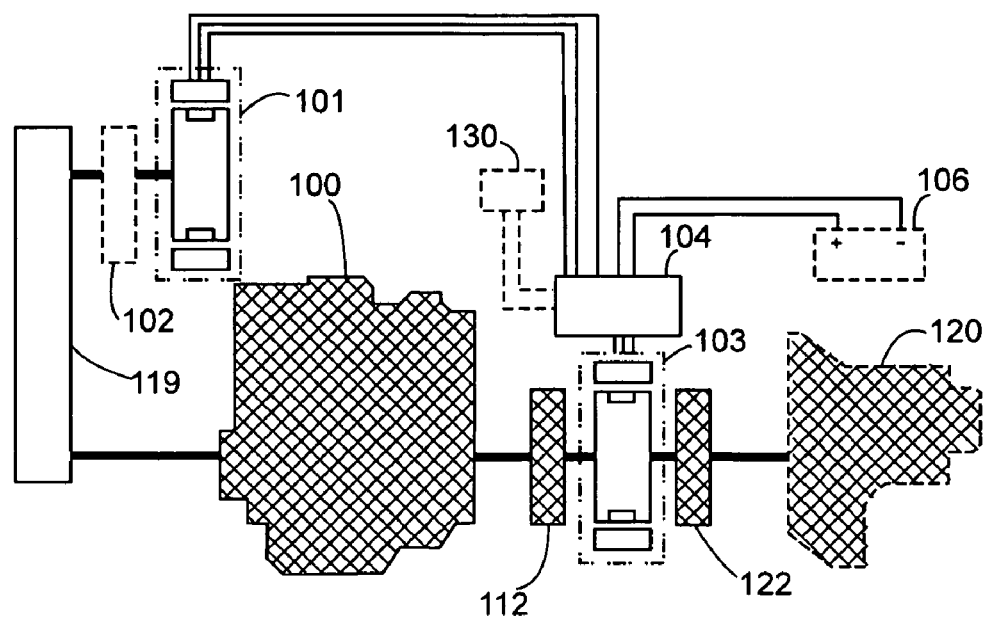
FIG. 105 is a schematic view showing that the preferred embodiment of the system illustrated in FIG. 100 operates on the power form the engine to drive the load.

FIG. 105 shows that the preferred embodiment of the system illustrated in FIG. 100 operates on the power form the engine to drive the load. FIG. 105 shows system function 5 provided by the preferred embodiment illustrated in FIG. 100, wherein, the system has the power from the engine to drive the load.

Figure 106:
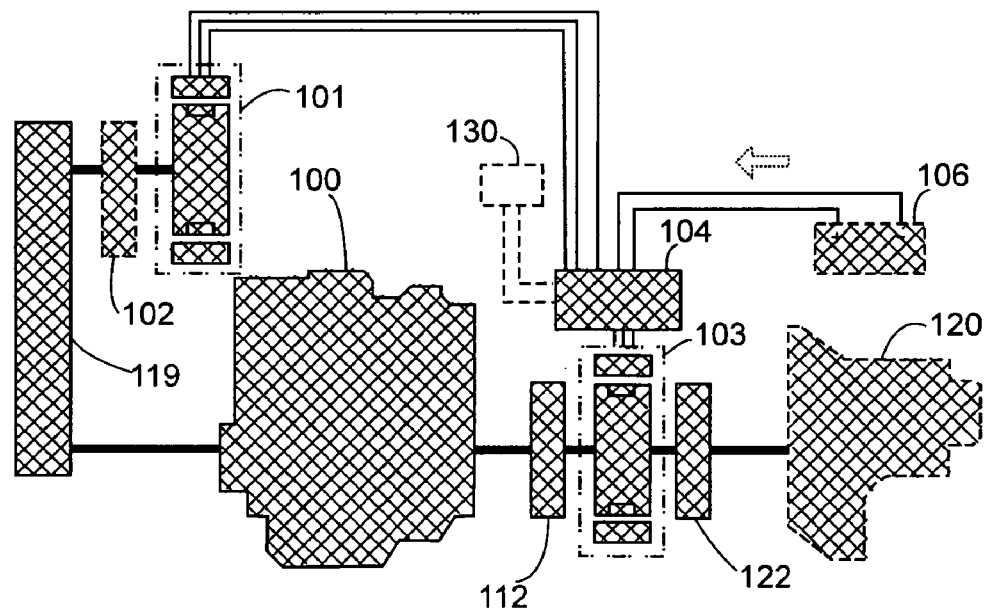
FIG. 106 is a schematic view showing that the preferred embodiment of the system illustrated in FIG. 100 operates on the power from the engine to jointly drive the load with both of the primary and the secondary dynamo-electric units driven by the rechargeable device.

FIG. 106 shows that the preferred embodiment of the system illustrated in FIG. 100 operates on the power from the engine to jointly drive the load with both of the primary and the secondary dynamo-electric units driven by the rechargeable device. FIG. 106 shows system function 6 provided by the preferred embodiment illustrated in FIG. 100, wherein, the system, in case of a heavy load, has the power form the engine, and the primary and the secondary dynamo-electric units driven by the rechargeable device to function as a motor to jointly drive the load.

Figure 107:
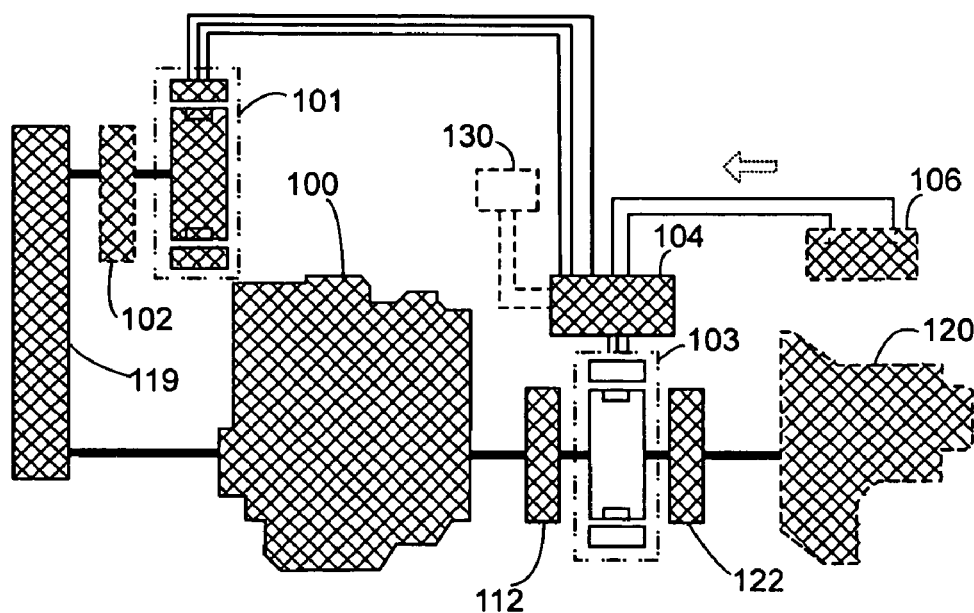
FIG. 107 is a schematic view showing that the preferred embodiment of the system illustrated in FIG. 100 operates on the power from the engine to jointly drive the load with the primary dynamo-electric unit driven by the rechargeable device.

FIG. 107 shows that the preferred embodiment of the system illustrated in FIG. 100 operates on the power from the engine to jointly drive the load with the primary dynamo-electric unit driven by the rechargeable device. FIG. 107 shows system function 7 provided by the preferred embodiment illustrated in FIG. 100, wherein, the system, in case of a heavy load, has the power form the engine, and the primary dynamo-electric unit driven by the rechargeable device to function as a motor to jointly drive the load.

Figure 108:
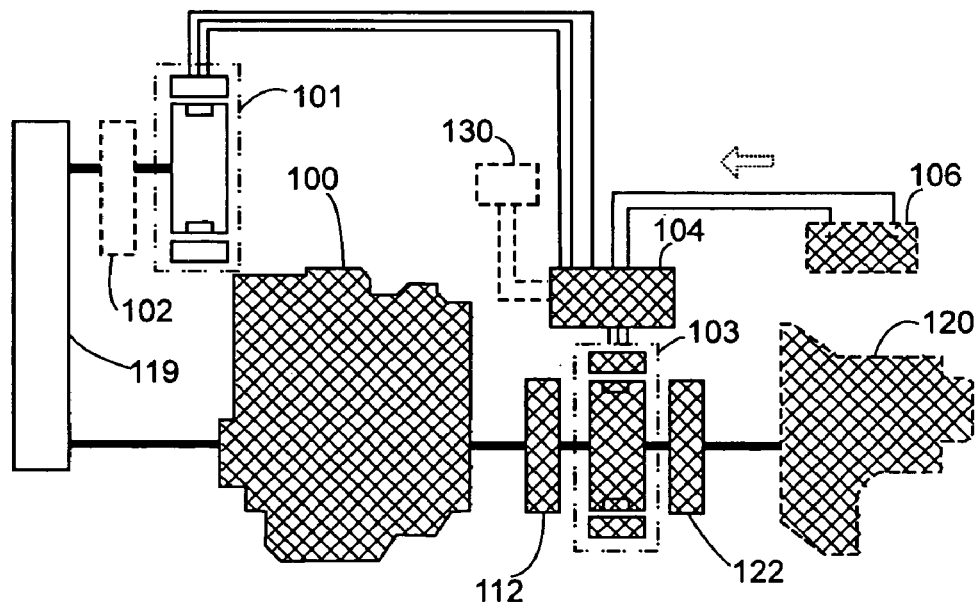
FIG. 108 is a schematic view showing that the preferred embodiment of the system illustrated in FIG. 100 operates on the power from the engine to jointly drive the load with the secondary dynamo-electric unit driven by the rechargeable device.

FIG. 108 is a schematic view showing that the preferred embodiment of the system illustrated in FIG. 100 operates on the power from the engine to jointly drive the load with the secondary dynamo-electric unit driven by the rechargeable device. FIG. 108 shows system function 8 provided by the preferred embodiment illustrated in FIG. 100, wherein, the system, in case of a heavy load, has the power form the engine, and the secondary dynamo-electric unit driven by the rechargeable device to function as a motor to jointly drive the load.

Figure 109:
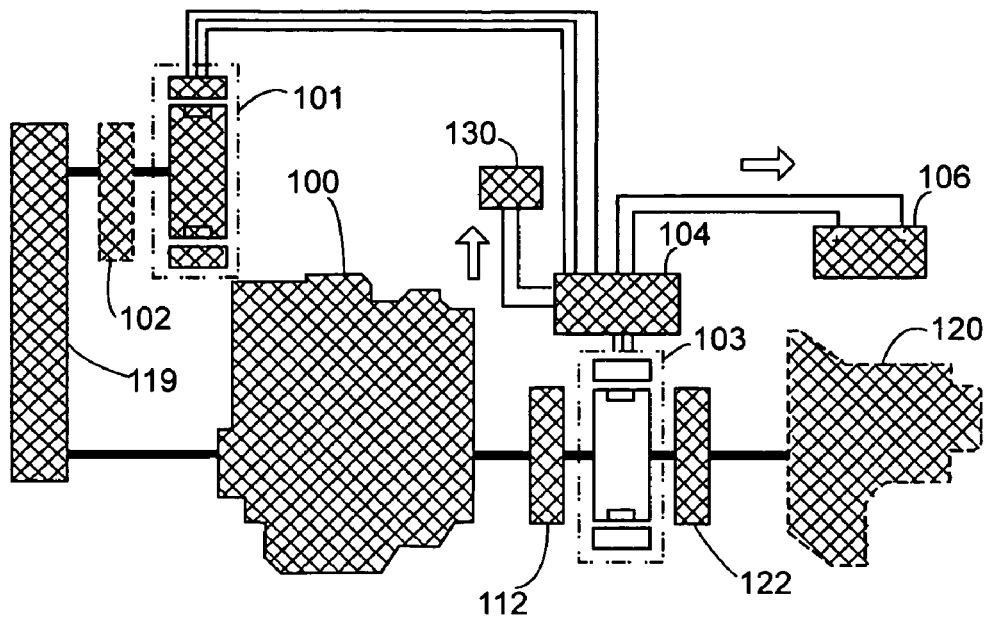
FIG. 109 is a schematic view showing that the preferred embodiment of the system illustrated in FIG. 100 operates on the power of the engine to drive the load, and to drive the primary dynamo-electric unit to function as a generator to charge the rechargeable device or to supply power to another load.

FIG. 109 shows that the preferred embodiment of the system illustrated in FIG. 100 operates on the power of the engine to drive the load, and to drive the primary dynamo-electric unit to function as a generator to charge the rechargeable device or to supply power to another load. FIG. 109 shows system function 9 provided by the preferred embodiment illustrated in FIG. 100, wherein, the power from the engine drives the load and the primary dynamo-electric unit to function as a generator for charging the rechargeable device or supplying power to another load.

Figure 110:
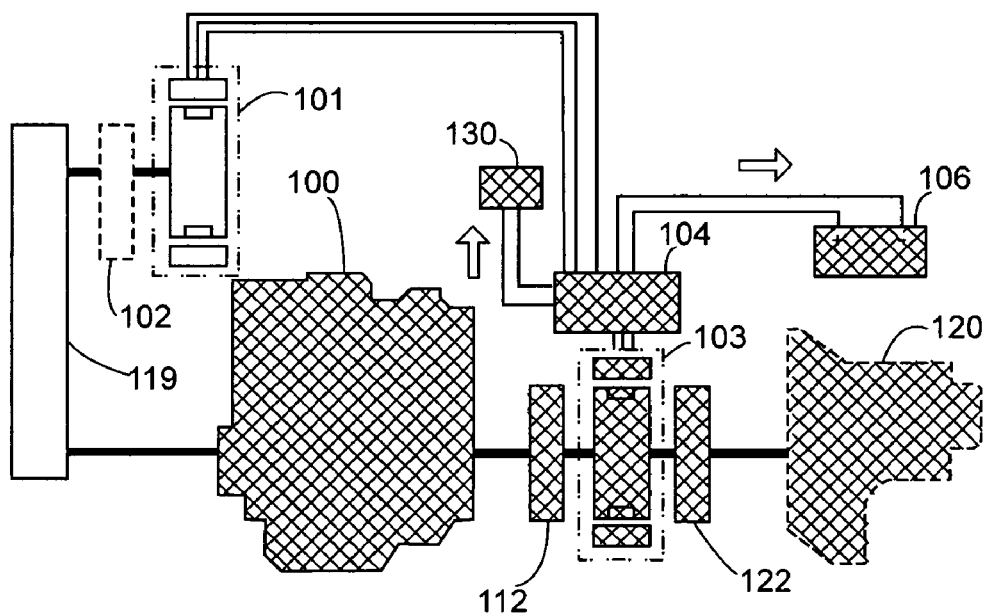
FIG. 110 is a schematic view showing that the preferred embodiment of the system illustrated in FIG. 100 operates on the power of the engine to drive the load, and to drive the secondary dynamo-electric unit to function as a generator to charge the rechargeable device or to supply power to another load.

FIG. 110 shows that the preferred embodiment of the system illustrated in FIG. 100 operates on the power of the engine to drive the load, and to drive the secondary dynamo-electric unit to function as a generator to charge the rechargeable device or to supply power to another load. FIG. 110 shows system function 10 provided by the preferred embodiment illustrated in FIG. 100, wherein, the power from the engine drives the load and the secondary dynamo-electric unit to function as a generator for charging the rechargeable device or supplying power to another load.

Figure 111:
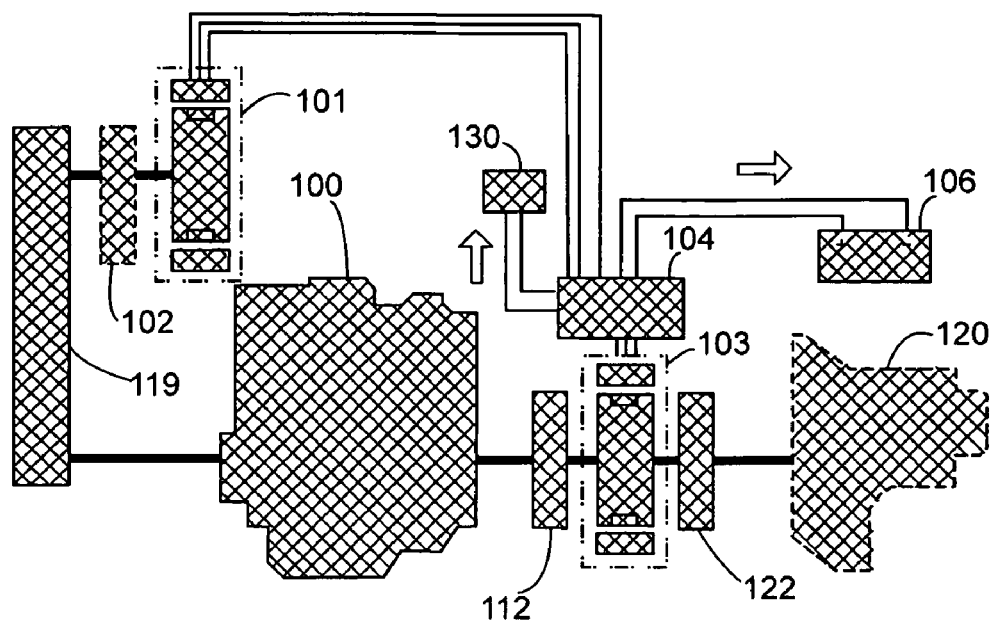
FIG. 111 is a schematic view showing that the preferred embodiment of the system illustrated in FIG. 100 operates on the power of the engine to drive the load, and to drive both of the primary and the secondary dynamo-electric units to function as a generator to charge the rechargeable device or to supply power to another load.

FIG. 111 is a schematic view showing that the preferred embodiment of the system illustrated in FIG. 100 operates on the power of the engine to drive the load, and to drive both of the primary and the secondary dynamo-electric units to function as a generator to charge the rechargeable device or to supply power to another load. FIG. 111 shows system function 11 provided by the preferred embodiment illus- trated in FIG. 100, wherein, the power from the engine drives the load and both of the primary and the secondary dynamo-electric units to function as a generator for charging the rechargeable device or supplying power to another load.

Figure 112:
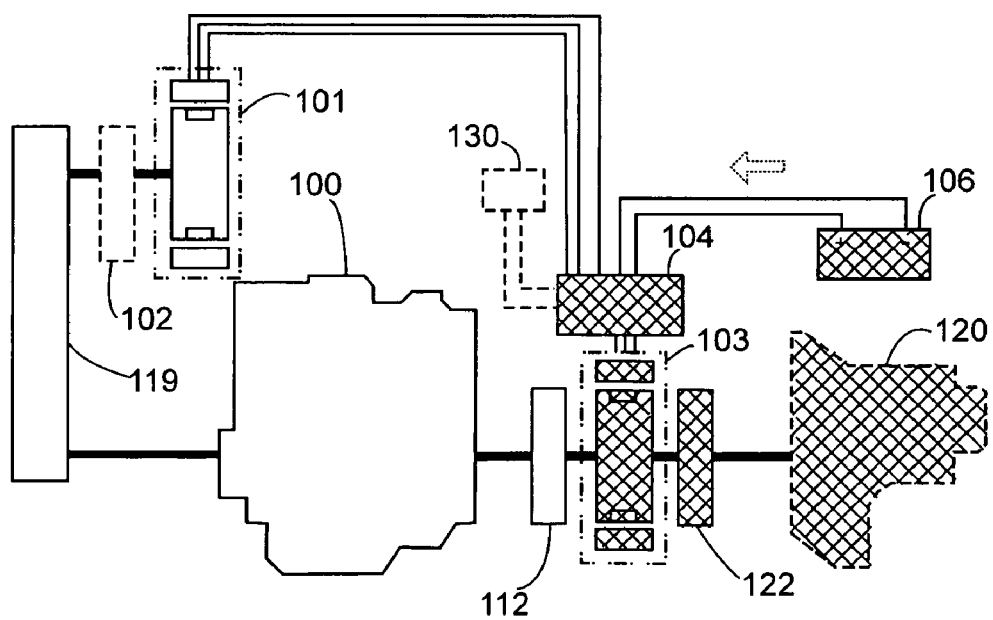
FIG. 112 is a schematic view showing that the preferred embodiment of the system illustrated in FIG. 100 operates on the power from the rechargeable device to drive the secondary dynamo-electric unit for driving the load.

FIG. 112 is a schematic view showing that the preferred embodiment of the system illustrated in FIG. 100 operates on the power from the rechargeable device to drive the secondary dynamo-electric unit for driving the load. FIG. 112 shows system function 13 provided by the preferred embodiment illustrated in FIG. 100, wherein, the power from the rechargeable device drives the secondary dynamo-electric unit to function as a motor for driving the load.

Figure 113:
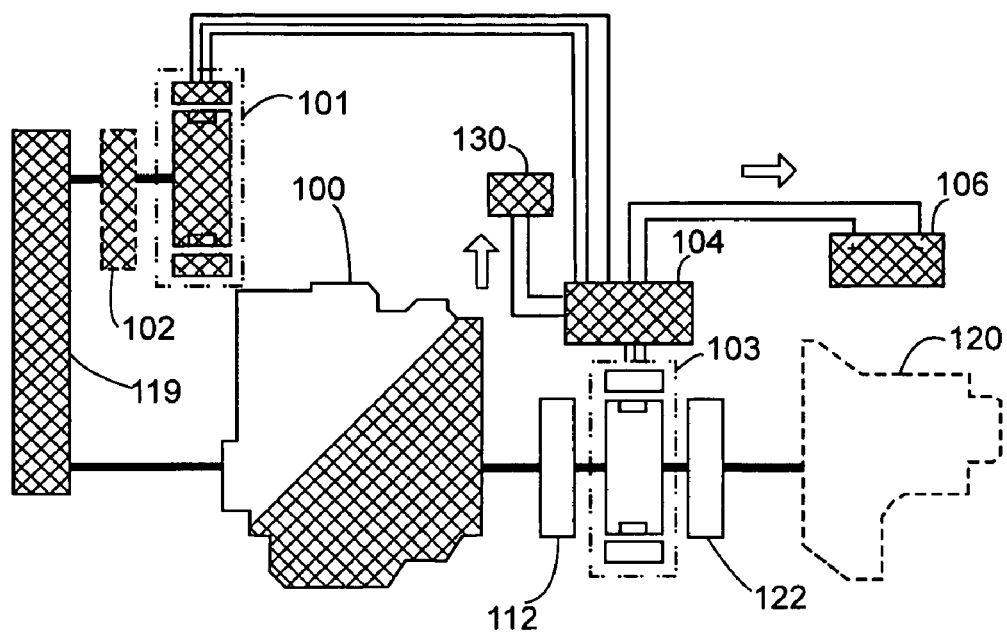
FIG. 113 is a schematic view showing that the preferred embodiment of the system illustrated in FIG. 100 operates with the engine running at a constant speed to drive the primary dynamo-electric unit to function as a generator to charge the rechargeable device or to supply power to another load.

FIG. 113 shows that the preferred embodiment of the system illustrated in FIG. 100 operates with the engine running at a constant speed to drive the primary dynamo-electric unit to function as a generator to charge the rechargeable device or to supply power to another load. FIG. 113 shows system function 15 provided by the primary dynamo-electric unit to function as a generator for charging the rechargeable device or supplying power to another load.

Figure 114:
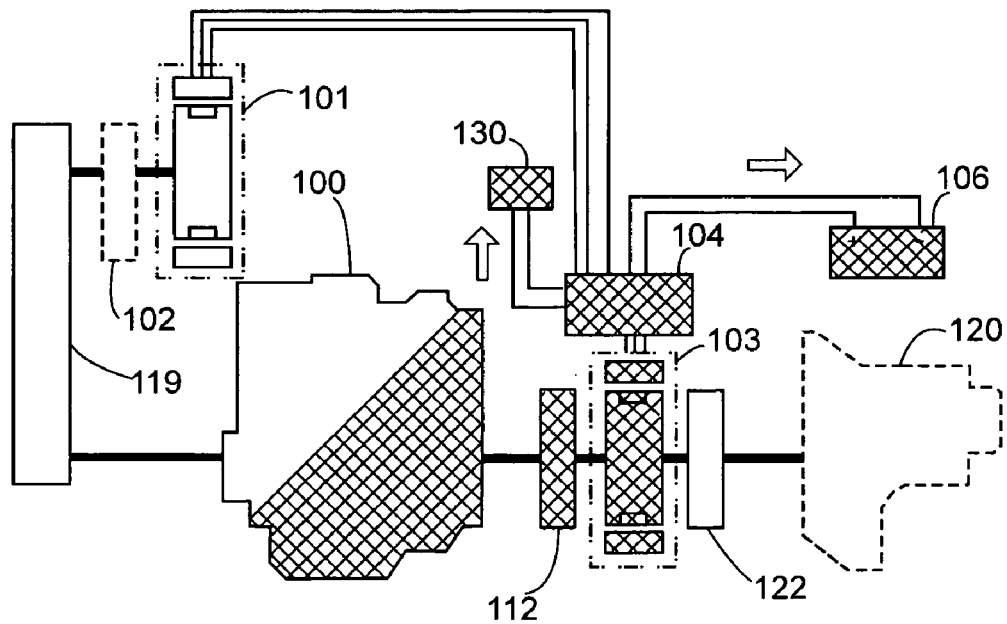
FIG. 114 is a schematic view showing that the preferred embodiment of the system illustrated in FIG. 100 operates with the engine running at a constant speed to drive the secondary dynamo-electric unit to function as a generator to charge the rechargeable device or to supply power to another load.

FIG. 114 shows that the preferred embodiment of the system illustrated in FIG. 100 operates with the engine running at a constant speed to drive the secondary dynamo-electric unit to function as a generator to charge the rechargeable device or to supply power to another load. FIG. 114 shows system function 16 provided by the preferred embodiment illustrated in FIG. 100, wherein, FIG. 114 shows system function 16 provided by the preferred embodiment illustrated in FIG. 100, wherein, the engine runs at a constant speed to drive the secondary dynamo-electric unit to function as a generator for charging the rechargeable device or supplying power to another load.

Figure 115:
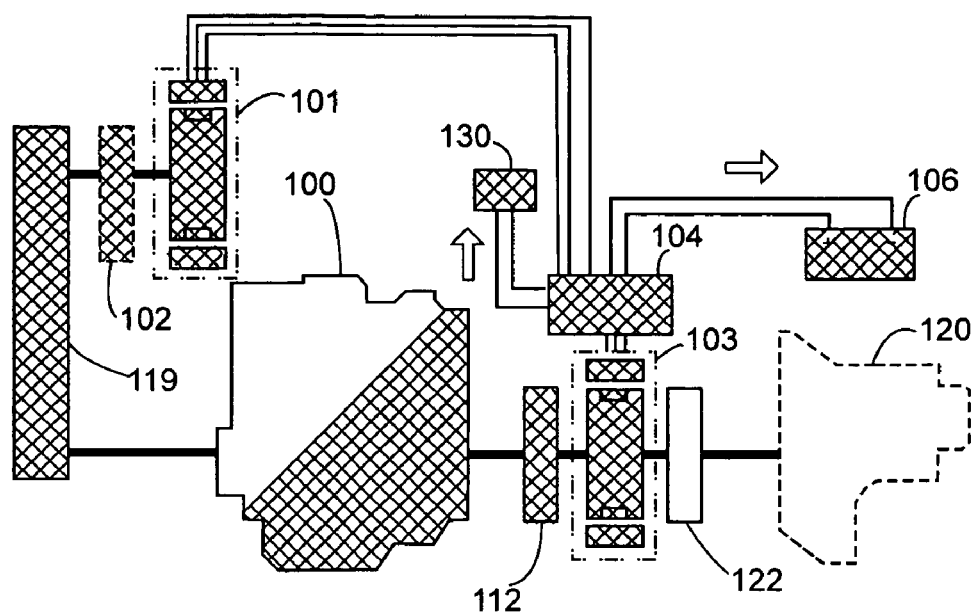
FIG. 115 is a schematic view showing that the preferred embodiment of the system illustrated in FIG. 100 operates with the engine running at a constant speed to drive both of the primary and the secondary dynamo-electric units to function as a generator to charge the rechargeable device or to supply power to another load.

FIG. 115 shows that the preferred embodiment of the system illustrated in FIG. 100 operates with the engine running at a constant speed to drive both of the primary and the secondary dynamo-electric units to function as a generator to charge the rechargeable device or to supply power to another load. FIG. 115 shows system function 17 of the preferred embodiment illustrated in FIG. 100, wherein, the engine runs at a constant speed to drive both of the primary and the secondary dynamo-electric units to function as a generator for charging the rechargeable device or supplying power to another load.

Figure 116:
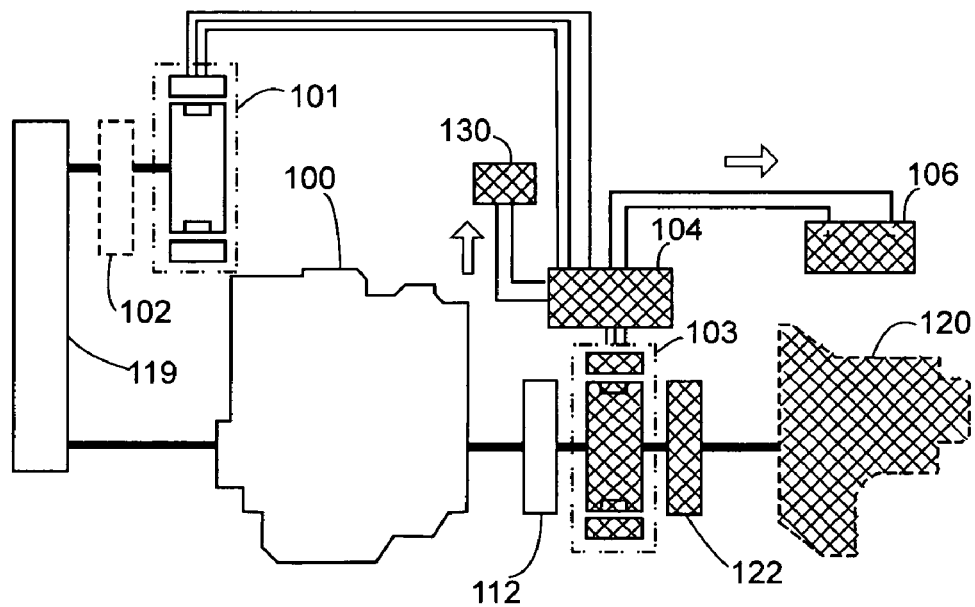
FIG. 116 is a schematic view showing that the preferred embodiment of the system illustrated in FIG. 100 has the load to draw the secondary dynamo-electric unit to regenerate by reclaiming the kinetics for charging the rechargeable device or supplying power to another load.

FIG. 116 shows that the preferred embodiment of the system illustrated in FIG. 100 has the load to draw the secondary dynamo-electric unit to regenerate by reclaiming the kinetics for charging the rechargeable device or supply- ing power to another load. FIG. 116 shows system function 19 provided by the preferred embodiment illustrated in FIG. 100, wherein, the system has the load to exercise the braking operation to draw the secondary dynamo-electric unit to function as a generator for charging the rechargeable device or supplying power to another load.

Figure 117:
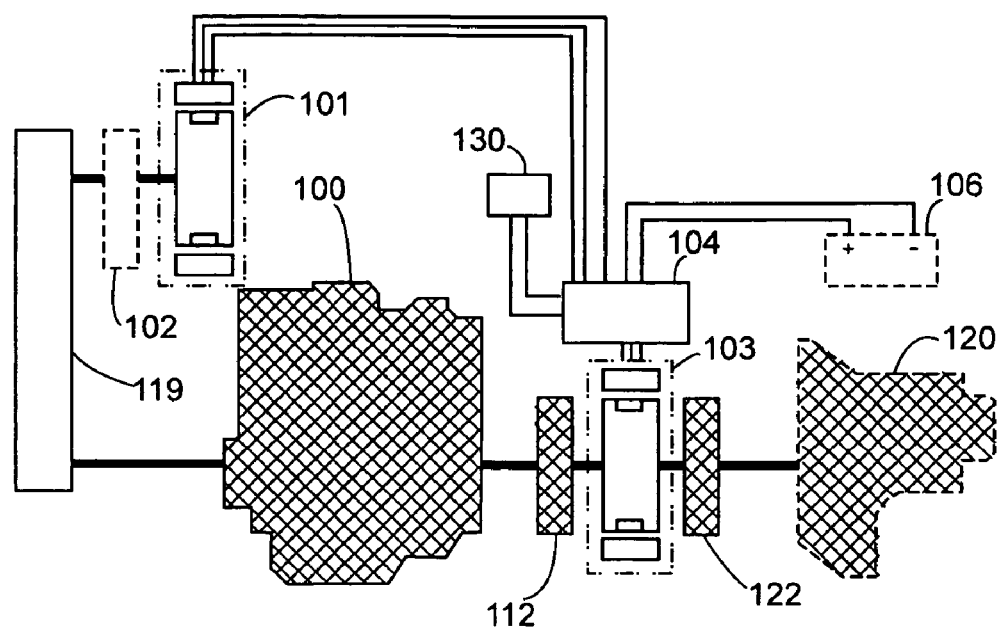
FIG. 117 is a schematic view showing that the preferred embodiment of the system illustrated in FIG. 100 has the mechanical damper of the engine to exercise the brake on the load.

FIG. 117 shows that the preferred embodiment of the system illustrated in FIG. 100 has the mechanical damper of the engine to exercise the brake on the load. FIG. 117 shows system function 21 provided by the preferred embodiment illustrated in FIG. 100, wherein, the mechanical damper from the engine exercises the braking operation on the load.

Figure 118:
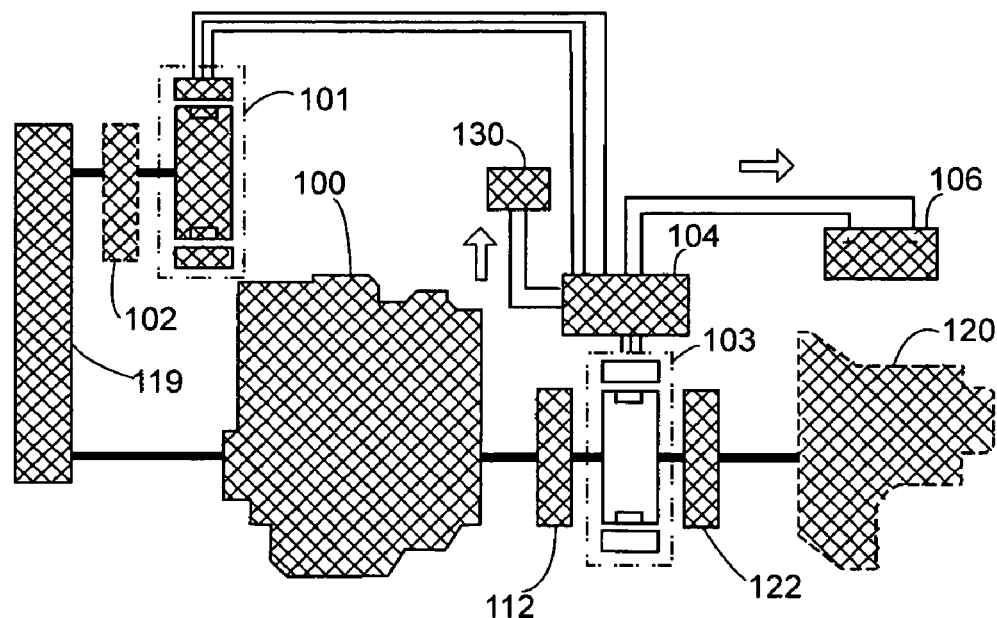
FIG. 118 is a schematic view showing that the preferred embodiment of the system illustrated in FIG. 100 has the mechanical damper of the engine to exercise a brake on the load and to drive the primary dynamo-electric unit to regenerate for charging the rechargeable device or supplying power to another load.

FIG. 118 shows that the preferred embodiment of the system illustrated in FIG. 100 has the mechanical damper of the engine to exercise a brake on the load and to drive the primary dynamo-electric unit to regenerate for charging the rechargeable device or supplying power to another load. FIG. 118 shows system function 22 provided by the pre- ferred embodiment illustrated in FIG. 100, wherein, the mechanical damper from the engine exercise the braking operation on the load, meanwhile, the primary dynamo-electric unit functions as a generator to regenerate by reclaiming kinetics for charging the rechargeable device or supplying power to another load.

Figure 119:
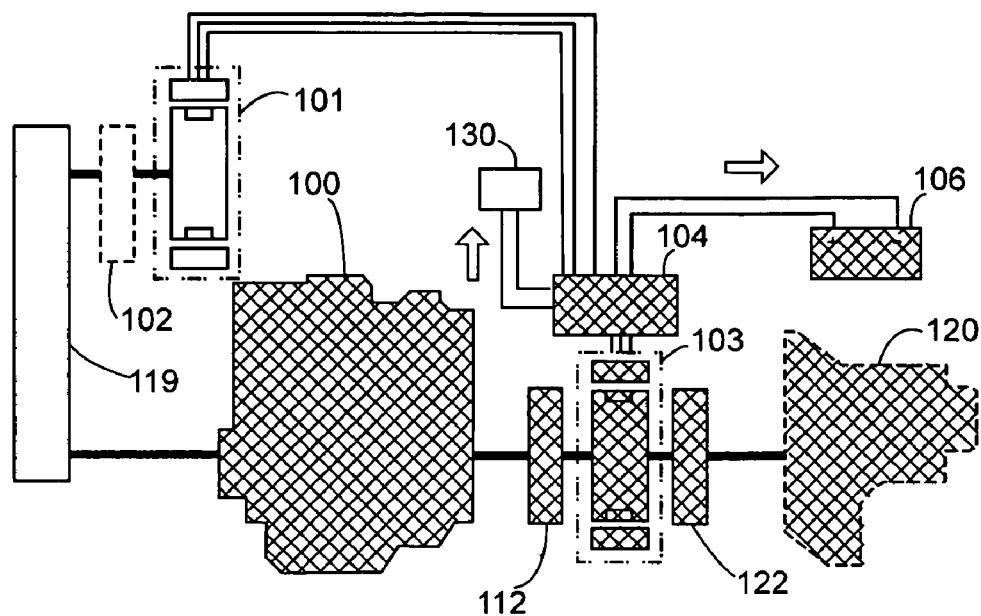
FIG. 119 is a schematic view showing that the preferred embodiment of the system illustrated in FIG. 100 has the mechanical damper of the engine to exercise a brake on the load and to drive the secondary dynamo-electric unit to regenerate for charging the rechargeable device or supplying power to another load.

FIG. 119 shows that the preferred embodiment of the system illustrated in FIG. 100 has the mechanical damper of the engine to exercise a brake on the load and to drive the secondary dynamo-electric unit to regenerate for charging the rechargeable device or supplying power to another load. FIG. 119 shows system function 23 provided by the pre- ferred embodiment illustrated in FIG. 100, wherein, he mechanical damper from the engine exercise the braking operation on the load, meanwhile, the secondary dynamo-electric unit functions as a generator to regenerate by reclaiming kinetics for charging the rechargeable device or supplying power to another load.

Figure 120:
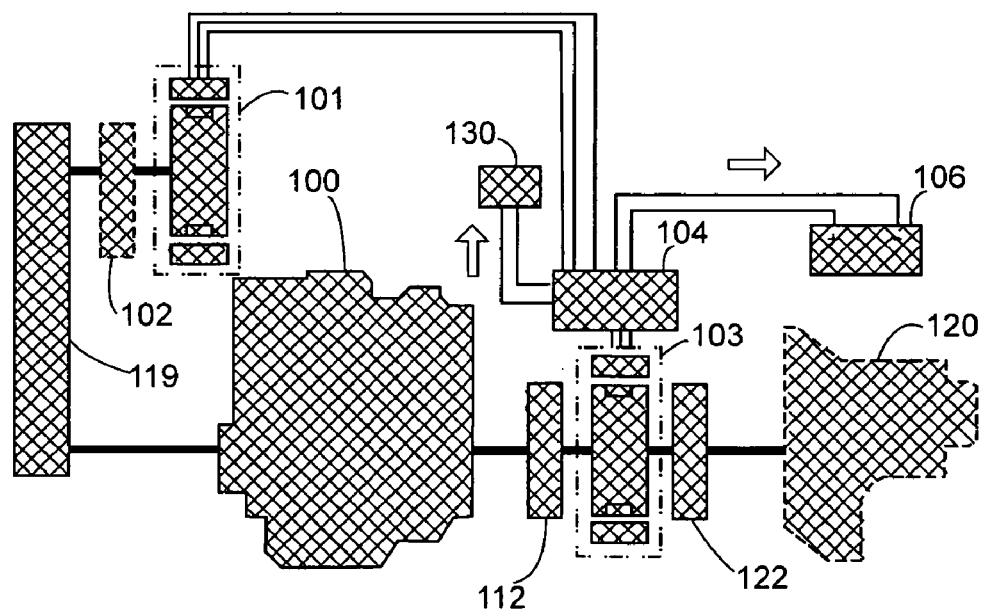

FIG. 120 is a schematic view showing that the preferred embodiment of the system illustrated in FIG. 100 has the mechanical damper of the engine to exercise a brake on the load and to drive both of the primary and the secondary dynamo-electric units to regenerate for charging the rechargeable device or supplying power to another load. FIG. 120 shows system function 24 provided by the pre- ferred embodiment illustrated in FIG. 100, wherein, the mechanical damper from the engine exercise the braking operation on the load, meanwhile, the primary and the secondary dynamo-electric units function as a generator to regenerate by reclaiming kinetics for charging the rechargeable device or supplying power to another load.

Figure 121:
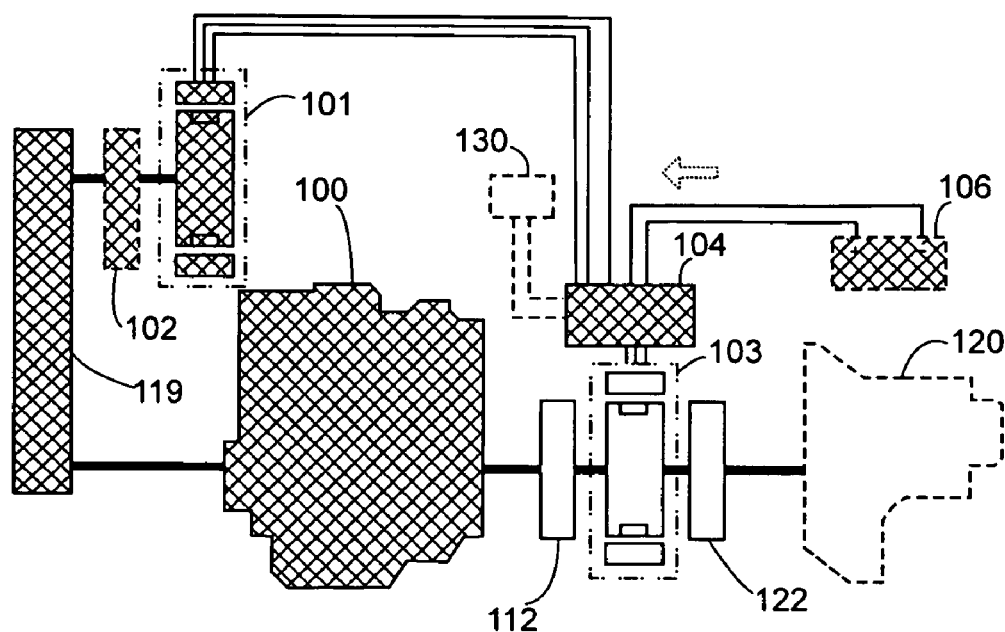

FIG. 121 is a schematic view showing that the preferred embodiment of the system illustrated in FIG. 100 operates on the power from the rechargeable device to drive the primary dynamo-electric unit to start the engine. FIG. 121 shows system function 25 provided by the preferred embodiment illustrated in FIG. 100, wherein, power from the rechargeable device drives the primary dynamo-electric unit to function as a motor to start the engine.

Figure 122:
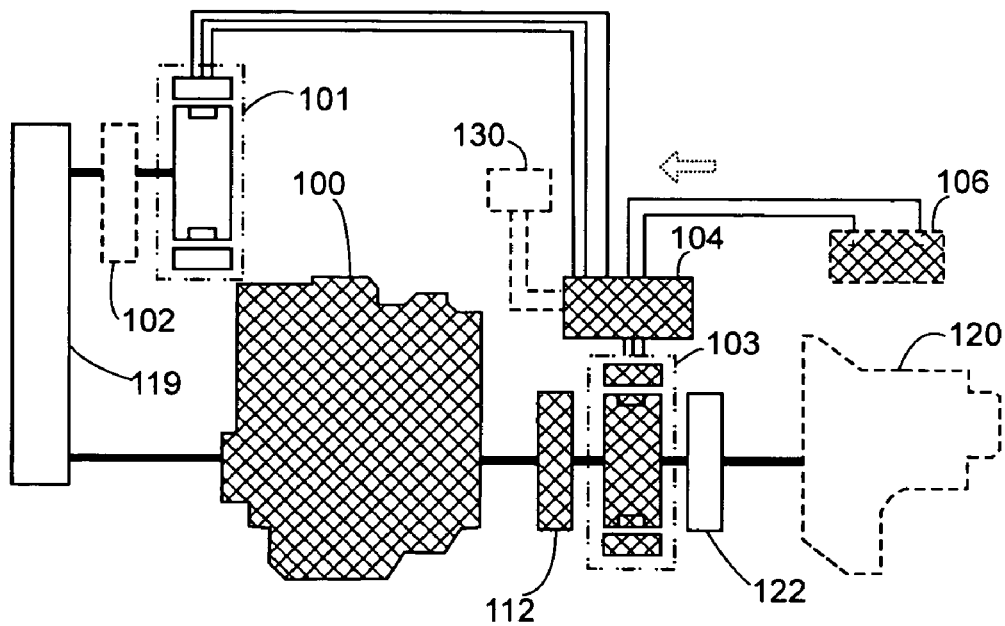

FIG. 122 is a schematic view showing that the preferred embodiment of the system illustrated in FIG. 100 operates on the power from the rechargeable device to drive the secondary dynamo-electric unit to start the engine. FIG. 122 shows system function 26 provided by the preferred embodiment illustrated in FIG. 100, wherein, power from the rechargeable device drives the secondary dynamo-electric unit to function as a motor to start the engine.

Figure 123:
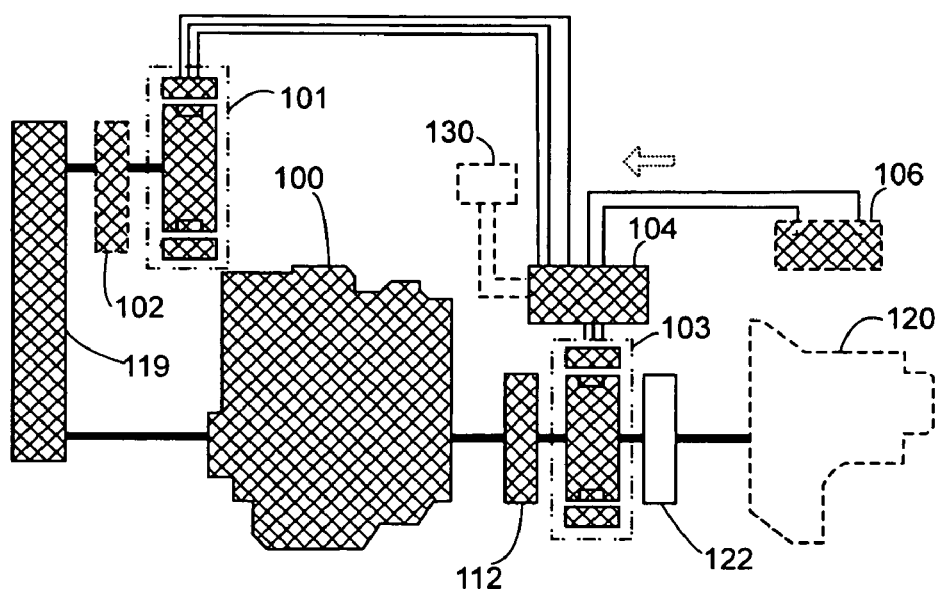

FIG. 123 is a schematic view showing that the preferred embodiment of the system illustrated in FIG. 100 operates on the power from the rechargeable device to drive both of the primary and the secondary dynamo-electric units to start the engine. FIG. 123 shows system function 27 provided by the preferred embodiment illustrated in FIG. 100, wherein, power from the rechargeable device drives both of the primary and the secondary dynamo-electric units to function as a motor to start the engine.

Figure 124:
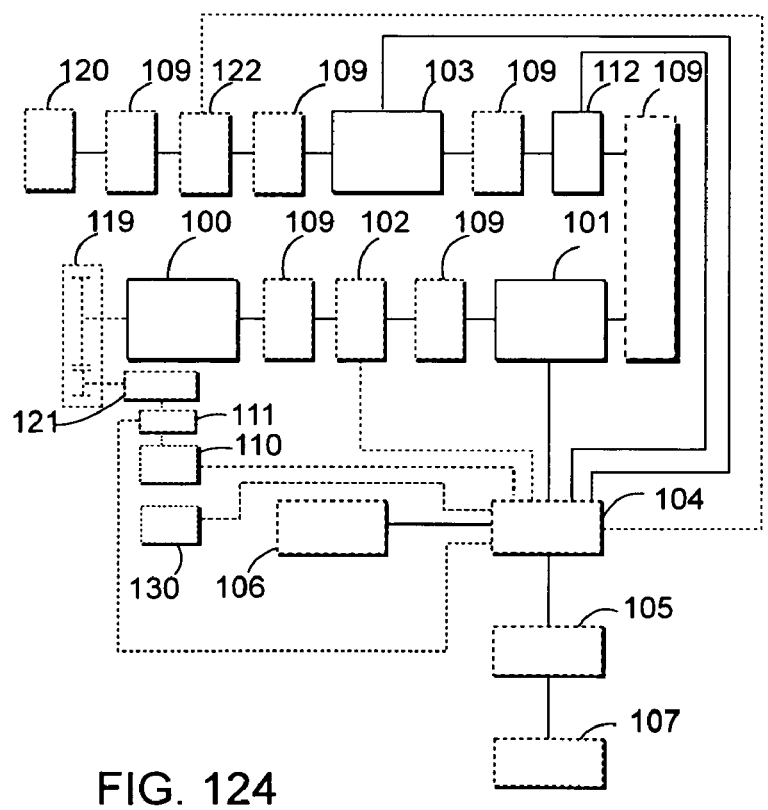

FIG. 124 is a block chart showing that the preferred embodiment of the system illustrated in FIG. 1 has different layouts of spatial configuration among the constituent units without changing the mechanism of the system. Wherein, the shaft of the engine and that of the secondary dynamo-electric unit are arranged in parallel. The structure illustrated is just for reference purpose while based on the mechanical principles illustrated in FIG. 1, 30, 54, 78 or 100, the number of the secondary dynamo-electric unit 103 may be less than, greater than or equal to that of the primary dynamo-electric unit 101 coupled to the same number of the clutch or the variable transmission unit for transmission. Wherein, those multiple secondary dynamo-electric units 103 may individually or jointly drive the load.

Figure 125:
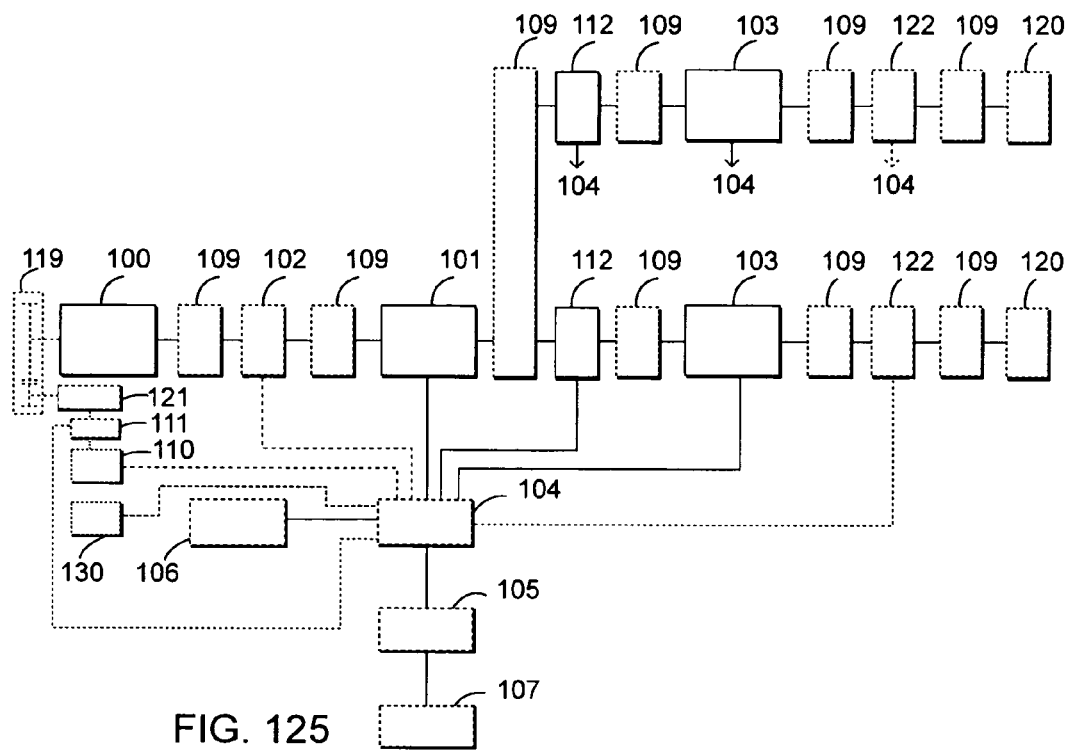

FIG. 125 is a schematic view showing that the preferred embodiment of the system illustrated in FIG. 1 engages in the distribution of power by a variable transmission unit driven by the active power source to drive in sequent two or more than two primary dynamo-electric units, clutches, and the secondary dynamo-electric units for driving the load. Wherein, the variable transmission unit 109 adapted to the output end of the active rotation power source 100 is driven by the active rotation power source 100, the individual output end of the variable transmission unit 109 is provided to respectively drive two or more than two rear end loads same as those provided by the preferred embodiment illustrated in FIG. 1 including multiple primary dynamo-electric units, clutches 112, secondary dynamo-electric units 103 and related transmission units. The variable transmission 109 for power distribution may be provided in the form of semi-automatic, or manual variable transmission device, or one with fixed speed ratio, or a differential gear set, epicyclical gear set, or other variable transmission device of the prior art.

Figure 126:
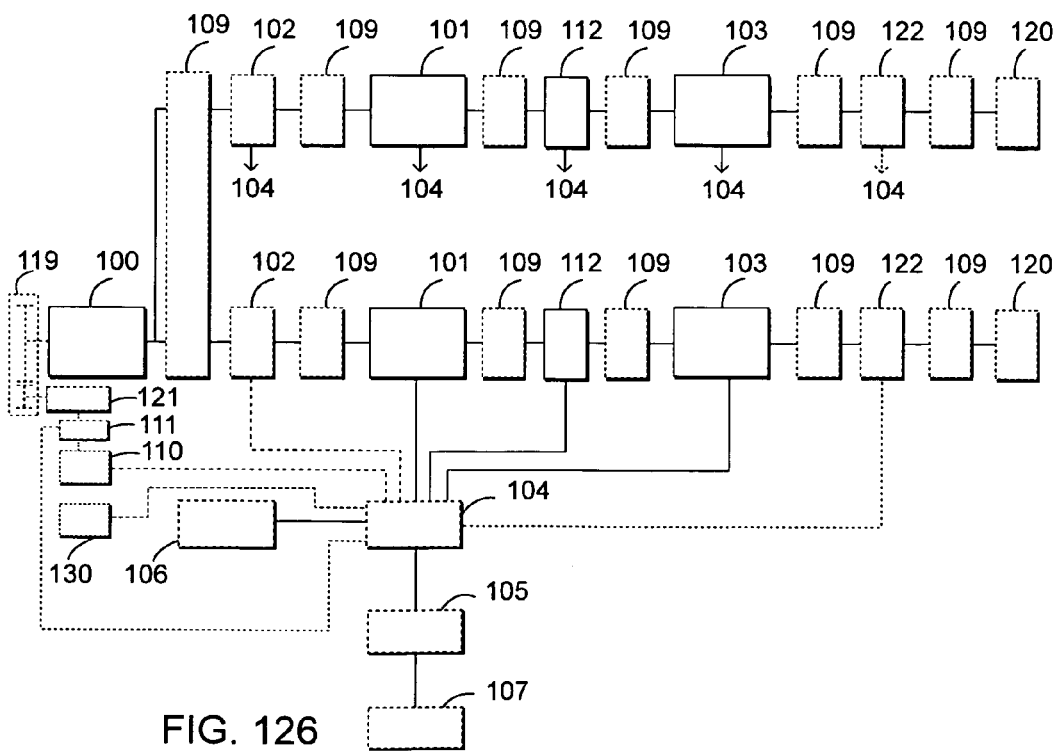

FIG. 126 is a schematic view showing that the preferred embodiment of the system illustrated in FIG. 1 engages in the distribution of power by the variable transmission unit driven by an output end from the primary dynamo-electric unit to drive in sequent two or more than two clutches, and the secondary dynamo-electric units for respectively driving the load. Wherein, the primary dynamo-electric unit 101 drives the variable transmission unit 109 adapted to the output end of the primary dynamo-electric unit 101. The individual output end of the variable transmission unit 109 is provided to respectively drive two or more than two rear end loads same as those provided by the preferred embodiment illustrated in FIG. 1 including multiple secondary dynamo-electric units, clutches 112, secondary dynamo-electric units 103 and related transmission units. The variable transmission 109 for power distribution may be provided in the form of semi-automatic, or manual variable transmission device, or one with fixed speed ratio, or a differential gear set, epicyclical gear set, or other variable transmission device of the prior art.

Figure 127:
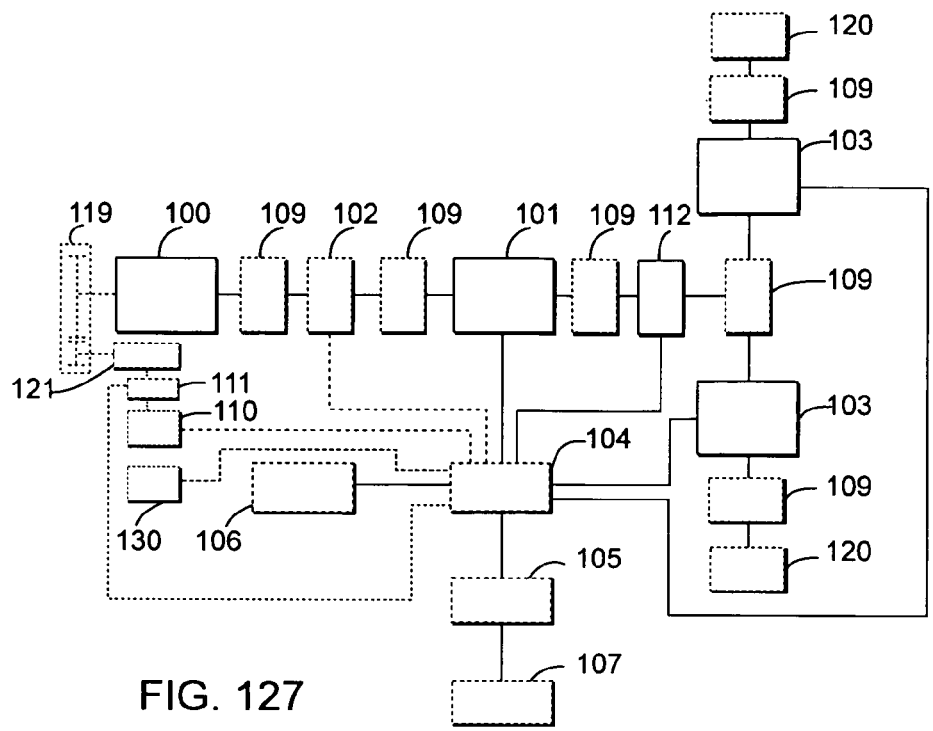

FIG. 127 is a schematic view showing that the preferred embodiment of the system illustrated in FIG. 1 has the clutch driven by the primary dynamo-electric unit to drive the variable transmission unit for power distribution so to drive two or more than two secondary dynamo-electric units. Wherein, the individual output end of the variable transmission unit 109 further driven by the clutch 112 driven by the primary dynamo-electric unit 101 is provided respectively to drive multiple rear end loads same as those provided by the preferred embodiment illustrated in FIG. 1 including multiple secondary dynamo-electric unit 103 and related transmission device. The variable transmission 109 for power distribution may be provided in the form of semi-automatic, or manual variable transmission device, or one with fixed speed ratio, or a differential gear set, epicyclical gear set, or other variable transmission device of the prior art.

Figure 128:
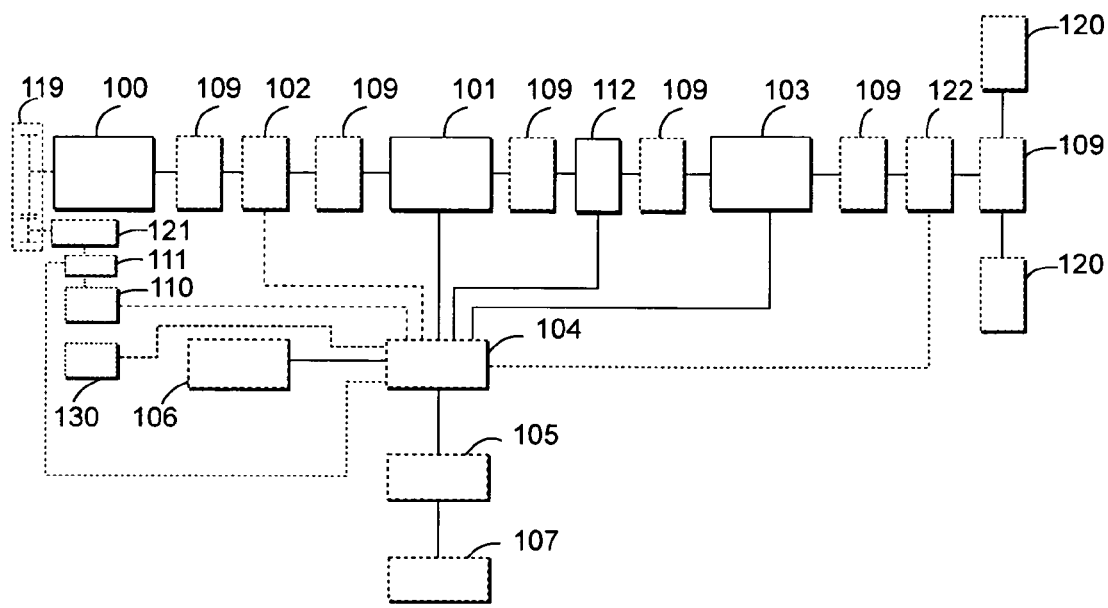

FIG. 128 is a schematic view showing that the preferred embodiment of the system illustrated in FIG. 1 has the variable unit at the output end of the system driven by the secondary dynamo-electric unit to engage in power distribution for driving two or more than two units of load. Wherein, the individual output end of the system driven by the secondary dynamo-electric unit 103 is provided respectively to drive multiple rear end loads same as those provided by the preferred embodiment illustrated in FIG. 1 including multiple loads and related transmission device. The variable transmission 109 for power distribution may be provided in the form of semi-automatic, or manual variable transmission device, or one with fixed speed ratio, or a differential gear set, epicyclical gear set, or other variable transmission device of the prior art.

Figure 129:
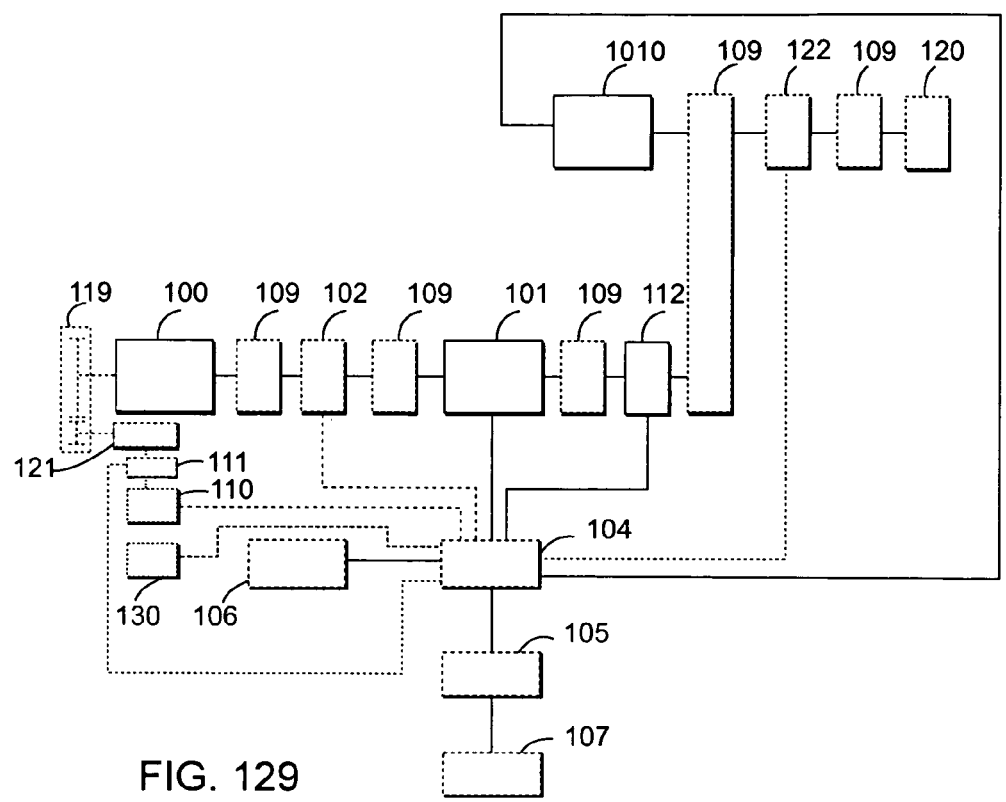

FIG. 129 is a schematic view showing that the preferred embodiment of the system illustrated in FIG. 1 has the individual output end of the variable transmission unit further driven by the clutch driven by the primary dynamo-electric unit to be respectively coupled to the rotary part of the secondary dynamo-electric unit and to the load end. Wherein, the output end of the clutch 112 driven by the primary dynamo-electric unit 101, the output end and the load end of the secondary dynamo-electric unit 103 are incorporated together by the variable transmission unit 109. The variable transmission 109 for power distribution may be provided in the form of semi-automatic, or manual variable transmission device, or one with fixed speed ratio, or a differential gear set, epicyclical gear set, or other variable transmission device of the prior art.

Figure 130:
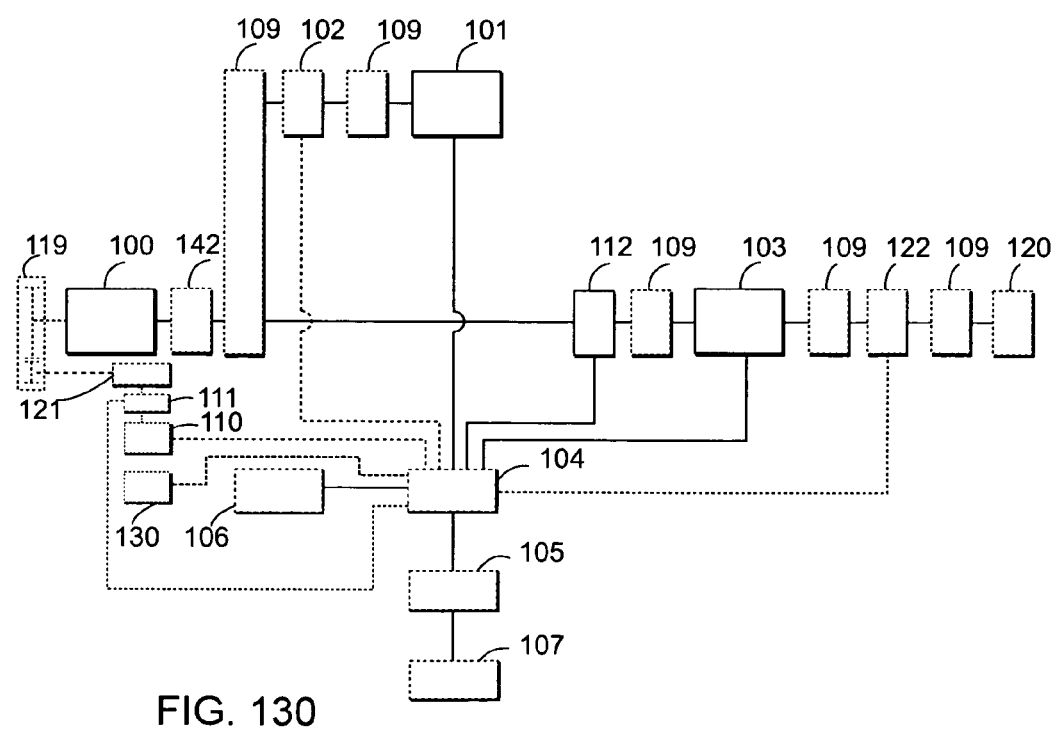

FIG. 130 is a schematic view showing that the preferred embodiment of the system illustrated in FIG. 1 has the output from the active rotation power source to be respectively coupled to the primary dynamo-electric unit through the variable transmission unit driven by the active rotation power source, and coupled to the secondary dynamo-electric unit through the clutch. Wherein, the rotation kinetics outputted by the active rotation power source 100 is directly or through the clutch 102 coupled to the primary dynamo-electric unit 101, and to the secondary dynamo-electric unit 103 through the clutch 112. The variable transmission 109 for power distribution may be provided in the form of semi-automatic, or manual variable transmission device, or one with fixed speed ratio, or a differential gear set, epicyclical gear set, or other variable transmission device of the prior art.

FIG. 131 is a schematic view showing that the preferred embodiment of the system illustrated in FIG. 1 has the output from the active rotation power source respectively coupled through the variable transmission unit driven by the active rotation power source to the primary dynamo-electric unit, and through the clutch to the individual output end of the variable transmission unit driven by the clutch for respectively driving two or more than two units of the secondary dynamo-electric units and loads. Wherein, the rotation kinetics outputted by the active rotation power source 100 may be directly coupled from the variable transmission unit 109 or through the clutch 102 to the primary dynamo-electric unit 101 and coupled to the variable transmission unit 109 through the clutch 112, together with the individual output end of the variable transmission unit 109 coupled through the clutch 112 to respectively drive multiple secondary dynamo-electric units 103 and loads. The variable transmission 109 for power distribution may be provided in the form of semi-automatic, or manual variable transmission device, or one with fixed speed ratio, or a differential gear set, epicyclical gear set, or other variable transmission device of the prior art.

FIG. 132 is a schematic view showing that the preferred embodiment of the system illustrated in FIG. 1 has two output ends with one end coupled to the first primary dynamo-electric unit and the other end coupled to the variable transmission unit comprised of clutch and differential gear set to respectively drive the load through the clutch and the secondary dynamo-electric unit.

As illustrated, one output end from the active rotation power source 100 is optionally provided with the clutch 102 and the variable transmission unit 109 to drive the primary dynamo-electric unit 101 while another output end of the active rotation power source 100 is optionally provided with the clutch 112 to respectively through the variable transmission unit 109 comprised of the differential gear set drive the individual secondary dynamo-electric unit 102 via the optionally provided clutch 1120, and to respectively directly or indirectly through the optionally provided variable transmission unit 109 to respectively drive the load 120. One or multiple primary dynamo-electric unit 101 may be driven by the active rotation power source 100; and one or multiple variable transmission unit 109 comprised of the clutch 112 and the differential gear set, the clutch 1120 adapted to the variable transmission unit 109, the secondary dynamo-electric unit 103, the variable transmission unit 109, and the load may be provided; and either or both of the clutch 112 and the clutch 1120 may be optionally provided.

When the preferred embodiment executes various functions related to the series combined power drive system, the clutch 112 or the clutch 1120 is disengaged while the active rotation power source 100 drives the primary dynamo-electric unit 101 to operate as a generator; the power so generated drives the secondary dynamo-electric unit 103 to operate as a motor for driving the load; and the clutch 112 or the clutch 1120 is closed up when the preferred embodiment executes various functions related to parallel combined power drive system.

FIG. 133 is a schematic view showing that the preferred embodiment of the system illustrated in FIG. 1 has the rotary part of the primary dynamo-electric unit to be coupled to the secondary dynamo-electric unit, and that optionally the variable transmission unit is adapted to the secondary dynamo-electric unit to drive the load and another variable transmission unit is provided between the output of the active rotation power source and the rotary part of the primary dynamo-electric unit.

As illustrated, the clutch 112 is provided between the rotary part of the primary dynamo-electric unit 101 and that of the secondary dynamo-electric unit 103; the variable transmission unit 109 is optionally provided between the rotary part of the secondary dynamo-electric unit 103 and the load 120; and the variable transmission unit 109 is provided between the rotary part of the active rotation power source 100 and that of the primary dynamo-electric unit 101.

When the preferred embodiment executes various functions related to the series combined power drive system, the clutch 112 is disengaged while the active rotation power source 100 drives the primary dynamo-electric unit 101 to operate as a generator; the power so generated drives the secondary dynamo-electric unit 103 to operate as a motor for driving the load; and the clutch 112 is closed up when the preferred embodiment executes various functions related to parallel combined power drive system.

FIG. 134 is a schematic view showing that the preferred embodiment of the system illustrated in FIG. 12 has the rotary part of the active rotation power source and where between the rotary part and the clutch of the primary dynamo-electric unit coupled by means of the variable transmission unit, and that the output end of the clutch is provided for copulation to the rotary part of the secondary dynamo-electric unit while a variable transmission unit is optionally provided at where between the rotary part of the secondary dynamo-electric unit and the load.

As illustrated, the rotary part of the active rotation power source 100, the rotary part of the primary dynamo-electric unit 101, and the input end of the clutch 112 jointly engage in coupled transmission by means of the variable transmission unit 109; the output end of the clutch is provided for copulation to the rotary part of the secondary dynamo-electric unit 103; and the variable transmission unit 109 is optionally provided between the rotary part of the secondary dynamo-electric unit 103 and the load 120.

When the preferred embodiment executes various functions related to the series combined power drive system, the clutch 112 is disengaged while the active rotation power source 100 drives the primary dynamo-electric unit 101 to operate as a generator; the power so generated drives the secondary dynamo-electric unit 103 to operate as a motor for driving the load; and the clutch 112 is closed up when the preferred embodiment executes various functions related to parallel combined power drive system.

FIG. 135 is a schematic view showing that the preferred embodiment as illustrated in FIG. 1 that has the active rotation power source respectively coupled to the primary and secondary dynamo-electric units via epicyclical gear, clutch and brake; and the output from the variable transmission unit is used to drive the load.

As illustrated, the output shaft of the active rotation power source is coupled to an epicyclical gear 803 of an epicyclical gear set 801 while the rotary part of the primary dynamo-electric unit 101 coupled to a sun gear 802 of the epicyclical gear set 801; at where between the rotary part and the static part of the primary dynamo-electric unit 101 optionally functions as a motor to output rotation kinetics, or as a generator to create damper while outputting the power, so to allow the rotation kinetics from the active rotation power source 100 to be outputted from an external gear 804; alternatively, at where between the rotary part and the static part of the primary dynamo-electric unit 101 provides the operation of electromechanical lockup by manipulating the drive control unit 104, and the lockup function is optionally replaced by the brake 902 while the rotary part of the primary dynamo-electric unit 101 is coupled to the rotary side of the brake 902 and the static side of the brake 902 is locked to the casing of the system or to the static part of the primary dynamo-electric unit 101. Accordingly, when the primary dynamo-electric unit 101 is in lockup status, the rotation kinetics from the active rotation power source 100 is outputted through the external gear 804.

When the primary dynamo-electric unit 101 as driven by the active rotation power source 100 functions as a generator, the brake 901 must be installed and the external gear 804 of the epicyclical gear set 801 is coupled to the input end of the clutch 112 and to the rotary side of the brake 901, the static side of the brake 901 is locked to the casing of the system. Another end of the clutch 112 may be directly coupled to the rotary part of the secondary dynamo-electric unit 103 or through the optionally installed variable transmission 109. Both of the clutch 112 and the brake 901 may be separately provided or share the same structure. When the brake 901 is closed and the clutch 112 is disengaged, the external gear 804 is locked up, the active rotation power source 100 independently drive the sun gear of the epicyclical gear 803 thus further to drive the primary dynamo-electric unit 101 to function as a generate for driving the secondary dynamo-electric unit 103 to engage in series combined power output and/or charge the rechargeable device 106. Alternatively, the power respectively supplied from the primary dynamo-electric unit 101 and the rechargeable device 106 jointly drives the secondary dynamo-electric unit 103 to function as a motor. The secondary dynamo-electric unit 103 is capable of jointly driving the load 120 with the rotation kinetics from the active rotation power source 100 when the clutch 112 is closed, and independently functioning as a motor or as a brake for regeneration when the clutch 112 is disengaged. Optionally, the secondary dynamo-electric unit 103 directly drives from its rotary part, or indirectly through the optional variable transmission unit 109 or other transmission device, one or multiple load 120; alternatively, the rotary part of the secondary dynamo-electric unit 103 is coupled to the input end of the differential variable transmission unit 109 for both output ends of the differential variable transmission unit 109 to drive the adapted load 120.

When the preferred embodiment exercises various functions related to the series combination power drive system, the clutch 112 may be disengaged and the brake 901 is in its braking status to lock up the external gear 804 of the epicyclical gear set 801 and the primary dynamo-electric unit 101 is engaged in rotation drive as a generator or a motor. If the brake 902 is installed to the system, the brake 902 may be controlled to stay in disengaged status for the active rotation power source 100 to drive the primary dynamo-electric unit 101 for functioning as a generator, the power so generated is used to drive the secondary dynamo-electric unit 103 for functioning as a motor to drive the load. When the preferred embodiment is engaged in the operation for various functions related to the parallel combined power drive system, the clutch 112 is closed and the brake 901 is disengaged, the rotary part and the static part of the primary dynamo-electric unit 101 provides electromagnetic lockup, or when the brake 902 is installed, the brake 902 is in closed status.

FIG. 136 is a schematic view showing that the preferred embodiment as illustrated in FIG. 1 has the active rotation power source respectively coupled to the primary dynamo-electric unit and to the secondary dynamo-electric unit through the epicyclical gear set and the brake; and the output from the variable transmission unit is used to drive the load.

As illustrated, the output end of the active rotation power source 100 is coupled to a first I/O end 501 of a revolving gear set while the rotary part of the primary dynamo-electric unit 101 is coupled to a second input end 502 of the revolving gear set 1030. By manipulating with the drive control unit 104, the operation between the rotary part and the static part of the primary dynamo-electric unit optionally functions as a motor to output the rotation kinetics or as a generator to produce damper during the output of power. The damper so created allows the rotation kinetics from the active rotation power source 100 to be outputted from an external gear 804; alternatively, at where between the rotary part and the static part of the primary dynamo-electric unit 101 provides the operation of electromechanical lockup by manipulating the drive control unit 104, and the lockup function is optionally replaced by the brake 902 while the rotary part of the primary dynamo-electric unit 101 is coupled to the rotary side of the brake 902 and the static side of the brake 902 is locked to the casing of the system or to the static part of the primary dynamo-electric unit 101. Accordingly, when the primary dynamo-electric unit 101 is in lockup status, the rotation kinetics from the active rotation power source 100 is outputted through a third I/O end 503 of the revolving gear set 1030.

When the primary dynamo-electric unit 101 as driven by the active rotation power source 100 functions as a generator, the brake 901 must be installed and the third I/O end of the revolving gear set 1030 is coupled to the input end of the clutch 112 and to the rotary side of the brake 901, the static side of the brake 901 is locked to the casing of the system. Another end of the clutch 112 may be directly coupled to the rotary part of the secondary dynamo-electric unit 103 or through the optionally installed variable transmission 109. Both of the clutch 112 and the brake 901 may be separately provided or share the same structure. When the brake 901 is closed and the clutch 112 is disengaged, the third I/O end of the revolving gear set 1030 is locked up, the active rotation power source 100 independently drive through a first I/O end 501 to further drive a second I/O end 502 for pushing forward the primary dynamo-electric unit 101 to function as a generator; the power so generated drives the secondary dynamo-unit 103 to execute series combined power output and/or recharge the rechargeable device 106. Alternatively, the power respectively supplied from the primary dynamo-electric unit 101 and the rechargeable device 106 jointly drives the secondary dynamo-electric unit 103 to function as a motor. The secondary dynamo-electric unit 103 is capable of jointly driving the load 120 with the rotation kinetics from the active rotation power source 100 when the clutch 112 is closed, and independently functioning as a motor or as a brake for regeneration when the clutch 112 is disengaged. Optionally, the secondary dynamo-electric unit 103 directly drives from its rotary part, or indirectly through the optional variable transmission unit 109 or other transmission device, one or multiple load 120; alternatively, the rotary part of the secondary dynamo-electric unit 103 is coupled to the input end of the differential variable transmission unit 109 for both output ends of the differential variable transmission unit 109 to drive the adapted load 120.

When the preferred embodiment executes various functions related to the series combined power drive system, the clutch 112 is disengaged while the active rotation power source 100 drives the primary dynamo-electric unit 101 to lock up the third I/O end 503. Wherein, the primary dynamo-electric unit 101 executes the rotation drive as a generator or a motor. If the brake 902 is installed for the system, the brake 902 can be manipulated to stay in disengaged status while the active rotation power source 100 drives the primary dynamo-electric unit 101 to function as a generator, and the power so generated is used to drive the secondary dynamo-electric unit 103 for functioning as a generator to drive the load. When the system is engaging in the operation of various functions related to the parallel combined power drive system, the clutch 112 is closed and the brake 901 is in disengaged status, and the rotary part and the static part of the primary dynamo-electric unit provides electromagnetic lockup function; or when the brake 902 is installed, the brake 902 is closed, and the rotation kinetics from the active rotation power source 100 is outputted from the first I/O end 501, the third I/O end of the revolving gear set 1030 and the clutch 112, or alternatively, the rotation kinetics from the secondary dynamo-electric unit 103 driven by the power supplied from the rechargeable device 106 and that outputted from the active rotation power source 100 jointly drive the load 120.

FIG. 137 is a schematic view showing that the preferred embodiment as illustrated in FIG. 1 has the active rotation power source is coupled to the primary dynamo-electric unit and the combined dual power dynamo-electric unit via the clutch and the output from the variable transmission unit is used to drive the load.

As illustrated, the output end of the active rotation power source 100 is coupled to the rotary part of the primary dynamo-electric unit 101 through the optionally provided clutch 102 and the variable transmission unit 109, and coupled to a first rotary part 1041 of the dual power dynamo-electric unit 1040 through the clutch 112 and the rotary part of the brake 901. The first rotary part 1041 and the second rotary part 1042 of the dual power dynamo-electric unit 1040 as manipulated by the drive control unit 104 functions as a motor to output the rotation kinetics, or functions as a generator to output the power so to produce damper during the output; and the damper so produced is used to transmit the rotation kinetics from the active rotation power source 100 for driving the load 120. Alternatively, through the manipulation of the drive control unit 104, the first and the second rotary parts 1041, 1042 of the dual power drive dynamo-electric unit 1040 provides electromagnetic lockup for transmission of the rotation kinetics; wherein, alternatively, the clutch 122 may provide the lockup instead. The clutch 122 is provided at where between the first and the second rotary parts 1041, 1042 of the dual power drive dynamo-electric unit 1040 and subject to the manipulation of the control unit 104 so to transmit the rotation kinetics when the clutch 122 is closed, and when disengaged to cause the first rotary part 1041 and/or the second rotary part 1042 of the dual power drive to engage in rotary operation for the functions as provided by the dual power drive dynamo-electric unit 1040.

The clutch 112 is provided at where between the rotary part of the primary dynamo-electric unit 101 and the first rotary parts of the dual power drive dynamo-electric unit 1040. The first rotary part of the dual power drive dynamo-electric unit 1040 is coupled to the rotary side of the brake 901, and the static part of the brake 901 is locked to the casing of the system. The second rotary part 1042 of the dual power drive dynamo-electric unit 1040 directly or indirectly through the variable transmission unit 109 outputs to drives the load 120. Members including the clutch 112, the brake 901, the clutch 122 and the dual power drive dynamo-electric unit 1040 may be separately provided, or share the same structure by two or more than two members thereof. With the clutch 112 closed and the brake 901 and the clutch 122 disengaged, the active rotation power source 100 drives the primary dynamo-electric 101 to function as a generator, and the power so generated is used to drive the dual power drive dynamo-electric unit 1040 to function as a motor and/or to recharge the rechargeable device 106 for the system to engage in series combined power drive operation. When both of the clutches 102, 112 are closed and both of the brake 901 and the clutch 122 are disengaged, the power generated by the primary dynamo-electric unit 101 and/or that from the rechargeable device 106 drive the dual power drive dynamo-electric unit 1040 for the rotation kinetics of the dual power drive dynamo-electric unit 1040 and those from the active rotation power source 100 to provide output of summarized speed; or alternatively, the differential generation effects produced by the differential motion between the first and the second rotary parts 1041, 1042 of the dual power drive dynamo-electric unit 1040 recharges the rechargeable device 106, or both functions of the rotation kinetics from the dual power drive dynamo-electric unit 1040, the summarized speed output from the active rotation power source 100 as well as the differential generation effects operate at the same time. With the brake 901 disengaged, and all clutches 102,112, 122 closed, the dual power drive dynamo-electric unit 1040 transmits the rotation kinetics from the active rotation power source 100 to drive the load 120; or independently functions as a motor or as a brake for power regeneration with the clutch 122 disengaged and the brake 901 closed. With both clutches 112, 122 disengaged and the brake 901 locked up, either or both of the power generated form the primary dynamo-electric unit 101 and that from the rechargeable device 106 jointly drive the dual power drive dynamo-electric unit 1040 to function as a motor. Optionally, the second rotary part 1042 of the dual power drive dynamo-electric unit 1040 directly or indirectly through the variable transmission 109 or other transmission device drives one or multiple load 120; or the second rotary part 1042 of the dual power drive dynamo-electric unit 1040 is coupled to the input end of the variable transmission unit 109 that provides differential motion for both output ends capable of providing differential motion of the differential variable transmission unit 109 to drive the adapted load 120.

In providing the operation of various functions related to the series combined power drive system by the preferred embodiment, the clutch 112 and the brake 901 are manipulated to stay in disengaged status while the active rotation power source 100 drives the primary dynamo-electric unit 101 to function as a generator. The power so generated drives the dual power drive dynamo-electric unit 1040 to function as a generator to drive the load. In the operation of various functions related to the series and parallel combined power drive system, the clutch 112 is closed and the brake 901 is disengaged.

FIG. 138 is a schematic view showing that the preferred embodiment as illustrated in FIG. 137 has installation of various shafts by having the primary dynamo-electric unit and the active rotary power source coupled to a multi-shaft transmission variable unit; and the output end of the active rotation power source drives the load as driven by the dual power dynamo-electric unit through the clutch.

As illustrated, the output end of the active rotation power source 100 is coupled to a multi-shaft variable transmission unit 109, and one of the output ends of the variable transmission unit 109 drives the primary dynamo-electric unit 101 through the optional clutch 102 while other selected output ends of the multi-shaft variable transmission unit 109 is coupled to the first rotary part 1041 of the dual power drive dynamo-electric unit 1040 through the clutch 112 and the rotary part of the brake 901. As manipulated by the driver control unit 104, the first and the second rotary parts 1041, 1042 of the dual power drive dynamo-electric unit 1040 function as a motor to output rotation kinetics, or as a generator to output power so to produce damper during the output of power to transmit the rotation kinetics from the active rotation power source 100 to drive the load 120, or by the manipulation of the drive control unit 104, the electromagnetic lockup operation is provided at where between the first and the second rotary parts 1041, 1042 of the dual power drive dynamo-electric unit 1040 to transmit the rotation kinetics. The clutch 122 may optionally provide the electromagnetic lockup function instead. The clutch 122 is provided between the first and the second rotary parts 1041, 1042 of the dual power drive dynamo-electric unit 1040 and subject to the manipulation by the control unit 104 to transmit the rotation kinetics when the clutch 122 is closed; and to cause the first rotary part 1041 and/or the second rotary part 1042 of the dual power drive dynamo-electric unit 1040 to engage in rotation for providing the dynamo-electric functions as expected from the dual power drive dynamo-electric unit when the clutch 122 is disengaged.

The first rotary part 1041 of the dual power drive dynamo-electric unit 1040 is coupled to the rotary side of the brake 901, and the static side of the brake 901 is locked to the casing of the system. The second rotary part 1042 of the dual power drive dynamo-electric unit 1040 directly or indirectly through the optionally provided variable transmission 109 outputs to drive the load 120. Members including the clutch 112, the brake 901, the clutch 122 and the dual power drive dynamo-electric unit 1040 may be separately provided, or share the same structure by two or more than two members thereof. With the clutch 112 closed and the brake 901 and the clutch 122 disengaged, the active rotation power source 100 drives the primary dynamo-electric 101 to function as a generator, and the power so generated is used to drive the dual power drive dynamo-electric unit 1040 to function as a motor and/or to recharge the rechargeable device 106 for the system to engage in series combined power drive operation. When both of the clutches 102, 112 are closed and both of the brake 901 and the clutch 122 are disengaged, the power generated by the primary dynamo-electric unit 101 and/or that from the rechargeable device 106 drive the dual power drive dynamo-electric unit 1040 for the rotation kinetics of the dual power drive dynamo-electric unit 1040 and those from the active rotation power source 100 to provide output of summarized speed; or alternatively, the differential generation effects produced by the differential motion between the first and the second rotary parts 1041, 1042 of the dual power drive dynamo-electric unit 1040 recharges the rechargeable device 106, or both functions of the rotation kinetics from the dual power drive dynamo-electric unit 1040, the summarized speed output from the active rotation power source 100 as well as the differential generation effects operate at the same time. With the brake 901 disengaged, and all clutches 102, 112, 122 closed, the dual power drive dynamo-electric unit 1040 transmits the rotation kinetics from the active rotation power source 100 to drive the load 120; or independently functions as a motor or as a brake for power regeneration with the clutch 122 disengaged and the brake 901 closed. With both clutches 112, 122 disengaged and the brake 901 locked up, either or both of the power generated form the primary dynamo-electric unit 101 and that from the rechargeable device 106 jointly drive the dual power drive dynamo-electric unit 1040 to function as a motor. Optionally, the second rotary part 1042 of the dual power drive dynamo-electric unit 1040 directly or indirectly through the variable transmission 109 or other transmission device drives one or multiple load 120; or the second rotary part 1042 of the dual power drive dynamo-electric unit 1040 is coupled to the input end of the variable transmission unit 109 that provides differential motion for both output ends capable of providing differential motion of the differential variable transmission unit 109 to drive the adapted load 120.

In providing the operation of various functions related to the series combined power drive system by the preferred embodiment, the clutch 112 and the brake 901 are manipulated to stay in disengaged status while the active rotation power source 100 drives the primary dynamo-electric unit 101 to function as a generator. The power so generated drives the dual power drive dynamo-electric unit 1040 to function as a generator to drive the load. In the operation of various functions related to the series and parallel combined power drive system, the clutch 112 is closed and the brake 901 is disengaged.

FIG. 139 is a schematic view showing that another preferred embodiment yet of the system of the present invention that both the primary and the secondary dynamo-electric units share the same structure. As illustrated, the primary and the secondary dynamo-electric units 101, 103 are comprised of an external dynamo-electric structure 1011, a central dynamo-electric structure 1012 and an internal dynamo-electric structure 1013 in a co-axial construction of three circles. Wherein, the external dynamo-electric structure 1011 and the exterior part of the central dynamo-electric structure 1012 coupled to the external dynamo-electric structure 1011 by way of dynamo-electric effects provide the functions otherwise provided by the primary dynamo-electric unit 101; while the internal dynamo-electric structure 1013 and the interior part of the central dynamo-electric structure 1012 coupled to the internal dynamo-electric structure 1013 by way of dynamo-electric effects provide the functions otherwise provided by the secondary dynamo-electric unit 103. The central dynamo-electric structure 1012 providing the dynamo-electric effects and sharing the same structure is fixed to the casing of the system without engaging in rotation. The external dynamo-electric structure 1011 is directly or indirectly coupled to the active rotation power source 109 through the optionally provided clutch 102 or the variable transmission unit 109. The clutch 112 is provided at where between the external and the internal dynamo-electric structures 1011, 1013. The internal dynamo-electric structure 1013 is directly coupled to the load 120 driven by it, or drives the load 120 through the optionally provided clutch 122 or the variable transmission unit 109. The load coupled to the rotary part of the secondary dynamo-electric unit 103 is optionally coupled from the rotary part of the secondary dynamo-electric unit 103 to the input end of the variable transmission unit 109 capable of exercising differential motion for both output ends capable of exercising differential motion of the differential variable transmission unit 109 to drive the load adapted thereto.

FIG. 140 is another schematic view showing that another preferred embodiment yet of the system of the present invention that both the primary and the secondary dynamo-electric units share the same structure. As illustrated, the primary and the secondary dynamo-electric units 101, 103 are comprised of an external dynamo-electric structure 1011, a central dynamo-electric structure 1012 and an internal dynamo-electric structure 1013 in a co-axial construction of three circles. Wherein, the external dynamo-electric structure 1012 and the exterior part of the central dynamo-electric structure 1012 coupled to the external dynamo-electric structure 1011 by way of dynamo-electric effects provide the functions otherwise provided by the primary dynamo-electric unit 101; while the internal dynamo-electric structure 1013 and the interior part of the central dynamo-electric structure 1012 coupled to the internal dynamo-electric structure 1013 by way of dynamo-electric effects provide the functions otherwise provided by the secondary dynamo-electric unit 103. The central dynamo-electric structure 1012 providing the dynamo-electric effects and sharing the same structure is fixed to the casing of the system without engaging in rotation. The central dynamo-electric structure 1012 is directly or indirectly coupled to the active rotation power source 109 through the optionally provided clutch 102 or the variable transmission unit 109. The clutch 112 is provided at where between the central and the internal dynamo-electric structures 1012, 1013. The internal dynamo-electric structure 1013 is directly coupled to the load 120 driven by it, or drives the load 120 through the optionally provided clutch 122 or the variable transmission unit 109. The load coupled to the rotary part of the secondary dynamo-electric unit 103 is optionally coupled from the rotary part of the secondary dynamo-electric unit 103 to the input end of the variable transmission unit 109 capable of exercising differential motion for both output ends capable of exercising differential motion of the differential variable transmission unit 109 to drive the load adapted thereto.

The series and parallel combined dual power drive system of the present invention allows arrangements of various spatial configurations without changing the mechanism of the system, and will not be elaborated herein.

To sum up, the series and parallel combined dual power drive system provides the operation as the series combined power system or as the parallel combined power system. While operating as the parallel combined power system for the rotation kinetics from the engine to drive the load at high power and high efficiency, the system can be switched to operate as the series combined power system with the engine unit to drive the primary dynamo-electric unit to function as generator with the power outputted to drive the secondary dynamo-electric unit to function as a motor for driving the load. Furthermore, the optional rechargeable device may or may not be provided; if provided, the power from the rechargeable device drives either or both of the primary and the secondary dynamo-electric units for driving the load or jointly driving the load with the power from the active rotation power source; or the load inversely drives either or both of the primary and the secondary dynamo-electric units to exercise the brake by regenerated power thus to correct the flaws of lower efficiency and high pollution found with the conventional engine running at low speed. Therefore, this application for a patent is duly filed accordingly.

TABLE A

| | System Function & Fig. No. | | | | | | | |
|---|---|---|---|---|---|---|---|---|
| Unit Status | Function 1 (FIG. 3) | Function 2 (FIG. 4) | Function 3 (FIG. 5) | Function 4 (FIG. 6) | Function 5 (FIG. 7) | Function 6 (FIG. 8) | Function 7 (FIG. 9) | Function 8 (FIG. 10) |
| Active Rotation Power Source 100 | L ↔ L | Constant | L ↔ H | Constant | L ↔ H | L ↔ H | L ↔ H | L ↔ H |
| Clutch 102 | Closed | Closed | Closed | Closed | Closed | Closed | Closed | Closed |
| Primary Dynamo-Electric Unit 101 | As motor or generator | As motor or generator | As generator | As generator | Non-operating | As motor | As motor | Non-operating |
| Clutch 112 | Disengaged | Disengaged | Disengaged | Disengaged | Closed | Closed | Closed | Closed |
| Secondary Dynamo-Electric Unit 103 | As motor or generator | As motor or generator | As motor | As motor | Non-operating | As motor | Non-operating | As motor |
| Clutch 122 | Closed | Closed | Closed | Closed | Closed | Closed | Closed | Closed |
| Load 120 | Operating | Operating | Operating | Operating | Operating | Operating | Operating | Operating |
| Drive Control Unit 104 | Operation | Operating | Operating | Operating | Non-operating | Operating | Operating | Operating |
| Rechargeable Device 106 | Charge or Discharge | Charge or Discharge | | | Non-operating | Discharge | Discharge | Discharge |
| Load 130 | At Random | At Random | At Random | At Random | Non-operating | At Random | Non-operating | At Random |

| | System Function & Fig. No. | | | | | | | |
|---|---|---|---|---|---|---|---|---|
| Unit Status | Function 9 (FIG. 11) | Function 10 (FIG. 12) | Function 11 (FIG. 13) | Function 12 (FIG. 14) | Function 13 (FIG. 15) | Function 14 (FIG. 16) | Function 15 (FIG. 17) | Function 16 (FIG. 18) |
| Active Rotation Power Source 100 | L ↔ H | L ↔ H | L ↔ H | Non-operating or Idling | Non-operating or Idling | Non-operating or Idling | Constant | Constant |
| Clutch 102 | Closed | Closed | Closed | Disengaged | Disengaged | Disengaged | Closed | Closed |
| Primary Dynamo-Electric Unit 101 | As generator | Non-operating | As generator | As motor | Non-operating | As motor | As generator | Non-operating |
| Clutch 112 | Closed | Closed | Closed | Closed | Disengaged | Closed | Disengaged | Closed |
| Secondary Dynamo-Electric Unit 103 | Non-operating | As generator | As motor | Non-operating | As motor | As motor | Non-operating | As Generator |
| Clutch 122 | Closed | Closed | Closed | Closed | Closed | Closed | Disengaged | Disengaged |
| Load 120 | Operating | Operating | Operating | Operating | Operating | Operating | Non-operating | Non-operating |

TABLE A-continued

| | | | | | | | | |
|---|---|---|---|---|---|---|---|---|
| Drive Control Unit 104 | Operating | Operating | Operating | Operating | Operating | Operating | Operating | Operating |
| Rechargeable Device 106 | Charge | Charge | Charge | Discharge | Discharge | Discharge | Charge | Charge |
| Load 130 | At Random | At Random | At Random | At Random | Non-operating | At Random | At Random | At Random |

| | System Function & Fig. No. | | | | | | | |
|---|---|---|---|---|---|---|---|---|
| Unit Status | Function 17 (FIG. 3) | Function 18 (FIG. 4) | Function 19 (FIG. 5) | Function 20 (FIG. 6) | Function 21 (FIG. 7) | Function 22 (FIG. 8) | Function 23 (FIG. 9) | Function 24 (FIG. 10) |
| Active Rotation Power Source 100 | Constant | Non-operating or Idling | Non-operating or Idling | Non-operating or Idling | Damper | Damper | Damper | Damper |
| Clutch 102 | Closed | Disengaged | Disengaged | Disengaged | Closed | Closed | Closed | Closed |
| Primary Dynamo-Electric Unit 101 | As generator | As generator | Non-operating | As generator | Non-operating | As generator | Non-operating | As generator |
| Clutch 112 | Closed | Closed | Disengaged | Closed | Closed | Closed | Closed | Closed |
| Secondary Dynamo-Electric Unit 103 | As generator | Non-operating | As generator | As generator | Non-operating | Non-operating | As generator | As generator |
| Clutch 122 | Disengaged | Braking | Braking | Braking | Braking | Braking | Braking | Braking |
| Load 120 | Operating | Operating | Operating | Operating | Non-operating | Operating | Operating | Operating |
| Drive Control Unit 104 | Operating | Operating | Operating | Operating | Non-operating | Operating | Operating | Operating |
| Rechargeable Device 106 | Charge | Charge | Charge | Charge | Non-operating | Charge | Charge | Charge |
| Load 130 | At Random | At Random | At Random | At Random | At Random | At Random | At Random | At Random |

| | System Function & Fig. No. | | |
|---|---|---|---|
| Unit Status | Function 25) (FIG. 27) | Function 26 (FIG. 28) | Function 27 (FIG. 29) |
| Active Rotation Power Source 100 | Start | Start | Start |
| Clutch 102 | Closed | Closed | Closed |
| Primary Dynamo-Electric Unit 101 | As motor | Non-operating | As motor |
| Clutch 112 | Disengaged | Closed | Closed |
| Secondary Dynamo-Electric Unit 103 | Non-operating | As motor | As motor |
| Clutch 122 | Disengaged | Disengaged | Disengaged |
| Load 120 | Non-operating | Non-operating | Non-operating |
| Drive Control Unit 104 | Operation | Operating | Operating |
| Rechargeable Device 106 | Charge | Charge | Charge |
| Load 130 | At Random | At Random | At Random |

TABLE B

| | System Function & Fig. No. | | | | | | | |
|---|---|---|---|---|---|---|---|---|
| Unit Status | Function 1 (FIG. 31) | Function 2 (FIG. 32) | Function 3 (FIG. 33) | Function 4 (FIG. 34) | Function 5 (FIG. 35) | Function 6 (FIG. 36) | Function 7 (FIG. 37) | Function 8 (FIG. 38) |
| Active Rotation Power Source 100 | L ↔ L | Constant | L ↔ H | Constant | L ↔ H | L ↔ H | L ↔ H | L ↔ H |
| Clutch 102 | Closed | Closed | Closed | Closed | Closed | Closed | Closed | Closed |
| Primary Dynamo-Electric Unit 101 | As motor or generator | As motor or generator | As generator | As generator | Non-operating | As motor | As motor | Non-operating |
| Clutch 112 | Disengaged | Disengaged | Disengaged | Disengaged | Closed | Closed | Closed | Closed |
| Secondary Dynamo-Electric Unit 103 | As motor or generator | As motor or generator | As motor | As motor | Non-operating | As motor | Non-operating | As motor |
| Load 120 | Operating | Operating | Operating | Operating | Non-operating | Operating | Operating | Operating |
| Drive Control Unit 104 | Operating | Operating | Operating | Operating | Non-operating | Operating | Operating | Operating |
| Rechargeable Device 106 | Charge or Discharge | Charge or Discharge | | | Non-operating | Discharge | Discharge | Discharge |
| Load 130 | At Random | At Random | At Random | At Random | Non-operating | At Random | At Random | At Random |

TABLE B-continued

| | System Function & Fig. No. | | | | | | | |
|---|---|---|---|---|---|---|---|---|
| Unit Status | Function 9 (FIG. 39) | Function 10 (FIG. 40) | Function 11 (FIG. 41) | Function 12 (FIG. 42) | Function 13 (FIG. 43) | Function 14 (FIG. 44) | Function 15 (FIG. 45) | Function 16 (FIG. 46) |
| Active Rotation Power Source 100 | L ↔ H | L ↔ H | L ↔ H | Non-operating or Idling | Non-operating or Idling | Non-operating or Idling | Constant | Non-operating or Idling |
| Clutch 102 | Closed | Closed | Closed | Disengaged | Disengaged | Disengage | Closed | Disengaged |
| Primary Dynamo-Electric Unit 101 | As generator | Non-operating | As generator | As motor | Non-operating | As motor | As generator | As generator |
| Clutch 112 | Closed | Closed | Closed | Closed | Disengaged | Closed | Disengaged | Disengaged |
| Secondary Dynamo-Electric Unit 103 | Non-operating | As generator | As generator | Non-operating | As motor | As motor | Non-operating | As generator |
| Load 120 | Operating | Operating | Operating | Operating | Operating | Operating | Non-operating | Braking |
| Drive Control Unit 104 | Operation | Operating | Operating | Operating | Operating | Operating | Operating | Operating |
| Rechargeable Device 106 | Charge | Charge | Charge | Discharge | Discharge | Discharge | Charge | Charge |
| Load 130 | At Random | At Random | At Random | At Random | Non-operating | At Random | At Random | At Random |

| | System Function & Fig. No. | | | | | | |
|---|---|---|---|---|---|---|---|
| Unit Status | Function 19 (FIG. 47) | Function 20 (FIG. 48) | Function 21 (FIG. 49) | Function 22 (FIG. 50) | Function 23 (FIG. 51) | Function 24 (FIG. 52) | Function 25 (FIG. 53) |
| Active Rotation Power Source 100 | Non-operating or Idling | Non-operating or Idling | Damper | Damper | Damper | Damper | Start |
| Clutch 102 | Disengaged | Disengaged | Closed | Closed | Closed | Closed | Closed |
| Primary Dynamo-Electric Unit 101 | Non-operating | As generator | Non-operating | As generator | Non-operating | As generator | As motor |
| Clutch 112 | Disengaged | Closed | Closed | Closed | Closed | Closed | Disengaged |
| Secondary Dynamo-Electric Unit 103 | As generator | As generator | Non-operating | Non-operating | As generator | As generator | Non-operating |
| Load 120 | Braking | Braking | Braking | Braking | Braking | Braking | Non-operating |
| Drive Control Unit 104 | Operating | Operating | Non-operating | Operating | Operating | Operating | Operating |
| Rechargeable Device 106 | Charge | Charge | Non-operating | Charge | Charge | Charge | Discharge |
| Load 130 | At Random | At Random | At Random | At Random | Non-operating | At Random | At Random |

TABLE C

| | System Function & Fig. No. | | | | | | | |
|---|---|---|---|---|---|---|---|---|
| Unit Status | Function 1 (FIG. 55) | Function 2 (FIG. 56) | Function 3 (FIG. 57) | Function 4 (FIG. 58) | Function 5 (FIG. 59) | Function 6 (FIG. 60) | Function 7 (FIG. 61) | Function 8 (FIG. 62) |
| Active Rotation Power Source 100 | L ↔ L | Constant | L ↔ H | Constant | L ↔ H | L ↔ H | L ↔ H | L ↔ H |
| Primary Dynamo-Electric Unit 101 | As motor or generator | As motor or generator | As generator | As generator | Non-operating | As motor | As motor | Non-operating |
| Clutch 112 | Disengaged | Disengaged | Disengaged | Disengaged | Closed | Closed | Closed | Closed |
| Secondary Dynamo-Electric Unit 103 | As motor or generator | As motor or generator | As motor | As motor | Non-operating | As motor | Non-operating | As motor |
| Clutch 122 | Closed | Closed | Closed | Closed | Closed | Closed | Closed | Closed |
| Load 120 | Operating | Operating | Operating | Operating | Operating | Operating | Operating | Operating |
| Drive Control Unit 104 | Operating | Operating | Operating | Operating | Non-operating | Operating | Operating | Operating |
| Rechargeable Device 106 | Charge or Discharge | Charge or Discharge | | | Non-operating | Discharge | Discharge | Discharge |
| Load 130 | At Random | At Random | At Random | At Random | Non-operating | At Random | At Random | At Random |

| | System Function & Fig. No. | | | | | | | |
|---|---|---|---|---|---|---|---|---|
| Unit Status | Function 9 (FIG. 63) | Function 10 (FIG. 64) | Function 11 (FIG. 65) | Function 13 (FIG. 66) | Function 15 (FIG. 67) | Function 16 (FIG. 68) | Function 17 (FIG. 69) | Function 19 (FIG. 70) |
| Active Rotation Power Source 100 | L ↔ H | L ↔ H | L ↔ H | Non-operating or Idling | Constant | Constant | Constant | Non-operating or Idling |
| Primary Dynamo-Electric Unit 101 | As generator | Non-operating | As generator | Non-operating | As generator | Non-operating | As generator | Non-operating |

TABLE C-continued

| | | | | | | | | |
|---|---|---|---|---|---|---|---|---|
| Clutch 112 | Closed | Closed | Closed | Disengaged | Disengaged | Closed | Closed | Disengaged |
| Secondary Dynamo-Electric Unit 103 | Non-operating | As generator | As generator | As motor | Non-operating | As generator | As generator | As generator |
| Clutch 122 | Closed | Closed | Closed | Closed | Disengaged | Disengaged | Disengaged | Closed |
| Load 120 | Operating | Operating | Operating | Operating | Non-operating | Non-operating | Non-operating | Braking |
| Drive Control Unit 104 | Operating | Operating | Operating | Operating | Operating | Operating | Operating | Operating |
| Rechargeable Device 106 | Charge | Charge | Charge | Discharge | Charge | Charge | Charge | Charge |
| Load 130 | At Random | At Random | At Random | At Random | Non-operating | At Random | At Random | At Random |

| | System Function & Fig. No. | | | | | | |
|---|---|---|---|---|---|---|---|
| Unit Status | Function 21 (FIG. 71) | Function 22 (FIG. 72) | Function 23 (FIG. 73) | Function 24 (FIG. 74) | Function 25 (FIG. 75) | Function 26 (FIG. 76) | Function 27 (FIG. 77) |
| Active Rotation Power Source 100 | Damper | Damper | Damper | Damper | Start | Start | Start |
| Primary Dynamo-Electric Unit 101 | Non-operating | As generator | Non-operating | As generator | As motor | Non-operating | As motor |
| Clutch 112 | Closed | Closed | Closed | Closed | Disengaged | Closed | Closed |
| Secondary Dynamo-Electric Unit 103 | Non-operating | Non-operating | As generator | As generator | Non-operating | As motor | As motor |
| Clutch 122 | Closed | Closed | Closed | Closed | Disengaged | Disengaged | Disengaged |
| Load 120 | Braking | Braking | Braking | Braking | Non-operating | Non-operating | Non-operating |
| Drive Control Unit 104 | Non-operating | Operating | Operating | Operating | Operating | Operating | Operating |
| Rechargeable Device 106 | Non-operating | Charge | Charge | Charge | Discharge | Discharge | Discharge |
| Load 130 | At Random | At Random | At Random | At Random | Non-operating | At Random | At Random |

TABLE D

| | System Function & Fig. No. | | | | | | | |
|---|---|---|---|---|---|---|---|---|
| Unit Status | Function 1 (FIG. 79) | Function 2 (FIG. 80) | Function 3 (FIG. 81) | Function 4 (FIG. 82) | Function 5 (FIG. 83) | Function 6 (FIG. 84) | Function 7 (FIG. 85) | Function 8 (FIG. 86) |
| Active Rotation Power Source 100 | L ↔ L | Constant | L ↔ H | Constant | L ↔ H | L ↔ H | L ↔ H | L ↔ H |
| Primary Dynamo-Electric Unit 101 | As motor or generator | As motor or generator | As generator | As generator | Non-operating | As motor | As motor | Non-operating |
| Clutch 112 | Disengaged | Disengaged | Disengaged | Disengaged | Closed | Closed | Closed | Closed |
| Secondary Dynamo-Electric Unit 103 | As motor or generator | As motor or generator | As motor | As motor | Non-operating | As motor | Non-operating | As motor |
| Load 120 | Operating | Operating | Operating | Operating | Operating | Operating | Operating | Operating |
| Drive Control Unit 104 | Operating | Operating | Operating | Operating | Non-operating | Operating | Operating | Operating |
| Rechargeable Device 106 | Charge or Discharge | Charge or Discharge | | | Non-operating | Discharge | Discharge | Discharge |
| Load 130 | At Random | At Random | At Random | At Random | Non-operating | At Random | At Random | At Random |

| | System Function & Fig. No. | | | | | | | |
|---|---|---|---|---|---|---|---|---|
| Unit Status | Function 9 (FIG. 87) | Function 10 (FIG. 88) | Function 11 (FIG. 89) | Function 13 (FIG. 90) | Function 15 (FIG. 91) | Function 19 (FIG. 92) | Function 21 (FIG. 93) | Function 22 (FIG. 94) |
| Active Rotation Power Source 100 | L ↔ H | L ↔ H | L ↔ H | Non-operating or Idling | Constant | Non-operating or Idling | Damper | Damper |
| Primary Dynamo-Electric Unit 101 | As generator | Non-operating | As generator | Non-operating | As generator | Non-operating | Non-operating | As generator |
| Clutch 112 | Closed | Closed | Closed | Disengaged | Disengaged | Disengaged | Closed | Closed |
| Secondary Dynamo-Electric Unit 103 | Non-operating | As generator | As generator | As motor | Non-operating | As generator | Non-operating | Non-operating |
| Load 120 | Operating | Operating | Operating | Operating | Non-operating | Braking | Braking | Braking |
| Drive Control Unit 104 | Operating | Operating | Operating | Operating | Non-operating | Operating | Non-operating | Operating |
| Rechargeable Device 106 | Charge | Charge | Charge | Discharge | Charge | Charge | Non-operating | Charge |
| Load 130 | At Random | At Random | At Random | At Random | Non-operating | At Random | At Random | At Random |

TABLE D-continued

| | | System Function & Fig. No. | | | | |
|---|---|---|---|---|---|---|
| Unit Status | | Function 23 (FIG. 95) | Function 24 (FIG. 96) | Function 25 (FIG. 97) | Function 26 (FIG. 98) | Function 27 (FIG. 99) |
| | Active Rotation Power Source 100 | Damper | Damper | Start | Start | Start |
| | Primary Dynamo-Electric Unit 101 | Non-operating | As generator | As motor | Non-operating | As motor |
| | Clutch 112 | Closed | Closed | Disengaged | Closed | Closed |
| | Secondary Dynamo-Electric Unit 103 | As generator | As generator | Non-operating | As motor | As motor |
| | Load 120 | Braking | Braking | Non-operating | Non-operating | Non-operating |
| | Drive Control Unit 104 | Operating | Operating | Operating | Operating | Operating |
| | Rechargeable Device 106 | Charge | Charge | Discharge | Discharge | Discharge |
| | Load 130 | At Random | At Random | At Random | At Random | At Random |

TABLE E

| | System Function & Fig. No. | | | | | | | |
|---|---|---|---|---|---|---|---|---|
| Unit Status | Function 1 (FIG. 101) | Function 2 (FIG. 102) | Function 3 (FIG. 103) | Function 4 (FIG. 104) | Function 5 (FIG. 105) | Function 6 (FIG. 106) | Function 7 (FIG. 107) | Function 8 (FIG. 108) |
| Active Rotation Power Source 100 | L ↔ L | Constant | L ↔ H | Constant | L ↔ H | L ↔ H | L ↔ H | L ↔ H |
| Clutch 102 | Closed | Closed | Closed | Closed | Disengaged | Closed | Closed | Disengaged |
| Primary Dynamo-Electric Unit 101 | As motor or generator | As motor or generator | As generator | As generator | Non-operating | As motor | As motor | Non-operating |
| Clutch 112 | Disengaged | Disengaged | Disengaged | Disengaged | Closed | Closed | Closed | Closed |
| Secondary Dynamo-Electric Unit 103 | As motor or generator | As motor or generator | As motor | As motor | Non-operating | As motor | Non-operating | As motor |
| Clutch 122 | Closed | Closed | Closed | Closed | Closed | Closed | Closed | Closed |
| Load 120 | Operating | Operating | Operating | Operating | Operating | Operating | Operating | Operating |
| Drive Control Unit 104 | Operating | Operating | Operating | Operating | Non-operating | Operating | Operating | Operating |
| Rechargeable Device 106 | Charge or Discharge | Charge or Discharge | | | Non-operating | Discharge | Discharge | Discharge |
| Load 130 | At Random | At Random | At Random | At Random | Non-operating | At Random | At Random | At Random |

| | System Function & Fig. No. | | | | | | | |
|---|---|---|---|---|---|---|---|---|
| Unit Status | Function 9 (FIG. 109) | Function 10 (FIG. 110) | Function 11 (FIG. 111) | Function 13 (FIG. 112) | Function 15 (FIG. 113) | Function 17 (FIG. 114) | Function 19 (FIG. 115) | Function 21 (FIG. 116) |
| Active Rotation Power Source 100 | L ↔ H | L ↔ H | L ↔ H | Non-operating or Idling | Constant | Constant | Constant | Non-operating or Idling |
| Clutch 102 | Closed | Disengaged | Closed | Disengaged | Closed | Disengaged | Closed | Disengaged |
| Primary Dynamo-Electric Unit 101 | As generator | Non-operating | As generator | Non-operating | As generator | Non-operating | As generator | Non-operating |
| Clutch 112 | Closed | Closed | Closed | Disengaged | Disengaged | Closed | Closed | Disengaged |
| Secondary Dynamo-Electric Unit 103 | Non-operating | As generator | As generator | As motor | Non-operating | As generator | As generator | As generator |
| Clutch 122 | Closed | Closed | Closed | Closed | Disengaged | Disengaged | Disengaged | Closed |
| Load 120 | Operating | Operating | Operating | Operating | Non-operating | Non-operating | Non-operating | Braking |
| Drive Control Unit 104 | Operating | Operating | Operating | Operating | Operating | Operating | Operating | Operating |
| Rechargeable Device 106 | Charge | Charge | Charge | Discharge | Charge | Charge | Charge | Charge |
| Load 130 | At Random | At Random | At Random | At Random | At Random | At Random | At Random | At Random |

| | System Function & Fig. No. | | | | | | |
|---|---|---|---|---|---|---|---|
| Unit Status | Function 21 (FIG. 117) | Function 22 (FIG. 118) | Function 23 (FIG. 119) | Function 24 (FIG. 120) | Function 25 (FIG. 121) | Function 26 (FIG. 122) | Function 27 (FIG. 123) |
| Active Rotation Power Source 100 | Damper | Damper | Damper | Damper | Start | Start | Start |

TABLE E-continued

| | | | | | | | |
|---|---|---|---|---|---|---|---|
| Clutch 102 | Disengaged | Closed | Disengaged | Closed | Closed | Disengaged | Closed |
| Primary Dynamo-Electric Unit 101 | Non-operating | As generator | Non-operating | As generator | As motor | Non-operating | As motor |
| Clutch 112 | Closed | Closed | Closed | Closed | Disengaged | Closed | Closed |
| Secondary Dynamo-Electric Unit 103 | Non-operating | Non-operating | As generator | As generator | Non-operating | As motor | As motor |
| Clutch 122 | Closed | Closed | Closed | Closed | Disengaged | Disengaged | Disengaged |
| Load 120 | Braking | Braking | Braking | Braking | Non-operating | Non-operating | Non-operating |
| Drive Control Unit 104 | Non-operating | Operating | Operating | Operating | Operating | Operating | Operating |
| Rechargeable Device 106 | Non-operating | Charge | Charge | Charge | Discharge | Discharge | Discharge |
| Load 130 | At Random | At Random | At Random | At Random | Non-operating | At Random | At Random |

The invention claimed is:

1. A series and parallel combined dual power system operating either as a series combined power system, or as a parallel combined power system; comprising:
   an engine;
   a primary dynamo-electric unit;
   a secondary dynamo-electric unit; and
   a first rechargeable device charged by the system;
   a rotary part of the engine being coupled to the primary dynamo-electric unit through at least one of a first clutch and a first variable transmission device comprising a first differential gear;
   a rotary part of the primary dynamo-electric unit being coupled to the secondary dynamo-electric unit through at least one of a second clutch and a second variable transmission device comprising a second differential gear;
   a rotary part of the secondary dynamo-electric unit being coupled to a load through at least one of a third clutch and a third variable transmission device;
   a drive control unit including circuits to control the primary dynamo-electric unit, the secondary dynamo-electric unit, and the rechargeable device;
   a central control unit comprising a device subject to control by a control interface and manipulating the drive control unit;
   the control interface comprising a device subject to manual input or input of a control signal to control the operation of the system;
   a redundant rechargeable device controlled by a start switch to drive a starter motor of the engine;
   wherein:
   the system operates as the series combined power system in case of a light load;
   the load is driven by the engine in case of a normal load;
   each of the primary and the secondary dynamo-electric units function as a motor on power from the rechargeable device to jointly drive the load with the power from the engine; and each function as a generator to provide power to the rechargeable device in case of a light load; and
   when the system is operating as the series combined power drive system, the second clutch is disengaged while the engine drives the primary dynamo-electric unit to operate as a generator and the power so generated drives the secondary dynamo-electric unit to operate as a motor for driving the load; and when the system is operating as the parallel combined power drive system the second clutch is closed up.

2. The series and parallel combined dual power system as claimed in claim 1, wherein
   the rotary part of the engine is coupled to the primary dynamo-electric unit through at least the first variable transmission device;
   the rotary part of the primary dynamo-electric unit is coupled to the secondary dynamo-electric unit through at least the second clutch and the second variable transmission device; and
   the rotary part of the secondary dynamo-electric unit is coupled to the load through at least the third variable transmission device.

3. The series and parallel combined dual power system as claimed in claim 1, wherein
   the rotary part of the engine is coupled to an input end of the second clutch through at least the first variable transmission;
   an output end of the second clutch is coupled to the rotary part of the secondary dynamo-electric unit; and
   the rotary part of the secondary dynamo-electric unit is coupled to the load through the third variable transmission device.

4. The series and parallel combined dual power system as claimed in claim 1, wherein
   the engine is coupled to the primary and secondary dynamo-electric units via an epicyclical gear set and a brake;
   the rotary part of the engine is coupled to an epicyclical gear of the epicyclical gear set;
   the rotary part of the primary dynamo-electric unit is coupled to a sun gear of the epicyclical gear set;
   a lockup function is provided either by the primary dynamo-electric unit or by the brake, where the rotary part of the primary dynamo-electric unit is coupled to a rotary side of the brake, and a static side of the brake is locked to a casing or to a static part of the primary dynamo-electric unit;
   wherein, when the primary dynamo-electric unit is in lockup status, rotary kinetic energy from the engine is outputted through an external gear.

5. The series and parallel combined dual power system as claimed in claim 1, wherein:
   when the primary dynamo-electric unit functions as a generator, the external gear is coupled to the input end of the second clutch and to the rotary side of the brake; and
   the static side of the brake is locked to the casing of the system.

6. The series and parallel combined dual power system as claimed in claim 1, wherein:

the engine is coupled to the primary and secondary dynamo-electric units via an revolving gear set and a brake;

the rotary part of the engine is coupled to a first end of the revolving gear set;

the rotary part of the primary dynamo-electric unit is coupled to a second end of the revolving gear set;

a lockup function is provided either by the primary dynamo-electric unit or by the brake, where the rotary part of the primary dynamo-electric unit is coupled to a rotary side of the brake, and a static side of the brake is locked to a casing or to a static part of the primary dynamo-electric unit;

wherein, when the primary dynamo-electric unit is in lockup status, rotary kinetic energy from the engine is outputted through a third end of the revolving gear set.

7. The series and parallel combined dual power system as claimed in claim 6, wherein:

when the primary dynamo-electric unit functions as a generator, the third I/O end of the revolving gear set is coupled to the input end of the second clutch and to the rotary side of the brake; and the static side of the brake is locked to the casing of the system.

8. The series and parallel combined dual power system as claimed in claim 1, wherein;

the secondary dynamo-electric unit is a combined dual power dynamo-electric unit;

the engine is coupled to the primary dynamo-electric unit and to the combined dual power dynamo-electric unit via the first clutch, and the output from the third variable transmission unit drives the load;

a rotary part of the engine is coupled to the rotary part of the primary dynamo-electric unit through the first clutch and the first variable transmission unit, and coupled to a first rotary part of the dual power dynamo-electric unit through the second clutch and a rotary part of a brake;

the first rotary part and a second rotary part of the dual power dynamo-electric unit are manipulated by the drive control unit function as a motor or as a generator;

wherein the first and the second rotary parts of the dual power drive dynamo-electric unit provide electromagnetic lockup through manipulation of the drive control unit;

wherein a fourth clutch is provided between the first and the second rotary parts of the dual power drive dynamo-electric unit, wherein said fourth clutch is also configured to provide lockup subject to manipulation of the drive control unit.

9. The series and parallel combined dual power system as claimed in claim 1, wherein;

the secondary dynamo-electric unit is a combined dual power dynamo-electric unit comprising first and second rotary parts;

the second clutch is provided between the rotary part of the primary dynamo-electric unit and the first rotary part of the dual power drive dynamo-electric unit;

a fourth clutch is provided between the first and the second rotary parts of the dual power drive dynamo-electric unit;

the system further comprises a brake, where a rotary part of the brake is coupled to the first rotary part of the dual power drive dynamo-electric unit, and a static part of the brake is locked to a casing;

wherein, when the second clutch is engaged and both the brake and the fourth clutch are disengaged, the engine drives the primary dynamo-electric as a generator, and the power so generated supplies at least one of the dual power drive dynamo-electric unit and the rechargeable device for the system to engage in series combined power drive operation;

when both the first and second clutches are engaged and both of the brake and the fourth clutch are disengaged, the power generated by at least one of the primary dynamo-electric unit and the rechargeable device supplies the dual power drive dynamo-electric unit;

when the brake is disengaged, and all said clutches are engaged, the dual power drive dynamo-electric unit drives the load; and when both clutches are disengaged and the brake locked up, power generated by at least one of the primary dynamo-electric unit and the rechargeable device drives the dual power drive dynamo-electric unit to function as a motor.

10. The series and parallel combined dual power system as claimed in claim 1, wherein;

the primary dynamo-electric unit and the engine are coupled to a multi-shaft variable transmission unit; and the output end of the engine drives the load as driven by the dual power dynamo-electric unit through the second clutch;

the output end of the engine is coupled to the multi-shaft variable transmission unit, and one of a plurality of output ends of the multi-shaft variable transmission unit drives the primary dynamo-electric unit through the first clutch, while other selected output ends of said plurality of ends of the multi-shaft variable transmission unit is coupled to the first rotary part of the dual power drive dynamo-electric unit through the second clutch and the rotary part of the brake;

as manipulated by the driver control unit, the first and the second rotary parts of the dual power drive dynamo-electric unit function as a motor or as a generator or lockup operation is provided between the first and the second rotary parts of the dual power drive dynamo-electric unit;

the third clutch is provided between the first and the second rotary parts of the dual power drive dynamo-electric unit and subject to the manipulation by the control unit.

11. The series and parallel combined dual power system as claimed in claim 10, wherein;

the first rotary part of the dual power drive dynamo-electric unit is coupled to the rotary side of the brake, and the static side of the brake is locked to the casing of the system;

the second rotary part of the dual power drive dynamo-electric unit directly or indirectly through the optionally provided variable transmission outputs to drive the load;

with the second clutch engaged and the brake and the third clutch disengaged, the engine drives the primary dynamo-electric to function as a generator, and the power so generated is used to drive the dual power drive dynamo-electric unit to function as a motor and/or to recharge the rechargeable device for the system to engage in series combined power drive operation;

when both the first and second clutches are engaged and both of the brake and the third clutch are disengaged, the power generated by the primary dynamo-electric unit and/or that from the rechargeable device drive the dual power drive dynamo-electric unit for the rotary kinetic energy of the dual power drive dynamo-electric unit and those from the engine to provide output of summarized speed;

wherein differential motion between the first and the second rotary parts of the dual power drive dynamo-electric unit recharges the rechargeable device;

wherein with the brake disengaged, and the first, second and third clutches engaged, the dual power drive dynamo-electric unit transmits the rotary kinetic energy from the engine to drive the load;

wherein the dual power drive dynamo-electric unit functions as a motor or as a brake for power regeneration with the third clutch disengaged and the brake engaged;

wherein when both the second and third clutches are disengaged and the brake is locked up, at least one of the power generated form the primary dynamo-electric unit and that from the rechargeable device jointly drive the dual power drive dynamo-electric unit to function as a motor;

wherein the second rotary part of the dual power drive dynamo-electric unit drives at least one load through the variable transmission or other transmission device;

wherein the second rotary part of the dual power drive dynamo-electric unit is coupled to the input end of the variable transmission unit that provides differential motion for both output ends capable of providing differential motion of the differential variable transmission unit to drive the load; and wherein the second clutch and the brake are manipulated to stay in disengaged status while the engine drives the primary dynamo-electric unit to function as a generator; the power so generated drives the dual power drive dynamo-electric unit to function as a generator to drive the load.

12. The series and parallel combined dual power system as claimed in claim 1, wherein:

both the primary and the secondary dynamo-electric units share a common structure;

said common structure comprising a concentric arrangement of an external dynamo-electric structure, a central dynamo-electric structure and an internal dynamo-electric structure, the central dynamo-electric structure comprising an exterior part and an interior part;

wherein the primary dynamo-electric unit comprises the external dynamo-electric structure and said exterior part of the central dynamo-electric structure; and the secondary dynamo-electric unit comprises the internal dynamo-electric structure and said interior part of the central dynamo-electric structure;

the central dynamo-electric structure is fixed to the casing of the system without engaging in rotation;

the external dynamo-electric structure is coupled to the engine through the first clutch or the variable transmission unit;

the second clutch is provided between the external and the internal dynamo-electric structures;

the internal dynamo-electric structure is coupled to the load; and the load coupled to the rotary part of the secondary dynamo-electric unit is selectively coupled to the input end of the variable transmission unit capable of exercising differential motion for both output ends capable of exercising differential motion of the differential variable transmission unit.

13. The series and parallel combined dual power system as claimed in claim 1, wherein:

both the primary and the secondary dynamo-electric units share a common structure;

said common structure comprising a concentric arrangement of an external dynamo-electric structure, a central dynamo-electric structure and an internal dynamo-electric structure, the central dynamo-electric structure comprising an exterior part and an interior part;

wherein the primary dynamo-electric unit comprises the external dynamo-electric structure and said exterior part of the central dynamo-electric structure; and the secondary dynamo-electric unit comprises the internal dynamo-electric structure and said interior part of the central dynamo-electric structure;

the central dynamo-electric structure is fixed to the casing of the system without engaging in rotation;

the central dynamo-electric structure is coupled to the engine through the first clutch or the variable transmission unit;

the second clutch is provided between the central and the internal dynamo-electric structures;

the internal dynamo-electric structure is coupled to the load; and the load coupled to the rotary part of the secondary dynamo-electric unit is selectively coupled to the input end of the variable transmission unit capable of exercising differential motion for both output ends capable of exercising differential motion of the differential variable transmission unit.

* * * * *

UNITED STATES PATENT AND TRADEMARK OFFICE
CERTIFICATE OF CORRECTION

| | |
|---|---|
| PATENT NO. | : 7,173,344 B2 |
| APPLICATION NO. | : 10/918487 |
| DATED | : February 6, 2007 |
| INVENTOR(S) | : Tai-Her Yang |

Page 1 of 1

It is certified that error appears in the above-identified patent and that said Letters Patent is hereby corrected as shown below:

Column 49, line 19, add --, the external dynamo-electric structure 1011-- after the word "structure";

Column 64, line 32, change "central" to --external--.

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,173,344 B2 |
| APPLICATION NO. | : 10/918487 |
| DATED | : February 6, 2007 |
| INVENTOR(S) | : Tai-Her Yang |

It is certified that error appears in the above-identified patent and that said Letters Patent is hereby corrected as shown below:

In the Drawings

Delete Drawing Sheet 65 of 73 consisting of Figs. 129 and 130 and substitute therefore with the attached Drawing Sheet 65 of 73.

Signed and Sealed this
First Day of December, 2015

Michelle K. Lee
*Director of the United States Patent and Trademark Office*